US008566185B2

(12) United States Patent
Bartelt et al.

(10) Patent No.: US 8,566,185 B2
(45) Date of Patent: Oct. 22, 2013

(54) MANAGING CONSISTENT INTERFACES FOR FINANCIAL INSTRUMENT BUSINESS OBJECTS ACROSS HETEROGENEOUS SYSTEMS

(75) Inventors: Joerg Bartelt, Stutensee (DE); Dirk Endesfelder, Neckarsulm (DE); Martin Erdelmeier, Schifferstadt (DE); Rainer Richter, Leimen (DE); Manfred Wanninger, Neulussheim (DE); Sarah Von Glan, Sandhausen (DE)

(73) Assignee: SAP AG, Walldorf (DE)

( * ) Notice: Subject to any disclaimer, the term of this patent is extended or adjusted under 35 U.S.C. 154(b) by 956 days.

(21) Appl. No.: 12/147,414

(22) Filed: Jun. 26, 2008

(65) Prior Publication Data

US 2009/0327106 A1 Dec. 31, 2009

(51) Int. Cl.

| | |
|---|---|
| ***G07B 17/00*** | (2006.01) |
| ***G07F 19/00*** | (2006.01) |
| ***G06F 17/30*** | (2006.01) |
| ***G07G 1/00*** | (2006.01) |
| ***G06Q 40/00*** | (2012.01) |

(52) U.S. Cl.
USPC ................................. 705/30; 705/10; 705/35

(58) Field of Classification Search
USPC ................................................ 705/30, 10, 35
See application file for complete search history.

(56) References Cited

U.S. PATENT DOCUMENTS

| | | | | |
|---|---|---|---|---|
| 3,223,321 A | | 12/1965 | Baumgartner | |
| 5,126,936 A | | 6/1992 | Champion et al. | |
| 5,210,686 A | | 5/1993 | Jernigan | |
| 5,247,575 A | | 9/1993 | Sprague et al. | |
| 5,255,181 A | | 10/1993 | Chapman et al. | |
| 5,321,605 A | | 6/1994 | Chapman et al. | |
| 5,434,971 A | * | 7/1995 | Lysakowski, Jr. | 702/31 |
| 5,463,555 A | | 10/1995 | Ward et al. | |
| 5,630,069 A | * | 5/1997 | Flores et al. | 705/7.27 |
| 5,787,237 A | | 7/1998 | Reilly | |
| 5,812,987 A | | 9/1998 | Luskin et al. | |
| 5,966,695 A | * | 10/1999 | Melchione et al. | 705/7.33 |
| 5,970,465 A | | 10/1999 | Dietrich et al. | |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

Ntegrating & customizinf heterogeneous, Anat Eyal, The VLDB journal 1): pp. 16-38, Aug. 2, 2001.*

(Continued)

*Primary Examiner* — Matthew Gart
*Assistant Examiner* — Harshad Parikh
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to a financial instrument position accounting period total analytical result, a financial instrument position accounting valuation analytical result, a financial instrument position accrual analytical result, a financial instrument position fair value analytical result, and/or a financial instrument position period average volume analytical result business object.

6 Claims, 139 Drawing Sheets

(56) References Cited

U.S. PATENT DOCUMENTS

| | | | | |
|---|---|---|---|---|
| 5,970,475 | A | 10/1999 | Barnes et al. | |
| 5,983,284 | A | 11/1999 | Argade | |
| 6,047,264 | A | 4/2000 | Fisher et al. | |
| 6,073,137 | A | 6/2000 | Brown et al. | |
| 6,092,196 | A | 7/2000 | Reiche | |
| 6,104,393 | A | 8/2000 | Santos-Gomez | |
| 6,115,690 | A | 9/2000 | Wong | |
| 6,125,391 | A | 9/2000 | Meltzer et al. | |
| 6,138,118 | A | 10/2000 | Koppstein et al. | |
| 6,154,729 | A * | 11/2000 | Cannon et al. | 705/35 |
| 6,154,732 | A | 11/2000 | Tarbox | |
| 6,222,533 | B1 | 4/2001 | Notani et al. | |
| 6,226,675 | B1 | 5/2001 | Meltzer et al. | |
| 6,229,551 | B1 | 5/2001 | Huang | |
| 6,311,165 | B1 | 10/2001 | Coutts et al. | |
| 6,327,700 | B1 * | 12/2001 | Chen et al. | 717/127 |
| 6,331,972 | B1 | 12/2001 | Harris et al. | |
| 6,332,163 | B1 | 12/2001 | Bowman-Amuah | |
| 6,421,653 | B1 * | 7/2002 | May | 705/36 R |
| 6,424,979 | B1 | 7/2002 | Livingston et al. | |
| 6,434,159 | B1 | 8/2002 | Woodward et al. | |
| 6,438,594 | B1 | 8/2002 | Bowman-Amuah | |
| 6,542,912 | B2 | 4/2003 | Meltzer et al. | |
| 6,591,260 | B1 | 7/2003 | Schwarzhoff et al. | |
| 6,725,122 | B2 | 4/2004 | Mori et al. | |
| 6,738,747 | B1 | 5/2004 | Tanaka et al. | |
| 6,745,229 | B1 | 6/2004 | Gobin et al. | |
| 6,763,353 | B2 | 7/2004 | Li et al. | |
| 6,775,647 | B1 | 8/2004 | Evans et al. | |
| 6,868,370 | B1 | 3/2005 | Burbridge et al. | |
| 6,937,992 | B1 | 8/2005 | Benda et al. | |
| 6,970,844 | B1 | 11/2005 | Bierenbaum | |
| 7,020,594 | B1 | 3/2006 | Chacon | |
| 7,039,606 | B2 | 5/2006 | Hoffman et al. | |
| 7,076,449 | B2 | 7/2006 | Tsunenari et al. | |
| 7,131,069 | B1 | 10/2006 | Rush et al. | |
| 7,206,768 | B1 | 4/2007 | deGroeve et al. | |
| 7,249,157 | B2 | 7/2007 | Stewart et al. | |
| 7,269,569 | B2 | 9/2007 | Spira et al. | |
| 7,292,965 | B1 | 11/2007 | Mehta et al. | |
| 7,321,864 | B1 | 1/2008 | Gendler | |
| 7,363,271 | B2 | 4/2008 | Morimoto | |
| 7,379,931 | B2 | 5/2008 | Morinville | |
| 7,383,990 | B2 | 6/2008 | Veit | |
| 7,406,358 | B2 | 7/2008 | Preiss | |
| 7,418,415 | B1 * | 8/2008 | Wasserman | 705/35 |
| 7,421,699 | B2 * | 9/2008 | Brendle et al. | 719/310 |
| 7,475,032 | B1 * | 1/2009 | Patnode et al. | 705/36 R |
| 7,481,367 | B2 | 1/2009 | Fees et al. | |
| 7,509,278 | B2 | 3/2009 | Jones | |
| 7,515,697 | B2 | 4/2009 | Eng et al. | |
| 7,516,088 | B2 | 4/2009 | Johnson et al. | |
| 7,571,191 | B2 * | 8/2009 | Dill et al. | 1/1 |
| 7,574,383 | B1 | 8/2009 | Parasnis et al. | |
| 7,627,504 | B2 | 12/2009 | Brady et al. | |
| 7,634,482 | B2 | 12/2009 | Mukherjee et al. | |
| 7,788,319 | B2 | 8/2010 | Schmidt et al. | |
| 7,797,370 | B2 * | 9/2010 | Brunswig et al. | 709/201 |
| 7,805,383 | B2 | 9/2010 | Veit et al. | |
| 7,853,491 | B2 | 12/2010 | Wittmer et al. | |
| 7,865,426 | B2 | 1/2011 | Volpert | |
| 7,873,965 | B2 | 1/2011 | Hayton et al. | |
| 7,895,209 | B2 | 2/2011 | Spence et al. | |
| 7,941,236 | B2 | 5/2011 | Spearman | |
| 8,180,051 | B1 * | 5/2012 | O'Toole, Jr. | 380/255 |
| 8,205,002 | B2 * | 6/2012 | Clarke et al. | 709/230 |
| 8,266,123 | B2 * | 9/2012 | Dill et al. | 707/702 |
| 8,266,315 | B2 * | 9/2012 | van Oldenborgh et al. | 709/231 |
| 8,364,608 | B2 * | 1/2013 | Hammer et al. | 705/342 |
| 8,364,715 | B2 * | 1/2013 | Schoknecht et al. | 707/791 |
| 8,374,931 | B2 * | 2/2013 | Bhatia et al. | 705/35 |
| 8,392,364 | B2 * | 3/2013 | Horn et al. | 707/613 |
| 8,412,374 | B2 * | 4/2013 | Kuehnrich et al. | 700/236 |
| 8,412,603 | B2 * | 4/2013 | N et al. | 705/35 |
| 8,433,585 | B2 * | 4/2013 | Sr et al. | 705/29 |
| 2001/0042032 | A1 | 11/2001 | Crawshaw et al. | |
| 2002/0013721 | A1 | 1/2002 | Dabbiere et al. | |
| 2002/0026394 | A1 | 2/2002 | Savage et al. | |
| 2002/0046053 | A1 | 4/2002 | Hare et al. | |
| 2002/0052754 | A1 | 5/2002 | Joyce et al. | |
| 2002/0072988 | A1 | 6/2002 | Aram | |
| 2002/0087481 | A1 | 7/2002 | Harif | |
| 2002/0087483 | A1 | 7/2002 | Harif | |
| 2002/0099634 | A1 | 7/2002 | Coutts et al. | |
| 2002/0107765 | A1 | 8/2002 | Walker | |
| 2002/0112171 | A1 | 8/2002 | Ginter et al. | |
| 2002/0138318 | A1 | 9/2002 | Ellis et al. | |
| 2002/0147668 | A1 | 10/2002 | Smith et al. | |
| 2002/0152104 | A1 | 10/2002 | Ojha et al. | |
| 2002/0152145 | A1 | 10/2002 | Wanta et al. | |
| 2002/0156693 | A1 | 10/2002 | Stewart et al. | |
| 2002/0156930 | A1 | 10/2002 | Velasquez | |
| 2002/0157017 | A1 | 10/2002 | Mi et al. | |
| 2002/0169657 | A1 | 11/2002 | Singh et al. | |
| 2002/0184070 | A1 | 12/2002 | Chen et al. | |
| 2002/0186876 | A1 | 12/2002 | Jones et al. | |
| 2002/0194045 | A1 | 12/2002 | Shay et al. | |
| 2002/0198811 | A1 * | 12/2002 | Wizon et al. | 705/36 |
| 2003/0004799 | A1 | 1/2003 | Kish | |
| 2003/0069648 | A1 | 4/2003 | Douglas et al. | |
| 2003/0086594 | A1 | 5/2003 | Gross | |
| 2003/0120502 | A1 | 6/2003 | Robb et al. | |
| 2003/0120665 | A1 | 6/2003 | Fox et al. | |
| 2003/0126077 | A1 | 7/2003 | Kantor et al. | |
| 2003/0167193 | A1 | 9/2003 | Jones et al. | |
| 2003/0171962 | A1 | 9/2003 | Hirth et al. | |
| 2003/0172007 | A1 | 9/2003 | Helmolt et al. | |
| 2003/0172135 | A1 | 9/2003 | Bobick et al. | |
| 2003/0195815 | A1 | 10/2003 | Li et al. | |
| 2003/0204452 | A1 | 10/2003 | Wheeler | |
| 2003/0208389 | A1 | 11/2003 | Kurihara et al. | |
| 2003/0212614 | A1 | 11/2003 | Chu et al. | |
| 2003/0216978 | A1 * | 11/2003 | Sweeney et al. | 705/30 |
| 2003/0220875 | A1 | 11/2003 | Lam et al. | |
| 2003/0229522 | A1 | 12/2003 | Thompson et al. | |
| 2003/0229550 | A1 | 12/2003 | DiPrima et al. | |
| 2003/0233295 | A1 | 12/2003 | Tozawa et al. | |
| 2003/0236748 | A1 | 12/2003 | Gressel et al. | |
| 2004/0015366 | A1 * | 1/2004 | Wiseman et al. | 705/1 |
| 2004/0024662 | A1 | 2/2004 | Gray et al. | |
| 2004/0034577 | A1 | 2/2004 | Van Hoose et al. | |
| 2004/0039665 | A1 | 2/2004 | Ouchi | |
| 2004/0073510 | A1 | 4/2004 | Logan | |
| 2004/0083201 | A1 | 4/2004 | Sholl et al. | |
| 2004/0083233 | A1 | 4/2004 | Willoughby | |
| 2004/0133445 | A1 * | 7/2004 | Rajan et al. | 705/1 |
| 2004/0138942 | A1 | 7/2004 | Pearson et al. | |
| 2004/0148227 | A1 | 7/2004 | Tabuchi et al. | |
| 2004/0172360 | A1 | 9/2004 | Mabrey et al. | |
| 2004/0187140 | A1 | 9/2004 | Aigner et al. | |
| 2004/0220910 | A1 | 11/2004 | Zang et al. | |
| 2004/0225589 | A1 * | 11/2004 | Marlowe-Noren | 705/35 |
| 2004/0249650 | A1 * | 12/2004 | Freedman et al. | 705/1 |
| 2004/0254945 | A1 | 12/2004 | Schmidt et al. | |
| 2004/0267714 | A1 | 12/2004 | Frid et al. | |
| 2005/0015273 | A1 | 1/2005 | Iyer | |
| 2005/0021366 | A1 | 1/2005 | Pool et al. | |
| 2005/0033588 | A1 | 2/2005 | Ruiz et al. | |
| 2005/0038744 | A1 | 2/2005 | Viijoen | |
| 2005/0049903 | A1 | 3/2005 | Raja | |
| 2005/0071262 | A1 | 3/2005 | Kobeh et al. | |
| 2005/0080640 | A1 | 4/2005 | Bhaskaran et al. | |
| 2005/0108085 | A1 | 5/2005 | Dakar et al. | |
| 2005/0131947 | A1 | 6/2005 | Laub et al. | |
| 2005/0159997 | A1 | 7/2005 | John | |
| 2005/0171833 | A1 | 8/2005 | Jost et al. | |
| 2005/0182639 | A1 | 8/2005 | Dale | |
| 2005/0187797 | A1 | 8/2005 | Johnson | |
| 2005/0187802 | A1 * | 8/2005 | Koeppel | 705/4 |
| 2005/0187866 | A1 | 8/2005 | Lee | |
| 2005/0194431 | A1 | 9/2005 | Fees et al. | |
| 2005/0194439 | A1 | 9/2005 | Zuerl et al. | |
| 2005/0197849 | A1 | 9/2005 | Fotteler et al. | |
| 2005/0197851 | A1 | 9/2005 | Veit | |

(56) References Cited

U.S. PATENT DOCUMENTS

2005/0197878 A1 9/2005 Fotteler et al.
2005/0197881 A1 9/2005 Fotteler et al.
2005/0197882 A1 9/2005 Fotteler et al.
2005/0197886 A1 9/2005 Veit
2005/0197887 A1 9/2005 Zuerl et al.
2005/0197896 A1 9/2005 Veit et al.
2005/0197897 A1 9/2005 Veit et al.
2005/0197898 A1 9/2005 Veit et al.
2005/0197899 A1 9/2005 Veit et al.
2005/0197900 A1 9/2005 Veit
2005/0197901 A1 9/2005 Veit et al.
2005/0197902 A1 9/2005 Veit
2005/0197928 A1 9/2005 Fotteler et al.
2005/0197941 A1 9/2005 Veit
2005/0209732 A1 9/2005 Audimoolam et al.
2005/0210406 A1 9/2005 Biwer et al.
2005/0216321 A1 9/2005 Veit
2005/0216371 A1 9/2005 Fotteler et al.
2005/0216421 A1 9/2005 Barry et al.
2005/0222888 A1 10/2005 Hosoda et al.
2005/0222896 A1 10/2005 Rhyne et al.
2005/0222945 A1 10/2005 Pannicke et al.
2005/0228821 A1 10/2005 Gold
2005/0234749 A1* 10/2005 Attebury et al. ................. 705/5
2005/0234754 A1 10/2005 Veit
2005/0246240 A1 11/2005 Padilla
2005/0256753 A1 11/2005 Veit et al.
2005/0262014 A1* 11/2005 Fickes ............................ 705/38
2006/0004934 A1 1/2006 Guldner et al.
2006/0005098 A1 1/2006 Lotz et al.
2006/0020515 A1 1/2006 Lee et al.
2006/0026586 A1 2/2006 Remmel et al.
2006/0036941 A1 2/2006 Neil
2006/0047574 A1 3/2006 Sundaram et al.
2006/0047598 A1 3/2006 Hansen
2006/0059005 A1 3/2006 Horn et al.
2006/0059059 A1 3/2006 Horn et al.
2006/0059060 A1 3/2006 Horn et al.
2006/0069598 A1 3/2006 Schweitzer et al.
2006/0069629 A1 3/2006 Schweitzer et al.
2006/0069632 A1 3/2006 Kahn et al.
2006/0074728 A1 4/2006 Schweitzer et al.
2006/0080338 A1 4/2006 Seubert et al.
2006/0085336 A1 4/2006 Seubert et al.
2006/0085412 A1 4/2006 Johnson et al.
2006/0085450 A1 4/2006 Seubert et al.
2006/0089885 A1 4/2006 Finke et al.
2006/0095373 A1 5/2006 Venkatasubramanian et al.
2006/0184435 A1 8/2006 Mostowfi
2006/0212376 A1* 9/2006 Snyder et al. .................. 705/35
2006/0280302 A1 12/2006 Baumann et al.
2006/0282360 A1 12/2006 Kahn et al.
2007/0027742 A1 2/2007 Emuchay et al.
2007/0043583 A1 2/2007 Davulcu et al.
2007/0055688 A1* 3/2007 Blattner ....................... 707/102
2007/0078799 A1 4/2007 Huber-Buschbeck et al.
2007/0100943 A1* 5/2007 Brunswig et al. ............. 709/206
2007/0112574 A1* 5/2007 Greene ............................ 705/1
2007/0124227 A1 5/2007 Dembo et al.
2007/0129978 A1 6/2007 Shirasu et al.
2007/0132585 A1 6/2007 Llorca et al.
2007/0136188 A1* 6/2007 Casper et al. .................. 705/38
2007/0150387 A1 6/2007 Seubert et al.
2007/0150836 A1 6/2007 Deggelmann et al.
2007/0156428 A1 7/2007 Brecht-Tillinger et al.
2007/0156545 A1* 7/2007 Lin ................................ 705/28
2007/0156552 A1 7/2007 Manganiello
2007/0156690 A1 7/2007 Moser et al.
2007/0165622 A1 7/2007 O'Rourke et al.
2007/0168228 A1* 7/2007 Lawless ........................... 705/2
2007/0214065 A1 9/2007 Kahlon et al.
2007/0225949 A1 9/2007 Sundararajan et al.
2007/0226090 A1 9/2007 Stratton
2007/0233586 A1* 10/2007 Liu et al. ........................ 705/35
2007/0244859 A1* 10/2007 Trippe et al. ...................... 707/3
2007/0255639 A1 11/2007 Seifert
2007/0265860 A1 11/2007 Herrmann et al.
2007/0265862 A1 11/2007 Freund et al.
2007/0294159 A1 12/2007 Cottle
2008/0005012 A1 1/2008 Deneef
2008/0021754 A1 1/2008 Horn et al.
2008/0040243 A1 2/2008 Chang et al.
2008/0046104 A1 2/2008 Van Camp et al.
2008/0046421 A1 2/2008 Bhatia et al.
2008/0120129 A1 5/2008 Seubert et al.
2008/0120190 A1 5/2008 Joao et al.
2008/0120204 A1 5/2008 Conner et al.
2008/0133303 A1 6/2008 Singh et al.
2008/0154969 A1 6/2008 DeBie
2008/0162266 A1 7/2008 Griessmann et al.
2008/0184265 A1 7/2008 Kasi et al.
2008/0196108 A1* 8/2008 Dent et al. ...................... 726/28
2008/0215354 A1 9/2008 Halverson et al.
2008/0215370 A1* 9/2008 Dent et al. ........................ 705/3
2008/0243578 A1 10/2008 Veit
2008/0255974 A1* 10/2008 Jacob et al. ..................... 705/35
2008/0288317 A1 11/2008 Kakar
2009/0006203 A1* 1/2009 Fordyce et al. ................. 705/14
2009/0063287 A1 3/2009 Tribout et al.
2009/0077074 A1 3/2009 Hosokawa
2009/0089198 A1 4/2009 Kroutik
2009/0164497 A1* 6/2009 Steinmaier et al. ........... 707/102
2009/0192926 A1 7/2009 Tarapata
2009/0193432 A1* 7/2009 McKegney et al. ........... 719/315
2009/0222360 A1* 9/2009 Schmitt et al. .................. 705/29
2009/0248431 A1 10/2009 Schoknecht et al.
2009/0248547 A1 10/2009 Doenig et al.
2009/0248558 A1* 10/2009 Hollberg et al. ................ 705/35
2009/0248586 A1* 10/2009 Kaisermayr et al. ............ 705/80
2009/0248698 A1* 10/2009 Rehmann ........................ 707/10
2009/0249362 A1* 10/2009 Lindemann et al. .......... 719/316
2009/0271245 A1 10/2009 Joshi et al.
2009/0300578 A1* 12/2009 Neil ............................. 717/104
2009/0319421 A1* 12/2009 Mathis et al. ................... 705/40
2009/0326988 A1* 12/2009 Barth et al. ....................... 705/4
2009/0327106 A1* 12/2009 Bartelt et al. ................... 705/30
2010/0014510 A1 1/2010 Boreli et al.
2010/0070391 A1* 3/2010 Storr et al. ...................... 705/30
2010/0070395 A1 3/2010 Elkeles et al.
2010/0076977 A1* 3/2010 Wyatt et al. ................... 707/737
2010/0106555 A1 4/2010 Mneimneh et al.
2010/0153297 A1* 6/2010 Haaf et al. .................. 705/36 R
2010/0161425 A1 6/2010 Sideman
2011/0046775 A1* 2/2011 Bailey et al. .................. 700/224
2011/0206198 A1* 8/2011 Freedman et al. ....... 379/265.03
2011/0276360 A1* 11/2011 Barth et al. .................. 705/7.23
2011/0307289 A1* 12/2011 Hosur et al. ................. 705/7.23
2011/0307348 A1* 12/2011 Vasing et al. ................ 705/26.5
2011/0307358 A1* 12/2011 Rumig et al. ................... 705/30
2011/0307398 A1* 12/2011 Reinhardt et al. ............ 705/319
2011/0307405 A1* 12/2011 Hammer et al. .............. 705/331
2012/0117000 A1* 5/2012 Haaf et al. .................. 705/36 R
2012/0173522 A1* 7/2012 Girsig et al. .................. 707/736
2012/0253997 A1* 10/2012 Kovalev .......................... 705/30
2013/0030930 A1* 1/2013 Asal et al. ....................... 705/16
2013/0030967 A1* 1/2013 Prasad et al. .................... 705/34
2013/0031014 A1* 1/2013 Richter et al. ................ 705/320
2013/0031566 A1* 1/2013 Sureshan et al. .............. 719/313
2013/0103615 A1* 4/2013 Mun .......................... 705/36 R

FOREIGN PATENT DOCUMENTS

CN 1632806 6/2005
CN 1767537 5/2006
CN 101174957 5/2008

OTHER PUBLICATIONS

Too much Middleware, Michael Stonebraker, SIGMOD record, Vil 31, No. 1, pp. 97-106 Mar. 2002.*
Role of B2B engines in B2B integration, Christopher Bussler, SIGMOD record, vol. 31, No. 1, pp. 67-72Mar. 2002.*
"Header", Newton's Telecom Dictionary; 12th Edition, 2004; pp. 389-390).

(56) References Cited

OTHER PUBLICATIONS

Office Action issued in U.S. Appl. No. 11/640,422 on May 14, 2010; 12 pages.
Notice of Allowance issued in related U.S. Appl. No. 11/775,821 on Jul. 16, 2010; 4 pages.
Office Action issued in related U.S. Appl. No. 11/864,871 on Apr. 21, 2010; 20 pages.
Office Action issued in related U.S. Appl. No. 12/060,178 on May 25, 2010; 19 pages.
Office Action issued in related U.S. Appl. No. 12/060,171 on Jul. 1, 2010; 19 pages.
Advisory Action issued in U.S. Appl. No. 11/155,368 on Mar. 31, 2010; 3 pages.
SAP Structured Entity Relationship Model (SAP-SERM) for R/3 System Release 4.0 Introduction and Index; Dec. 1998; 26 pages.
SAP Structured Entity Relationship Model (SAP-SERM) for R/3 System Release 4.0 (Part 1); Dec. 1998; 5954 pages.
SAP Structured Entity Relationship Model (SAP-SERM) for R/3 System Release 4.0 (Part 2); Dec. 1998; 7838 pages.
Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf ; 36 pages.
"UML in the .com Enterprise: Modeling CORBA, Components, XML/XMI and Metadata Workshop"; <http://www.omg.org/news/meetings/workshops/uml_presentations.htm>.
Medjahed, Brahim et al; "Business-to-Business Interactions: Issues and Enabling Technologies"; The VLDB Journal; vol. 12, No. 1; Apr. 3, 2003; pp. 59-89.
Medjahed, Brahim et al.; "Composing Web Services on the Semantic Web"; The VLDB Journal; vol. 12, No. 4, Sep. 23, 2003; pp. 333-351.
Born, Marc et al.; "Customizing UML for Component Design"; www.dot-profile.de; UML Workshop, Palm Springs, CA; Nov. 2000.
Kappel, Gerti et al.; "A Framework for Workflow Management Systems Based on Objects, Rules, and Roles"; ACM Computing Surveys; ACM Press; vol. 32; Mar. 2000; 5 pages.
Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.
Microsoft; "Creating an XML Web Service Proxy"; 2001; mshelp://ms.msdnqtr.2003apr.1033/cpguide/html/cpconcreatingwebserviceproxy.htm; 3 pages.
Proceedings of OMG Workshops; http://www.omg.org/news/meetings/workshops/proceedings.htm; pp. 1-3.
Meltzer, Bart et al.; "XML and Electronic Commerce: Enabling the Network Economy"; SIGMOD Record; ACM Press; vol. 27, No. 4; Dec. 1998; pp. 21-24.
Huhns, Michael N. et al.; "Automating Supply-Chain Mangement"; Jul. 15-19, 2002; pp. 1017-1024.
Soederstroem, Eva; "Standardising the Business Vocabulary of Standards"; SAC, Madrid, Spain; 2002; pp. 1048-1052.
Bastide, Remi et al.; "Formal Specification of CORBA Services: Experience and Lessons Learned"; 2000; pp. 105-117.
Glushko, Robert J. et al.; "An XML Framework for Agent-Based E-Commerce"; Communications of the ACM; vol. 42, No. 3; Mar. 1999; pp. 106-114.
Coen-Porisini, Alberto et al.; "A Formal Approach for Designing CORBA-Based Applications"; ACM Transactions on Software Engineering and Methodology; vol. 12, No. 2; Apr. 2003; pp. 107-151.
Yang, J. et al.; "Service Deployment for Virtual Enterprises"; IEEE; 2001; pp. 107-115.
Karp, Alan H.; "E-speak E-xplained"; Communications of the ACM; vol. 46, No. 7; Jul. 2003; pp. 113-118.
Gillibrand, David; "Essential Business Object Design"; Communications of the ACM; vol. 43, No. 2; Feb. 2000; pp. 117-119.
Cole, James et al.; "Extending Support for Contracts in ebXML"; IEEE; 2001; pp. 119-127.
DiNitto, Elisabetta et al.; "Deriving Executable Process Descriptions from UML"; ICSE '02; May 19-25, 2002; pp. 155-165.
Stumptner, Markus et al.; "On the Road to Behavior-Based Integration"; First Asia-Pacific Conferences on Conceptual Modelling; Dunedin, New Zealand; Jan. 2004; pp. 15-22.
Gosain, Sanjay et al.; "The Impact of Common E-Business Interfaces"; Communications of the ACM; vol. 46, No. 2; Dec. 2003; pp. 186-195.
Damodaran, Suresh; "B2B Integration over the Internet with XML—RosettaNet Successes and Challenges"; WWW2004; May 17-22, 2004; pp. 188-195.
Schulze, Wolfgang et al.; "Standardising on Workflow-Management—The OMG Workflow Management Facility"; SIGGROUP Bulletin; vol. 19, No. 1; Apr. 1998; pp. 24-30.
Sutherland, Jeff; "Business Objects in Corporate Information Systems"; ACM Computing Surveys; vol. 27, No. 2; Jun. 1995; pp. 274-276.
Arsanjani, Ali; "Developing and Integrating Enterprise Components and Services"; Communications of the ACM; vol. 45, No. 10; Oct. 2002; pp. 31-34.
Kim, Dan Jong et al.; "A Comparison of B2B E-Service Solutions"; Communications of the ACM; vol. 46, No. 12; Dec. 2003; pp. 317-324.
Hasselbring, Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the 17th Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; 27th Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.

(56) References Cited

OTHER PUBLICATIONS

Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirk et al.; "Using UML for Software Process Modeling"; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anat et al.; "Integrating and Customizing Heterogeneous E-Commerce Applications"; The VLDB Journal; Aug. 2001; pp. 16-38.
He, Ning et al.; "B2B Contract Implementation Using Windows DNS"; 2001; pp. 71-79.
FSML—Financial Services Markup Language (Jul. 14, 1999) http://xml.coverpages.org/FSML-v1500a.pdf; pp. 1-159.
Webster's Revised Unabridged Dictionary (1913+1828); Def. "merchandise".
Statement in Accordance with the Notice from the European Patent Office dated Oct. 1, 2007 Concerning Business Methods—EPC; Official Journal of the European Patent Office; Munich; Nov. 1, 2007; pp. 592-593.
Lynn, Chris; "Sony Enters Brand Asset Management Market"; The Seybold Report; Analyzing Publishing Technologies; Aug. 4, 2004; <www.Seybold365.com>; 3 pages.
International Search Report and Written Opinion of the International Searching Authority issued in International Application No. PCT/US2007/011378 on Apr. 30, 2008; 17 pages.
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Office Action issued in related U.S. Appl. No. 11/775,821 on Jan. 22, 2010; 16 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/060,178 on Dec. 7, 2009; 6 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 11/145,464 on Aug. 5, 2009; 31 pages.
Office Action issued in related U.S. Appl. No. 11/145,464 on Jan. 22, 2009; 30 pages.
Office Action issued in related U.S. Appl. No. 11/145,464 on Feb. 5, 2010; 57 pages.
Office Action issued in related U.S. Appl. No. 11/155,368 on May 14, 2009; 6 pages.
Office Action issued in related U.S. Appl. No. 11/155,368 on Dec. 10, 2009; 43 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Communication Pursuant to Article 94(3) EPC issued in related European Application No. 05757432.9 on Jan. 26, 2009; 4 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
Newton's Telecom Dictionary; 18th Edition; 2002; pp. 347, 454.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
Notice of Allowance issued in related U.S. Appl. No. 12/147,395 on Oct. 26, 2010; 10 pages.
Office Action issued in related U.S. Appl. No. 12/147,399 on Jan. 26, 2011; 16 pages.

(56) References Cited

OTHER PUBLICATIONS

Notice of Allowance issued in related U.S. Appl. No. 11/775,821 on Oct. 22, 2010; 4 pages.
Notice of Allowance issued in related U.S. Appl. No. 11/775,821 on Feb. 4, 2011; 4 pages.
Notice of Allowance issued in related U.S. Appl. No. 11/364,538 on Dec. 13, 2010; 5 pages.
Notice of Allowance issued in related U.S. Appl. No. 11/731,857 on Nov. 29, 2010; 4 pages.
Notice of Allowance issued in U.S. Appl. No. 12/323,139 on Mar. 4, 2011; 13 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Office Action issued in related U.S. Appl. No. 11/864,871 on Oct. 1, 2010; 30 pages.
Office Action issued in related U.S. Appl. No. 12/059,971 on Nov. 4, 2010; 20 pages.
Office Action issued in related U.S. Appl. No. 12/060,149 on Aug. 26, 2010; 15 pages.
Office Action issued in related U.S. Appl. No. 12/060,149 on Feb. 4, 2011; 19 pages.
Notice of Allowance issued in related U.S. Appl. No. 12/060,178 on Dec. 6, 2010; 4 pages.
Office Action issued in related U.S. Appl. No. 12/060,171 on Jan. 26, 2011; 17 pages.
Notice of Allowance issued in related U.S. Appl. No. 11/145,464 on Nov. 1, 2010; 4 pages.
Notice of Allowance issued in U.S. Appl. No. 11/155,368 on Oct. 7, 2010; 4 pages.
Notice of Allowance issued in related U.S. Appl. No. 11/166,065 on Sep. 20, 2010; 6 pages.
Notice of Allowance issued in U.S. Appl. No. 11/166,065 on Mar. 8, 2011; 5 pages.
Office Action issued in related U.S. Appl. No. 11/864,866 on Feb. 3, 2011; 20 pages.
Office Action issued in U.S. Appl. No. 11/864,811 on Mar. 18, 2011; 10 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
SAP; "BC-Central Maintenance and Transport Objects"; Release 4.6C; Apr. 200; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; date unknown; 8 pages.
Communication Pursuant to Article 94(3) issued in European Application No. 05757432.9 on Apr. 12, 2011; 5 pages.
Notice of Allowance issued in U.S. Appl. No. 12/147,395 on May 4, 2011; 10 pages.
Notice of Allowance issued in related U.S. Appl. No. 12/147,449 on Apr. 28, 2011; 9 pages.
Office Action issued in related U.S. Appl. No. 12/334,175 on May 27, 2011; 12 pages.
Notice of Allowance issued in related U.S. Appl. No. 11/731,857 on Apr. 11, 2011; 8 pages.
Office Action issued in U.S. Appl. No. 12/147,378 on Jun. 17, 2011; 10 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/059,804 on Apr. 28, 2011; 14 pages.
Office Action issued in related U.S. Appl. No. 12/059,860 on Aug. 3, 2011; 15 pages.
Office Action issued in related U.S. Appl. No. 12/060,192 on Apr. 14, 2011; 18 pages.
Office Action issued in related U.S. Appl. No. 12/060,062 on Jul. 13, 2011; 16 pages.
Office Action issued in related U.S. Appl. No. 12/060,155 on May 10, 2011; 8 pages.
Notice of Allowance issued in related U.S. Appl. No. 11/145,464 on Feb. 23, 2011; 7 pages.
Notice of Allowance issued in U.S. Appl. No. 11/155,368 on Mar. 14, 2011; 7 pages.
Notice of Allowance issued in related U.S. Appl. No. 11/864,866 on Jul. 22, 2011; 6 pages.
Notice of Allowance issued in related U.S. Appl. No. 11/364,538 on Jul. 26, 2011; 6 pages.
Office Action issued in U.S. Appl. No. 11/864,811 on Jul. 26, 2011; 7 pages.
Notice of Allowance issued in related U.S. Appl. No. 11/864,832 on Jul. 7, 2011;11 pages.
Office Action issued in related U.S. Appl. No. 11/864,863 on Jul. 21, 2011; 29 pages.
Notice of Allowance issued in related U.S. Appl. No. 11/803,178 on May 17, 2011; 13 pages.
Definition of "header" and "message header"; Newton's Telecom Dictionary; 18th Edition; 2002; pp. 347, 464.
Office Action issued in U.S. Appl. No. 12/323,116 on Sep. 6, 2011; 8 pages.
Office Action issued in U.S. Appl. No. 12/571,140 on Sep. 26, 2011; 14 pages.
Office Action issued in related U.S. Appl. No. 12/060,192 on Sep. 6, 2011; 18 pages.
Notice of Allowance issued in related U.S. Appl. No. 12/060,178 on Sep. 2, 2011; 9 pages.
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
Communication Pursuant to Article 94(3) issued in European Application No. 05766672.9 on Jul. 14, 2011; 4 pages.
Notice of Allowance issued in related U.S. Appl. No. 11/731,857 on Dec. 14, 2011; 7 pages.
Notice of Allowance issued in U.S. Appl. No. 12/147,378 on Nov. 9, 2011; 16 pages.
Office Action issued in U.S. Appl. No. 12/323,116 on Jan. 27, 2012; 7 pages.
Office Action issued in related U.S. Appl. No. 12/060,054 on Dec. 7, 2011; 15 pages.
Office Action issued in U.S. Appl. No. 12/060,144 on Dec. 8, 2011; 18 pages.
Office Action issued in U.S. Appl. No. 12/059,804 on Nov. 14, 2011; 15 pages.
Office Action issued in related U.S. Appl. No. 12/059,860 on Jan. 23, 2012; 16 pages.
Office Action issued in related U.S. Appl. No. 12/060,155 on Oct. 31, 2011; 15 pages.
Notice of Allowance issued in U.S. Appl. No. 11/155,368 on Nov. 8, 2011; 7 pages.
Office Action issued in U.S. Appl. No. 12/815,698 on Jan. 20, 2012; 10 pages.

(56) References Cited

OTHER PUBLICATIONS

Office Action issued in U.S. Appl. No. 12/815,618 on Dec. 22, 2011; 8 pages.
Notice of Allowance issued in U.S. Appl. No. 11/775,821 on Sep. 21, 2011; 5 pages.
Notice of Allowance issued in U.S. Appl. No. 11/775,821 on Dec. 30, 2011; 5 pages.
Notice of Allowance issued in U.S. Appl. No. 11/864,811 on Nov. 14, 2011; 8 pages.
Notice of Allowance issued in related U.S. Appl. No. 11/864,832 on Jan. 9, 2012;12 pages.
Office Action issued in related U.S. Appl. No. 11/864,863 on Dec. 22, 2011; 20 pages.
Notice of Allowance issued in U.S. Appl. No. 11/640,422 on Sep. 29, 2011; 7 pages.
Altintas et al.; "Aurora Software Product Line"; Cybersoft Information Technologies Co.; 2005; pp. 1-8.
Himoff et al.; "MAGENTA Technology: Multi-Agent Systems for Industrial Logistics"; AAMAS'05; Jul. 25-29, 2005; 2005 ACM; pp. 60-66:1-7).
Notice of Allowance issued in U.S. Appl. No. 12/060,192 on Mar. 2, 2012; 18 pages.
Office Action issued in related U.S. Appl. No. 12/060,171 on Mar. 1, 2012; 19 pages.
Notice of Allowance issued in related U.S. Appl. No. 11/145,464 on Feb. 6, 2012; 7 pages.
Notice of Allowance issued in U.S. Appl. No. 11/166,065 on Feb. 15, 2012; 7 pages.
Notice of Allowance issued in U.S. Appl. No. 11/864,811 on Mar. 2, 2012; 8 pages.
Gable, Julie; "Enterprise Application Integration"; Information Management Journal; Mar./Apr. 2002; pp. 48-52.
Notice of Allowance issued in U.S. Appl. No. 12/323,139 on Mar. 14, 2012; 10 pages.
Notice of Allowance issued in U.S. Appl. No. 12/571,140 on Mar. 20, 2012; 16 pages.
Notice of Allowance issued in U.S. Appl. No. 12/060,062 on Mar. 20, 2012; 16 pages.
Notice of Allowance issued in related U.S. Appl. No. 11/864,866 on Mar. 13, 2012; 7 pages.

* cited by examiner

| Package | level1 | level2 | Cardinality | Data Type Name |
|---|---|---|---|---|
| FinInstrPosAcctgPerTo-tAnalRsltBulkCancReqMsg 38000 | FinInstrPosAcctgPerTo-tAnalRsltBulkCancReqMsg 38002 | | | FinInstrPosAcctgPerTo-tAnalRsltBulkCancReqMsg 38004 |
| MessageHeader 38006 | | MessageHeader 38008 | 1 38010 | BusinessDocumentMessageHeader 38012 |
| FinInstrPosAcctgPerTo-tAnalRsltCancReqMsg 38014 | | FinInstrPosAcctgPerTo-tAnalRsltCancReqMsg 38016 | 1..n 38018 | FinancialInstrumentAccountingPe-riodTotalCancelRequestMessage 38020 |

FIG. 39

| Package | level1 | level2 | Cardinality | Data Type Name |
|---|---|---|---|---|
| FinInstrPosAcctgPerTotAnalRsltBulk-CrteReqMsg 39000 | FinInstrPosAcctgPerTo-tAnalRsltBulkCrteReqMsg 39002 | | | FinInstrPosAcctgPerTo-tAnalRsltBulkCrteReqMsg 39004 |
| MessageHeader 39006 | | MessageHeader 39008 | 1 39010 | BusinessDocumentMessageHeader 39012 |
| FinInstrPosAcctgPerTo-tAnalRsltCrteReqMsg 39014 | | FinInstrPosAcctgPerTo-tAnalRsltCrteReqMsg 39016 | 1..n 39018 | FinInstrPosAcctgPerTo-tAnalRsltCrteReqMsg 39020 |

FIG. 40-1

| Package | level1 | level2 | level3 | level4 | Cardinality | Data Type Name |
|---|---|---|---|---|---|---|
| FinInstrPosAcctgPer-TotAnalRsltCan-cReqMsg 40000 | FinInstrPosAcctgPerTotAnalRsltCan-cReqMsg 40002 | | | | | FinInstrPosAcctgPerTotAnalRsltCan-cReqMsg 40004 |
| MessageHeader 40006 | | MessageHeader 40008 | | | 1 40010 | BusinessDocumentMessageHeader 40012 |
| FinancialInstrumentPositionAccountingPe-riodTotalAnalytical-Result 40014 | | FinancialInstrument PositionAccount-ingPeriodTotalAna-lyticalResult 40016 | | | 1 40018 | FinInstrPosAcctgPerTotAnalRsltCan-cReqMsgPerTotAnalRslt 40020 |
| | | | GroupID 40022 | | 1 40024 | BusinessTransactionDocumentGroupID 40026 |
| | | | FinancialInstrumentID 40028 | | 1 40030 | BusinessTransactionDocumentID 40032 |

FIG. 40-2

| Package | level1 | level2 | level3 | level4 | Cardinality | Data Type Name |
|---|---|---|---|---|---|---|
| | | | StandardisedFinancialInstrumentAccountID 40034 | | 0..1 40036 | FinancialInstrumentAccountID 40038 |
| | | | FinancialInstrumentPositionCharacteristicValueCombinationID 40040 | | 0..1 40042 | FinancialInstrumentPositionCharacteristicValueCombinationID 40044 |
| | | | SetOfBooksID 40046 | | 1 40048 | SetOfBooksID 40050 |
| | | | FiscalYearID 40052 | | 1 40054 | FiscalYearID 40056 |
| | | | AccountingPeriodID 40058 | | 1 40060 | AccountingPeriodID 40062 |
| | | | FinancialInstrument-CategoryCode 40064 | | 1 40066 | FinancialInstrumentCategoryCode 40068 |

FIG. 40-3

| Package | level1 | level2 | level3 | level4 | Cardinality | Data Type Name |
|---|---|---|---|---|---|---|
| | | | ValidityEndDate 40070 | | 0..1 40072 | Date;Qualifier'ValidityEnd' 40074 |
| | | | CreationDateTime 40076 | | 1 40078 | GLOBAL_DateTime,Qualifier:Creation 40080 |
| CharacteristicValue 40082 | | | CharacteristicValue 40084 | | 0..n 40086 | FinInstrPosAnalyticalResultCharacteristicValue 40088 |
| | | | | FinancialInstrumentPositionCharacteristicID 40090 | 1 40092 | FinancialInstrumentPositionCharacteristicID 40094 |
| | | | | FinancialInstrumentPositionCharacteristicValue 40096 | 1 40098 | FinancialInstrumentPositionCharacteristicValue 40100 |

FIG. 41-1

| Package | level1 | level2 | level3 | level4 | level5 | Cardinality | Data Type Name |
|---|---|---|---|---|---|---|---|
| FinInstrPosAcctgPerTo-tAnalRsltCrteReqMsg 41000 | FinInstrPosAcctgPerTo-tAnalRsltCrteReqMsg 41002 | | | | | | FinInstrPosAcctgPerTo-tAnalRsltCrteReqMsg 41004 |
| MessageHeader 41006 | | MessageHeader 41008 | | | | 1 41010 | BusinessDocumentMessage-Header 41012 |
| FinancialInstrumentPositionAccountingPe-riodTotalAnalyticalRe-sult 41014 | | FinancialInstrumentPositionAccount-ingPeriodTota-lAnalyticalResult 41016 | | | | 1 41018 | FinInstrPosAcctgPerTo-tAnalRsltCrteReqMsgPerTo-tAnalRslt 41020 |
| | | | GroupID 41022 | | | 1 41024 | BusinessTransactionDocu-mentGroupID 41026 |
| | | | FinancialInstrumentID 41028 | | | 1 41030 | BusinessTransactionDocu-mentID 41032 |

FIG. 41-2

| Package | level1 | level2 | level3 | level4 | level5 | Cardinality | Data Type Name |
|---|---|---|---|---|---|---|---|
| | | | StandardisedFinancialInstrumentAccountID 41034 | | | 0..1 41036 | FinancialInstrumentAccountID 41038 |
| | | | FinancialInstrumentPositionCharacteristicValueCombinationID 41040 | | | 0..1 41042 | FinancialInstrumentPositionCharacteristicValueCombinationID 41044 |
| | | | CompanyID 41046 | | | 1 41048 | CompanyID 41050 |
| | | | OrganisationalCentreID 41052 | | | 0..1 41054 | OrganisationalCentreID 41056 |
| | | | SetOfBooksID 41058 | | | 1 41060 | SetOfBooksID 41062 |
| | | | FiscalYearID 41064 | | | 1 41066 | FiscalYearID 41068 |

FIG. 41-3

| Package | level1 | level2 | level3 | level4 | level5 | Cardinality | Data Type Name |
|---|---|---|---|---|---|---|---|
| | | | AccountingPeriodID 41070 | | | 1 41072 | AccountingPeriodID 41074 |
| | | | FinancialInstrument-CategoryCode 41076 | | | 1 41078 | FinancialInstrumentCategory-Code 41080 |
| | | | ValidityEndDate 41082 | | | 0..1 41084 | Date;Qualifier'ValidityEnd' 41086 |
| | | | CreationDateTime 41088 | | | 1 41090 | GLOBAL_DateTime;Quali-fier:Creation 41092 |
| CharacteristicValue 41094 | | | CharacteristicValue 41096 | | | 0..n 41098 | FinInstrPosAnalyticalRe-sultCharacteristicValue 41100 |
| | | | | FinancialInstrumentPosi-tionCharacteristicID 41102 | | 1 41104 | FinancialInstrumentPosition-CharacteristicID 41106 |

FIG. 41-4

| Package | level1 | level2 | level3 | level4 | level5 | Cardinality | Data Type Name |
|---|---|---|---|---|---|---|---|
| | | | | FinancialInstrumentPositionCharacteristicValue 41108 | | 1 41110 | FinancialInstrumentPositionCharacteristicValue 41112 |
| Item 41114 | | | Item 41116 | | | 1..n 41118 | FinInstrPosAcctgPerTotAnalRsltCrteReqMsgPerTotAnalRsltItm 41120 |
| | | | | ID 41122 | | 1 41124 | BusinessTransactionDocumentItemID 41126 |
| | | | | FinancialInstrumentAnalyticalComponentReference 41128 | | 0..1 41130 | FinancialInstrumentAnalyticalComponentReference 41132 |
| | | | | | ID 41134 | 1 41136 | FinancialInstrumentAnalyticalComponentID 41138 |

FIG. 41-5

| Package | level1 | level2 | level3 | level4 | level5 | Cardinality | Data Type Name |
|---|---|---|---|---|---|---|---|
| | | | | | TypeCode 41140 | 1 41142 | FinancialInstrumentAnalyticalComponentTypeCode 41144 |
| | | | | | Currency-Code 41146 | 1 41148 | CurrencyCode 41150 |
| | | | | PostingKeyFigure 41152 | | 1..n 41154 | FinancialInstrumentPosting-KeyFigure 41156 |
| | | | | | Code 41158 | 1 41160 | FinancialInstrumentPosting-KeyFigureCode 41162 |
| | | | | | Value 41164 | 1 41166 | FinancialInstrumentPosting-KeyFigureValue 41168 |

| Package | level1 | level2 | Cardinality | Data Type Name |
|---|---|---|---|---|
| FinInstrPosAcctgVal-nAnalRsltBulkCancReqMsg 48000 | FinInstrPosAcctgVal-nAnalRsltBulkCancReqMsg 48002 | | | FinInstrPosAcctgValnAnalRsltBulkCancReqMsg 48004 |
| MessageHeader 48006 | | MessageHeader 48008 | 1 48010 | BusinessDocumentMessageHeader 48012 |
| FinInstrPosAcctgVal-nAnalRsltCancReqMsg 48014 | | FinInstrPosAcctgVal-nAnalRsltCancReqMsg 48016 | 1..n 48018 | FinInstrPosAcctgValnAnalRsltCancReqMsg 48020 |

FIG. 49

| Package | level1 | level2 | Cardinality | Data Type Name |
|---|---|---|---|---|
| FinInstrPosAcctgVal-nAnalRsltBulkCrteReqMsg 49000 | FinInstrPosAcctgVal-nAnalRsltBulkCrteReqMsg 49002 | | | FinInstrPosAcctgValnAnalRsltBulk-CrteReqMsg 49004 |
| MessageHeader 49006 | | MessageHeader 49008 | 1 49010 | BusinessDocumentMessageHeader 49012 |
| FinInstrPosAcctgVal-nAnalRsltCrteReqMsg 49014 | | FinInstrPosAcctgVal-nAnalRsltCrteReqMsg 49016 | 1..n 49018 | FinInstrPosAcctgValnAnalRsltCrteReqMsg 49020 |

FIG. 50-1

| Package | level1 | level2 | level3 | level4 | Cardinality | Data Type Name |
|---|---|---|---|---|---|---|
| FinInstrPosAcctgVal-nAnalRsltCancReqMsg 50000 | FinInstrPosAcctgValnAnalRsltCan-cReqMsg 50002 | | | | | FinInstrPosAcctgVal-nAnalRsltCancReqMsg 50004 |
| MessageHeader 50006 | | MessageHeader 50008 | | | 1 50010 | BusinessDocumentMes-sageHeader 50012 |
| FinancialInstrumentPosi-tionAccountingValua-tionAnalyticalResult 50014 | | FinancialInstrumentPosi-tionAccountingValua-tionAnalyticalResult 50016 | | | 1 50018 | FinInstrPosAcctgVal-nAnalRsltCancReqMs-gAcctgValnAnalRslt 50020 |
| | | | GroupID 50022 | | 1 50024 | BusinessTransaction-DocumentGroupID 50026 |
| | | | FinancialInstrumentID 50028 | | 1 50030 | BusinessTransaction-DocumentID 50032 |

FIG. 50-2

| Package | level1 | level2 | level3 | level4 | Cardinality | Data Type Name |
|---|---|---|---|---|---|---|
| | | | StandardisedFinancialInstrumentAccountID 50034 | | 0..1 50036 | FinancialInstrumentAccountID 50038 |
| | | | FinancialInstrumentPositionCharacteristicValueCombinationID 50040 | | 0..1 50042 | FinancialInstrumentPositionCharacteristicValueCombinationID 50044 |
| | | | SetOfBooksID 50046 | | 1 50048 | SetOfBooksID 50050 |
| | | | KeyDate 50052 | | 1 50054 | Date 50056 |
| | | | FinancialInstrumentCategoryCode 50058 | | 1 50060 | FinancialInstrumentCategoryCode 50062 |

FIG. 50-3

| Package | level1 | level2 | level3 | level4 | Cardinality | Data Type Name |
|---|---|---|---|---|---|---|
| | | | CreationDateTime 50064 | | 1 50066 | GLOBAL_DateTime:Qualifier:Creation 50068 |
| CharacteristicValue 50070 | | | CharacteristicValue 50072 | | 0..n 50074 | FinInstrPosAnalyticalResultCharacteristicValue 50076 |
| | | | | FinancialInstrumentPositionCharacteristicID 50078 | 1 50080 | FinancialInstrumentPositionCharacteristicID 50082 |
| | | | | FinancialInstrumentPositionCharacteristicValue 50084 | 1 50086 | FinancialInstrumentPositionCharacteristicValue 50088 |

FIG. 51-1

| Package | level1 | level2 | level3 | level4 | level5 | Cardinality | Data Type Name |
|---|---|---|---|---|---|---|---|
| FinInstrPosAcctgVal-nAnalRsltCrteReqMsg 51000 | FinInstrPosAcctgVal-nAnalRsltCrteReqMsg 51002 | | | | | | FinInstrPosAcctgVal-nAnalRsltCrteReqMsg 51004 |
| MessageHeader 51006 | | MessageHeader 51008 | | | | 1 51010 | BusinessDocument-MessageHeader 51012 |
| FinancialInstrument-PositionAccounting-ValuationAnalytical-Result 51014 | | FinancialInstrument-PositionAccounting-ValuationAnalytical-Result 51016 | | | | 1 51018 | FinInstrPosAcctgVal-nAnalRsltCrteReqMs-gAcctgValnAnalRslt 51020 |
| | | | GroupID 51022 | | | 1 51024 | BusinessTransaction-DocumentGroupID 51026 |
| | | | FinancialInstrumentID 51028 | | | 1 51030 | BusinessTransaction-DocumentID 51032 |

FIG. 51-2

| Package | level1 | level2 | level3 | level4 | level5 | Cardinality | Data Type Name |
|---|---|---|---|---|---|---|---|
| | | | StandardisedFinancialInstrumentAccountID 51034 | | | 0..1 51036 | FinancialInstrumentAccountID 51038 |
| | | | FinancialInstrumentPositionCharacteristicValueCombinationID 51040 | | | 0..1 51042 | FinancialInstrumentPositionCharacteristicValueCombinationID 51044 |
| | | | CompanyID 51046 | | | 1 51048 | CompanyID 51050 |
| | | | OrganisationalCentreID 51052 | | | 0..1 51054 | OrganisationalCentreID 51056 |
| | | | SetOfBooksID 51058 | | | 1 51060 | SetOfBooksID 51062 |
| | | | KeyDate 51064 | | | 1 51066 | Date 51068 |

FIG. 51-3

| Package | level1 | level2 | level3 | level4 | level5 | Cardinality | Data Type Name |
|---|---|---|---|---|---|---|---|
| | | | FinancialInstrument-CategoryCode 51070 | | | 1 51072 | FinancialInstrument-CategoryCode 51074 |
| | | | CreationDateTime 51076 | | | 1 51078 | GLOBAL_DateTime,Qualifier:Creation 51080 |
| CharacteristicValue 51082 | | | CharacteristicValue 51084 | | | 0..n 51086 | FinInstrPosAnalytical-ResultCharacteris-ticValue 51088 |
| | | | | FinancialInstru-mentPositionChar-acteristicID 51090 | | 1 51092 | FinancialInstrument-PositionCharacteristi-cID 51094 |
| | | | | FinancialInstru-mentPositionChar-acteristicValue 51096 | | 1 51098 | FinancialInstrument-PositionCharacteris-ticValue 51100 |

FIG. 51-4

| Package | level1 | level2 | level3 | level4 | level5 | Cardinality | Data Type Name |
|---|---|---|---|---|---|---|---|
| Item 51102 | | | Item 51104 | | | 1..n 51106 | FinInstrPosAcctgValnAnalRsltCrteReqMsgAcctgValnAnalRsltItm 51108 |
| | | | | ID 51110 | | 1 51112 | BusinessTransactionDocumentItemID 51114 |
| | | | | FinancialInstrumentAnalyticalComponentReference 51116 | | 0..1 51118 | FinancialInstrumentAnalyticalComponentReference 51120 |
| | | | | | ID 51122 | 1 51124 | FinancialInstrumentAnalyticalComponentID 51126 |
| | | | | | TypeCode 51128 | 1 51130 | FinancialInstrumentAnalyticalComponentTypeCode 51132 |

FIG. 51-5

| Package | level1 | level2 | level3 | level4 | level5 | Cardinality | Data Type Name |
|---|---|---|---|---|---|---|---|
| | | | | | Currency-Code 51134 | 1 51136 | CurrencyCode 51138 |
| | | | | Accounting-HedgeRelation-shipID 51140 | | 0..1 51142 | BusinessTransaction-DocumentID 51144 |
| | | | | AmortizedCostA-mount 51146 | | 0..1 51148 | Amount,Quali-fier:AmortizedCost 51150 |
| | | | | StartOfDayAmor-tizedCostAmount 51152 | | 0..1 51154 | Amount,Quali-fier:AmortizedCost 51156 |
| | | | | HedgeAdjustmen-tAmount 51158 | | 0..1 51160 | Amount,Quali-fier:HedgeAdjustment 51162 |

FIG. 51-6

| Package | level1 | level2 | level3 | level4 | level5 | Cardinality | Data Type Name |
|---|---|---|---|---|---|---|---|
| | | | | StartOfDayHedge-AdjustmentAmount 51164 | | 0..1 51166 | Amount,Quali-fier:HedgeAdjustment 51168 |
| | | | | StartOfDayFairVal-ueAmount 51170 | | 0..1 51172 | Amount,Quali-fier:FairValue 51174 |

| Package | level1 | level2 | Cardinality |
|---|---|---|---|
| FinInstrPosAccrAnalRsltBulkCancReqMsg 59000 | FinInstrPosAccrAnalRsltBulkCancReqMsg 59002 | | |
| MessageHeader 59004 | | MessageHeader 59006 | 1 59008 |
| FinInstrPosAccrAnalRsltCancReqMsg 59010 | | FinInstrPosAccrAnalRsltCancReqMsg 59012 | 1..n 59014 |

FIG. 60

| Package | level1 | level2 | Cardinality |
|---|---|---|---|
| FinInstrPosAccrAnalRsltBulkCrteReqMsg 60000 | FinInstrPosAccrAnalRsltBulkCrteReqMsg 60002 | | |
| MessageHeader 60004 | | MessageHeader 60006 | 1 60008 |
| FinInstrPosAccrAnalRsltCrteReqMsg 60010 | | FinInstrPosAccrAnalRsltCrteReqMsg 60012 | 1..n 60014 |

FIG. 61-1

| Package | level1 | level2 | level3 | level4 | Cardinality |
|---|---|---|---|---|---|
| FinInstrPosAccrAnalRsltCan-cReqMsg 61000 | FinInstrPosAc-crAnalRsltCancReqMsg 61002 | | | | |
| MessageHeader 61004 | | MessageHeader 61006 | | | 1 61008 |
| FinancialInstrumentPosi-tionAccrualAnalyticalResult 61010 | | FinancialInstrumentPosi-tionAccrualAnalyticalResult 61012 | | | 1 61014 |
| | | | GroupID 61016 | | 1 61018 |
| | | | FinancialInstrumentID 61020 | | 1 61022 |
| | | | StandardisedFinan-cialInstrumentAccountID 61024 | | 0..1 61026 |

FIG. 61-2

| Package | level1 | level2 | level3 | level4 | Cardinality |
|---|---|---|---|---|---|
| | | | FinancialInstrumentPositionCharacteristicValueCombinationID 61028 | | 0..1 61030 |
| | | | CompanyID 61032 | | 1 61034 |
| | | | KeyDate 61036 | | 1 61038 |
| | | | FinancialInstrumentCategoryCode 61040 | | 1 61042 |
| | | | CreationDateTime 61044 | | 1 61046 |
| | | | AccrualCalculationMethodCode 61048 | | 1 61050 |

FIG. 61-3

| Package | level1 | level2 | level3 | level4 | Cardinality |
|---|---|---|---|---|---|
| CharacteristicValue 61052 | | | CharacteristicValue 61054 | | 0..n 61056 |
| | | | | FinancialInstrumentPositionCharacteristicID 61058 | 1 61060 |
| | | | | FinancialInstrumentPositionCharacteristicValue 61062 | 1 61064 |

FIG. 62-1

| Package | level1 | level2 | level3 | level4 | level5 | Cardinality |
|---|---|---|---|---|---|---|
| FinInstrPosAc-crAnalRsltCrteReqMsg 62000 | FinInstrPosAc-crAnalRsltCrteReqMsg 62002 | | | | | |
| MessageHeader 62004 | | MessageHeader 62006 | | | | 1 62008 |
| FinancialInstrumentPosi-tionAccrualAnalyticalResult 62010 | | FinancialInstrument-PositionAccrualAna-lyticalResult 62012 | | | | 1 62014 |
| | | | GroupID 62016 | | | 1 62018 |
| | | | BankAccountDocumen-tReconciliationKeyID 62020 | | | 1 62022 |
| | | | FinancialInstrumentID 62024 | | | 1 62026 |

FIG. 62-2

| Package | level1 | level2 | level3 | level4 | level5 | Cardinality |
|---|---|---|---|---|---|---|
| | | | StandardisedFinancialInstrumentAccountID 62028 | | | 0..1 62030 |
| | | | FinancialInstrumentPositionCharacteristicValueCombinationID 62032 | | | 0..1 62034 |
| | | | CompanyID 62036 | | | 1 62038 |
| | | | OrganisationalCentreID 62040 | | | 0..1 62042 |
| | | | KeyDate 62044 | | | 1 62046 |
| | | | FinancialInstrumentCategoryCode 62048 | | | 1 62050 |

FIG. 62-3

| Package | level1 | level2 | level3 | level4 | level5 | Cardinality |
|---|---|---|---|---|---|---|
| | | | CreationDateTime 62052 | | | 1 62054 |
| | | | NominalAmount 62056 | | | 0..1 62058 |
| | | | Quantity 62060 | | | 0..1 62062 |
| | | | AccrualCalculation-MethodCode 62064 | | | 1 62066 |
| CharacteristicValue 62068 | | | CharacteristicValue 62070 | | | 0..n 62072 |
| | | | | FinancialInstrumentPo-sitionCharacteristicID 62074 | | 1 62076 |

FIG. 62-4

| Package | level1 | level2 | level3 | level4 | level5 | Cardinality |
|---|---|---|---|---|---|---|
| | | | | FinancialInstrumentPositionCharacteristicValue 62078 | | 1 62080 |
| Item 62082 | | | Item 62084 | | | 1..n 62086 |
| | | | | ID 62088 | | 1 62090 |
| | | | | FinancialInstrumentAnalyticalComponentReference 62092 | | 0..1 62094 |
| | | | | | ID 62096 | 1 62098 |
| | | | | | TypeCode 62100 | 1 62102 |

FIG. 62-5

| Package | level1 | level2 | level3 | level4 | level5 | Cardinality |
|---|---|---|---|---|---|---|
| | | | | | CurrencyCode 62104 | 1 62106 |
| | | | | AccrualItemTypeCode 62108 | | 1 62110 |
| | | | | AccrualAmount 62112 | | 1 62114 |

FIG. 63-1

| Package | level1 | level2 | level3 | level4 | level5 | Data Type Name |
|---|---|---|---|---|---|---|
| FinInstrPosAc-crAnalRsltMsg 63000 | FinInstrPosAc-crAnalRsltMsg 63002 | | | | | |
| MessageHeader 63004 | | MessageHeader 63006 | | | | BusinessDocumentMessageHeader 63008 |
| FinancialInstrument-PositionAccrualAna-lyticalResult 63010 | | FinancialInstru-mentPositionAccru-alAnalyticalResult 63012 | | | | |
| | | | GroupID 63014 | | | BusinessTransactionDocument-GroupID 63016 |
| | | | BankAccountDocumen-tReconciliationKeyID 63018 | | | BankAccountDocumentReconcilia-tionKeyID 63020 |
| | | | FinancialInstrumentID 63022 | | | BusinessTransactionDocumentID 63024 |

FIG. 63-2

| Package | level1 | level2 | level3 | level4 | level5 | Data Type Name |
|---|---|---|---|---|---|---|
| | | | StandardisedFinancialInstrumentAccountID 63026 | | | FinancialInstrumentAccountID;Qualifier'Standardised' 63028 |
| | | | FinancialInstrumentPositionCharacteristicValueCombinationID 63030 | | | FinancialInstrumentPositionCharacteristicValueCombinationID 63032 |
| | | | CompanyID 63034 | | | CompanyID 63036 |
| | | | OrganisationalCentreID 63038 | | | OrganisationalCentreID 63040 |
| | | | KeyDate 63042 | | | Date,Qualifier:Key 63044 |
| | | | FinancialInstrumentCategoryCode 63046 | | | FinancialInstrumentCategoryCode 63048 |

FIG. 63-3

| Package | level1 | level2 | level3 | level4 | level5 | Data Type Name |
|---|---|---|---|---|---|---|
| | | | CreationDateTime 63050 | | | GLOBAL_DateTime,Qualifier:Creation 63052 |
| | | | NominalAmount 63054 | | | Amount,Qualifier:Nominal 63056 |
| | | | Quantity 63058 | | | Quantity 63060 |
| | | | AccrualCalculation-MethodCode 63062 | | | AccrualCalculationMethodCode 63064 |
| CharacteristicValue 63066 | | | CharacteristicValue 63068 | | | |
| | | | | FinancialInstrument-PositionCharacteristicID 63070 | | FinancialInstrumentPositionCharac-teristicID 63072 |

FIG. 63-4

| Package | level1 | level2 | level3 | level4 | level5 | Data Type Name |
|---|---|---|---|---|---|---|
| | | | | FinancialInstrument-PositionCharacteris-ticValue 63074 | | FinancialInstrumentPositionCharac-teristicValue 63076 |
| Item 63078 | | | Item 63080 | | | FinInstrPosAccrualAnalyticalResultCreateRequestMessageFinInstrPosAc-crualAnalyticalResultItem 63082 |
| | | | | ID 63084 | | BusinessTransactionDocumen-tItemID 63086 |
| | | | | FinancialInstrumen-tAnalyticalComponen-tReference 63088 | | FinancialInstrumentAnalyticalCom-ponentReference 63090 |
| | | | | | ID 63092 | FinancialInstrumentAnalyticalCom-ponentID 63094 |

FIG. 63-5

| Package | level1 | level2 | level3 | level4 | level5 | Data Type Name |
|---|---|---|---|---|---|---|
| | | | | | TypeCode 63096 | FinancialInstrumentAnalyticalCom-ponentTypeCode 63098 |
| | | | | | CurrencyCode 63100 | CurrencyCode 63102 |
| | | | | AccrualItemType-Code 63104 | | AccrualItemTypeCode 63106 |
| | | | | AccrualAmount 63108 | | Amount,Qualifier:Accrual 63110 |

| Package | level1 | level2 | Cardinality | Data Type Name |
|---|---|---|---|---|
| FinInstrPosFairValueAnalRsltBulkCancReqMsg 70000 | FinInstrPosFairValueAnalRsltBulkCancReqMsg 70002 | | | FinInstrPosFairValueAnalRsltBulkCancReqMsg 70004 |
| MessageHeader 70006 | | MessageHeader 70008 | 1 70010 | BusinessDocumentMessageHeader 70012 |
| FinInstrPosFairValueAnalRsltCancReqMsg 70014 | | FinInstrPosFairValueAnalRsltCancReqMsg 70016 | 1..n 70018 | FinInstrPosFairValueAnalRsltCancReqMsg 70020 |

FIG. 71

| Package | level1 | level2 | Cardinality | Data Type Name |
|---|---|---|---|---|
| FinInstrPosFairVal-ueAnalRsltBulkCrteReqMsg 71000 | FinInstrPosFairVal-ueAnalRsltBulkCrteReqMsg 71002 | | | FinInstrPosFairVal-ueAnalRsltBulkCrteReqMsg 71004 |
| MessageHeader 71006 | | MessageHeader 71008 | 1 71010 | BusinessDocumentMessage-Header 71012 |
| FinInstrPosFairVal-ueAnalRsltCrteReqMsg 71014 | | FinInstrPosFairVal-ueAnalRsltCrteReqMsg 71016 | 1..n 71018 | FinInstrPosFairVal-ueAnalRsltCrteReqMsg 71020 |

FIG. 72-1

| Package | level1 | level2 | level3 | level4 | Cardinality | Data Type Name |
|---|---|---|---|---|---|---|
| FinInstrPosFairValueAnalRsltCancReqMsg 72000 | FinInstrPosFairValueAnalRsltCancReqMsg 72002 | | | | | FinInstrPosFairValueAnalRsltCancReqMsg 72004 |
| MessageHeader 72006 | | MessageHeader 72008 | | | 1 72010 | BusinessDocumentMessageHeader 72012 |
| FinancialInstrumentPositionFairValueAnalyticalResult 72014 | | FinancialInstrumentPositionFairValueAnalyticalResult 72016 | | | 1 72018 | FinInstrPosFairValueAnalRsltCancReqMsgFairValueAnalRslt 72020 |
| | | | GroupID 72022 | | 1 72024 | BusinessTransactionDocumentGroupID 72026 |
| | | | FinancialInstrumentID 72028 | | 1 72030 | BusinessTransactionDocumentID 72032 |

FIG. 72-2

| Package | level1 | level2 | level3 | level4 | Cardinality | Data Type Name |
|---|---|---|---|---|---|---|
| | | | StandardisedFinancialInstrumentAccountID 72034 | | 0..1 72036 | FinancialInstrumentAccountID 72038 |
| | | | FinancialInstrumentPositionCharacteristicValueCombinationID 72040 | | 0..1 72042 | FinancialInstrumentPositionCharacteristicValueCombinationID 72044 |
| | | | KeyDate 72046 | | 1 72048 | Date 72050 |
| | | | FinancialInstrumentCategoryCode 72052 | | 1 72054 | FinancialInstrumentCategoryCode 72056 |
| | | | CreationDateTime 72058 | | 1 72060 | GLOBAL_DateTime 72062 |
| CharacteristicValue 72064 | | | CharacteristicValue 72066 | | 0..n 72068 | FinInstrPosAnalyticalResultCharacteristicValue 72070 |

FIG. 72-3

| Package | level1 | level2 | level3 | level4 | Cardinality | Data Type Name |
|---|---|---|---|---|---|---|
| | | | | FinancialInstrumentPositionCharacteristicID 72072 | 1 72074 | FinancialInstrumentPositionCharacteristicID 72076 |
| | | | | FinancialInstrumentPositionCharacteristicValue 72078 | 1 72080 | FinancialInstrumentPositionCharacteristicValue 72082 |

FIG. 73-1

| Package | level1 | level2 | level3 | level4 | level5 | Cardinality | Data Type Name |
|---|---|---|---|---|---|---|---|
| FinInstrPosFairValueAnalRsltCrteReqMsg 73000 | FinInstrPosFairValueAnalRsltCrteReqMsg 73002 | | | | | | FinInstrPosFairValueAnalRsltCrteReqMsg 73004 |
| MessageHeader 73006 | | MessageHeader 73008 | | | | 1 73010 | BusinessDocumentMessageHeader 73012 |
| FinancialInstrumentPositionFairValueAnalyticalResult 73014 | | FinancialInstrument-PositionFairValueAnalyticalResult 73016 | | | | 1 73018 | FinInstrPosFairValueAnalRsltCrteReqMsgFairValueAnalRslt 73020 |
| | | | GroupID 73022 | | | 1 73024 | BusinessTransaction-DocumentGroupID 73026 |
| | | | FinancialInstrumentID 73028 | | | 1 73030 | BusinessTransaction-DocumentID 73032 |

FIG. 73-2

| Package | level1 | level2 | level3 | level4 | level5 | Cardinality | Data Type Name |
|---|---|---|---|---|---|---|---|
| | | | StandardisedFinancialInstrumentAccountID 73034 | | | 0..1 73036 | FinancialInstrumentAccountID 73038 |
| | | | FinancialInstrumentPositionCharacteristicValueCombinationID 73040 | | | 0..1 73042 | FinancialInstrumentPositionCharacteristicValueCombinationID 73044 |
| | | | CompanyID 73046 | | | 1 73048 | CompanyID 73050 |
| | | | OrganisationalCentreID 73052 | | | 0..1 73054 | OrganisationalCentreID 73056 |
| | | | KeyDate 73058 | | | 1 73060 | Date 73062 |
| | | | FinancialInstrumentCategoryCode 73064 | | | 1 73066 | FinancialInstrumentCategoryCode 73068 |

FIG. 73-3

| Package | level1 | level2 | level3 | level4 | level5 | Cardinality | Data Type Name |
|---|---|---|---|---|---|---|---|
| | | | CreationDateTime 73070 | | | 1 73072 | DateTime 73074 |
| | | | NominalAmount 73076 | | | 0..1 73078 | Amount 73080 |
| | | | Quantity 73082 | | | 0..1 73084 | Quantity 73086 |
| CharacteristicValue 73088 | | | CharacteristicValue 73090 | | | 0..n 73092 | FinInstrPosAnalyticalResultCharacteristicValue 73094 |
| | | | | FinancialInstrumentPositionCharacteristicID 73096 | | 1 73098 | FinancialInstrumentPositionCharacteristicID 73100 |
| | | | | FinancialInstrumentPositionCharacteristicValue 73102 | | 1 73104 | FinancialInstrumentPositionCharacteristicValue 73106 |

FIG. 73-4

| Package | level1 | level2 | level3 | level4 | level5 | Cardinality | Data Type Name |
|---|---|---|---|---|---|---|---|
| Item 73108 | | | Item 73110 | | | 1..n 73112 | FinInstrPosFairValueAnalRsltCrteReqMsgFairValueAnalRsltItm 73114 |
| | | | | ID 73116 | | 1 73118 | BusinessTransactionDocumentItemID 73120 |
| FinancialInstrumentAnalyticalComponent 73122 | | | | FinancialInstrumentAnalyticalComponentReference 73124 | | 0..1 73126 | FinancialInstrumentAnalyticalComponentReference 73128 |
| | | | | | ID 73130 | 1 73132 | FinancialInstrumentAnalyticalComponentID 73134 |
| | | | | | TypeCode 73136 | 1 73138 | FinancialInstrumentAnalyticalComponentTypeCode 73140 |

FIG. 73-5

| Package | level1 | level2 | level3 | level4 | level5 | Cardinality | Data Type Name |
|---|---|---|---|---|---|---|---|
| | | | | | Currency-Code 73142 | 1 73144 | CurrencyCode 73146 |
| | | | | CleanPriceAmount 73148 | | 1 73150 | Amount,Qualifier:CleanPrice 73152 |
| | | | | DirtyPriceAmount 73154 | | 1 73156 | Amount,Qualifier:DirtyPrice 73158 |

| Package | level1 | level2 | Cardinality | Data Type Name |
|---|---|---|---|---|
| FinInstrPosPerAvgVo-lAnalRsltBulkCancReqMsg 80000 | FinInstrPosPerAvgVo-lAnalRsltBulkCancReqMsg 80002 | | | FinInstrPosPerAvgVolAnalRsltBulkCancReqMsg 80004 |
| MessageHeader 80006 | | MessageHeader 80008 | 1 80010 | BusinessDocumentMessageHeader 80012 |
| FinInstrPosPerAvgVo-lAnalRsltCancReqMsg 80014 | | FinInstrPosPerAvgVo-lAnalRsltCancReqMsg 80016 | 1..n 80018 | FinInstrPosPerAvgVolAnalRsltCancReqMsg 80020 |

FIG. 81

| Package | level1 | level2 | Cardinality | Data Type Name |
|---|---|---|---|---|
| FinInstrPosPerAvgVo-lAnalRsltBulkCrteReqMsg 81000 | FinInstrPosPerAvgVo-lAnalRsltBulkCrteReqMsg 81002 | | | FinInstrPosPerAvgVolAnalRsltBulkCrteReqMsg 81004 |
| MessageHeader 81006 | | MessageHeader 81008 | 1 81010 | BusinessDocumentMessageHeader 81012 |
| FinInstrPosPerAvgVo-lAnalRsltCrteReqMsg 81014 | | FinInstrPosPerAvgVo-lAnalRsltCrteReqMsg 81016 | 1..n 81018 | FinInstrPosPerAvgVolAnalRsltCrteReqMsg 81020 |

FIG. 82-1

| Package | level1 | level2 | level3 | level4 | Cardinality | Data Type Name |
|---|---|---|---|---|---|---|
| FinInstrPosPerAvgVolAnalRsltCancReqMsg 82000 | FinInstrPosPerAvgVolAnalRsltCancReqMsg 82002 | | | | | FinInstrPosPerAvgVolAnalRsltCancReqMsg 82004 |
| MessageHeader 82006 | | MessageHeader 82008 | | | 1 82010 | BusinessDocumentMessageHeader 82012 |
| FinancialInstrumentPositionPeriodAverageVolumeAnalyticalResult 82014 | | FinancialInstrumentPositionPeriodAverageVolumeAnalyticalResult 82016 | | | 1 82018 | FinInstrPosPerAvgVolAnalRsltCancReqMsgPerAvgAnalRslt 82020 |
| | | | GroupID 82022 | | 1 82024 | BusinessTransactionDocumentGroupID 82026 |
| | | | FinancialInstrumentID 82028 | | 1 82030 | BusinessTransactionDocumentID 82032 |

FIG. 82-2

| Package | level1 | level2 | level3 | level4 | Cardinality | Data Type Name |
|---|---|---|---|---|---|---|
| | | | StandardisedFinancialInstrumentAccountID 82034 | | 0..1 82036 | FinancialInstrumentAccountID;Qualifier:Standardised 82038 |
| | | | FinancialInstrumentPositionCharacteristicValueCombinationID 82040 | | 0..1 82042 | FinancialInstrumentPositionCharacteristicValueCombinationID 82044 |
| | | | FinancialInstrumentCategoryCode 82046 | | 1 82048 | FinancialInstrumentCategoryCode 82050 |
| | | | DatePeriod 82052 | | 1 82054 | CLOSED_DatePeriod 82056 |
| | | | CreationDateTime 82058 | | 1 82060 | GLOBAL_DateTime,Qualifier:Creation 82062 |

FIG. 82-3

| Package | level1 | level2 | level3 | level4 | Cardinality | Data Type Name |
|---|---|---|---|---|---|---|
| CharacteristicValue 82064 | | | CharacteristicValue 82066 | | 0..n 82068 | FinInstrPosAnalyticalResultCharacteristicValue 82070 |
| | | | | FinancialInstrumentPositionCharacteristicID 82072 | 1 82074 | FinancialInstrumentPositionCharacteristicID 82076 |
| | | | | FinancialInstrumentPositionCharacteristicValue 82078 | 1 82080 | FinancialInstrumentPositionCharacteristicValue 82082 |

FIG. 83-1

| Package | level1 | level2 | level3 | level4 | level5 | Cardinality | Data Type Name |
|---|---|---|---|---|---|---|---|
| FinInstrPosPerAvgVolAnalRsltCrteReqMsg 83000 | FinInstrPosPerAvgVolAnalRsltCrteReqMsg 83002 | | | | | | FinInstrPosPerAvgVolAnalRsltCrteReqMsg 83004 |
| MessageHeader 83006 | | MessageHeader 83008 | | | | 1 83010 | BusinessDocumentMessageHeader 83012 |
| FinancialInstrumentPositionPeriodAverageVolumeAnalyticResult 83014 | | FinancialInstrumentPositionPeriodAverageVolumeAnalyticResult 83016 | | | | 1 83018 | FinInstrPosPerAvgVolAnalRsltCrteReqMsgPerAvgAnalRslt 83020 |
| | | | GroupID 83022 | | | 1 83024 | BusinessTransactionDocumentGroupID 83026 |

FIG. 83-2

| Package | level1 | level2 | level3 | level4 | level5 | Cardinality | Data Type Name |
|---|---|---|---|---|---|---|---|
| | | | FinancialInstrumentID 83028 | | | 1 83030 | BusinessTransactionDocumentID 83032 |
| | | | StandardisedFinancialInstrumentAccountID 83034 | | | 0..1 83036 | FinancialInstrumentAccountID;Qualifier:Standardised 83038 |
| | | | FinancialInstrumentPositionCharacteristicValueCombinationID 83040 | | | 0..1 83042 | FinancialInstrumentPositionCharacteristicValueCombinationID 83044 |
| | | | CompanyID 83046 | | | 1 83048 | CompanyID 83050 |
| | | | OrganisationalCentreID 83052 | | | 0..1 83054 | OrganisationalCentreID 83056 |
| | | | FiscalYearID 83058 | | | 0..1 83060 | FiscalYearID 83062 |

FIG. 83-3

| Package | level1 | level2 | level3 | level4 | level5 | Cardinality | Data Type Name |
|---|---|---|---|---|---|---|---|
| | | | AccountingPeriodID 83064 | | | 0..1 83066 | AccountingPeriodID 83068 |
| | | | FinancialInstrumentCategoryCode 83070 | | | 1 83072 | FinancialInstrumentCategoryCode 83074 |
| | | | DatePeriod 83076 | | | 1 83078 | CLOSED_DatePeriod 83080 |
| | | | CreationDateTime 83082 | | | 1 83084 | GLOBAL_DateTime,Qualifier:Creation 83086 |
| CharacteristicValue 83088 | | | CharacteristicValue 83090 | | | 0..n 83092 | FinInstrPosAnalyticalResultCharacteristicValue 83094 |
| | | | | FinancialInstrumentPositionCharacteristicID 83096 | | 1 83098 | FinancialInstrumentPositionCharacteristicID 83100 |

FIG. 83-4

| Package | level1 | level2 | level3 | level4 | level5 | Cardinality | Data Type Name |
|---|---|---|---|---|---|---|---|
| | | | | FinancialInstrumentPositionCharacteristicValue 83102 | | 1 83104 | FinancialInstrumentPosition-CharacteristicValue 83106 |
| Item 83108 | | | Item 83110 | | | 1..n 83112 | FinInstrPosPerAvgVolAnalRsltCrteReqMsgPerAvgAnalRsltItm 83114 |
| | | | | ID 83116 | | 1 83118 | BusinessTransactionDocumentItemID 83120 |
| | | | | FinancialInstrumentAnalyticalComponentReference 83122 | | 0..1 83124 | FinancialInstrumentAnalytical-ComponentReference 83126 |
| | | | | | ID 83128 | 1 83130 | FinancialInstrumentAnalytical-ComponentID 83132 |

FIG. 83-5

| Package | level1 | level2 | level3 | level4 | level5 | Cardinality | Data Type Name |
|---|---|---|---|---|---|---|---|
| | | | | | TypeCode 83134 | 1 83136 | FinancialInstrumentAnalytical-ComponentTypeCode 83138 |
| | | | | | Currency-Code 83140 | 1 83142 | CurrencyCode 83144 |
| | | | | AssetLiabilityCode 83146 | | 1 83148 | AssetLiablityCode 83150 |
| | | | | FinancialInstrumentCash-FlowOwnAllotmentPortion-Indicator 83152 | | 0..1 83154 | Indica-tor;Qualifier:OwnAllotmentPorti on 83156 |
| | | | | FinancialInstrumentCash-FlowCoveragePortionCode 83158 | | 0..1 83160 | FinancialInstrumentCashFlow-CoveragePortionCode 83162 |

FIG. 83-6

| Package | level1 | level2 | level3 | level4 | level5 | Cardinality | Data Type Name |
|---|---|---|---|---|---|---|---|
| | | | | PeriodAverageVolumeKey-Figure 83164 | | 1..n 83166 | FinancialInstrumentPeriodAv-erageVolumeKeyFigure 83168 |
| | | | | | Code 83170 | 1 83172 | FinancialInstrumentPeriodAv-erageVolumeKeyFigureCode 83174 |
| | | | | | Value 83176 | 1 83178 | Value 83180 |

MANAGING CONSISTENT INTERFACES FOR FINANCIAL INSTRUMENT BUSINESS OBJECTS ACROSS HETEROGENEOUS SYSTEMS

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In a first aspect, a computer readable medium includes program code for providing a message-based interface for performing a financial instrument position accounting period total analytical result service. The interface exposes at least one service as defined in a service registry, wherein upon execution the program code executes in an environment of computer systems providing message-based services. The program code receives, from a service consumer, a first message for processing key figure-based views of the performance of a bank, including information that a ledger for financial instruments can use to create or cancel one or more analytical results for an accounting period total. The program code invokes a financial instrument position accounting period total analytical result business object. The business object is a logically centralized, semantically disjointed object for key figure-based views of the performance of a bank, including information that a ledger for financial instruments can use to create or cancel one or more analytical results for an accounting period total. The program code comprises data logically organized as a financial instrument position analytical result template root node, a financial instrument position accounting valuation analytical result subordinate node, a financial instrument position accounting period total analytical result subordinate node, a financial instrument position period average volume analytical result subordinate node, a financial instrument position fair value analytical result subordinate node, a funds transfer pricing rate analytical result subordinate node, a characteristic value subordinate node, and an item subordinate node. The item node contains a financial instrument analytical component subordinate node, a posting key figure subordinate node, and a period average volume key figure subordinate node. The program code initiates transmission of a message to a heterogeneous second application, executing in the environment of computer systems providing message-based services, based on the data in the financial instrument position accounting period total analytical result business object. The message comprises a financial instrument position accounting period total analytical result create request message entity, a message header package, and a financial instrument position accounting period total analytical result package.

In a second aspect, a computer readable medium includes program code for providing a message-based interface for performing a financial instrument position accounting period total analytical result service. The interface exposes at least one service as defined in a service registry, wherein upon execution the program code executes in an environment of computer systems providing message-based services. The program code initiates transmission of a message to a heterogeneous second application, executing in the environment of computer systems providing message-based services, based on data in a financial instrument position accounting period total analytical result business object invoked by the second application. The business object is a logically centralized, semantically disjointed object for key figure-based views of the performance of a bank, including information that a ledger for financial instruments can use to create or cancel one or more analytical results for an accounting period total. The business object comprises data logically organized as a financial instrument position analytical result template root node, a financial instrument position accounting valuation analytical result subordinate node, a financial instrument position accounting period total analytical result subordinate node, a financial instrument position period average volume analytical result subordinate node, a financial instrument position fair value analytical result subordinate node, a funds transfer pricing rate analytical result subordinate node, a characteristic value subordinate node, and an item subordinate node. The item node contains a financial instrument analytical component subordinate node, a posting key figure subordinate node, and a period average volume key figure subordinate node. The message comprises a financial instrument position accounting period total analytical result create request message entity, a message header package, and a financial instrument position accounting period total analytical result package. The program code receives a second message from the second application, the second message associated with the invoked financial instrument position accounting period total analytical result business object and in response to the first message.

In a third aspect, a distributed system operates in a landscape of computer systems providing message-based services. The system processes business objects involving processing a key figure-based view of the performance of a bank, including information that a ledger for financial instruments can use to create or cancel one or more analytical results for an accounting period total. The system comprises memory and a graphical user interface remote from the memory. The memory stores a business object repository storing a plurality of business objects. Each business object is a logically centralized, semantically disjointed object of a particular business object type. At least one of the business objects is for key figure-based views of the performance of a bank, including information that a ledger for financial instruments can use to create or cancel one or more analytical results for an accounting period total. The business object comprises data logically organized as a financial instrument position analytical result template root node, a financial instrument position accounting valuation analytical result subordinate node, a financial instrument position accounting period total analytical result subordinate node, a financial instrument position period average volume analytical result subordinate node, a financial instrument position fair value analytical result subordinate node, a funds transfer pricing rate analytical result subordinate node, a characteristic value subordinate node, and an item subordinate node. The item node contains a financial instrument analytical component subordinate node, a posting key figure subordinate node, and a period average volume key figure subordinate node. The graphical user interface presents data associated with an invoked instance of the financial instrument position accounting valuation analytical result business object, the interface comprising computer readable instructions embodied on tangible media.

In a fourth aspect, a computer readable medium includes program code for providing a message-based interface for performing a financial instrument position accounting valuation analytical result service. The interface exposes at least one service as defined in a service registry, wherein upon execution the program code executes in an environment of computer systems providing message-based services. The service comprises program code for receiving, from a service consumer, a first message for processing key figure-based views of the performance of a bank, including information that a ledger for financial instruments can use to create or cancel one or more analytical results for an accounting valuation. Program code invokes a financial instrument position accounting valuation analytical result business object. The business object is a logically centralized, semantically disjointed object for key figure-based views of the performance of a bank, including information that a ledger for financial instruments can use to create or cancel one or more analytical results for an accounting valuation. The business object comprises data logically organized as a financial instrument position analytical result template root node, a financial instrument position accounting valuation analytical result subordinate node, a financial instrument position accounting period total analytical result subordinate node, a financial instrument position period average volume analytical result subordinate node, a financial instrument position fair value analytical result subordinate node, a funds transfer pricing rate analytical result subordinate node, a characteristic value subordinate node, and an item subordinate node. The item node contains a financial instrument analytical component subordinate node, a posting key figure subordinate node, and a period average volume key figure subordinate node. The program code initiates transmission of a message to a heterogeneous second application, executing in the environment of computer systems providing message-based services, based on the data in the financial instrument position accounting valuation analytical result business object. The message comprises a financial instrument position accounting valuation analytical result create request message entity, a message header package, and a financial instrument position accounting period total analytical result package.

In a fifth aspect, a computer readable medium includes program code for providing a message-based interface for performing a financial instrument position accounting valuation analytical result service. The interface exposes at least one service as defined in a service registry, wherein upon execution the program code executes in an environment of computer systems providing message-based services. The service comprises program code for initiating transmission of a message to a heterogeneous second application, executing in the environment of computer systems providing message-based services, based on data in a financial instrument position accounting valuation analytical result business object invoked by the second application. The business object is a logically centralized, semantically disjointed object for key figure-based views of the performance of a bank, including information that a ledger for financial instruments can use to create or cancel one or more analytical results for an accounting valuation. The business object comprises data logically organized as a financial instrument position analytical result template root node, a financial instrument position accounting valuation analytical result subordinate node, a financial instrument position accounting period total analytical result subordinate node, a financial instrument position period average volume analytical result subordinate node, a financial instrument position fair value analytical result subordinate node, a funds transfer pricing rate analytical result subordinate node, a characteristic value subordinate node, and an item subordinate node. The item node contains a financial instrument analytical component subordinate node, a posting key figure subordinate node, and a period average volume key figure subordinate node. The message comprises a financial instrument position accounting valuation analytical result create request message entity, a message header package, and a financial instrument position accounting period total analytical result package. Program code receives a second message from the second application, the second message associated with the invoked financial instrument position accounting valuation analytical result business object and in response to the first message.

In a sixth aspect, a distributed system operates in a landscape of computer systems providing message-based services. The system processes business objects involving processing a key figure-based view of the performance of a bank, including information that a ledger for financial instruments can use to create or cancel one or more analytical results for an accounting valuation. The system comprises memory and a graphical user interface remote from the memory. The memory stores a business object repository storing a plurality of business objects. Each business object is a logically centralized, semantically disjointed object of a particular business object type. At least one of the business objects is for key figure-based views of the performance of a bank, including information that a ledger for financial instruments can use to create or cancel one or more analytical results for an accounting valuation. The business object comprises data logically organized as a financial instrument position analytical result template root node, a financial instrument position accounting valuation analytical result subordinate node, a financial instrument position accounting period total analytical result subordinate node, a financial instrument position period average volume analytical result subordinate node, a financial instrument position fair value analytical result subordinate node, a funds transfer pricing rate analytical result subordinate node, a characteristic value subordinate node, and an item subordinate node. The item node contains a financial instrument analytical component subordinate node, a posting key figure subordinate node, and a period average volume key figure subordinate node. The graphical user interface presents data associated with an invoked instance of the financial instrument position accounting valuation analytical result business object, the interface comprising computer readable instructions embodied on tangible media.

In a seventh aspect, a computer readable medium includes program code for providing a message-based interface for performing a financial instrument position accrual analytical result service. The interface exposes at least one service as defined in a service registry, wherein upon execution the program code executes in an environment of computer systems providing message-based services. Program code receives, from a service consumer, a first message for processing information for complex accrual calculations for specific financial instrument positions, including accrual results. Program code invokes a financial instrument position accrual analytical result business object. The business object is a logically centralized, semantically disjointed object for representing information for complex accrual calculations for specific financial instrument positions, including accrual results. The business object comprises data logically organized as a financial instrument position analytical result template root node, a financial instrument position accounting valuation analytical result subordinate node, a financial instrument position accounting period total analytical result subordinate node, a financial instrument position period average analytical result subordinate node, a financial instrument position fair value analytical result subordinate node, a funds transfer pricing rate analytical result subordinate node, a financial instrument position accrual analytical result subordinate node, a characteristic value subordinate node, and an item subordinate node. The item node contains a financial instrument analytical component subordinate node and an amount subordinate node. Program code initiates transmission of a message to a heterogeneous second application, executing in the environment of computer systems providing message-based services, based on the data in the financial instrument position accrual analytical result business object. The message comprises a financial instrument position accrual analytical result create request message entity, a message header package, and a financial instrument position accrual analytical result package.

In an eighth aspect, a computer readable medium includes program code for providing a message-based interface for performing a financial instrument position accrual analytical result service. The interface exposes at least one service as defined in a service registry, wherein upon execution the program code executes in an environment of computer systems providing message-based services. Program code initiates transmission of a message to a heterogeneous second application, executing in the environment of computer systems providing message-based services, based on data in a financial instrument position accrual analytical result business object invoked by the second application. The business object is a logically centralized, semantically disjointed object for representing information for complex accrual calculations for specific financial instrument positions, including accrual results. The business object comprises data logically organized as a financial instrument position analytical result template root node, a financial instrument position accounting valuation analytical result subordinate node, a financial instrument position accounting period total analytical result subordinate node, a financial instrument position period average analytical result subordinate node, a financial instrument position fair value analytical result subordinate node, a funds transfer pricing rate analytical result subordinate node, a financial instrument position accrual analytical result subordinate node, a characteristic value subordinate node, and an item subordinate node. The item node contains a financial instrument analytical component subordinate node and an amount subordinate node. The message comprises a financial instrument position accrual analytical result create request message entity, a message header package, and a financial instrument position accrual analytical result package. Program code receives a second message from the second application, the second message associated with the invoked financial instrument position accrual analytical result business object and in response to the first message.

In a ninth aspect, a distributed system operates in a landscape of computer systems providing message-based services. The system processes business objects involving information for complex accrual calculations for specific financial instrument positions, including accrual results. The system comprises memory and a graphical user interface remote from the memory. The memory stores a business object repository storing a plurality of business objects. Each business object is a logically centralized, semantically disjointed object of a particular business object type. At least one of the business objects is for representing information for complex accrual calculations for specific financial instrument positions, including accrual results. The business object comprises data logically organized as a financial instrument position analytical result template root node, a financial instrument position accounting valuation analytical result subordinate node, a financial instrument position accounting period total analytical result subordinate node, a financial instrument position period average analytical result subordinate node, a financial instrument position fair value analytical result subordinate node, a funds transfer pricing rate analytical result subordinate node, a financial instrument position accrual analytical result subordinate node, a characteristic value subordinate node, and an item subordinate node. The item node contains a financial instrument analytical component subordinate node and an amount subordinate node. The graphical user interface presents data associated with an invoked instance of the financial instrument position accrual analytical result business object, the interface comprising computer readable instructions embodied on tangible media.

In a tenth aspect, a computer readable medium includes program code for providing a message-based interface for performing a financial instrument position fair value analytical result service. The interface exposes at least one service as defined in a service registry, wherein upon execution the program code executes in an environment of computer systems providing message-based services. Program code receives, from a service consumer, a first message for processing sub-ledger information relating to financial instruments, including net present value information. Program code invokes a financial instrument position fair value analytical result business object. The business object is a logically centralized, semantically disjointed object for representing sub-ledger information relating to financial instruments, including net present value information. The business object comprises data logically organized as a financial instrument position analytical result template root node, a financial instrument position accounting valuation analytical result subordinate node, a financial instrument position accounting period total analytical result subordinate node, a financial instrument position period average analytical result subordinate node, a financial instrument position fair value analytical result subordinate node, a funds transfer pricing rate analytical result subordinate node, a financial instrument position accrual analytical result subordinate node, a characteristic value subordinate node and an item subordinate node. The item node contains a financial instrument analytical component subordinate node and an amount subordinate node. Program code initiates transmission of a message to a heterogeneous second application, executing in the environment of computer systems providing message-based services, based on the data in the financial instrument position fair value analytical result business object, The message comprises a financial instrument position fair value analytical result create request message entity, a message header package, and a financial instrument position fair value analytical result package.

In an eleventh aspect, a computer readable medium includes program code for providing a message-based interface for performing a financial instrument position fair value analytical result service. The interface exposes at least one service as defined in a service registry, wherein upon execution the program code executes in an environment of computer systems providing message-based services. Program code initiates transmission of a message to a heterogeneous second application, executing in the environment of computer systems providing message-based services, based on data in a financial instrument position fair value analytical result business object invoked by the second application. The business object is a logically centralized, semantically disjointed object for representing sub-ledger information relating to financial instruments, including net present value information. The business object comprises data logically organized as a financial instrument position analytical result template root node, a financial instrument position accounting valuation analytical result subordinate node, a financial instrument position accounting period total analytical result subordinate node, a financial instrument position period average analytical result subordinate node, a financial instrument position fair value analytical result subordinate node, a funds transfer pricing rate analytical result subordinate node, a financial instrument position accrual analytical result subordinate node, a characteristic value subordinate node and an item subordinate node. The item node contains a financial instrument analytical component subordinate node and an amount subordinate node. The message comprises a financial instrument position fair value analytical result create request message entity, a message header package, and a financial instrument position fair value analytical result package. Program code receives a second message from the second application, the second message associated with the invoked financial instrument position fair value analytical result business object and in response to the first message.

In a twelfth aspect, a distributed system operates in a landscape of computer systems providing message-based services. The system processes business objects involving sub-ledger information relating to financial instruments, including net present value information. The system comprises memory and a graphical user interface remote from the memory. The memory stores a business object repository storing a plurality of business objects. Each business object is a logically centralized, semantically disjointed object of a particular business object type. At least one of the business objects is for representing sub-ledger information relating to financial instruments, including net present value information. The business object comprises data logically organized as a financial instrument position analytical result template root node, a financial instrument position accounting valuation analytical result subordinate node, a financial instrument position accounting period total analytical result subordinate node, a financial instrument position period average analytical result subordinate node, a financial instrument position fair value analytical result subordinate node, a funds transfer pricing rate analytical result subordinate node, a financial instrument position accrual analytical result subordinate node, a characteristic value subordinate node and an item subordinate node. The item node contains a financial instrument analytical component subordinate node and an amount subordinate node. The graphical user interface presents data associated with an invoked instance of the financial instrument position fair value analytical result business object, the interface comprising computer readable instructions embodied on tangible media.

In a thirteenth aspect, a computer readable medium includes program code for providing a message-based interface for performing a financial instrument position period average volume analytical result service. The interface exposes at least one service as defined in a service registry, wherein upon execution the program code executes in an environment of computer systems providing message-based services. Program code receives, from a service consumer, a first message for processing key figure-based views of the performance of a bank, including information that a ledger for financial instruments can use to create or cancel one or more analytical results for a period average volume. Program code invokes a financial instrument position period average volume analytical result business object. The business object is a logically centralized, semantically disjointed object for key figure-based views of the performance of a bank, including information that a ledger for financial instruments can use to create or cancel one or more analytical results for a period average volume. The business object comprises data logically organized as a financial instrument position analytical result template root node, a financial instrument position accounting valuation analytical result subordinate node, a financial instrument position accounting period total analytical result subordinate node, a financial instrument position period average volume analytical result subordinate node, a financial instrument position fair value analytical result subordinate node, a funds transfer pricing rate analytical result subordinate node, a characteristic value subordinate node, and an item subordinate node. The item node contains a financial instrument analytical component subordinate node, a posting key figure subordinate node, and a period average volume key figure subordinate node. Program code initiates transmission of a message to a heterogeneous second application, executing in the environment of computer systems providing message-based services, based on the data in the financial instrument position period average volume analytical result business object. The message comprises a financial instrument position period average volume analytical result create request message entity, a message header package, and a financial instrument position period average volume analytical result package.

In a fourteenth aspect, a computer readable medium includes program code for providing a message-based interface for performing a financial instrument position period average volume analytical result service. The interface exposes at least one service as defined in a service registry, wherein upon execution the program code executes in an environment of computer systems providing message-based services and comprises. Program code initiates transmission of a message to a heterogeneous second application, executing in the environment of computer systems providing message-based services, based on data in a financial instrument position period average volume analytical result business object invoked by the second application. The business object is a logically centralized, semantically disjointed object for key figure-based views of the performance of a bank, including information that a ledger for financial instruments can use to create or cancel one or more analytical results for a period average volume. The business object comprises data logically organized as a financial instrument position analytical result template root node, a financial instrument position accounting valuation analytical result subordinate node, a financial instrument position accounting period total analytical result subordinate node, a financial instrument position period average volume analytical result subordinate node, a financial instrument position fair value analytical result subordinate node, a funds transfer pricing rate analytical result subordinate node, a characteristic value subordinate node, and an item subordinate node. The item node contains a financial instrument analytical component subordinate node, a posting key figure subordinate node, and a period average volume key figure subordinate node. The message comprises a financial instrument position period average volume analytical result create request message entity, a message header package, and a financial instrument position period average volume analytical result package. Program code receives a second message from the second application, the second message associated with the invoked financial instrument position period average volume analytical result business object and in response to the first message.

In a fifteenth aspect, a distributed system operates in a landscape of computer systems providing message-based services. The system processes business objects involving processing a key figure-based view of the performance of a bank, including information that a ledger for financial instruments can use to create or cancel one or more analytical results for a period average volume. The system comprises memory and a graphical user interface remote from the memory. The memory stores a business object repository storing a plurality of business objects. Each business object is a logically centralized, semantically disjointed object of a particular business object type. At least one of the business objects is for key figure-based views of the performance of a bank, including information that a ledger for financial instruments can use to create or cancel one or more analytical results for a period average volume. The business object comprises data logically organized as a financial instrument position analytical result template root node, a financial instrument position accounting valuation analytical result subordinate node, a financial instrument position accounting period total analytical result subordinate node, a financial instrument position period average volume analytical result subordinate node, a financial instrument position fair value analytical result subordinate node, a funds transfer pricing rate analytical result subordinate node, a characteristic value subordinate node, and an item subordinate node. The item node contains a financial instrument analytical component subordinate node, a posting key figure subordinate node, and a period average volume key figure subordinate node. The graphical user interface presents data associated with an invoked instance of the financial instrument position period average volume analytical result business object, the interface comprising computer readable instructions embodied on tangible media.

In some implementations, processing business objects includes creating, updating and/or retrieving information associated with the business objects.

BRIEF DESCRIPTION OF THE DRAWINGS

FIGS. 32-1 through 32-4 show an exemplary FinancialInstrumentPositionAnalyticalResult_Template Object Model.

FIG. 38 shows an exemplary FinInstPosAcctgPerTotAnalRsltBulkCancReq Element Structure.

FIG. 39 shows an exemplary FinInstPosAcctgPerTotAnalRsltBulkCrteReq Element Structure.

FIGS. 40-1 through 40-3 show an exemplary FinInstPosAcctgPerTotAnalRsltCancReq Element Structure.

FIGS. 41-1 through 41-5 show an exemplary FinInstPosAcctgPerTotAnalRsltCrteReq Element Structure.

FIGS. 42-1 through 42-4 show an exemplary Financial Instrument Position Accounting Valuation Analytical Result Object Model.

FIG. 48 shows an exemplary FinInstrPosAcctgValnAnalRsltBulkCancReq_V2.1 Element Structure.

FIG. 49 shows an exemplary FinInstrPosAcctgValnAnalRsltBulkCrteReq_V2.1 Element Structure.

FIGS. 50-1 through 50-3 show an exemplary FinInstrPosAcctgValnAnalRsltCancReq_V2.1 Element Structure.

FIGS. 51-1 through 51-6 show an exemplary FinInstrPosAcctgValnAnalRsltCrteReq_V2.1 Element Structure.

FIGS. 52-1 through 52-4 show an exemplary FinancialInstrumentPositionAnalyticalResult_Template Object Model.

FIG. 59 shows an exemplary FinInstrPosAccrAnalRsltMsg Message Data Type.

FIG. 60 shows an exemplary FinInstrPosAccrAnalRsltCrteReqMsg Message Data Type.

FIGS. 61-1 through 61-3 show an exemplary FinInstrPosAccrAnalRsltBulkCrteReqMsg Message Data Type.

FIGS. 62-1 through 62-5 show an exemplary FinInstrPosAccrAnalRsltCancReqMsg Element Structure.

FIGS. 63-1 through 63-5 show an exemplary FinInstrPosAccrAnalRsltBulkCancReqMsg Element Structure.

FIGS. 64-1 through 64-4 show an exemplary Financial Instrument Position Fair Value Analytical Result Object Model.

FIG. 70 shows an exemplary FinInstrPosFairValueAnalRsltBulkCancReqMsg Element Structure.

FIG. 71 shows an exemplary FinInstrPosFairValueAnalRsltBulkCrteReqMsg Element Structure.

FIGS. 72-1 through 72-3 show an exemplary FinInstrPosFairValueAnalRsltCancReqMsg Element Structure.

FIGS. 73-1 through 73-5 show an exemplary FinInstrPosFairValueAnalRsltCrteReqMsg Element Structure.

FIGS. 74-1 through 74-4 show an exemplary Financial Instrument Position Period Average Volume Analytical Result Object Model.

FIG. 80 shows an exemplary FinInstrPosPerAvgVolAnalRsltBulkCancReq Element Structure.

FIG. 81 shows an exemplary FinInstrPosPerAvgVolAnalRsltBulkCrteReq Element Structure.

FIGS. 82-1 through 82-3 show an exemplary FinInstrPosPerAvgVolAnalRsltCancReq Element Structure.

FIGS. 83-1 through 83-6 show an exemplary FinInstrPosPerAvgVolAnalRsltCrteReq Element Structure.

DETAILED DESCRIPTION

A. Overview

Figure 1:
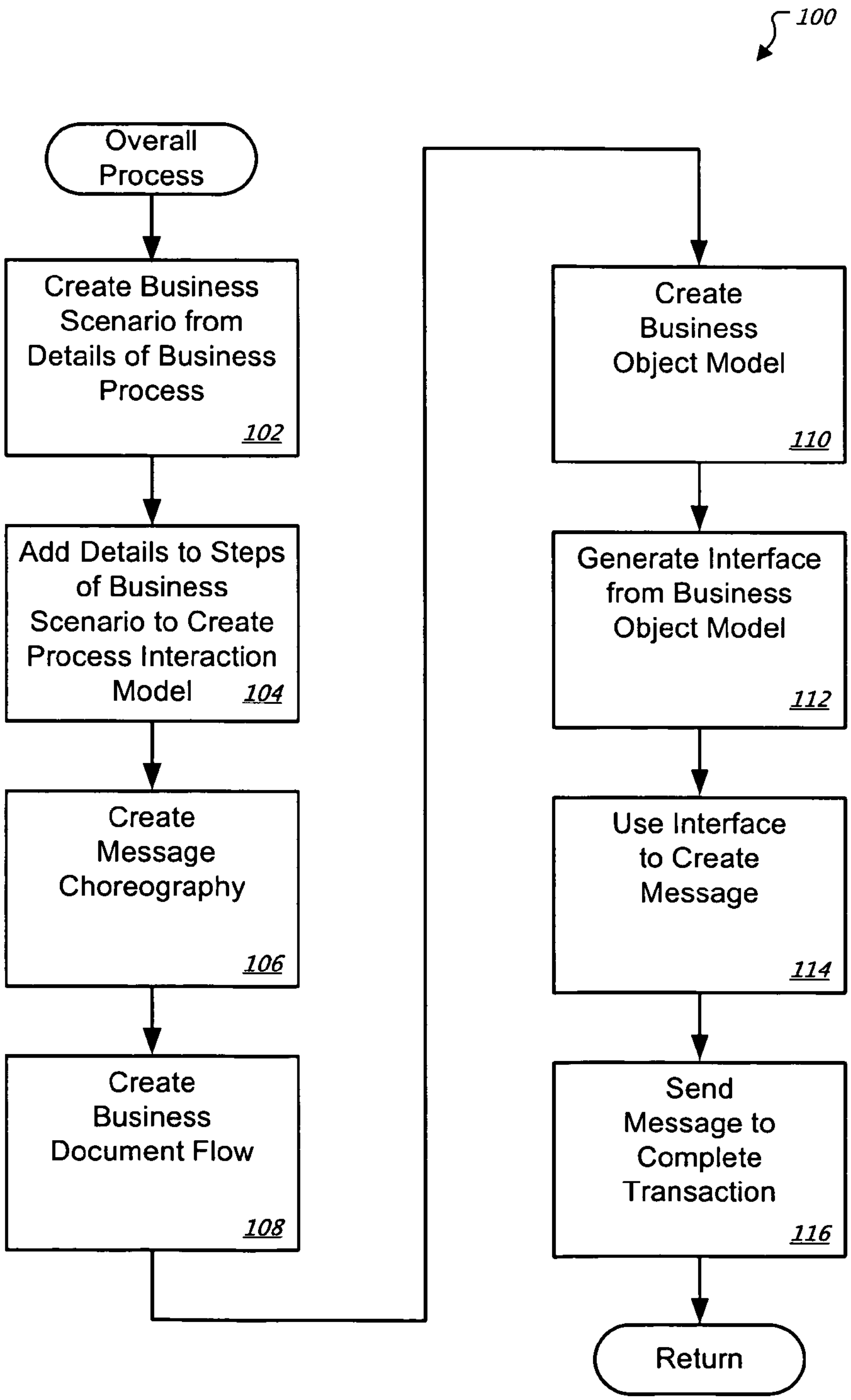
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a “create”, “update”, or “delete” of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a “business scenario” (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a “business transaction,” and each business entity is referred to as a “component” of the business transaction. The developers also identify the messages that are transmitted between the components. A “process interaction model” represents the complete process steps between two components.

After creating the process interaction model, the developers create a “message choreography” (step 106), which depicts the messages transmitted between the two components in the process interaction model. The developers then represent the transmission of the messages between the components during a business process in a “business document flow” (step 108). Thus, the business document flow illustrates the flow of information between the business entities during a business process.

Figure 2:
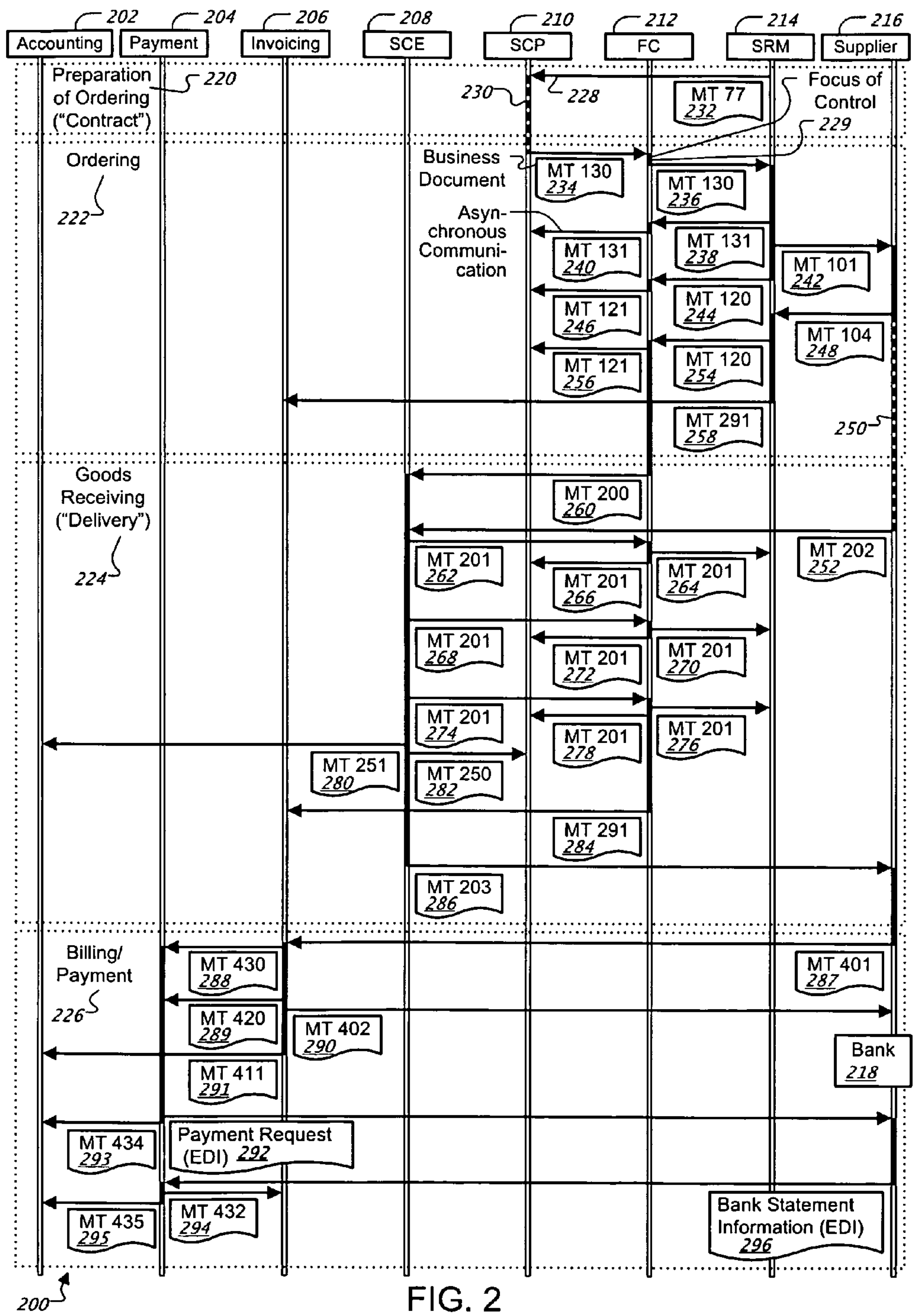
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution (“SCE”) 208, Supply Chain Planning (“SCP”) 210, Fulfillment Coordination (“FC”) 212, Supply Relationship Management (“SRM”) 214, Supplier 216, and Bank 218. The business document flow 200 is divided into four different transactions: Preparation of Ordering (“Contract”) 220, Ordering 222, Goods Receiving (“Delivery”) 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
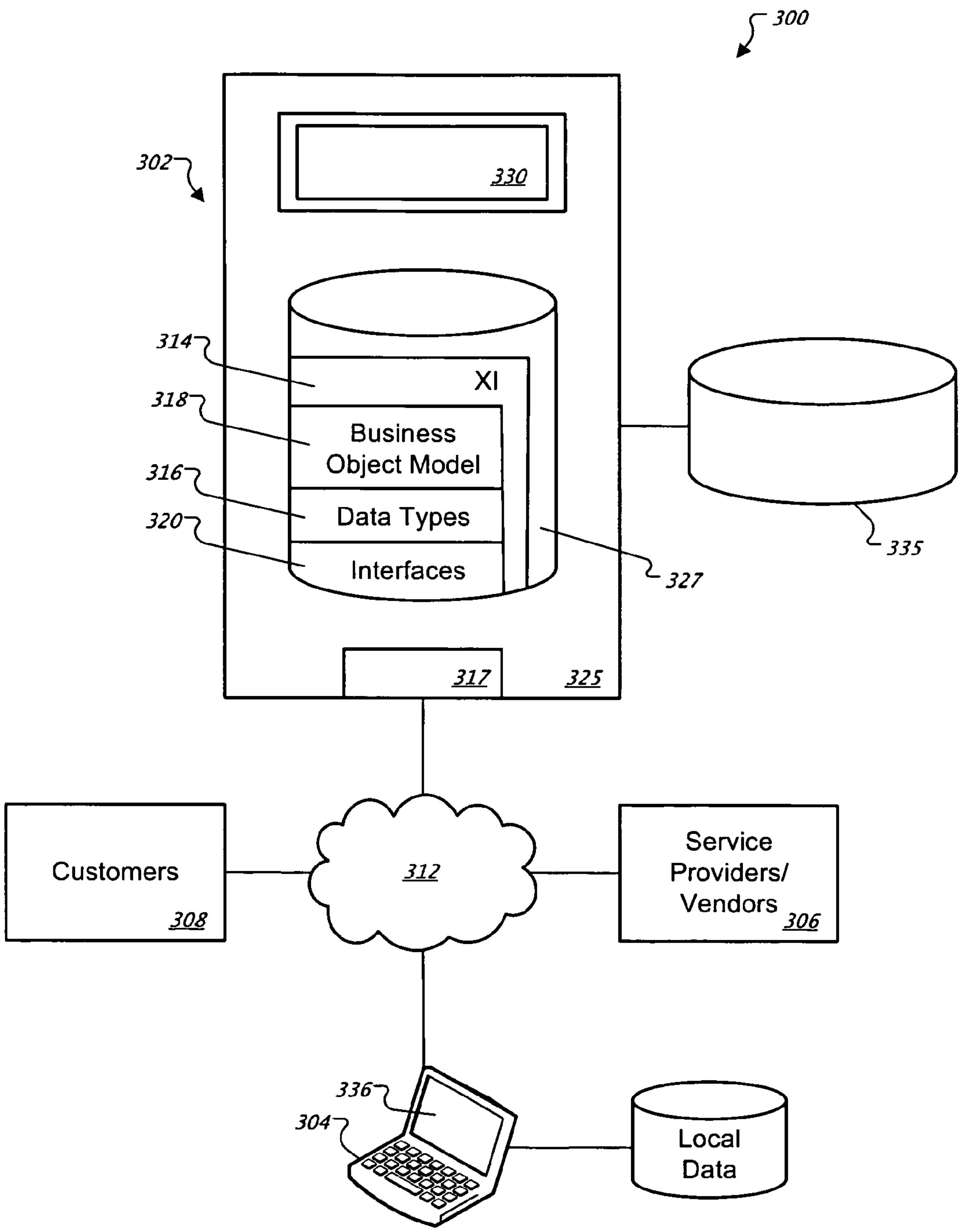
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or offshore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
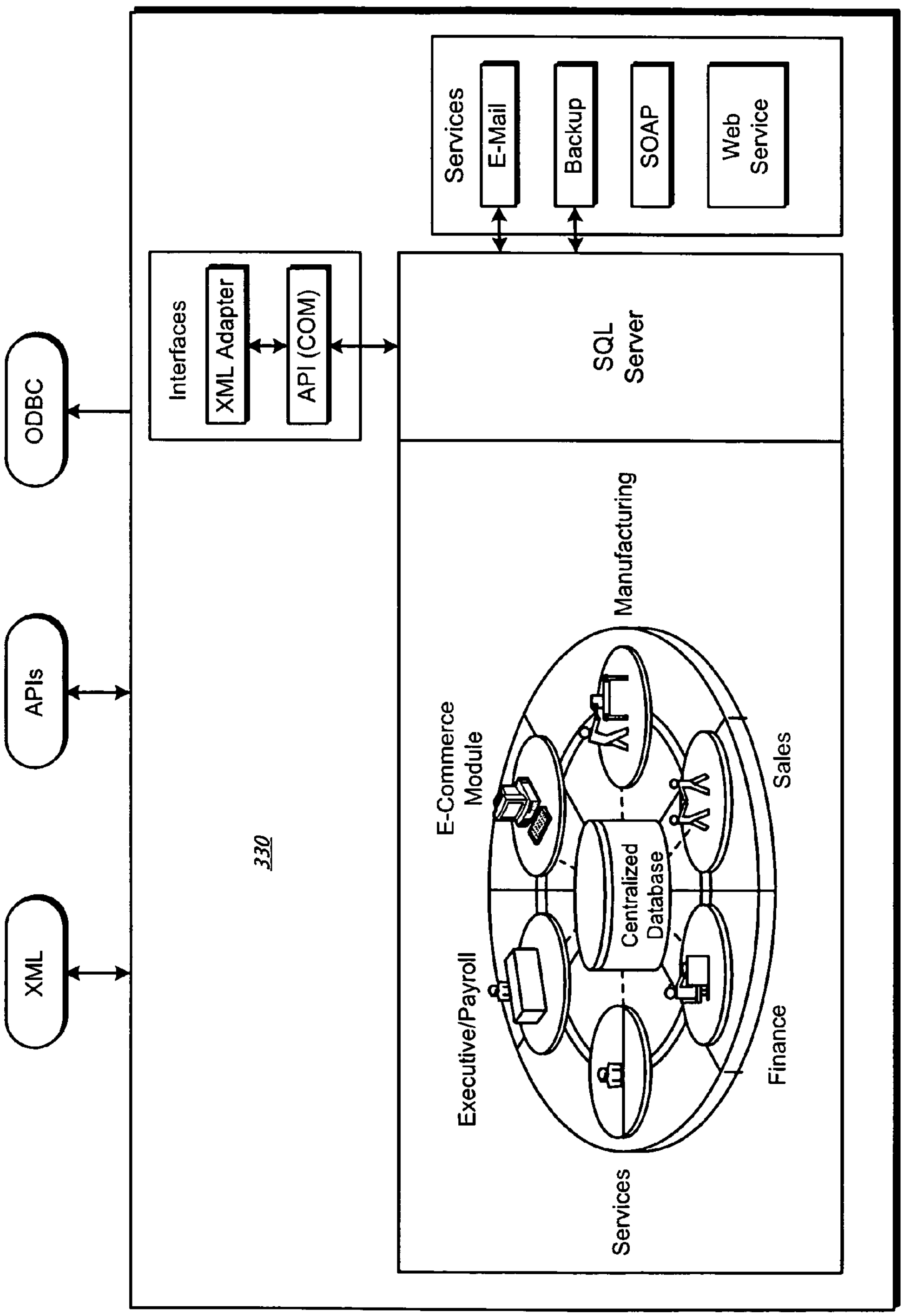
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
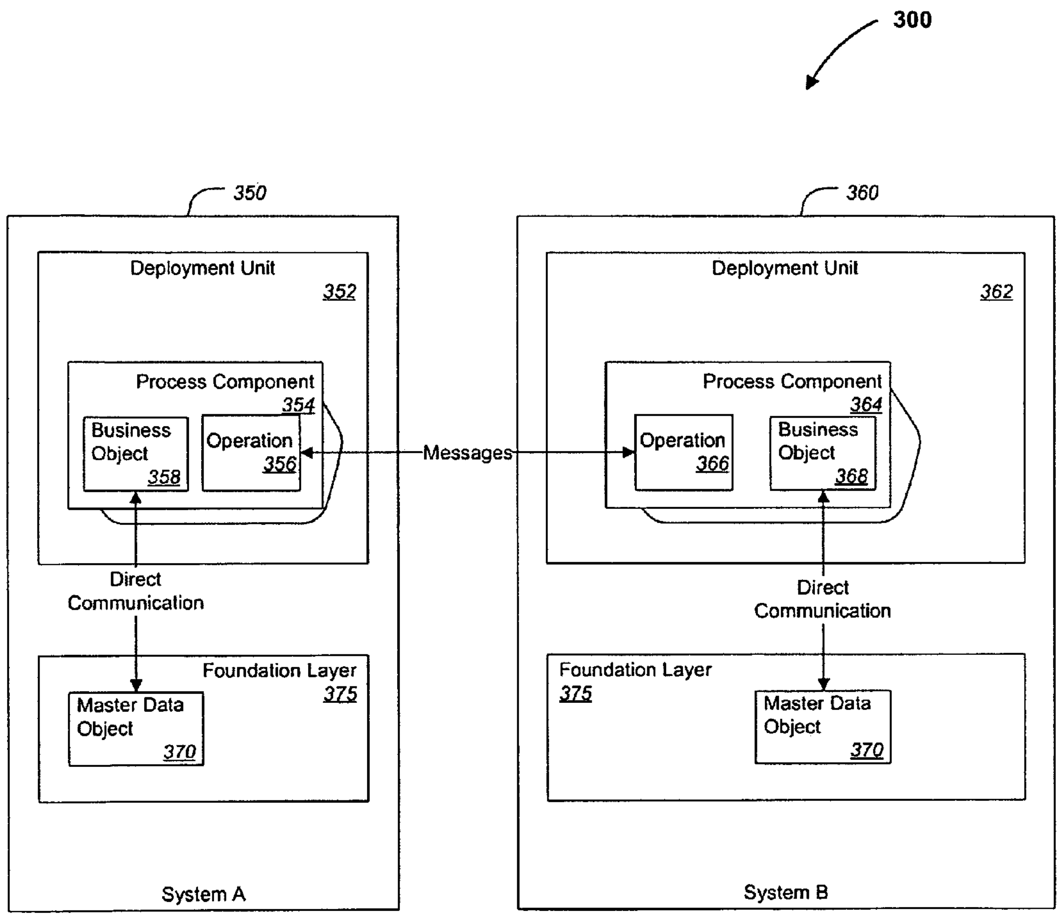

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
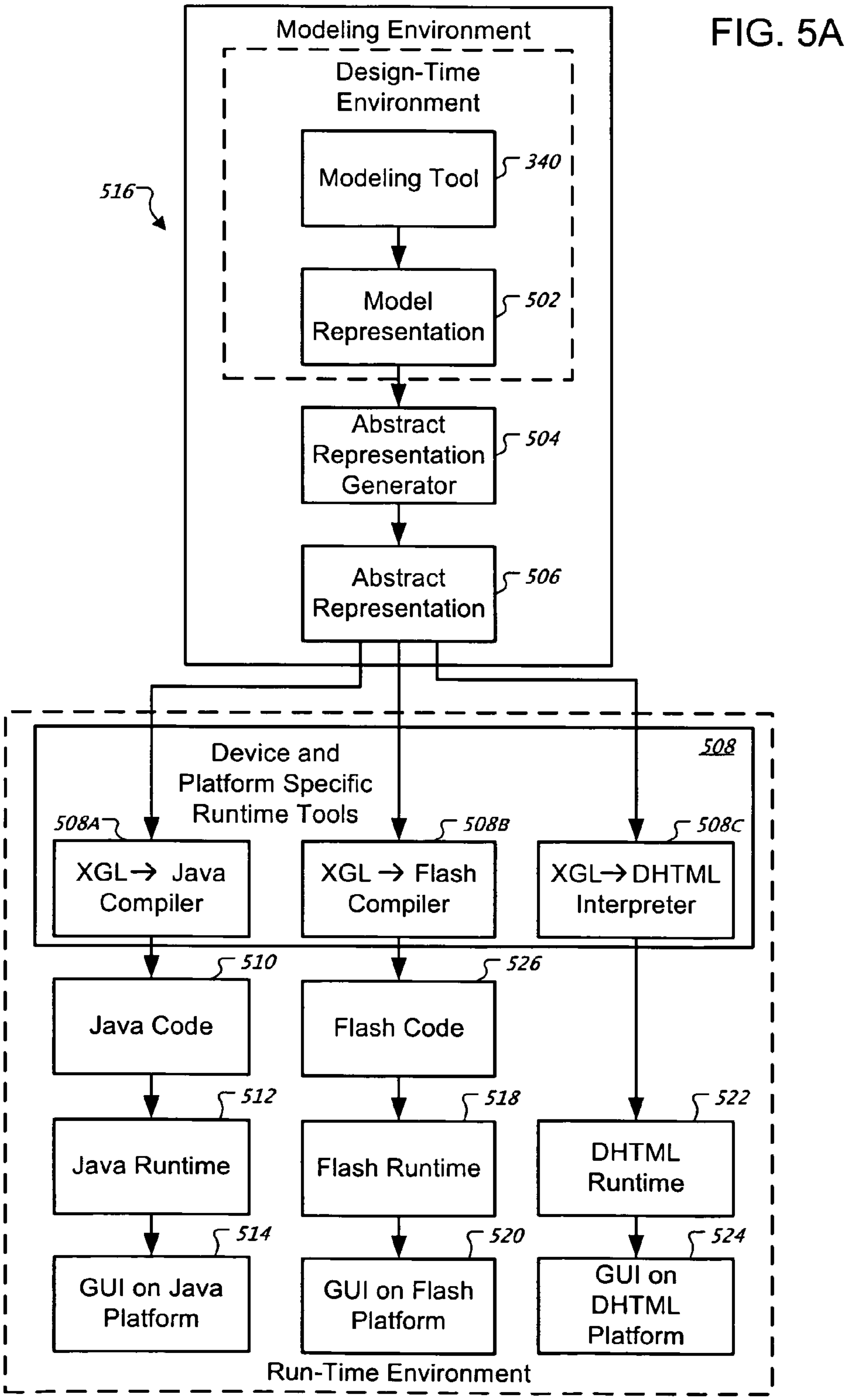
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
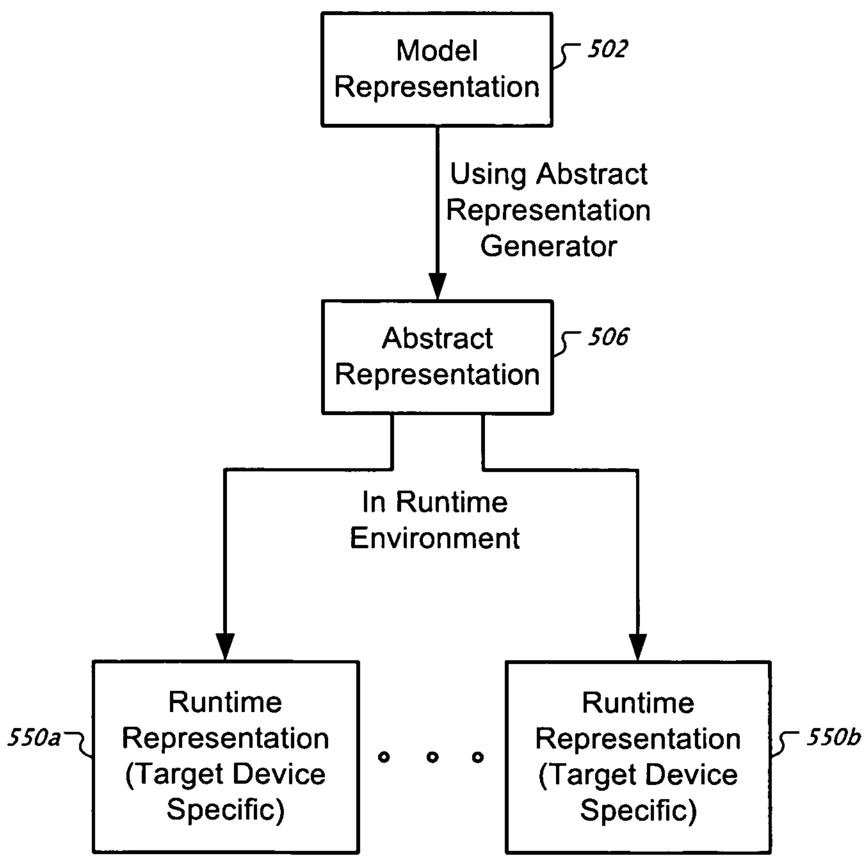
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

Figure 6:
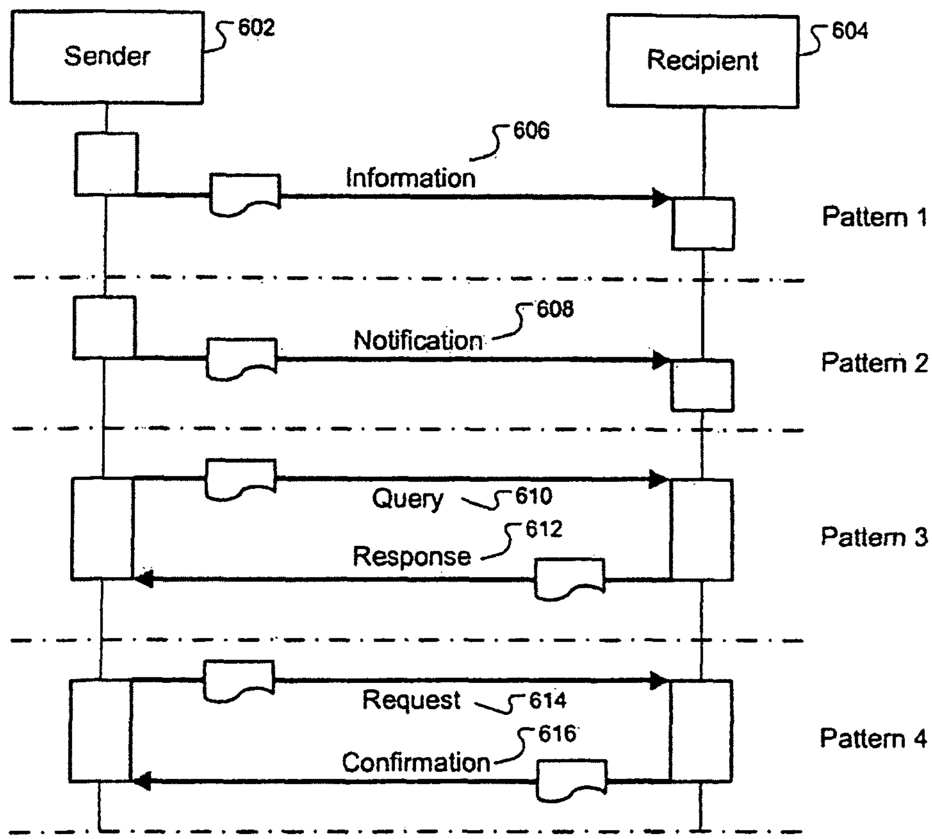
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic.

Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include "sub"-packages, i.e., the packages may be nested.

Figure 7:
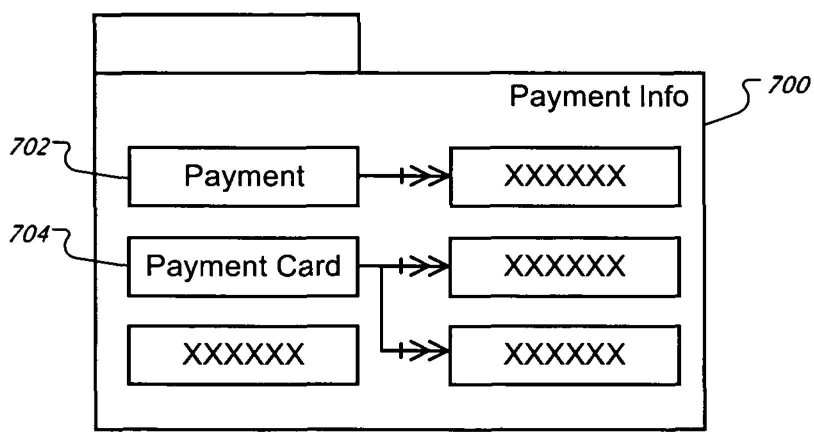
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
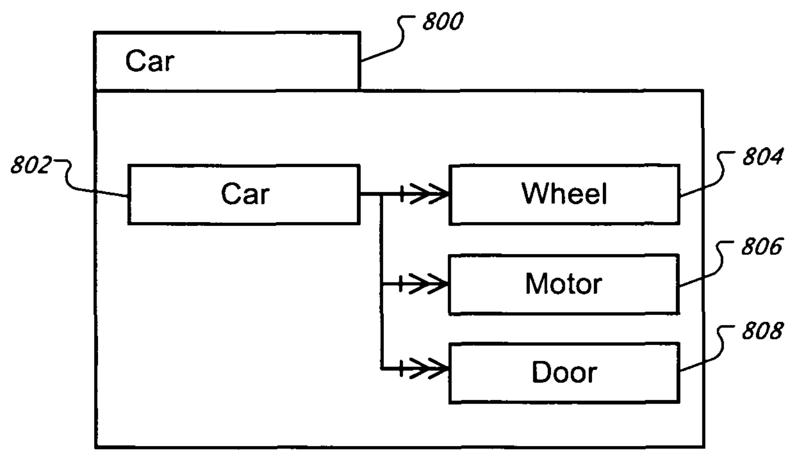
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
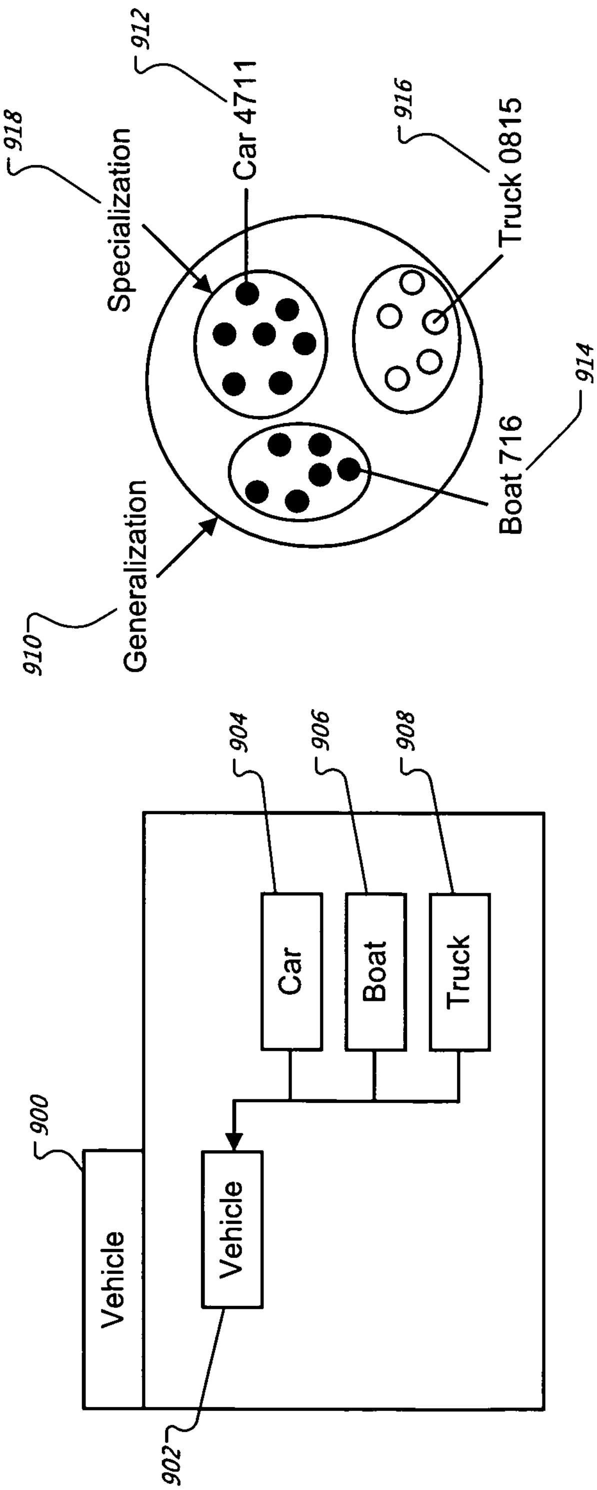
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
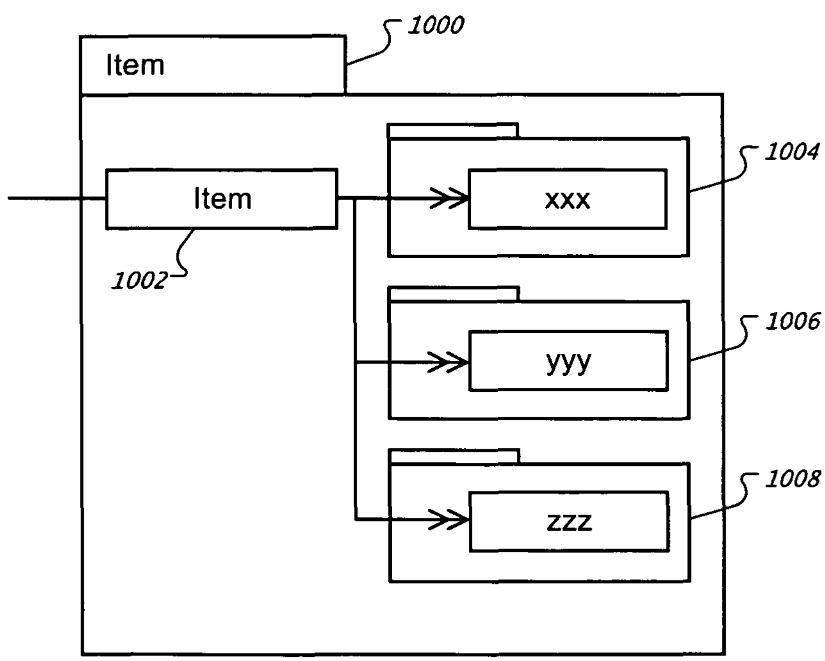
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
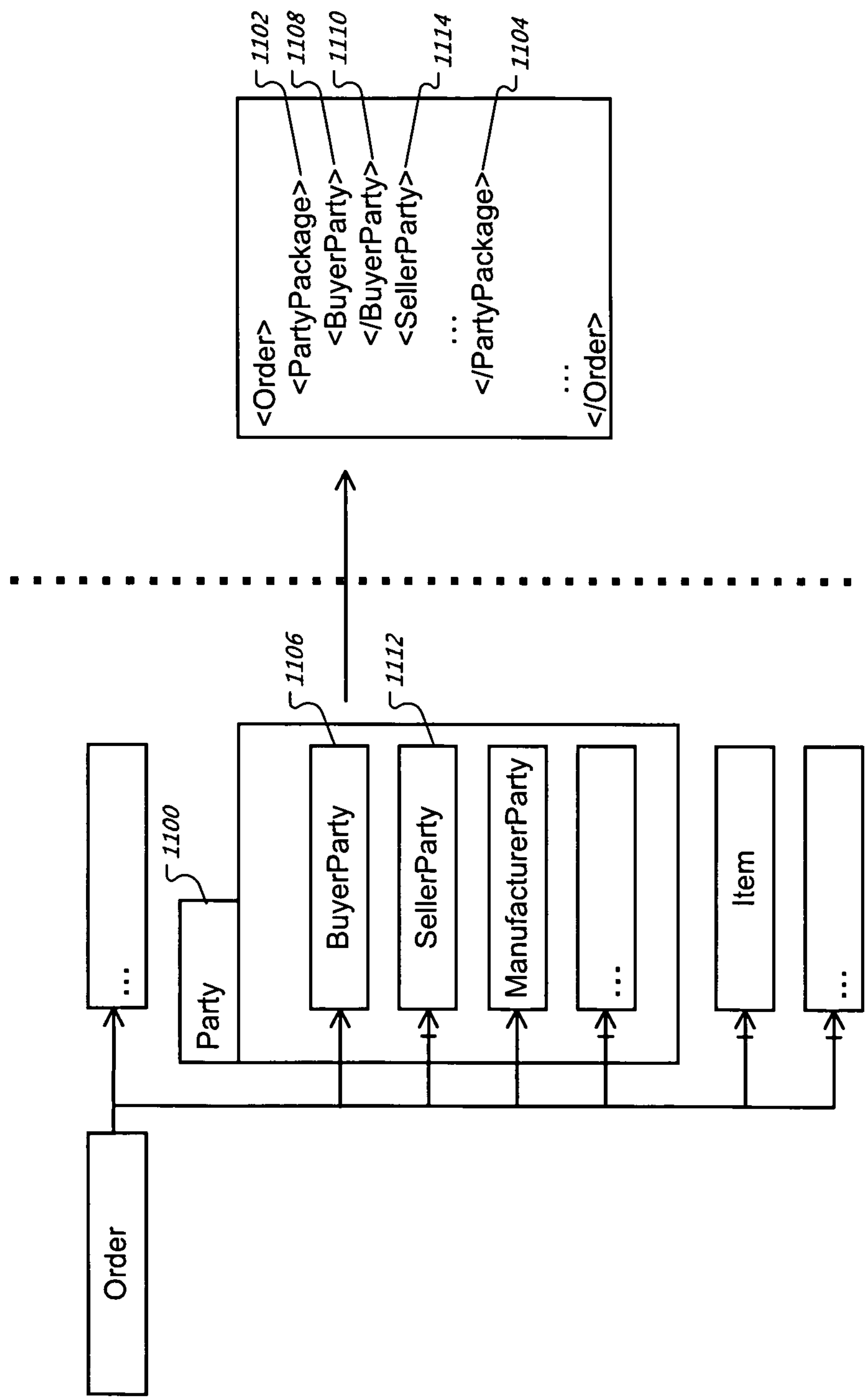
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

Figure 12:
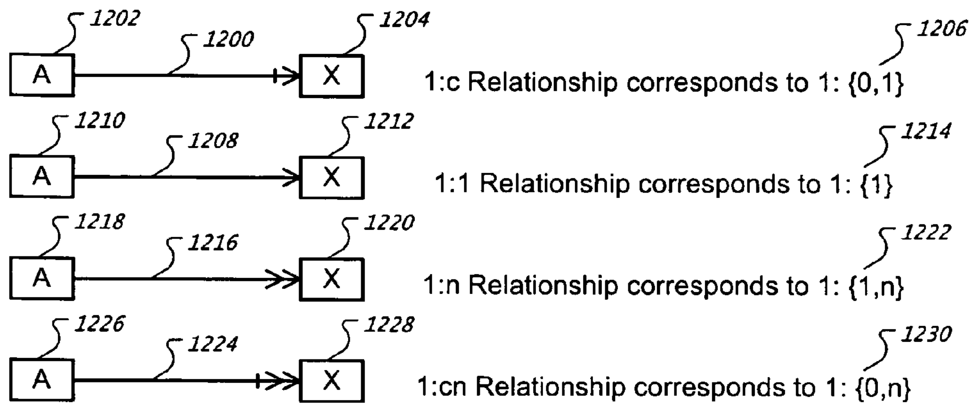
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

Figure 13:
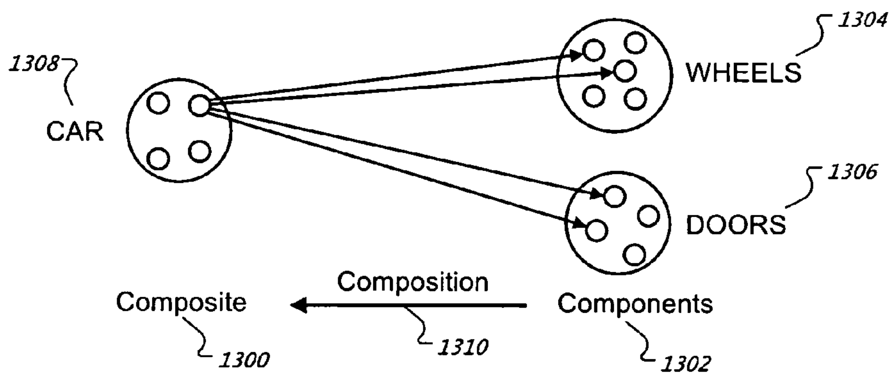
FIG. 13 depicts an example of a composition in accordance with methods and systems consistent with the subject matter described herein.
Figure 14:
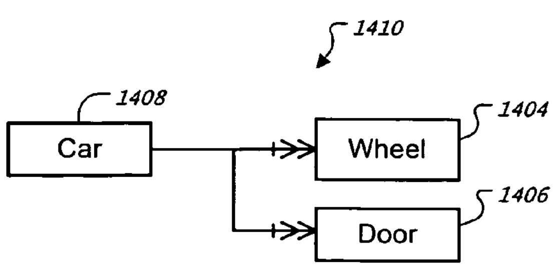
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

Figure 15:
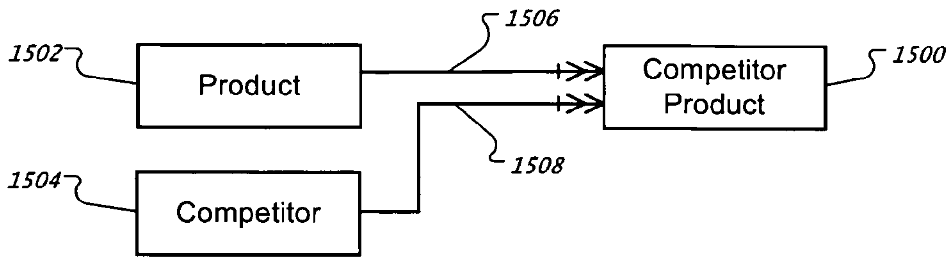
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

Figure 16:
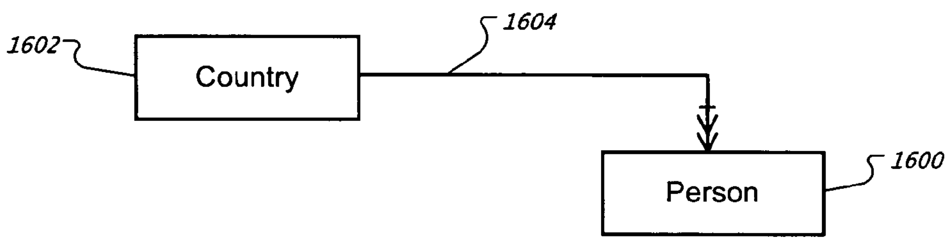
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(3) Specialization

Figure 17:
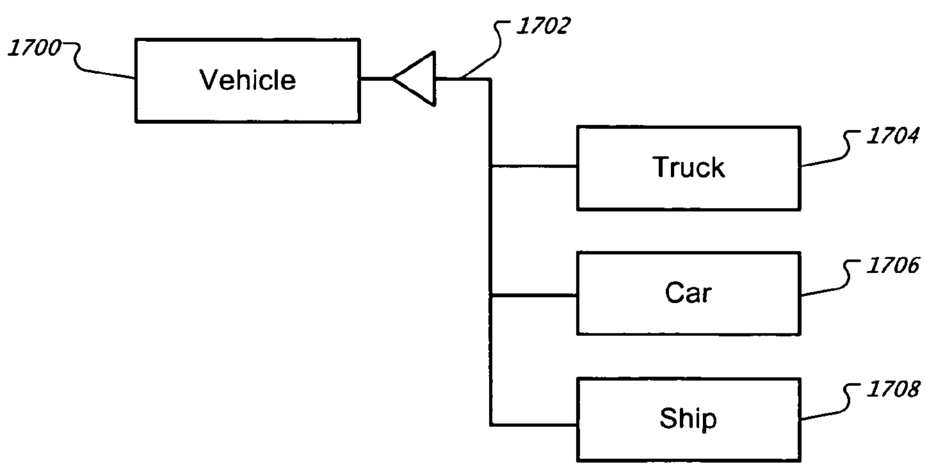
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
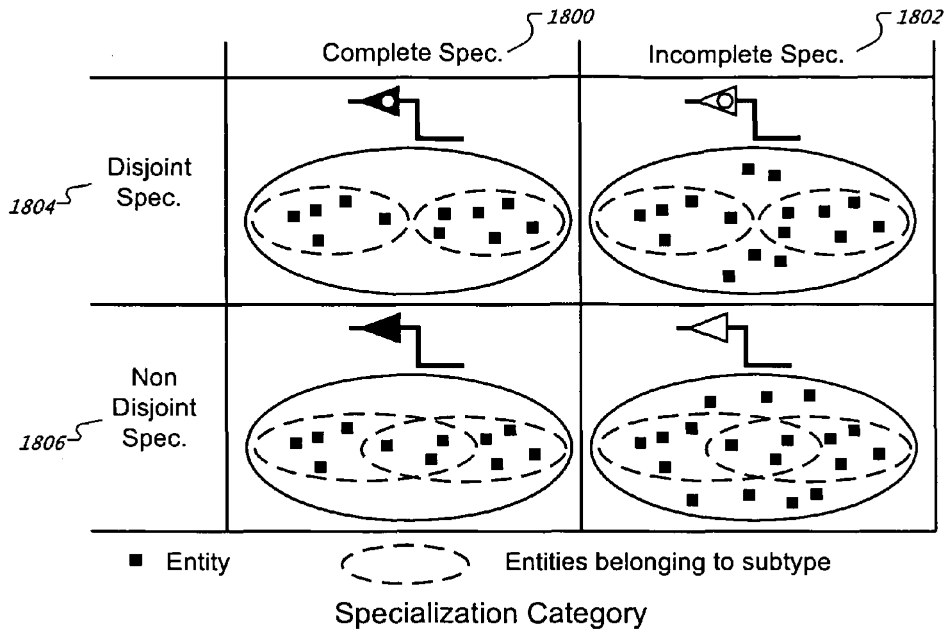
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(2) Hierarchy

Figure 19:
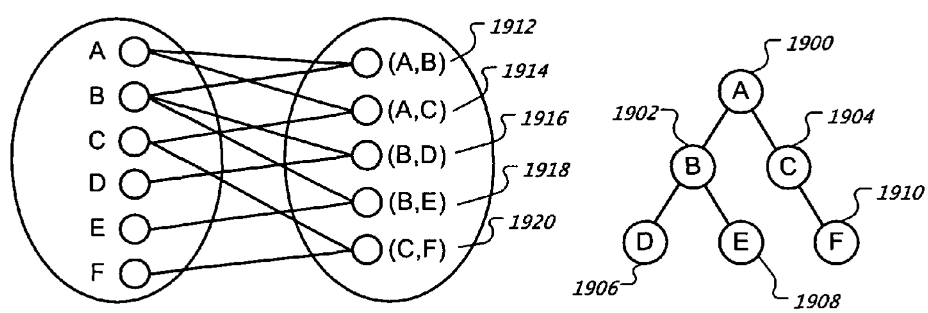
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
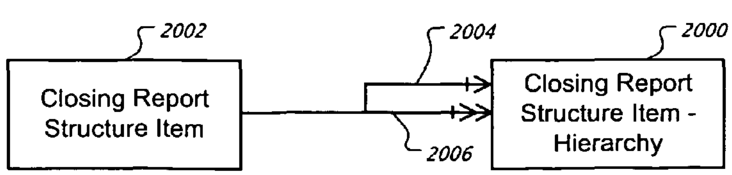
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
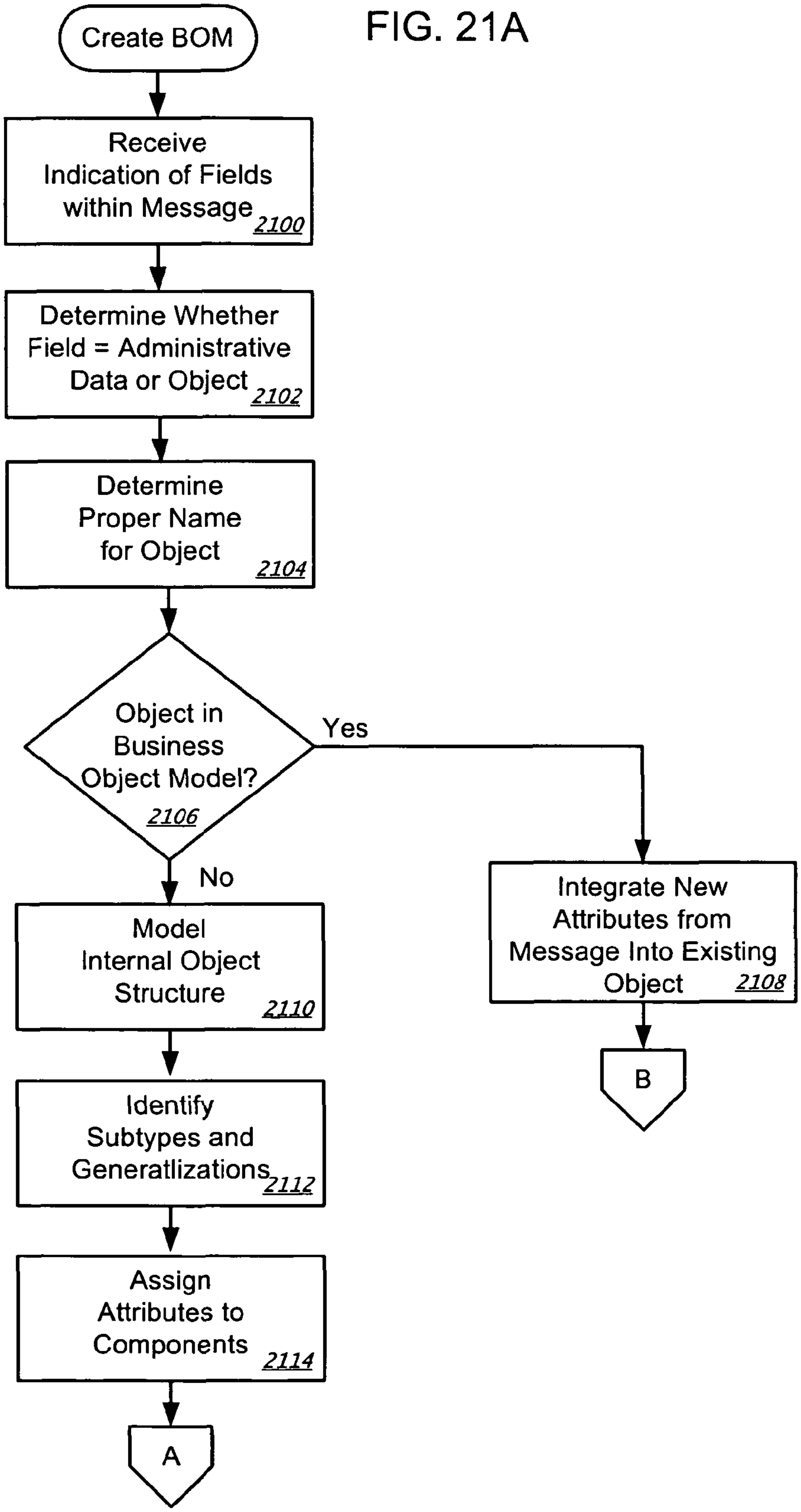
FIGS. 21A-B depict a flow diagram of the steps performed to create a business object model in accordance with methods and systems consistent with the subject matter described herein.
Figure 21B:
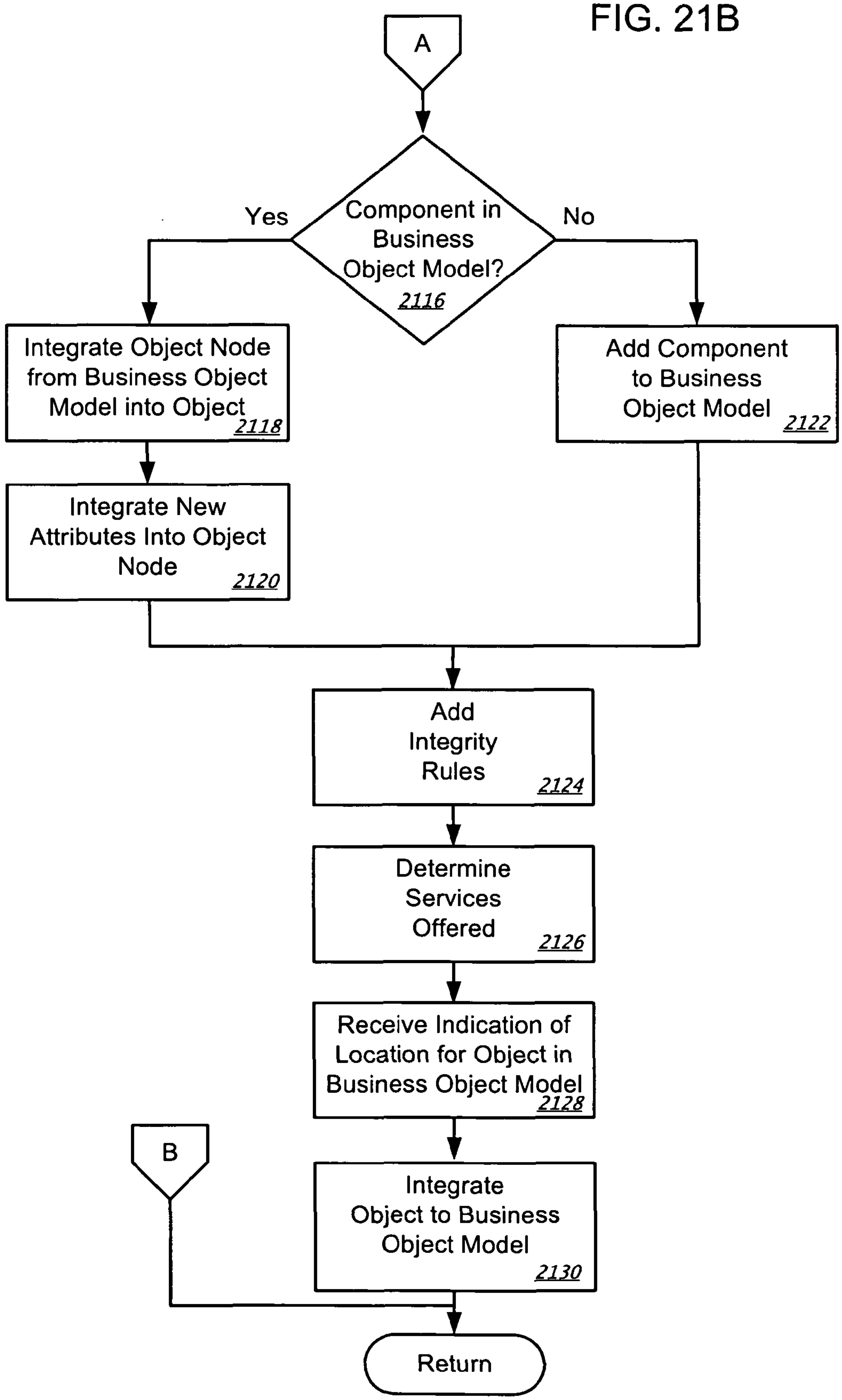

FIGS. 21A-B depict the steps performed using methods and systems consistent with the subject matter described herein to create a business object model. Although some steps are described as being performed by a computer, these steps may alternatively be performed manually, or computer-assisted, or any combination thereof Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |

-continued

| |
|---|
| Seller |
| SellerAddress |
| Location |
| LocationType |
| DeliveryItemGroupID |
| DeliveryPriority |
| DeliveryCondition |
| TransferLocation |
| NumberofPartialDelivery |
| QuantityTolerance |
| MaximumLeadTime |
| TransportServiceLevel |
| TranportCondition |
| TransportDescription |
| CashDiscountTerms |
| PaymentForm |
| PaymentCardID |
| PaymentCardReferenceID |
| SequenceID |
| Holder |
| ExpirationDate |
| AttachmentID |
| AttachmentFilename |
| DescriptionofMessage |
| ConfirmationDescriptionof Message |
| FollowUpActivity |
| ItemID |
| ParentItemID |
| HierarchyType |
| ProductID |
| ProductType |
| ProductNote |
| ProductCategoryID |
| Amount |
| BaseQuantity |
| ConfirmedAmount |
| ConfirmedBaseQuantity |
| ItemBuyer |
| ItemBuyerOrganisationName |
| Person Name |
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |

-continued

| |
|---|
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | |
|---|---|---|
| ID | Pur- chase Order | |
| AdditionalID | | |
| PostingDate | | |
| LastChangeDate | | |
| AcceptanceStatus | | |
| Note | | |
| CompleteTransmission Indicator | | |
| Buyer | | Buyer |
| BuyerOrganisationName | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | | Seller |
| SellerAddress | | |
| Location | | Location |
| LocationType | | |
| DeliveryItemGroupID | | DeliveryTerms |
| DeliveryPriority | | |
| DeliveryCondition | | |
| TransferLocation | | |
| NumberofPartialDelivery | | |
| QuantityTolerance | | |
| MaximumLeadTime | | |

-continued

| | | |
|---|---|---|
| TransportServiceLevel | | |
| TranportCondition | | |
| TransportDescription | | |
| CashDiscountTerms | | |
| PaymentForm | Payment | |
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof Message | | |
| FollowUpActivity | | |
| ItemID | Purchase Order | |
| ParentItemID | Item | |
| HierarchyType | | |
| ProductID | | Product |
| ProductType | | |
| ProductNote | | |
| ProductCategoryID | | ProductCategory |
| Amount | | |
| BaseQuantity | | |
| ConfirmedAmount | | |
| ConfirmedBaseQuantity | | |
| ItemBuyer | | Buyer |
| ItemBuyerOrganisation Name | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |

-continued

| | |
|---|---|
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | Seller |
| ItemSellerAddress | |
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial Delivery | |
| ItemQuantityTolerance | |
| ItemMaximumLeadTime | |
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscount Terms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation Description | | | 0 . . . 1 |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetunitPrice | 0 . . . 1 |
| | | ConfirmedPrice | | 0 . . . 1 |
| | | | NetunitPrice | 0 . . . 1 |

-continued

| | | | |
|---|---|---|---|
| Buyer | | | 0 . . . 1 |
| Seller | | | 0 . . . 1 |
| Location | | | 0 . . . 1 |
| DeliveryTerms | | | 0 . . . 1 |
| Attachment | | | 0 . . . n |
| Description | | | 0 . . . 1 |
| ConfirmationDescription | | | 0 . . . 1 |
| ScheduleLine | | | 0 . . . n |
| | DeliveryPeriod | | 1 |
| ConfirmedScheduleLine | | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| Purchase Order | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |
| | | ShipFromLocation | | | 0 . . . 1 |
| | | | Address | | 0 . . . 1 |
| | DeliveryTerms | | | | 0 . . . 1 |
| | | Incoterms | | | 0 . . . 1 |
| | | PartialDelivery | | | 0 . . . 1 |
| | | QuantityTolerance | | | 0 . . . 1 |
| | | Transport | | | 0 . . . 1 |
| | CashDiscount Terms | | | | 0 . . . 1 |
| | | MaximumCash Discount | | | 0 . . . 1 |
| | | NormalCashDiscount | | | 0 . . . 1 |
| | PaymentForm | | | | 0 . . . 1 |
| | | PaymentCard | | | 0 . . . 1 |
| | Attachment | | | | 0 . . . n |
| | Description | | | | 0 . . . 1 |
| | Confirmation Description | | | | 0 . . . 1 |
| | Item | | | | 0 . . . n |
| | | HierarchyRelationship | | | 0 . . . 1 |
| | | Product | | | 0 . . . 1 |
| | | ProductCategory | | | 0 . . . 1 |
| | | Price | | | 0 . . . 1 |
| | | | NetunitPrice | | 0 . . . 1 |
| | | ConfirmedPrice | | | 0 . . . 1 |
| | | | NetunitPrice | | 0 . . . 1 |
| | | Party | | | |
| | | | BuyerParty | | 0 . . . 1 |
| | | | SellerParty | | 0 . . . 1 |
| | | Location | | | |
| | | | ShipTo Location | | 0 . . . 1 |
| | | | ShipFrom Location | | 0 . . . 1 |
| | | DeliveryTerms | | | 0 . . . 1 |
| | | Attachment | | | 0 . . . n |
| | | Description | | | 0 . . . 1 |
| | | Confirmation | | | 0 . . . 1 |

-continued

| | | | |
|---|---|---|---|
| | Description | | |
| | ScheduleLine | | 0 . . . n |
| | | Delivery Period | 1 |
| | ConfirmedScheduleLine | | 0 . . . n |

After identifying the subtypes and generalizations, the developers assign the attributes to these components (step 2114). The attributes for a portion of the components are shown below.

| | | | | |
|---|---|---|---|---|
| Purchase Order | | | | 1 |
| | ID | | | 1 |
| | SellerID | | | 0 . . . 1 |
| | BuyerPosting DateTime | | | 0 . . . 1 |
| | BuyerLast ChangeDate Time | | | 0 . . . 1 |
| | SellerPosting DateTime | | | 0 . . . 1 |
| | SellerLast ChangeDate Time | | | 0 . . . 1 |
| | Acceptance StatusCode | | | 0 . . . 1 |
| | Note | | | 0 . . . 1 |
| | ItemList Complete Transmission Indicator | | | 0 . . . 1 |
| | BuyerParty | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | | ContactPerson | | 0 . . . 1 |
| | | | BuyerID | 0 . . . 1 |
| | | | SellerID | 0 . . . 1 |
| | | | Address | 0 . . . 1 |
| | SellerParty | | | 0 . . . 1 |
| | Product RecipientParty | | | 0 . . . 1 |
| | VendorParty | | | 0 . . . 1 |
| | Manufacturer Party | | | 0 . . . 1 |
| | BillToParty | | | 0 . . . 1 |
| | PayerParty | | | 0 . . . 1 |
| | CarrierParty | | | 0 . . . 1 |
| | ShipTo Location | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | ShipFrom Location | | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Figure 27A:
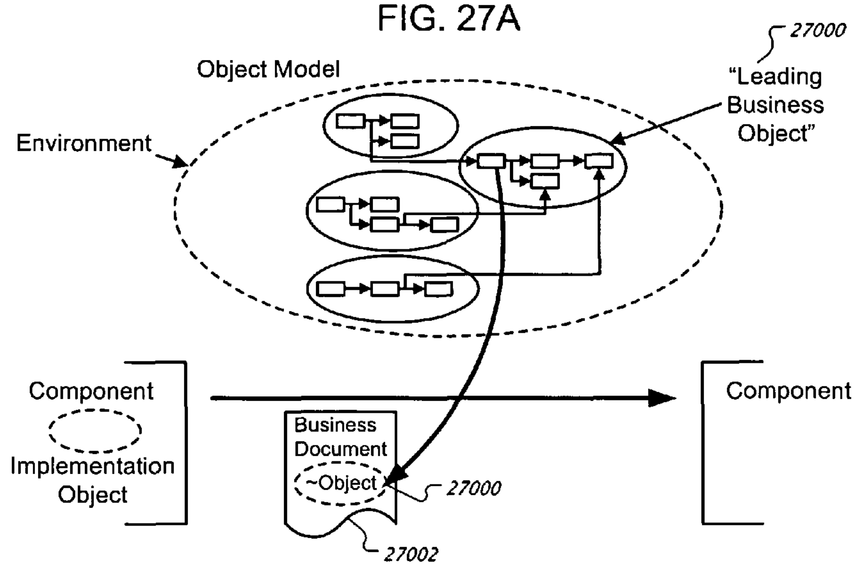
FIGS. 27A-E depict a hierarchization process in accordance with methods and systems consistent with the subject matter described herein.

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
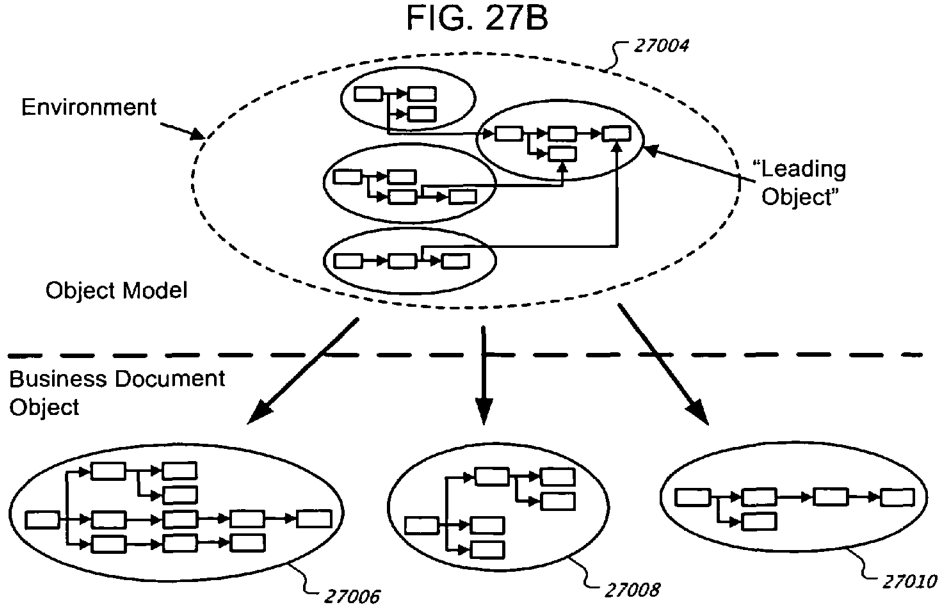

As illustrated in FIG. 27B, several business document objects 27006, 27008, and 27010 as overlapping views may be derived for a given leading object 27004. Each business document object results from the object model by hierarchization.

Figure 27C:
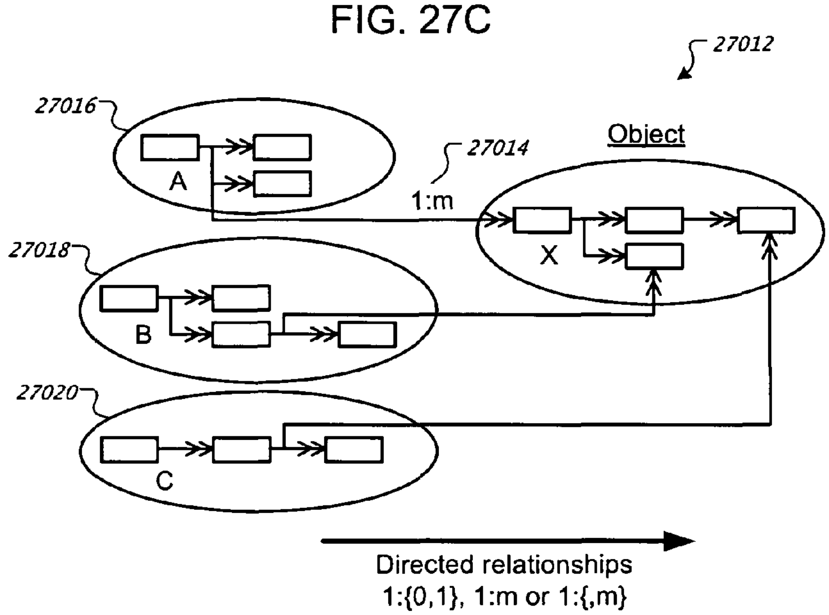

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
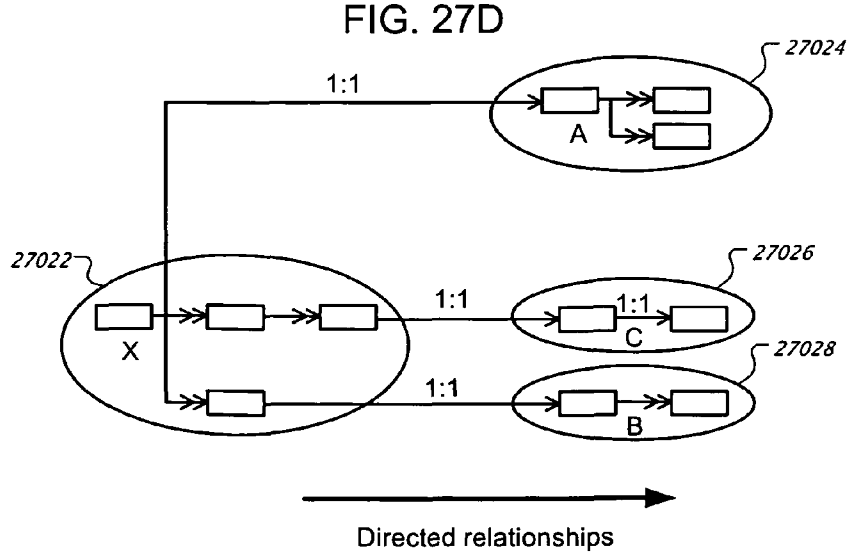

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

Figure 27E:
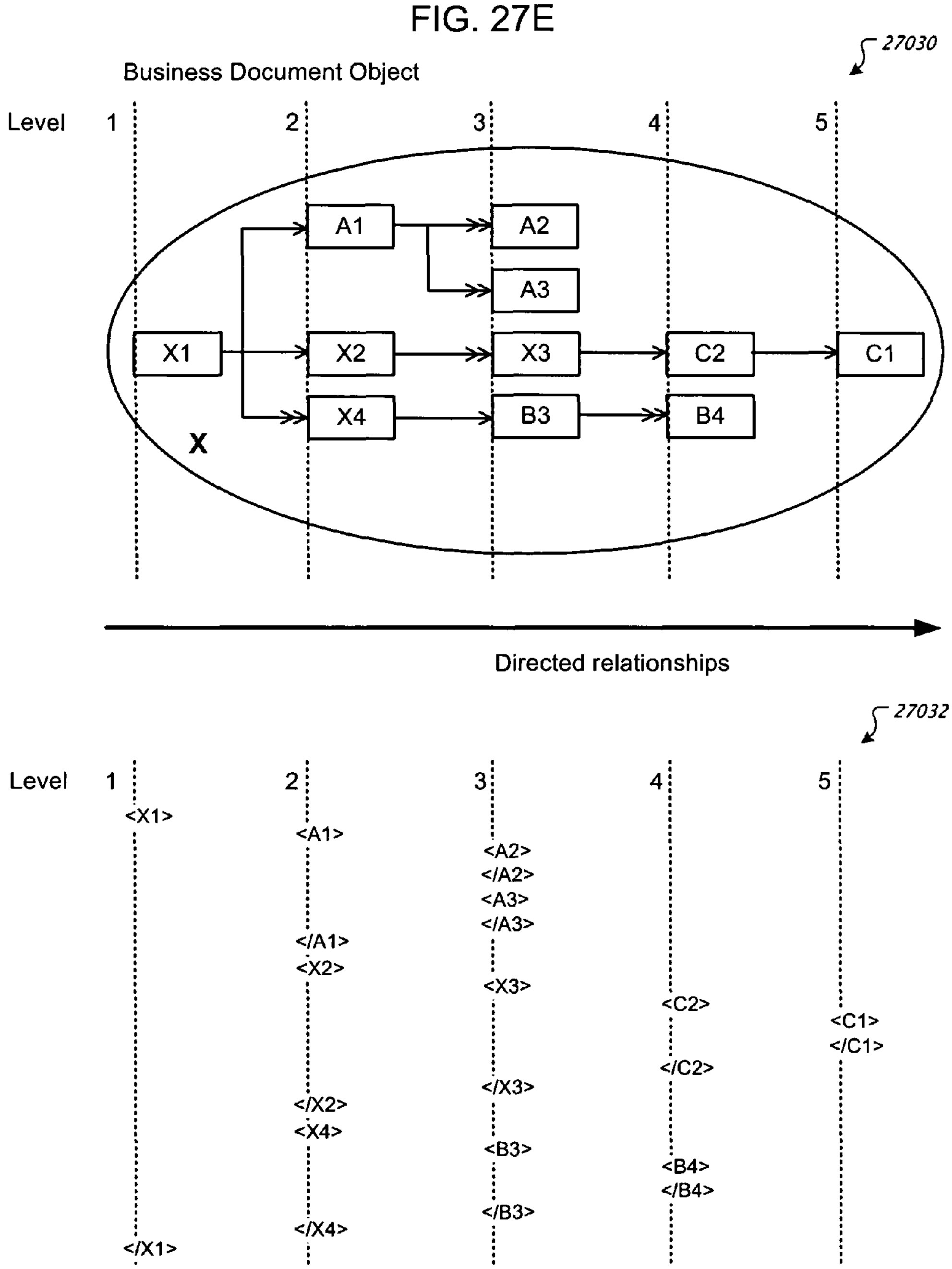

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process:

- A business document object always refers to a leading business document object and is derived from this object.
- The name of the root entity in the business document entity is the name of the business object or the name of a specialization of the business object or the name of a service specific view onto the business object.
- The nodes and elements of the business object that are relevant (according to the semantics of the associated message type) are contained as entities and elements in the business document object.
- The name of a business document entity is predefined by the name of the corresponding business object node. The name of the superordinate entity is not repeated in the name of the business document entity. The "full" semantic name results from the concatenation of the entity names along the hierarchical structure of the business document object.
- The structure of the business document object is, except for deviations due to hierarchization, the same as the structure of the business object.
- The cardinalities of the business document object nodes and elements are adopted identically or more restrictively to the business document object.
- An object from which the leading business object is dependent can be adopted to the business document object. For this arrangement, the relationship is inverted, and the object (or its parts, respectively) are hierarchically subordinated in the business document object.
- Nodes in the business object representing generalized business information can be adopted as explicit entities to the business document object (generally speaking, multiply TypeCodes out). When this adoption occurs, the entities are named according to their more specific semantic (name of TypeCode becomes prefix).
  - Party nodes of the business object are modeled as explicit entities for each party role in the business document object. These nodes are given the name <Prefix><Party Role>Party, for example, BuyerParty, ItemBuyerParty.
  - BTDReference nodes are modeled as separate entities for each reference type in the business document object. These nodes are given the name <Qualifier><BO><Node>Reference, for example SalesOrderReference, OriginSalesOrderReference, SalesOrderItemReference.
  - A product node in the business object comprises all of the information on the Product, ProductCategory, and Batch. This information is modeled in the business document object as explicit entities for Product, ProductCategory, and Batch.
- Entities which are connected by a 1:1 relationship as a result of hierarchization can be combined to a single entity, if they are semantically equivalent. Such a combination can often occurs if a node in the business document object that results from an assignment node is removed because it does not have any elements.

The message type structure is typed with data types.

Elements are typed by GDTs according to their business objects.

Aggregated levels are typed with message type specific data types (Intermediate Data Types), with their names being built according to the corresponding paths in the message type structure.

The whole message type structured is typed by a message data type with its name being built according to the root entity with the suffix “Message”.

For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status “pending.”

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status “pending.” The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status “pending.” The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
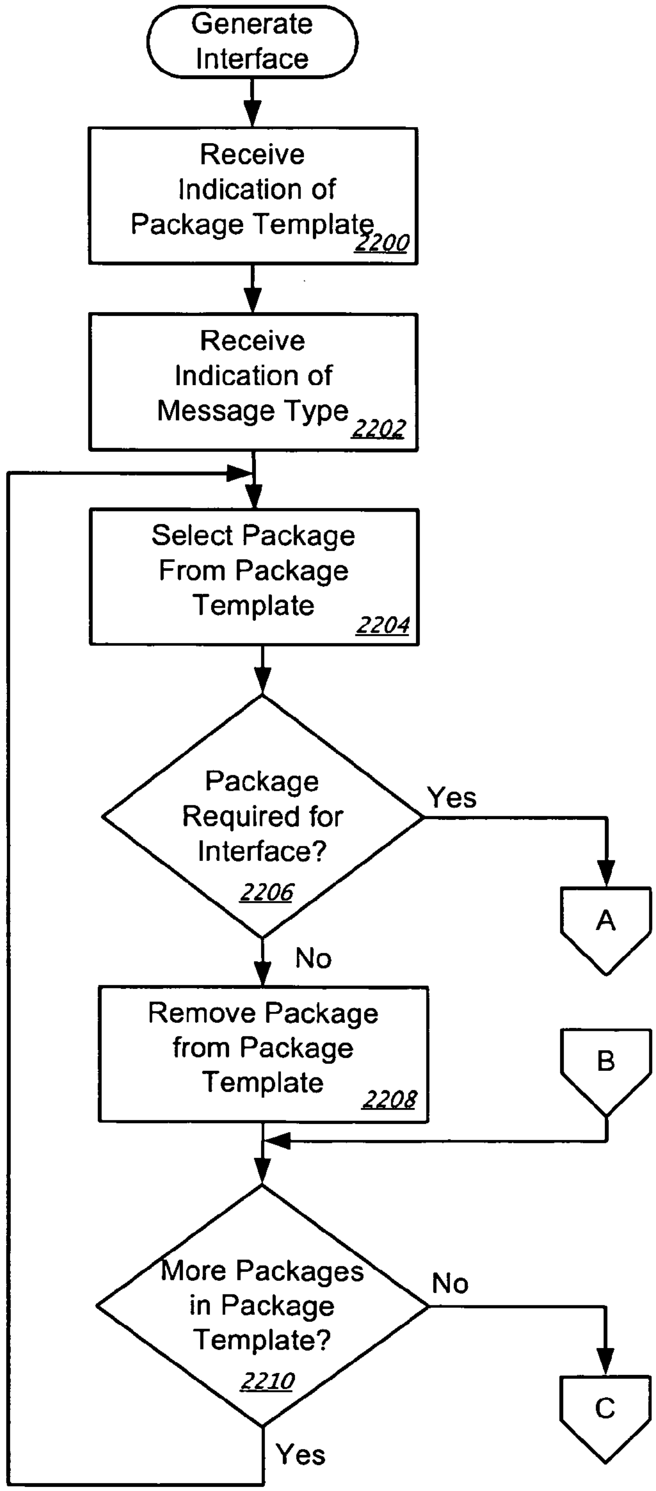
FIGS. 22A-F depict a flow diagram of the steps performed to generate an interface from the business object model in accordance with methods and systems consistent with the subject matter described herein.
Figure 22B:
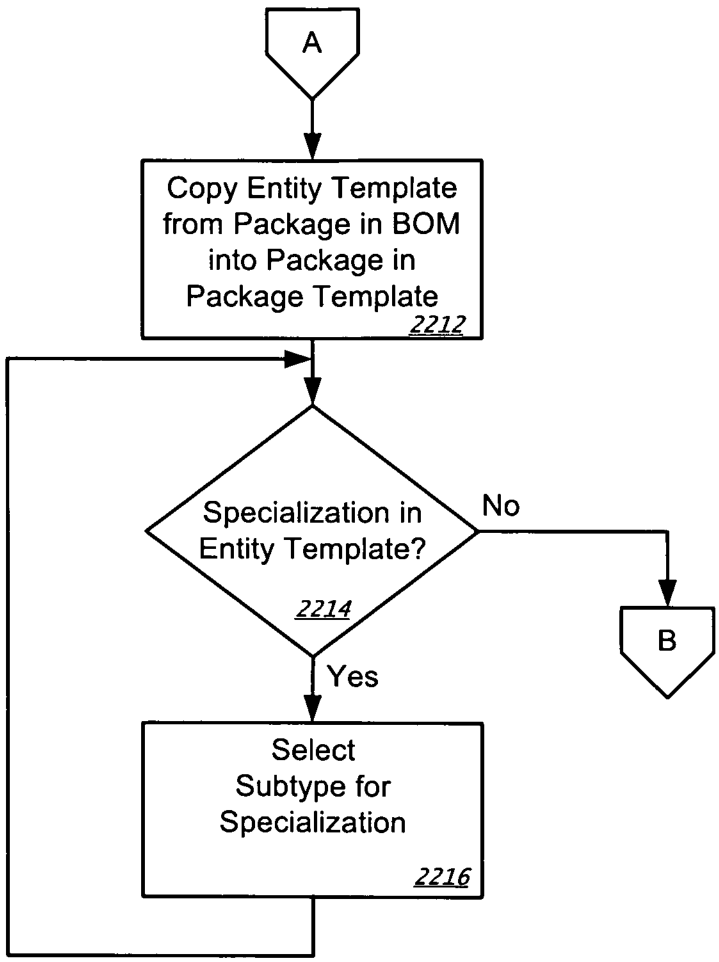
Figure 22C:
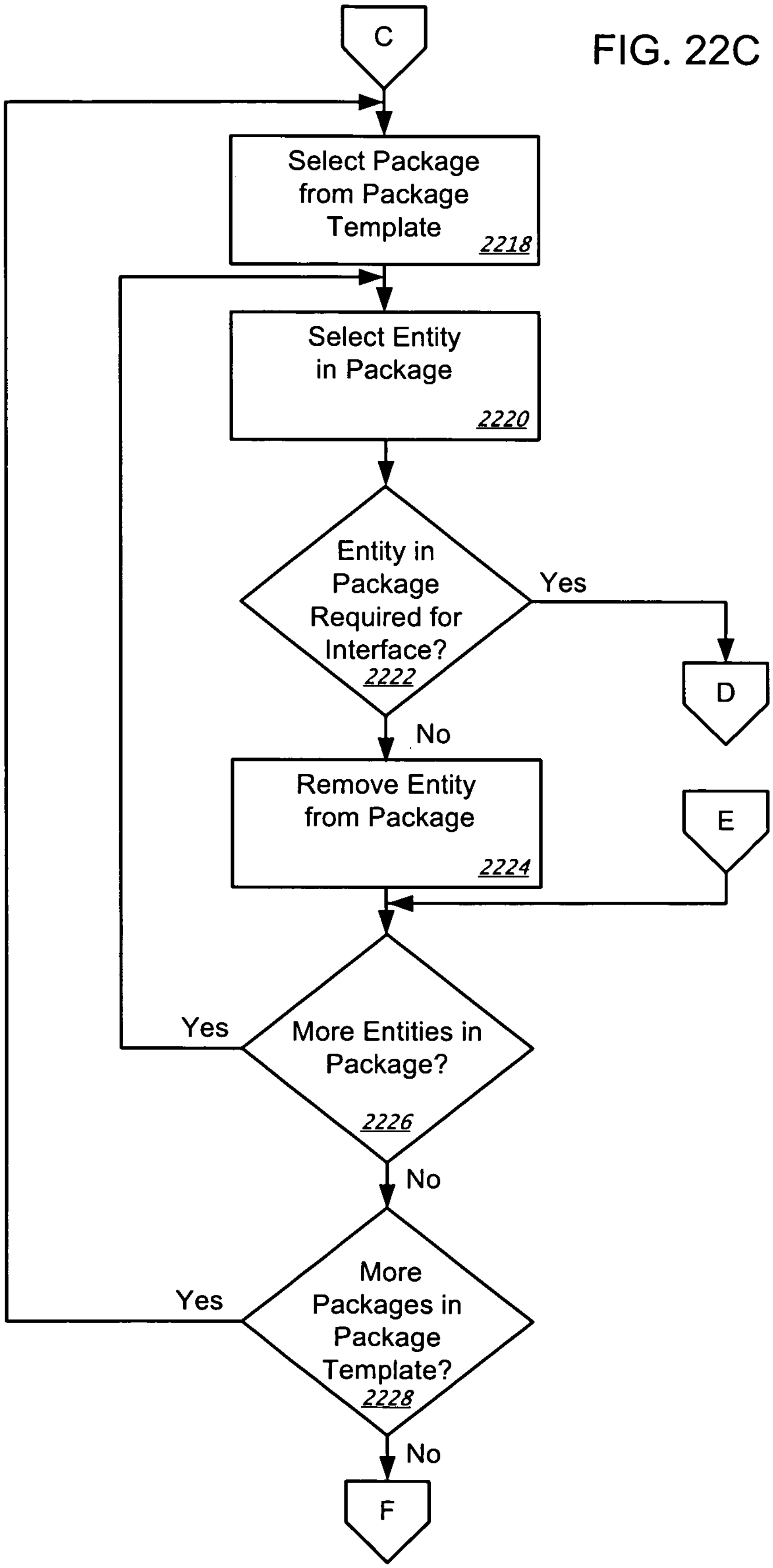

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
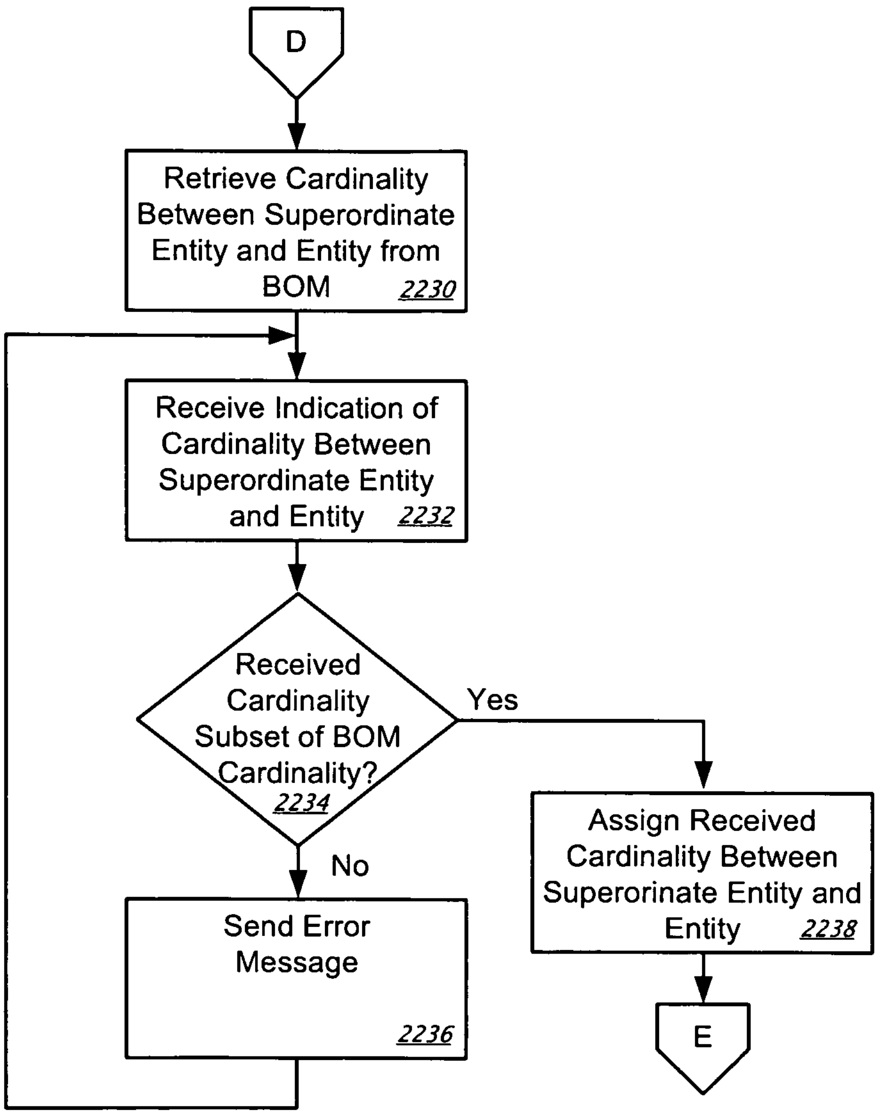

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
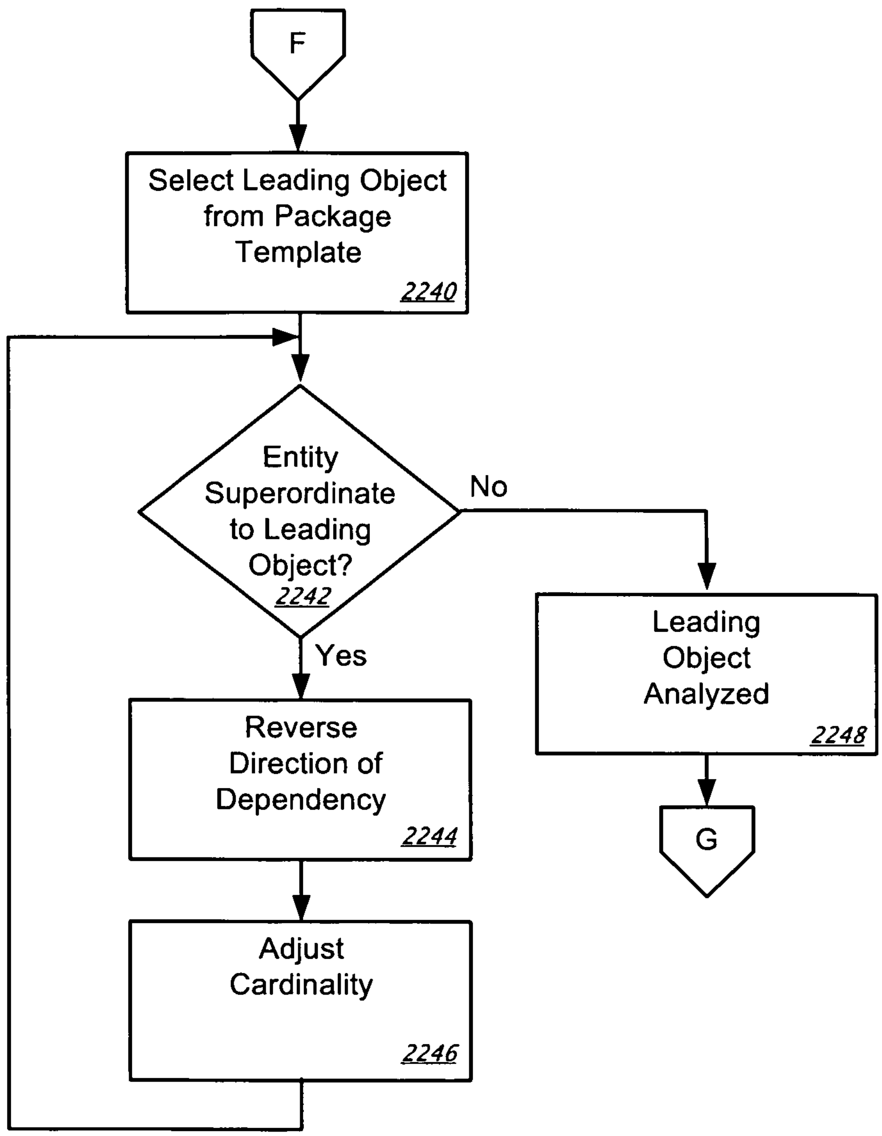

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
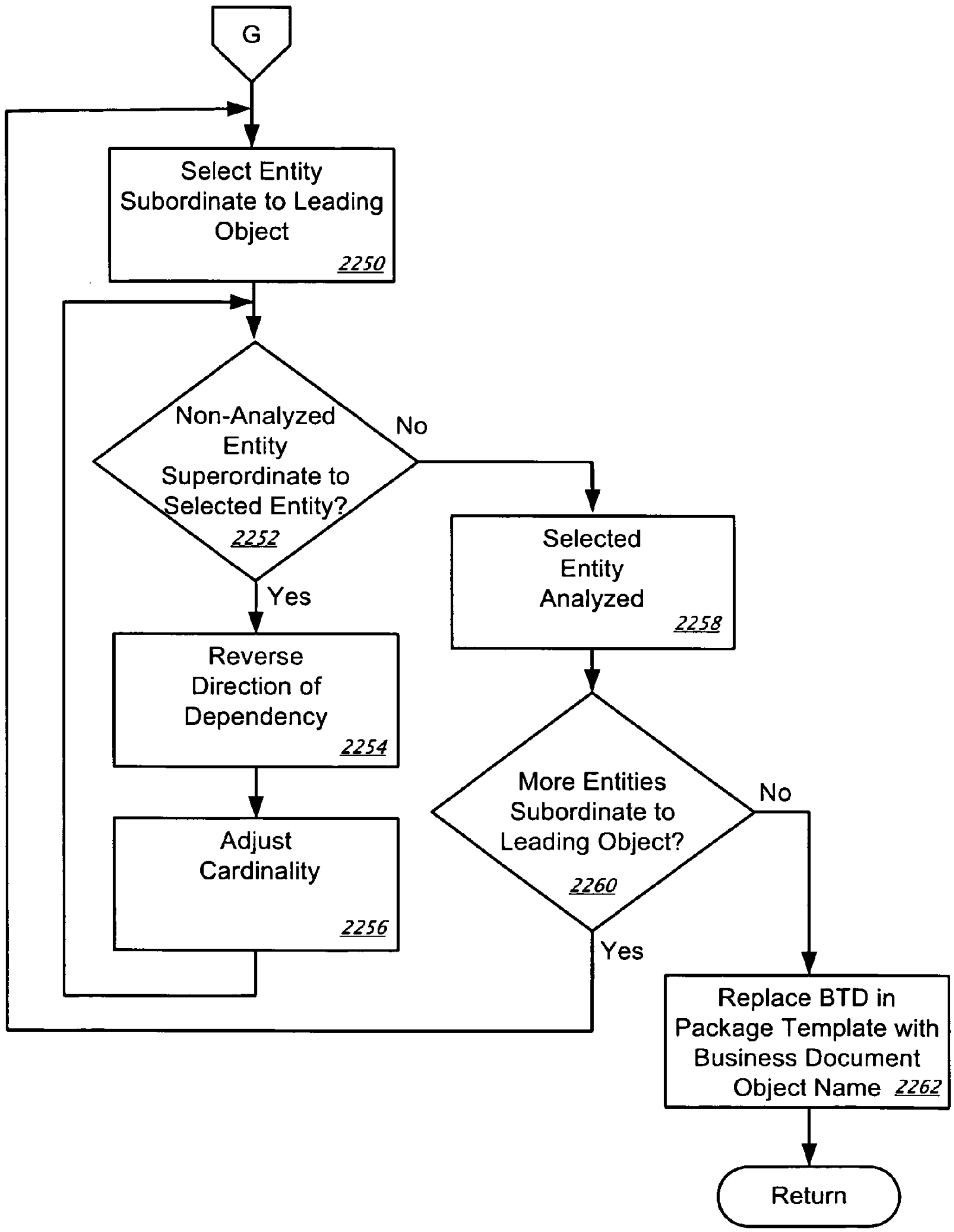

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

Figure 23:
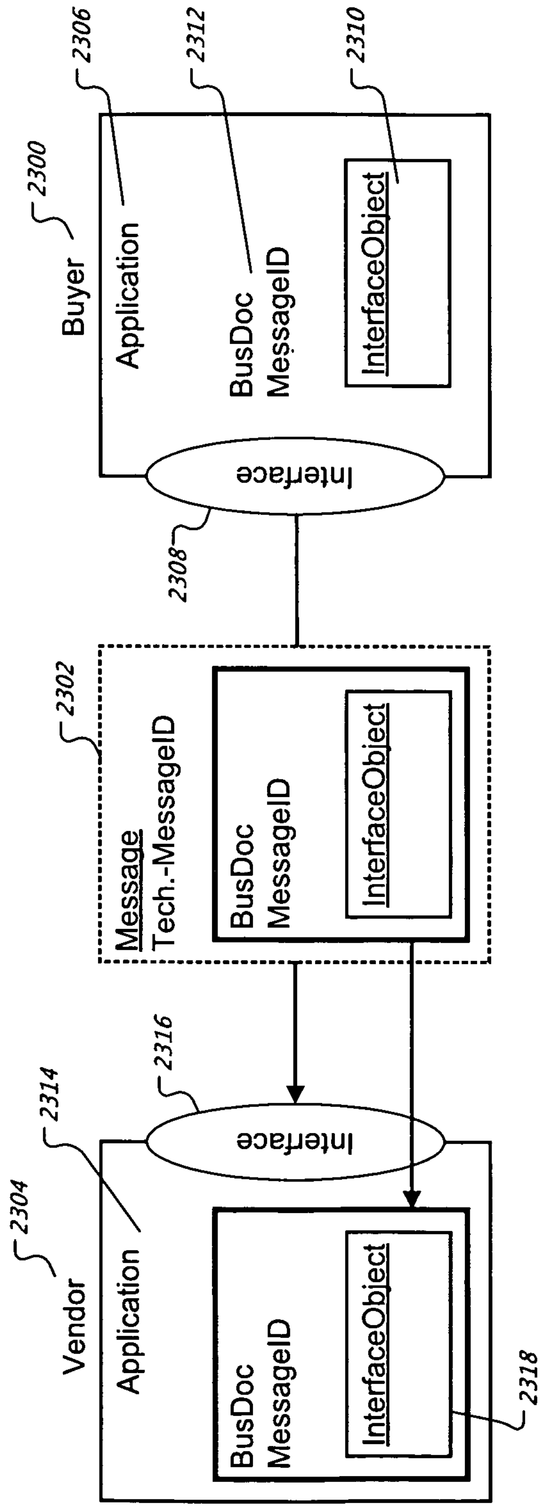
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
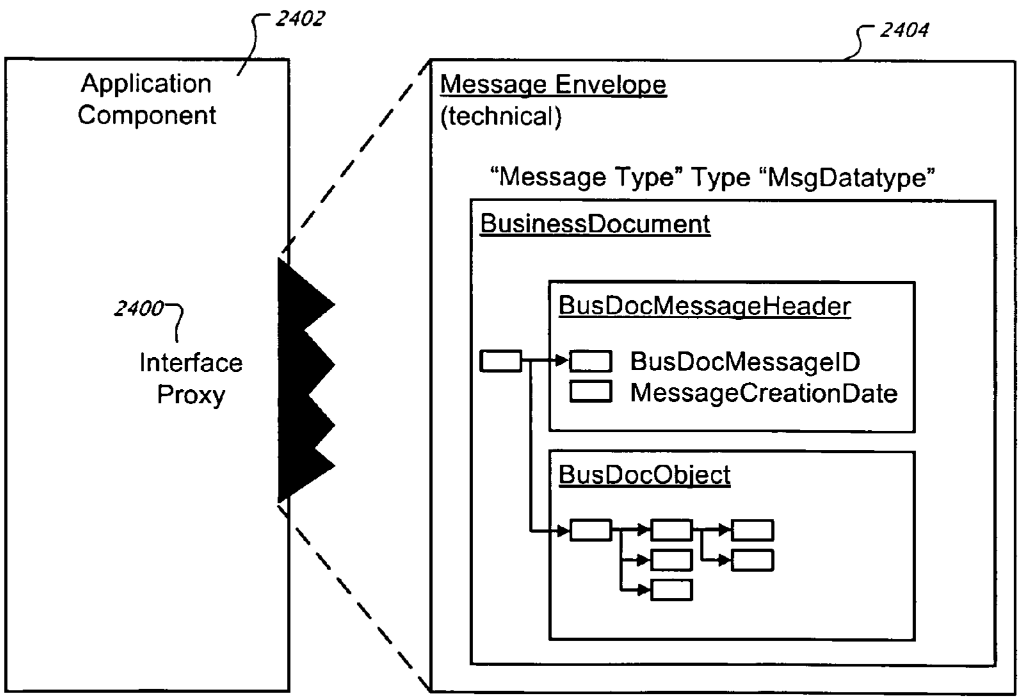
FIG. 24 depicts an interface proxy in accordance with methods and systems consistent with the subject matter described herein.
Figure 25:
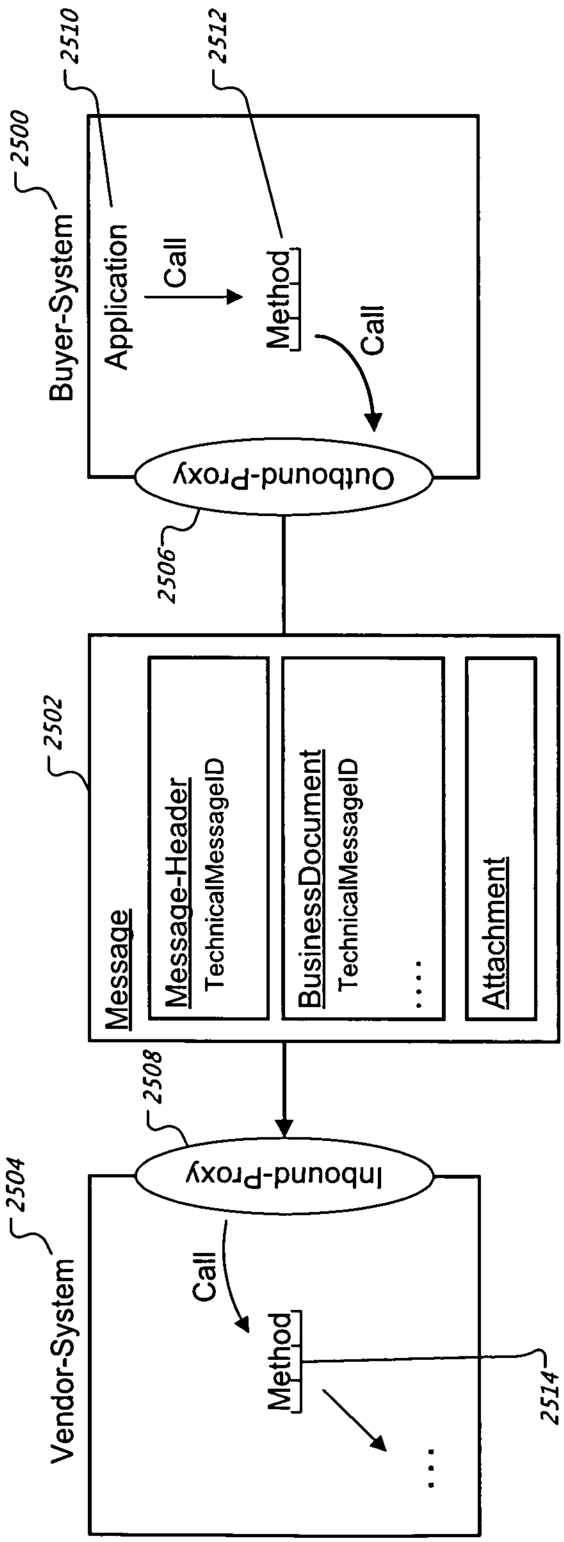
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
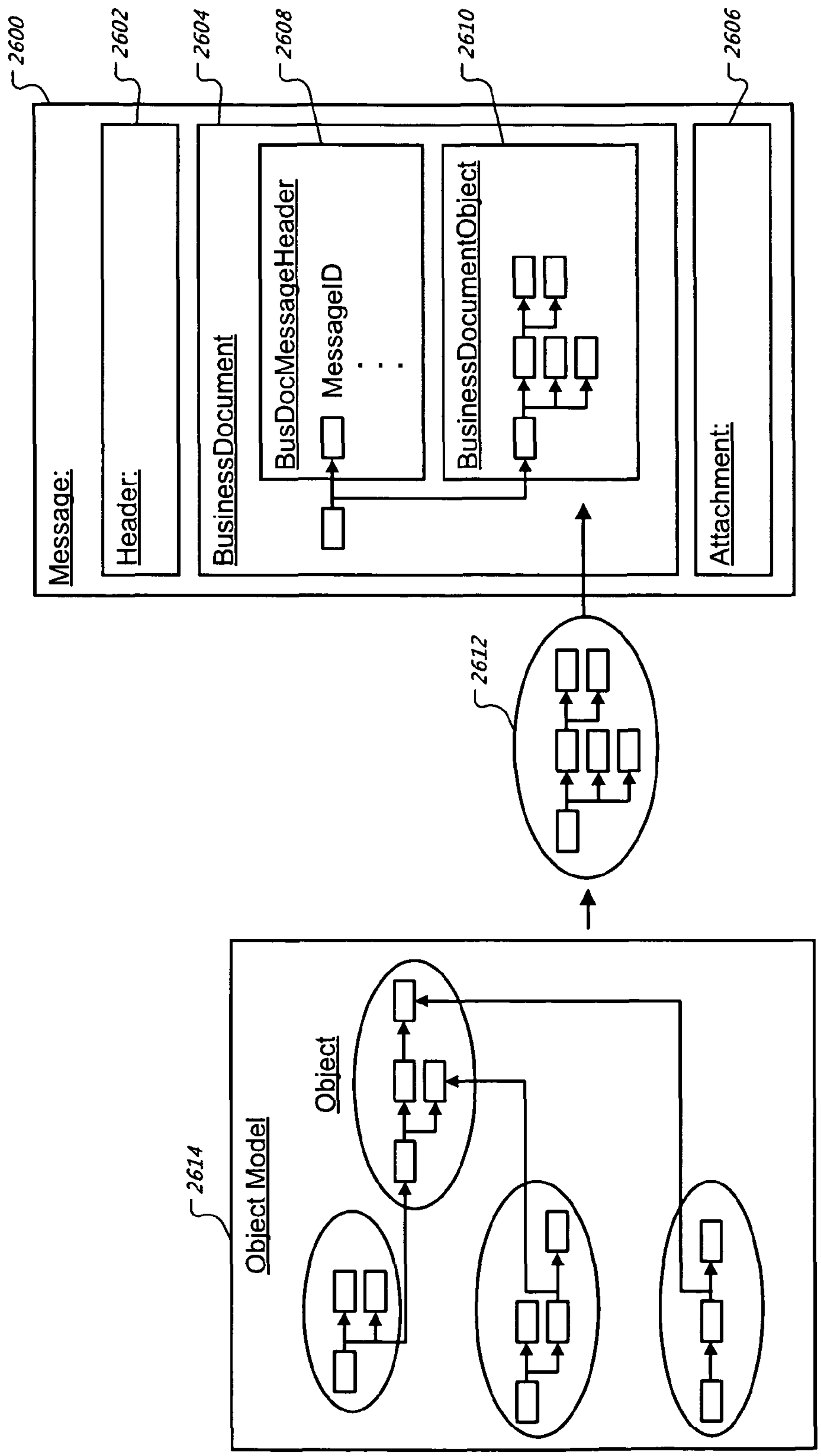
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
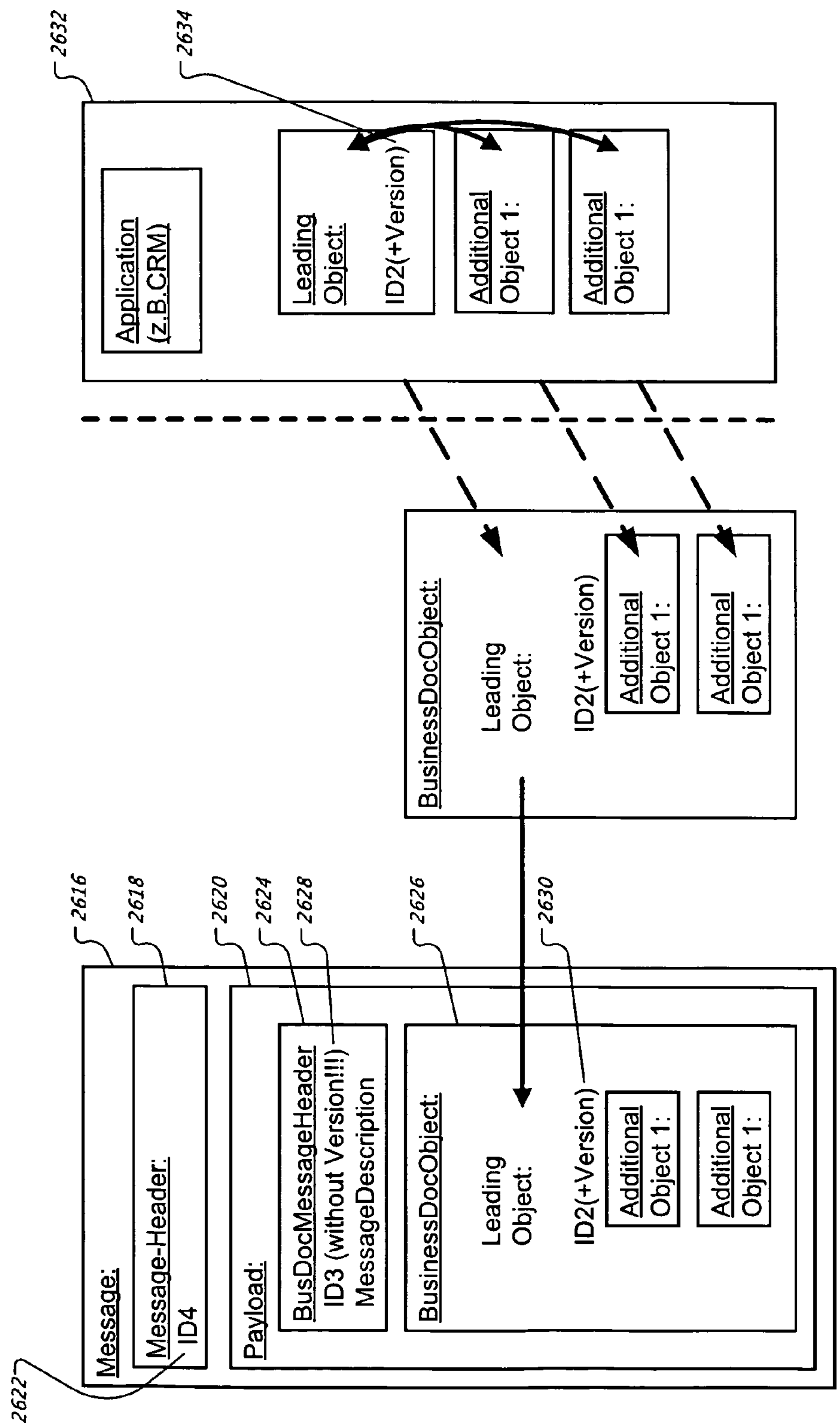
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
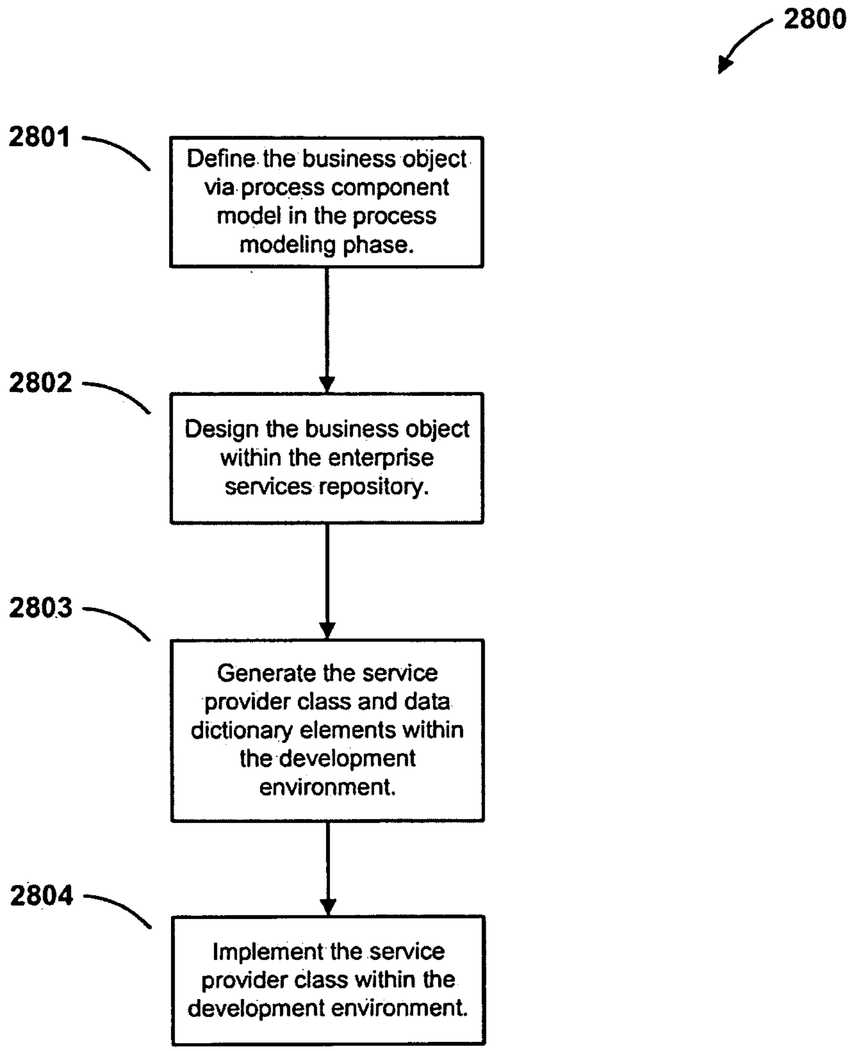
FIG. 28 illustrates an example method for service enabling in accordance with one embodiment of the present disclosure.
Figure 29:
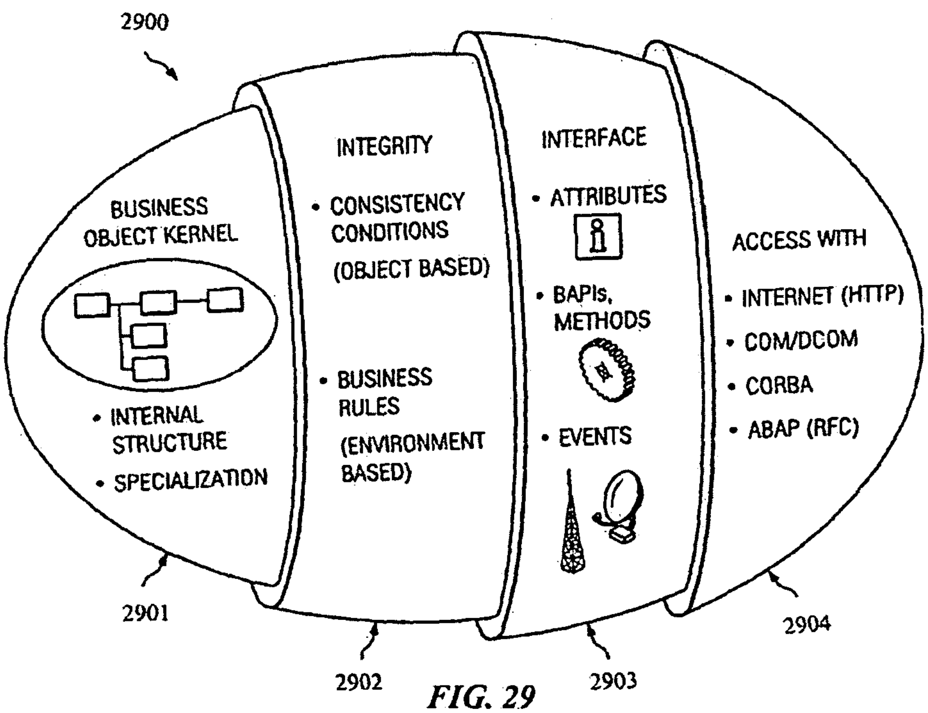
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
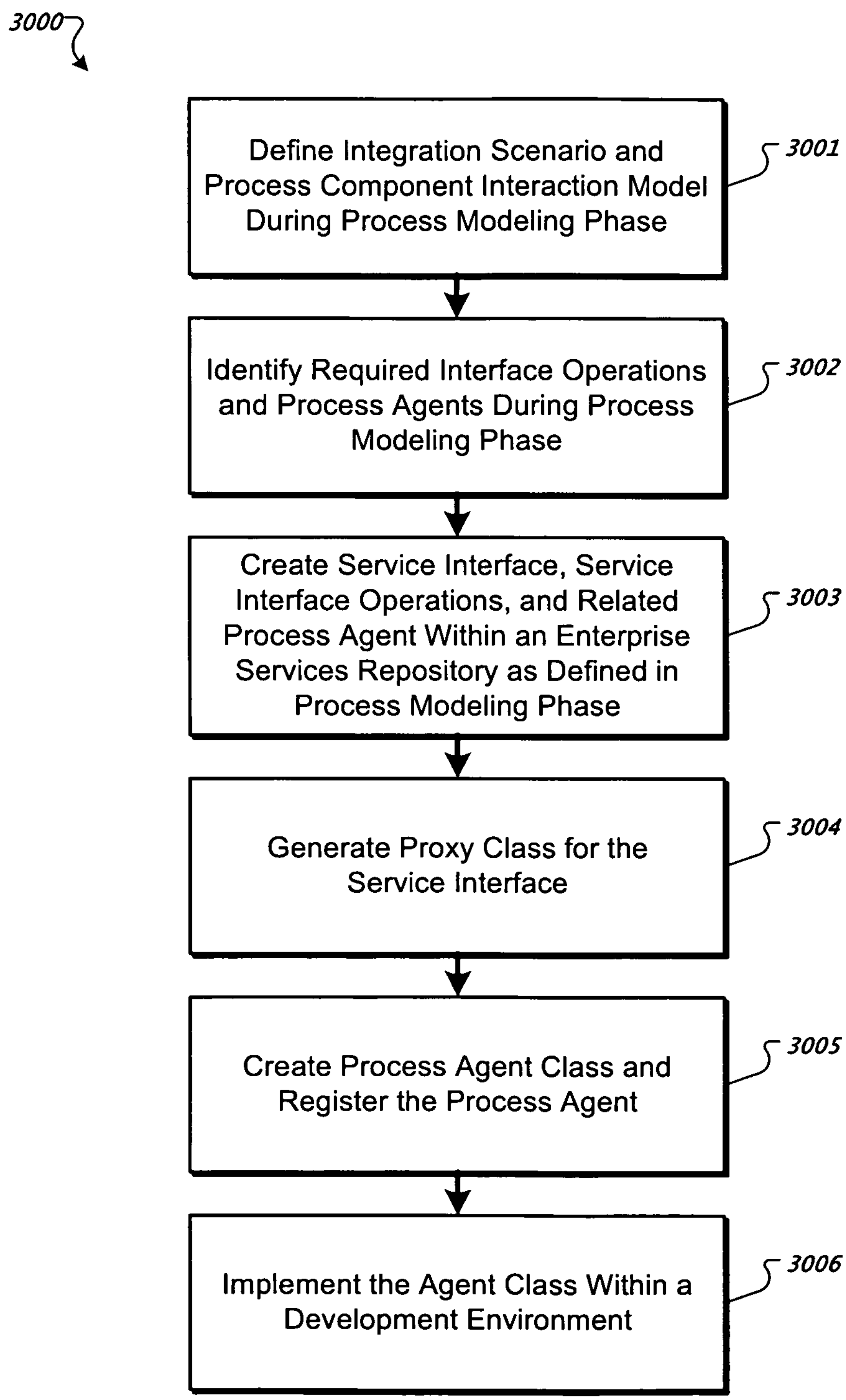
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
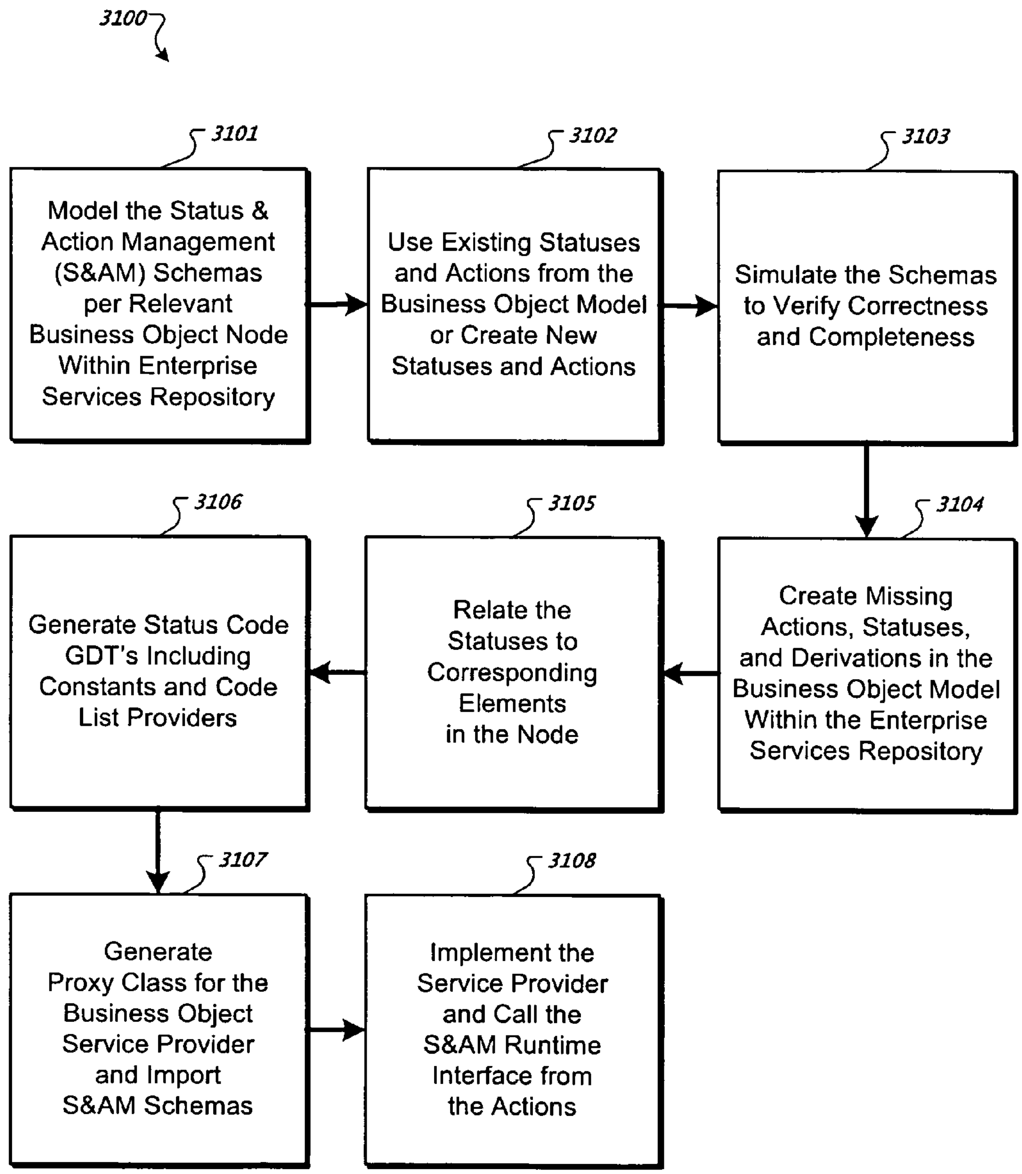
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

FinancialInstrumentPosition-AccountingPeriodTotalAnalyticalResult

The purpose of the Profitability Analysis scenario can be to provide a key figure-based view of the performance of a bank. This includes the following two main aspects: 1) calculation and storage of indirect costs and revenues on the granularity of a single financial instrument; and 2) analysis of the cost and revenue information in reporting. In some implementations, the Profitability Analysis scenario is not integrated with the Financial Accounting scenario. As a result, direct costs and revenues from external transactions (between the bank and its customers) can be delivered from an external financial accounting system.

The Financial Instruments Analytical Results Management process component corresponds to the analytical Results Data Layer. It stores the analytical results of the valuation and calculation processes, acts as single source of truth for multipurpose analytical results, and serves as a starting point for the creation of scenario-specific information, such as specific reports. FinancialInstrumentPosition-AccountingPeriodTotalAnalyticalResultCreateRequest can be a request to Financial Instruments Analytical Results Management to create an instance of FinancialInstrumentPositionAccountingPeriodTotalAnalyticalResult. The structure of the FinancialInstrumentPosition-AccountingPeriodTotalAnalyticalResultCreateRequest message type can be specified by the FinInstrPosAcctgPerTotAnalRsltCrteReqMsg message data type that includes the object FinancialInstrumentPosition-AccountingPeriodTotalAnalyticalResult. FinancialInstrumentPositionAccountingPeriod-TotalAnalyticalResultCreateRequest can be a message that a ledger for financial instruments can use to create an analytical result for an accounting period total.

FinancialInstrumentPosition-AccountingPeriodTotalAnalyticalResultBulkCreateRequest can be a request to Financial Instruments Analytical Results Management to create several instances of FinancialInstrumentPositionAccountingPeriodTotalAnalyticalResult. The structure of the FinancialInstrumentPosition-AccountingPeriodTotalAnalyticalResultBulkCreateRequest message type can be specified by the FinInstrPosAcctgPerTotAnalRsltBulkCrteReqMsg message data type that includes multiple FinancialInstrumentPosition-AccountingPeriodTotalAnalyticalResultCreateRequest messages. FinancialInstrumentPosition-AccountingPeriodTotalAnalyticalResultBulkCreateRequest can be a message that a ledger for financial instruments can use to create several analytical results for an accounting period total.

FinancialInstrumentPosition-AccountingPeriodTotalAnalyticalResultCancelRequest can be a request to Financial Instruments Analytical Results Management to cancel an instance of FinancialInstrumentPositionAccountingPeriodTotalAnalyticalResult. The structure of the FinancialInstrumentPosition-AccountingPeriodTotalAnalyticalResultCancelRequest message type can be specified by the FinInstrPosAcctgPerTotAnalRsltCancReqMsg message data type that includes the object FinancialInstrumentPosition-AccountingPeriodTotalAnalyticalResult. FinancialInstrumentPositionAccountingPeriod-TotalAnalyticalResultCancelRequest can be the message that a ledger for financial instruments can use to cancel an analytical result for an accounting period total.

FinancialInstrumentPosition-AccountingPeriodTotalAnalyticalResultBulkCancelRequest can be a request to the Financial Instruments Analytical Results Management to cancel several instances of FinancialInstrumentPositionAccount-ingPeriodTotalAnalyticalResult. The structure of the FinancialInstrumentPositionAccountingPeriodTotalAnalytical ResultBulkCancelRequest message type can be specified by the FinInstrPosAcctgPerTotAnalRsltBulkCancReqMsg message data type that includes the FinancialInstrumentPositionAccountingPeriodTotalA-nalyticalResultCancelRequest message. FinancialInstrumentPositionAccountingPeriodTotalAnalyticalResultBulk CancelRequest can be a message that a ledger for financial instruments can use to cancel several analytical results for an accounting period total.

In some implementations, in the create and cancel process, the messages can be sent exactly once in order. FinancialInstrumentPositionAccountingPeriodTotalAnalyticalResult messages can be implemented by a message interface on the Financial Instruments Analytical Results Management side. FinancialInstrumentsAnalyti-calResultsManagementFinancia-lInstrPosAccountingPeriodTotalAnalyticalResultIn includes the operations CreateResults and CancelResults.

Figures 1, 32:
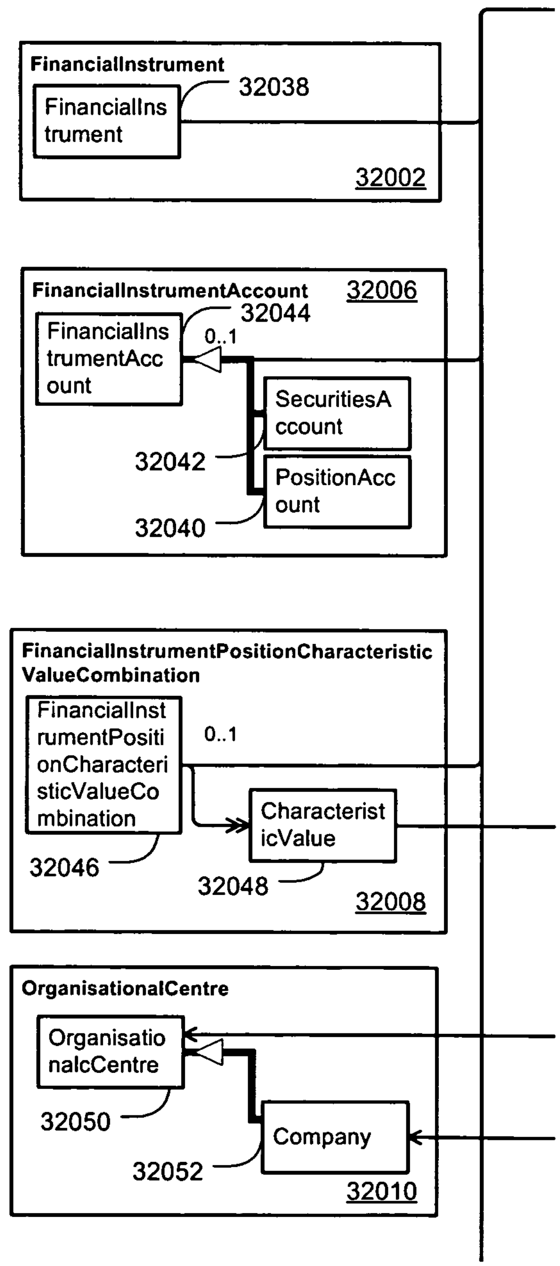
Figures 2, 32:
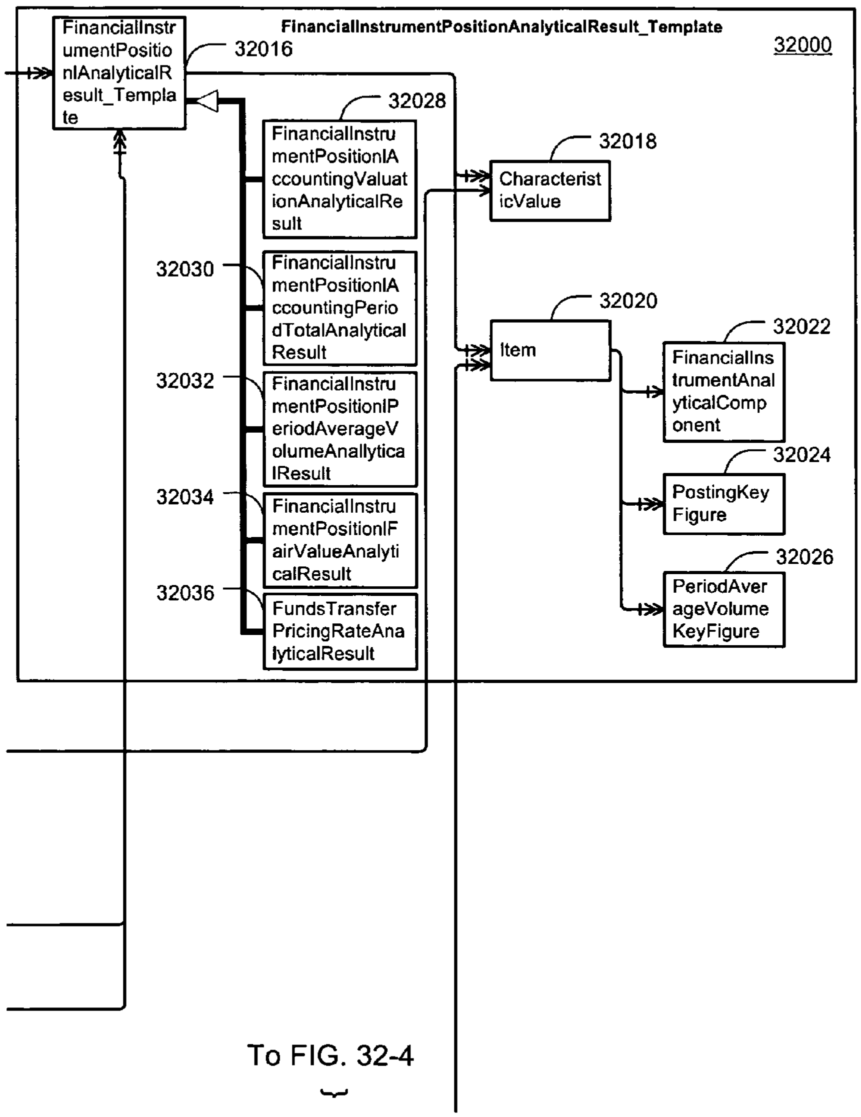

FIGS. 32-1 through 32-4 illustrate an example Financial-InstrumentPositionAnalyticalResult_Template business object model 32000. Specifically, this model depicts interactions among various components of the FinancialInstrument-PositionAnalyticalResult_Template, as well as external components that interact with the FinancialInstrumentPositionAnalyticalResult_Template (shown here as 32002 through 32014 and 32038 through 32056). FinancialInstrumentPositionAnalyticalResult_Template 32000 includes elements 32016 through 32036. FinancialInstrumentPositionAnalyticalResult_Template 32000 includes for example, a FinancialInstrumentPositionAccountingValuationAnalyticalResult 32028.

Figure 33:
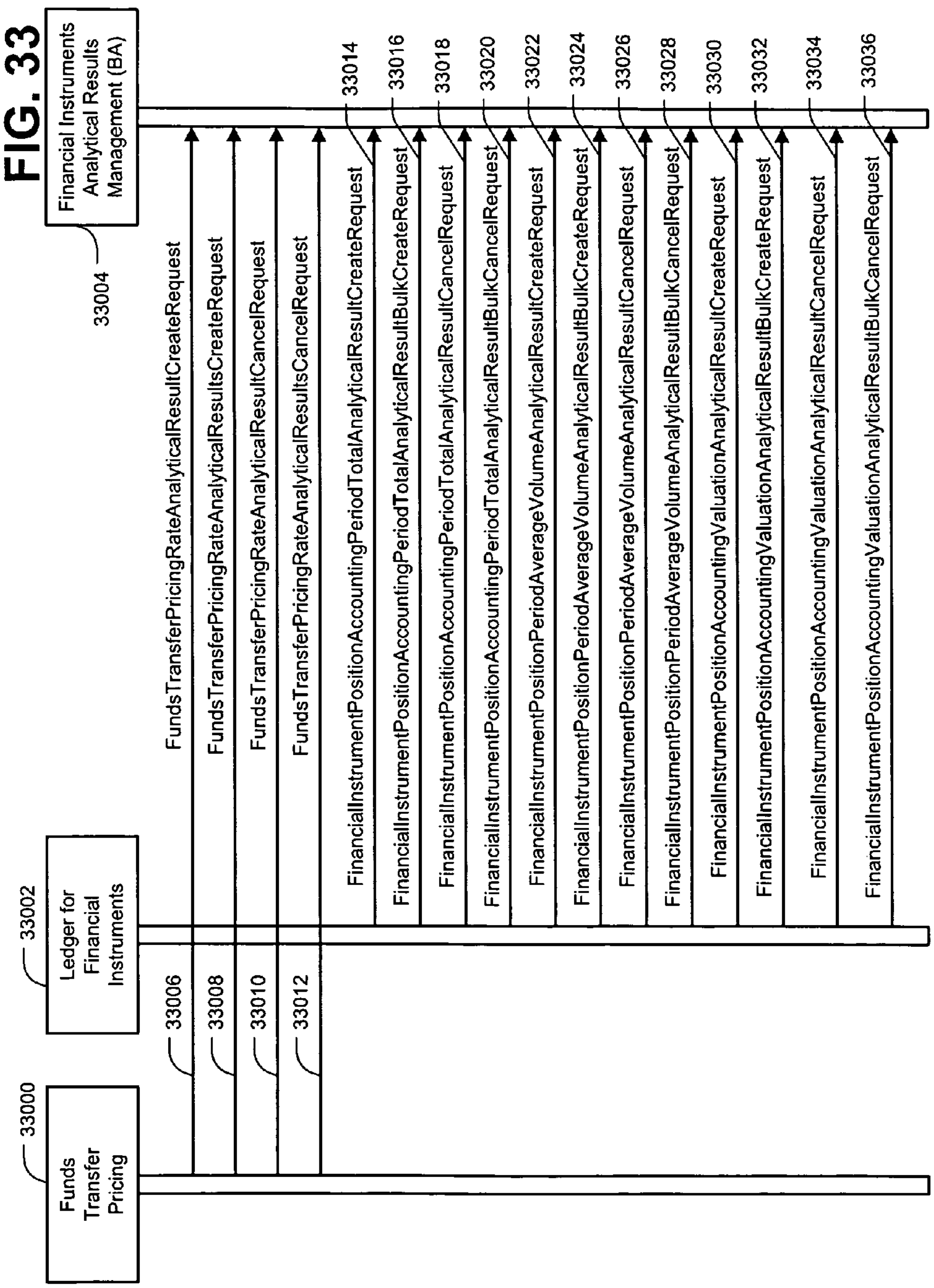
FIG. 33 shows an exemplary FinancialInstrumentPositionAnalyticalResult_Template Message Choreography.

The message choreography of FIG. 33 describes a possible logical sequence of messages that can be used to realize a Profitability Analysis business scenario. A "Funds Transfer Pricing" system 33000 can request the creation of a funds transfer pricing rate analytical result from a "Financial Instruments Analytical Results Management (BA)" system 33004, using a FundsTransferPricingRateAnalyticalResultCreateRequest message 33006 as shown, for example, in FIG. 33.

The "Funds Transfer Pricing" system 33000 can request the creation of funds transfer pricing rate analytical results from the "Financial Instruments Analytical Results Management (BA)" system 33004, using a FundsTransferPricingRateAnalyticalResultsCreateRequest message 33008 as shown, for example, in FIG. 33. The "Funds Transfer Pricing" system 33000 can request the cancellation of the funds transfer pricing rate analytical result from the "Financial Instruments Analytical Results Management (BA)" system 33004, using a FundsTransferPricingRateAnalyticalResultCancelRequest message 33010 as shown, for example, in FIG. 33. The "Funds Transfer Pricing" system 33000 can request the cancellation of funds transfer pricing rate analytical results from the "Financial Instruments Analytical Results Management (BA)" system 33004, using a FundsTransferPricingRateAnalyticalResultsCancelRequest message 33012 as shown, for example, in FIG. 33.

A "Ledger for Financial Instruments" system 33002 can request the creation of a financial instrument position accounting period total analytical result from the "Financial Instruments Analytical Results Management (BA)" system 33004, using a FinancialInstrumentPositionAccountingPeriodTotalAnalyticalResultCreateRequest message 33014 as shown, for example, in FIG. 33. The "Ledger for Financial Instruments" system 33002 can request the creation of financial instrument position accounting period total analytical results from the "Financial Instruments Analytical Results Management (BA)" system 33004, using a FinancialInstrumentPositionAccountingPeriodTotalAnalyticalResultBulkCreateRequest message 33016 as shown, for example, in FIG. 33. The "Ledger for Financial Instruments" system 33002 can request the cancellation of the financial instrument position accounting period total analytical result from the "Financial Instruments Analytical Results Management (BA)" system 33004, using a FinancialInstrumentPositionAccountingPeriodTotalAnalyticalResultCancelRequest message 33018 as shown, for example, in FIG. 33.

The "Ledger for Financial Instruments" system 33002 can request the cancellation of financial instrument position accounting period total analytical results from the "Financial Instruments Analytical Results Management (BA)" system 33004, using a FinancialInstrumentPositionAccountingPeriodTotalAnalyticalResultBulkCancelRequest message 33020 as shown, for example, in FIG. 33. The "Ledger for Financial Instruments" system 33002 can request the creation of a financial instrument position period average volume analytical result from the "Financial Instruments Analytical Results Management (BA)" system 33004, using a FinancialInstrumentPositionPeriodAverageVolumeAnalyticalResultCreateRequest message 33022 as shown, for example, in FIG. 33. The "Ledger for Financial Instruments" system 33002 can request the creation of financial instrument position period average volume analytical result from the "Financial Instruments Analytical Results Management (BA)" system 33004, using a FinancialInstrumentPositionPeriodAverageVolumeAnalyticalResultCreateRequest message 33024 as shown, for example, in FIG. 33.

The "Ledger for Financial Instruments" system 33002 can request the cancellation of the financial instrument position period average volume analytical result from the "Financial Instruments Analytical Results Management (BA)" system 33004, using a FinancialInstrumentPositionPeriodAverageVolumeAnalyticalResultCancelRequest message 33026 as shown, for example, in FIG. 33. The "Ledger for Financial Instruments" system 33002 can request the cancellation of financial instrument position period average volume analytical results from the "Financial Instruments Analytical Results Management (BA)" system 33004, using a FinancialInstrumentPositionPeriodAverageVolumeAnalyticalResultBulkCancelRequest message 33028 as shown, for example, in FIG. 33. The "Ledger for Financial Instruments" system 33002 can request the creation of a financial instrument position accounting valuation analytical result from the "Financial Instruments Analytical Results Management (BA)" system 33004, using a FinancialInstrumentPositionAccountingValuationAnalyticalResultCreateRequest message 33030 as shown, for example, in FIG. 33.

The "Ledger for Financial Instruments" system 33002 can request the creation of financial instrument position accounting valuation analytical results from the "Financial Instruments Analytical Results Management (BA)" system 33004, using a FinancialInstrumentPositionAccountingValuationAnalyticalResultBulkCreateRequest message 33032 as shown, for example, in FIG. 33. The "Ledger for Financial Instruments" system 33002 can request the cancellation of the financial instrument position accounting valuation analytical result from the "Financial Instruments Analytical Results Management (BA)" system 33004, using a FinancialInstrumentPositionAccountingValuationAnalyticalResultCancelRequest message 33034 as shown, for example, in FIG. 33. The "Ledger for Financial Instruments" system 33002 can request the cancellation of financial instrument position accounting valuation analytical results from the "Financial Instruments Analytical Results Management (BA)" system 33004, using a FinancialInstrumentPositionAccountingValuationAnalyticalResultBulkCancelRequest message 33036 as shown, for example, in FIG. 33.

Figure 34:
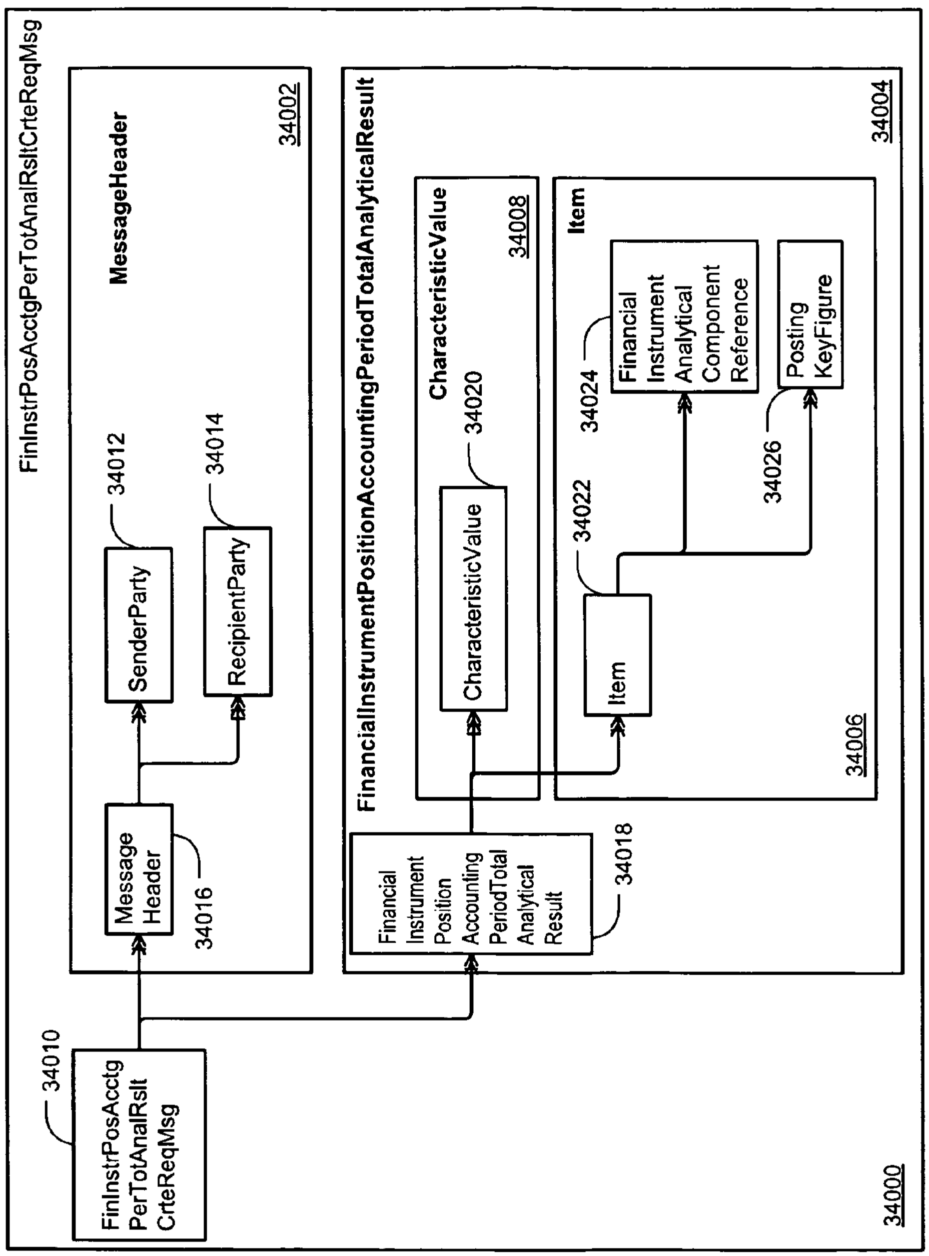
FIG. 34 shows an exemplary FinInstrPosAcctgPerTotAnalRsltCrteReqMsg Message Data Type.

FIG. 34 illustrates one example logical configuration of FinInstrPosAcctgPerTotAnalRsltCrteReqMsg message 34000. Specifically, this figure depicts the arrangement and hierarchy of various components such as one or more levels of packages, entities, and datatypes, shown here as 34002 through 34026. As described above, packages may be used to represent hierarchy levels. Entities are discrete business elements that are used during a business transaction. Data types are used to type object entities and interfaces with a structure. For example, FinInstrPosAcctgPerTotAnalRsltCrteReqMsg message 34000 includes, among other things, MessageHeader 34016. Accordingly, heterogeneous applications may communicate using this consistent message configured as such.

Figure 35:
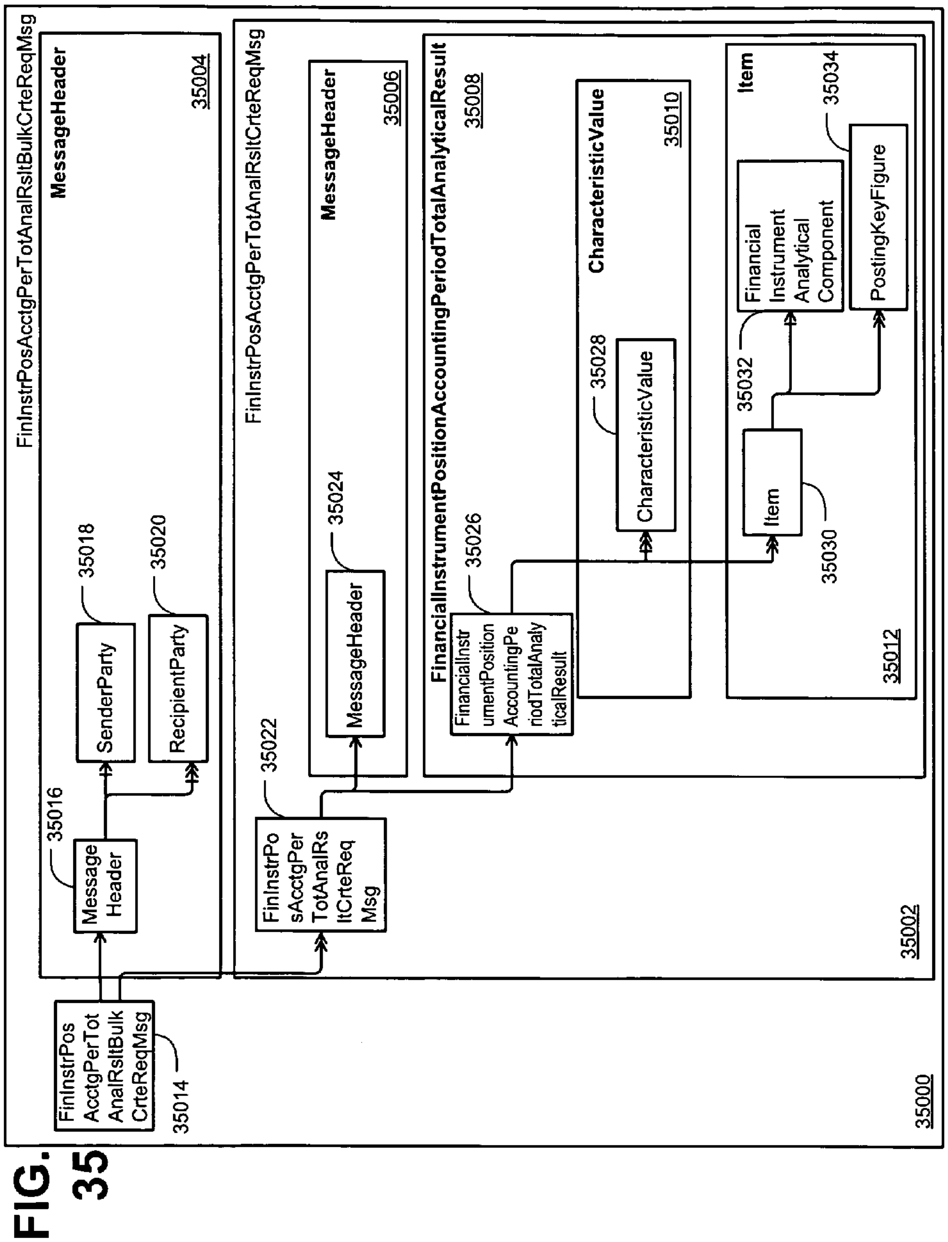
FIG. 35 shows an exemplary FinInstrPosAcctgPerTotAnalRsltBulkCrteReqMsg Message Data Type.

Additionally, FIG. 35 illustrates one example logical configuration of FinInstrPosAcctgPerTotAnalRsltBulkCrteReqMsg message 35000. Specifically, this figure depicts the arrangement and hierarchy of various components such as one or more levels of packages, entities, and datatypes, shown here as 35002 through 35034. As described above, packages may be used to represent hierarchy levels. Entities are discrete business elements that are used during a business transaction. Data types are used to type object entities and interfaces with a structure. For example, FinInstrPosAcctgPerTotAnalRsltBulkCrteReqMsg message 35000 includes, among other things, MessageHeader 35016. Accordingly, heterogeneous applications may communicate using this consistent message configured as such.

Figure 36:
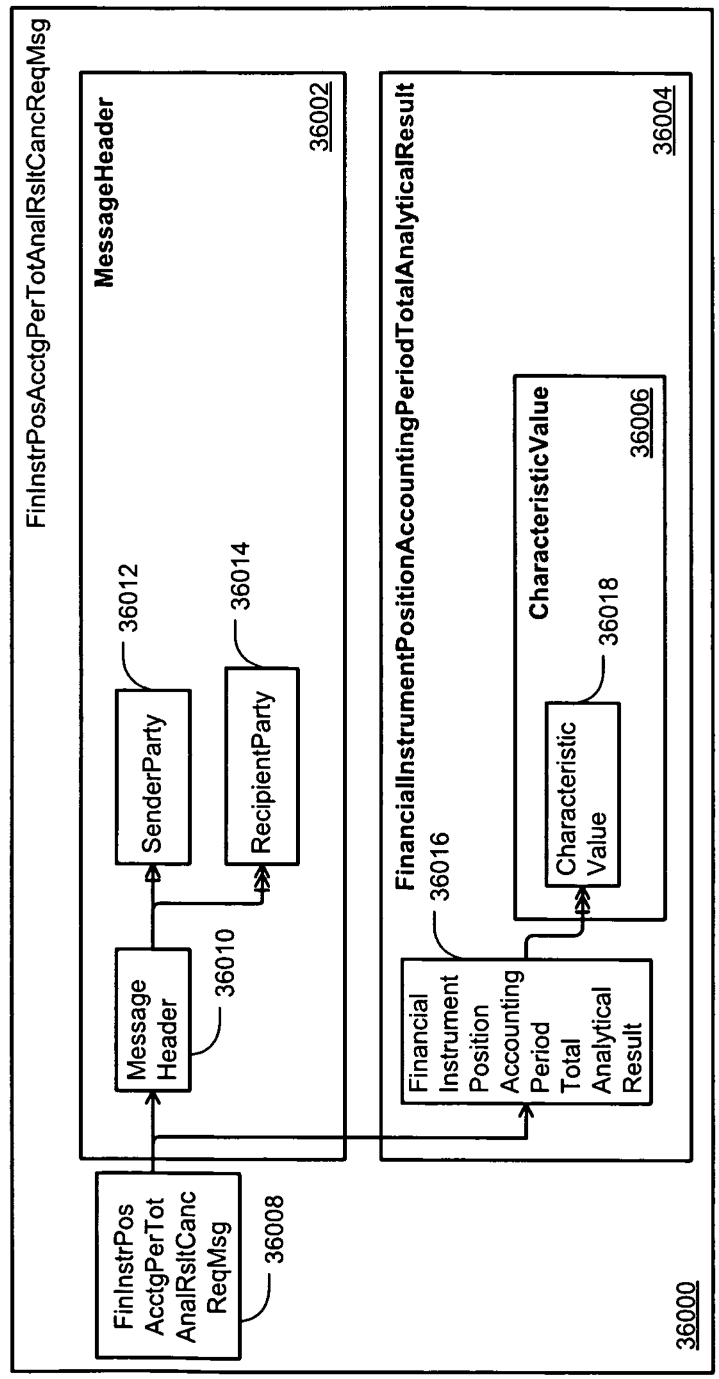
FIG. 36 shows an exemplary FinInstrPosAcctgPerTotAnalRsltCancReqMsg Message Data Type.

Additionally, FIG. 36 illustrates one example logical configuration of FinInstrPosAcctgPerTotAnalRsltCancReqMsg message 36000. Specifically, this figure depicts the arrangement and hierarchy of various components such as one or more levels of packages, entities, and datatypes, shown here as 36002 through 36018. As described above, packages may be used to represent hierarchy levels. Entities are discrete business elements that are used during a business transaction. Data types are used to type object entities and interfaces with a structure. For example, FinInstrPosAcctgPerTotAnalRsltCancReqMsg message 36000 includes, among other things, MessageHeader 36010. Accordingly, heterogeneous applications may communicate using this consistent message configured as such.

Figure 37:
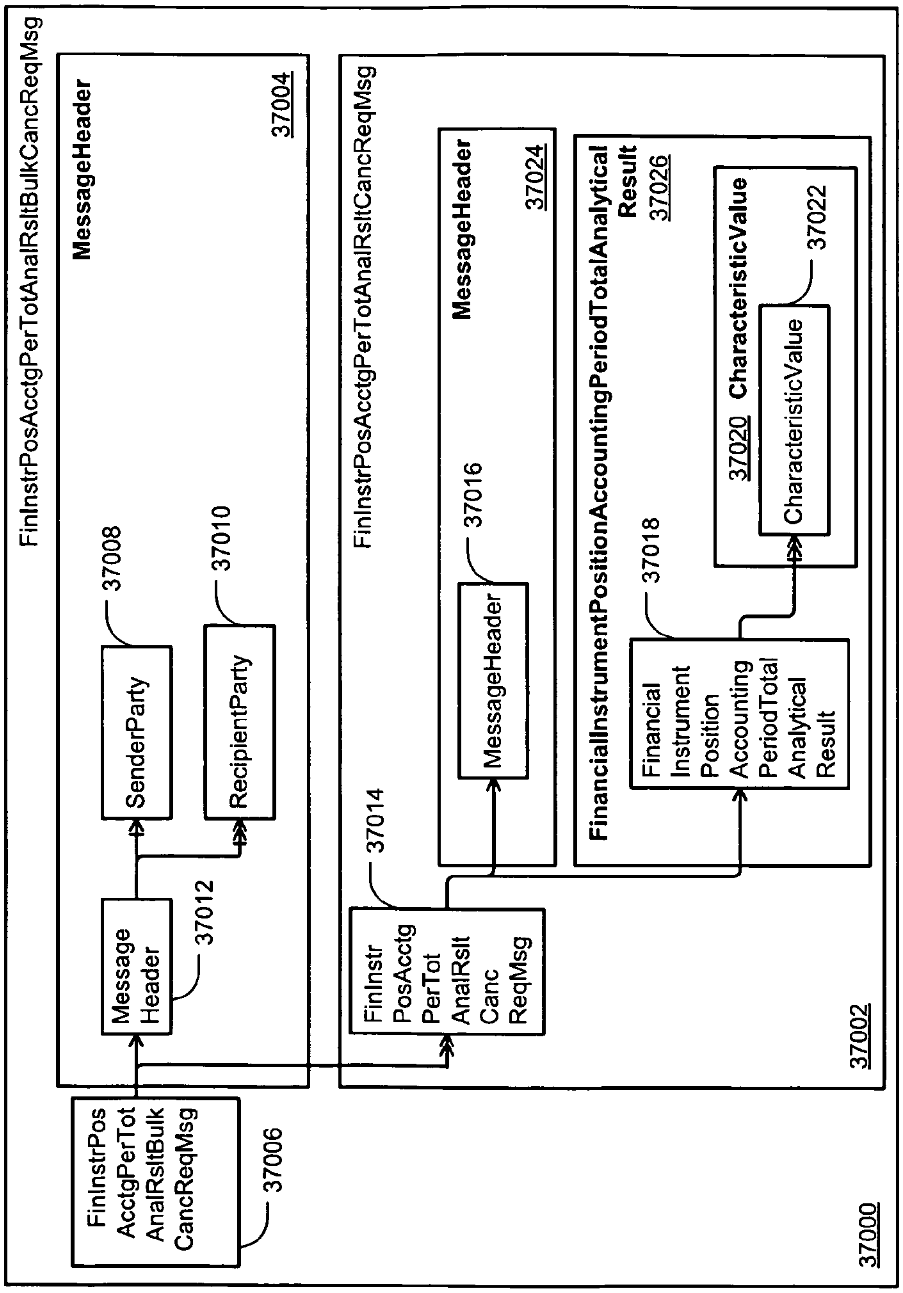
FIG. 37 shows an exemplary FinInstrPosAcctgPerTotAnalRsltBulkCancReqMsg Message Data Type.

Additionally, FIG. 37 illustrates one example logical configuration of FinInstrPosAcctgPerTotAnalRsltBulkCancReqMsg message 37000. Specifically, this figure depicts the arrangement and hierarchy of various components such as one or more levels of packages, entities, and datatypes, shown here as 37002 through 37026. As described above, packages may be used to represent hierarchy levels. Entities are discrete business elements that are used during a business transaction. Data types are used to type object entities and interfaces with a structure. For example, FinInstrPosAcctgPerTotAnalRsltBulkCancReqMsg message 37000 includes, among other things, MessageHeader 37016. Accordingly, heterogeneous applications may communicate using this consistent message configured as such.

FIG. 38 illustrates one example logical configuration of a FinInstrPosAcctgPerTotAnalRsltBulkCancReqMsg 38000 element structure. Specifically, this figure depicts the arrangement and hierarchy of various components such as one or more levels of packages, entities, and datatypes, shown here as 38000 through 38020. As described above, packages may be used to represent hierarchy levels. Entities are discrete business elements that are used during a business transaction. Data types are used to type object entities and interfaces with a structure. For example, the FinInstrPosAcctgPerTotAnalRsltBulkCancReqMsg 38000 includes, among other things, a FinInstrPosAcctgPerTotAnalRsltBulkCancReqMsg 38002. Accordingly, heterogeneous applications may communicate using this consistent message configured as such.

FIG. 39 illustrates one example logical configuration of a FinInstrPosAcctgPerTotAnalRsltBulkCrteReqMsg 39000 element structure. Specifically, this figure depicts the arrangement and hierarchy of various components such as one or more levels of packages, entities, and datatypes, shown here as 39000 through 39020. As described above, packages may be used to represent hierarchy levels. Entities are discrete business elements that are used during a business transaction. Data types are used to type object entities and interfaces with a structure. For example, the FinInstrPosAcctgPerTotAnalRsltBulkCrteReqMsg 39000 includes, among other things, a FinInstrPosAcctgPerTotAnalRsltBulkCrteReqMsg 39002. Accordingly, heterogeneous applications may communicate using this consistent message configured as such.

Figures 3, 32:
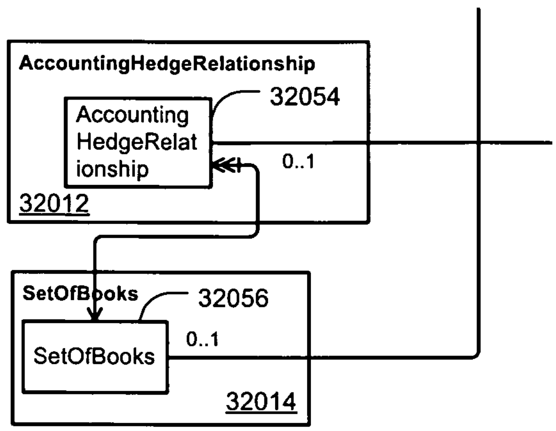

FIGS. 40-1 through 40-3 illustrate one example logical configuration of a FinInstrPosAcctgPerTotAnalRsltCancReqMsg 40000 element structure. Specifically, these figures depict the arrangement and hierarchy of various components such as one or more levels of packages, entities, and datatypes, shown here as 40000 through 40100. As described above, packages may be used to represent hierarchy levels. Entities are discrete business elements that are used during a business transaction. Data types are used to type object entities and interfaces with a structure. For example, the FinInstrPosAcctgPerTotAnalRsltCancReqMsg 40000 includes, among other things, a FinInstrPosAcctgPerTotAnalRsltCancReqMsg 40002. Accordingly, heterogeneous applications may communicate using this consistent message configured as such.

FIGS. 41-1 through 41-5 illustrate one example logical configuration of a FinInstrPosAcctgPerTotAnalRsltCrteReqMsg 41000 element structure. Specifically, these figures depict the arrangement and hierarchy of various components such as one or more levels of packages, entities, and datatypes, shown here as 41000 through 41168. As described above, packages may be used to represent hierarchy levels. Entities are discrete business elements that are used during a business transaction. Data types are used to type object entities and interfaces with a structure. For example, the FinInstrPosAcctgPerTotAnalRsltCrteReqMsg 41000 includes, among other things, a FinInstrPosAcctgPerTotAnalRsltCrteReqMsg 41002. Accordingly, heterogeneous applications may communicate using this consistent message configured as such.

Message Data Type FinInstrPosAcctgPerTotAnalRsltCrteReqMsg

The FinInstrPosAcctgPerTotAnalRsltCrteReqMsg message data type includes the business information that can be relevant for sending an analytical result in a message and the information that can be relevant for creating an instance of FinancialInstrumentPositionAccountingPeriodTotalAnalyticalResult. It includes the MessageHeader and FinancialInstrumentPositionAccountingPeriodTotalAnalyticalResult packages. The FinInstrPosAcctgPerTotAnalRsltCrteReqMsg message data type can provide the structure for the FinancialInstrumentPositionAccountingPeriodTotalAnalyticalResultCreateRequest message type and the service operations that are based on it.

A MessageHeader package can group the business information that is relevant for sending an analytical result in a message. It includes the entity MessageHeader. A MessageHeader can group business information from the perspective of the sending application and can include information to identify the business document in a message, information about the sender, and information about the recipient. The MessageHeader includes SenderParty and RecipientParty. It can be of type GDT BusinessDocumentMessageHeader, whereby the following elements of the GDT are used: ID and CreationDateTime. The ID and the CreationDateTime can be set by the sending application.

A SenderParty can be a party responsible for sending an analytical result at a business application level. The SenderParty can be of type GDT BusinessDocumentMessageHeaderParty. The SenderParty can be filled by the sending application to name a contact person for any problems with the message. SenderParty can be used to transfer the message and can be ignored by the receiving application.

RecipientParty can be a party responsible for receiving an analytical result at a business application level. RecipientParty can be of type GDT BusinessDocumentMessageHeaderParty. RecipientParty can be filled by the sending application to name a contact person for any problems that occur with the message. RecipientParty can be used to transfer the message and can be ignored by the receiving application. A FinancialInstrumentPositionAccountingPeriodTotalAnalyticalResult package can group FinancialInstrumentPosition-AccountingPeriodTotalAnalyticalResult with its packages. It includes the packages CharacteristicValue and Item.

FinancialInstrumentPosition-AccountingPeriodTotalAnalyticalResult can be a result of the calculation of the accounting period total for an individual financial instrument position. An accounting period total can be calculated by aggregating all of the changes of a specific posting key figure within an accounting period. Accounting period totals can describe the contribution of a financial instrument position to the different items of the balance sheet and the profit and loss statement for a specific accounting period. An accounting period total can be used for reporting purposes. It should not be confused with an accounting balance. Accounting balances of a date can be the sum of all contributions from the past up to this date. For example, if a Period 1 produces an interest income of € 5, and a period 2 produces an interest income of € 5, then the total of period 2 is € 5, while the balance is € 10.

FinancialInstrumentPosition-AccountingPeriodTotalAnalyticalResult can be subdivided into CharacteristicValue, which further specifies custom characteristics for the financial instrument position, and Items, which further specify the details of the analytical result, especially the posting key figure. The entity FinancialInstrumentPositionAccountingPeriodTotalAnalyticalResult includes the following elements: GroupID, FinancialInstrumentID, StandardisedFinancialInstrumentAccountID, FinancialInstrumentPosition-CharacteristicValueCombinationID, CompanyID, OrganisationalCentreID, SetOfBooksID, FiscalYearID, AccountingPeriodID, FinancialInstrumentCategoryCode, ValidityEndDate, and CreationDateTime.

A BusinessTransactionDocumentGroupID can uniquely identify a group of business documents that can be considered as one group within a business process. It can refer to a group of analytical results for which an analytical result was calculated. BusinessTransactionDocumentGroupID can be used in messages that cancel by reference and can be based on GDT: BusinessTransactionDocumentGroupID. A BusinessTransactionDocumentID can be a unique identifier for a business transaction document. It can refer to a financial instrument for which an analytical result was calculated and can be based on GDT: BusinessTransactionDocumentID. A FinancialInstrumentAccountID can be a unique identifier of an account for financial instruments. It can refer to an account for a position of a standardized financial instrument and can be based on GDT: FinancialInstrumentAccountID, Qualifier: Standardised. A FinancialInstrumentPosition-CharacteristicValueCombinationID can be a unique identifier for a FinancialInstrumentPosition-CharacteristicValueCombination. It can refer to a financial instrument position and can be based on GDT:FinancialInstrumentPositionCharacteristicValueCombinationID. A CompanyID can be an identifier for a company. It can refer to the company that owns the financial instrument for which an analytical result was calculated. A CompanyID can be based on GDT: CompanyID. An OrganisationalCentreID can be a unique identifier of an organizational unit and can be based on GDT: OrganisationalCentreID. It can refer to a center which is responsible for a contribution of a financial instrument position to the bank's financial result. A SetOfBooksID can be a unique identifier for a set of books. It can represent an accounting principle that was used for calculation and may be based on GDT: SetOfBooksID.

A FiscalYearID can be a unique identifier for a fiscal year. It can refer to a year for which a profit and loss of a company is accounted (inventory and balance sheet). A FiscalYearID can be based on GDT: FiscalYearID. An AccountingPeriodID can be a unique identifier for an accounting period in a fiscal year and can be based on GDT: AccountingPeriodID. The FinancialInstrumentCategoryCode can be a coded representation of a category of a financial instrument for which an analytical result was calculated. It can be based on GDT: FinancialInstrumentCategoryCode. A Date can be a specification of an exact day in the Gregorian calendar. It can refer to the last valid date within the period for which the key figure values are delivered. A Date can be based on GDT: Date, Qualifier:ValidityEnd. GLOBAL_DateTime can be an accurate-to-the-second time-point of a calendar day in time zone UTC. It can refer to a point in time at which an analytical result was calculated. It can be based on GDT: GLOBAL_DateTime, Qualifier: Creation.

In some implementations, StandardisedFinancialInstrumentAccountID is relevant for standardized financial instruments, that is, for financial instruments where the financial instrument category code is equal to '1'. In some implementations, it may not be filled for non-standardized financial instruments, that is, for financial instruments where the financial instrument category code is equal to '2'. The CharacteristicValue package can group a set of characteristics with its values. It includes the entity CharacteristicValue. CharacteristicValue can be a combination of a characteristic and a characteristic value. CharacteristicValue includes the FinancialInstrumentPositionCharacteristicID and FinancialInstrumentPositionCharacteristicValue elements.

FinancialInstrumentPositionCharacteristicID can be an identifier for a FinancialInstrumentPositionCharacteristic and can be based on GDT: FinancialInstrumentPosition-CharacteristicID. FinancialInstrumentPosition-CharacteristicValue can be an arbitrary value that a financial instrument position characteristic can have. FinancialInstrumentPositionCharacteristicValue can be based on GDT: FinancialInstrumentPositionCharacteristicValue. The Item package can group a result according to items for an accounting period total. It includes the Item entity. Item can represent a specific part of the financial instrument position for which FinancialInstrumentPosition-AccountingPeriodTotalAnalyticalResult is specified. For structured financial instruments, it can be subdivided by FinancialInstrumentAnalyticalComponent and PostingKeyFigure.

FinancialInstrumentPosition-AccountingPeriodTotalAnalyticalResultItem can be subdivided into FinancialInstrumentAnalyticalComponent, which may be based on GDT: FinancialInstrumentAnalyticalComponent and PostingKeyFigure, which may be based on GDT: FinancialInstrumentPostingKeyFigure which further specifies an item of an analytical result. FinancialInstrumentPositionAccountingPeriodTotalAnalyticalResultItem includes the ID element. BusinessTransactionDocumentItemID can be a unique identifier of an item or sub item of a document within a business transaction and can be unique in the context of the business transaction. It can refer to the analytical result item for the accounting period total of the financial instrument position. BusinessTransactionDocumentItemID can be based on GDT: BusinessTransactionDocumentItemID. FinancialInstrumentAnalyticalComponentReference can be a reference to an analytical component on the financial instrument. In some implementations, the component is made at issuance of the financial instrument and is not revised for subsequent changes in market interest rates, share prices, or other events that change the likelihood that an option included in the financial instrument may be exercised.

FinancialInstrumentAnalyticalComponent, which can be based on GDT: FinancialInstrumentAnalyticalComponent, includes the following elements: ID, TypeCode, and CurrencyCode. FinancialInstrumentAnalyticalComponentID can be an identifier for a FinancialInstrumentAnalyticalComponent. It can be based on GDT: FinancialInstrumentAnalyticalComponentID. FinancialInstrumentAnalyticalComponentTypeCode can be a coded representation of an analytical component of a financial instrument. It can be based on GDT: FinancialInstrumentAnalyticalComponentTypeCode. The CurrencyCode can be a coded representation of the currency. It can refer to an object currency of a financial instrument analytical component and can be based on GDT: CurrencyCode.

In some implementations, the FinancialInstrumentAnalyticalComponentID is unique in the context of the FinancialInstrumentAnalyticalComponentTypeCode and the FinancialInstrumentAnalyticalComponentCurrencyCode. PostingKeyFigure can be an accounting period total value for a financial instrument position. FinancialInstrumentPositionAccountingPeriodTotalAnalyticalResultAmount includes the Code and Value elements. The FinancialInstrumentPostingKeyFigureCode can be a coded representation of the semantic of a posting key figure for financial instruments. FinancialInstrumentPostingKeyFigureCode can be based on GDT: FinancialInstrumentPostingKeyFigureCode. FinancialInstrumentPostingKeyFigureValue can be the value of a posting key figure for a financial instrument. The value, amount or quantity, is defined by the key figure code of a financial instrument posting. It can be based on GDT: FinancialInstrumentPostingKeyFigureValue.

Message Data Type FinInstrPosAcctgPerTotAnalRsltBulkCrteReqMsg

The FinInstrPosAcctgPerTotAnalRsltBulkCrteReqMsg message data type includes the business information that is relevant for sending analytical results in a message and the information that is relevant for creating an instance of FinancialInstrumentPositionAccountingPeriodTotalAnalyticalResult. It includes the MessageHeader and FinInstrPosAcctgPerTotAnalRsltCrteReqMsg packages. The FinInstrPosAcctgPerTotAnalRsltBulkCrteReqMsg message data type can provide the structure for the FinancialInstrumentPosAccountingPeriodTotalAnalyticalResultsCreateRequest message type and the service operations that are based on it. The FinInstrPosAcctgPerTotAnalRsltCrteReqMsg package can be of type FinInstrPosAcctgPerTotAnalRsltCrteReqMsg.

Message Data Type FinInstrPosAcctgPerTotAnalRsltCancReqMsg

The FinInstrPosAcctgPerTotAnalRsltCancReqMsg message data type includes the business information that is relevant for sending an analytical result in a message and the information that is relevant for canceling an instance of FinancialInstrumentPositionAccountingPeriodTotal AnalyticalResult. It includes the MessageHeader and FinancialInstrumentPositionAccountingPeriodTotalAnalyticalResult packages. The FinInstrPosAcctgPerTotAnalRsltCancReqMsg message data type can provide the structure for the FinancialInstrumentPositionAccountingPeriodTotalAnalyticalResultCancelRequest message type and the service operations that are based on it. A FinancialInstrumentPositionAccountingPeriodTotalAnalyticalResult package can group FinancialInstrumentPositionAccountingPeriodTotalAnalyticalResult with its packages. It includes the package CharacteristicValue.

FinancialInstrumentPositionAccountingPeriodTotalAnalyticalResult can be a result of the calculation of the accounting period total for an individual financial instrument position. An accounting period total can be calculated by aggregating all of the changes of a specific posting key figure within an accounting period. Accounting period totals can describe the contribution of a financial instrument position to the different items of the balance sheet and the profit and loss statement for a specific accounting period. An accounting period total can be used for reporting purposes. In some implementations, it should not be confused with an accounting balance. Accounting balances of a date can be the sum of all contributions from the past up to this date. For example, if a period 1 produces an interest income of € 5, and a period 2 also produces an interest income of € 5, then the total of period 2 is € 5, while the balance is € 10.

FinancialInstrumentPositionAccountingPeriodTotalAnalyticalResult can be subdivided into CharacteristicValue, which further specifies custom characteristics for the financial instrument position. FinancialInstrumentPositionAccountingPeriodTotalAnalyticalResult includes the following elements: GroupID, FinancialInstrumentID, StandardisedFinancialInstrumentAccountID, FinancialInstrumentPositionCharacteristicValueCombinationID, SetOfBooksID, FiscalYearID, AccountingPeriodID, FinancialInstrumentCategoryCode, ValidityEndDate, and CreationDateTime A BusinessTransactionDocumentGroupID can uniquely identify a group of business documents that are to be considered as one group within a business process. It can refer to a group of analytical results for which an analytical result was calculated. This element can be used in messages that cancel by reference. A BusinessTransactionDocumentGroupID can be based on GDT: BusinessTransactionDocumentGroupID. A BusinessTransactionDocumentID can be a unique identifier for a business transaction document. It can refer to a financial instrument for which an analytical result was calculated and can be based on GDT: BusinessTransactionDocumentID. A FinancialInstrumentAccountID can be a unique identifier of an account for financial instruments. It can refer to an account for a position of a standardized financial instrument. It can be based on GDT: FinancialInstrumentAccountID, Qualifier: Standardised. A FinancialInstrumentPositionCharacteristicValueCombinationID can be a unique identifier for a FinancialInstrumentPositionCharacteristicValueCombination. It can refer to a financial instrument position and can be based on GDT:FinancialInstrumentPositionCharacteristicValueCombinationID. A SetOfBooksID can be a unique identifier for a set of books. It can represent an accounting principle that was used for calculation. A SetOfBooksID can be based on GDT: SetOfBooksID. A FiscalYearID can be a unique identifier for a fiscal year. It can be a valid time period for key figure values that are delivered. It can be based on GDT: FiscalYearID. An AccountingPeriodID can be a unique identifier for an accounting period in a fiscal year, and can be based on GDT: AccountingPeriodID. FinancialInstrumentCategoryCode can be a coded representation of a category of a financial instrument for which an analytical result was calculated. It can be based on GDT: FinancialInstrumentCategoryCode. A Date can be a specification of an exact day in the Gregorian calendar. It can refer to a last valid date within the period for which the key figure values are delivered. A Date can be based on GDT: Date, Qualifier:ValidityEnd. GLOBAL_DateTime can be an accurate-to-the-second time-point of a calendar day in time zone UTC. It can refer to a point in time at which the analytical result was calculated. It can be based on GDT: GLOBAL_DateTime, Qualifier: Creation.

In some implementations, StandardisedFinancialInstrumentAccountID is relevant for standardized financial instruments (that is, for financial instruments where the financial instrument category code is equal to '1'). In some implementations, StandardisedFinancialInstrumentAccountID may not be filled for non-standardized financial instruments (that is, for financial instruments where the financial instrument category code is equal to '2').

Message Data Type FinInstrPosAcctgPerTotAnalRsltBulkCancReqMsg

The FinInstrPosAcctgPerTotAnalRsltBulkCancReqMsg message data type includes business information that is relevant for sending analytical results in a message and information that is relevant for canceling an instance of FinancialInstrumentPositionAccountingPeriodTotal AnalyticalResult. It includes the MessageHeader and FinInstrPosAcctgPerTotAnalRsltCancReqMsg packages. The FinInstrPosAcctgPerTotAnalRsltBulkCancReqMsg message data type can provide a structure for the FinancialInstrumentPositionAccountingPeriod-TotalAnalyticalResultCancelRequest message type and service operations that are based on it. The FinInstrPosAcctgPerTotAnalRsltCancReqMsg package can be of type FinInstrPosAcctgPerTotAnalRsltCancReqMsg.

Financial Instrument Position Accounting Valuation Analytical Result Interfaces

The Financial Instrument Position Accounting Valuation Analytical Result business object can be used to provide a Profitability Analysis scenario. The purpose of the Profitability Analysis scenario can be to provide a key-figure based view of the performance of a bank. This includes the following two main aspects: 1) calculation and storage of indirect costs and revenues on the granularity of a single financial instrument, and 2) analysis of the cost and revenue information in reporting. In some implementations, the Profitability Analysis scenario may not be integrated with the Financial Accounting scenario, in contrast to 'Integrated Financial and Management Accounting'. As a result, direct costs and revenues from external transactions, between the bank and its customers, can be delivered from an external financial accounting system, such as process component Ledger for Financial Instruments.

The Financial Instruments Analytical Results Management process component can correspond to the analytical Results Data Layer. It can store the analytical results of the valuation and calculation processes, act as single source of truth for multipurpose analytical results, and serve as starting point for the creation of all scenario-specific information such as specific reports. FinancialInstrumentPosition-AccountingValuationAnalyticalResultCreateRequest can be a request to Financial Instruments Analytical Results Management to create an instance of FinancialInstrumentPositionAccountingValuationAnalyticalResult. The structure of the FinancialInstrumentPosition-AccountingValuationAnalyticalResultCreateRequest message type can be specified by the FinInstrPosAcctgValnAnalRsltCrteReqMsg message data type that includes the object FinancialInstrumentPosition-AccountingValuationAnalyticalResult.

FinancialInstrumentPosition-AccountingValuationAnalyticalResultCreateRequest can be a message that a ledger for financial instruments can use to create an analytical result for an accounting valuation. FinancialInstrumentPositionAccountingValuationAnalyticalResultBulkCreateRequest can be a request to the Financial Instruments Analytical Results Management to create several instances of FinancialInstrumentPositionAccountingValuationAnalyticalResult. The structure of the FinancialInstrumentPosition-AccountingValuationAnalyticalResultBulkCreateRequest message type can be specified by the FinInstrPosAcctgValnAnalRsltBulkCrteReqMsg message data type that includes multiple FinancialInstrumentPosition-AccountingValuationAnalyticalResultCreateRequest messages. FinancialInstrumentPosition-AccountingValuationAnalyticalResultBulkCreateRequest can be a message that a ledger for financial instruments can use to create several analytical results for an accounting valuation.

FinancialInstrumentPosition-AccountingValuationAnalyticalResultCancelRequest can be a request to the Financial Instruments Analytical Results Management to cancel an instance of FinancialInstrumentPositionAccountingValuationAnalyticalResult. The structure of the FinancialInstrumentPosition-AccountingValuationAnalyticalResultCancelRequest message type can be specified by the FinInstrPosAcctgValnAnalRsltCancReqMsg message data type that includes the object FinancialInstrumentPosition-AccountingValuationAnalyticalResult. FinancialInstrumentPositionAccountingValuationAnalyticalResultCancelRequest can be a message that a ledger for financial instruments can use to cancel an analytical result for an accounting valuation.

FinancialInstrumentPosition-AccountingValuationAnalyticalResultBulkCancelRequest can be a request to the Financial Instruments Analytical Results Management to cancel several instances of FinancialInstrumentPositionAccountingValuationAnalyticalResult. The structure of the FinancialInstrumentPosition-AccountingValuationAnalyticalResultBulkCancelRequest message type can be specified by the FinInstrPosAcctgValnAnalRsltBulkCancReqMsg message data type that includes the FinancialInstrumentPosition-AccountingValuationAnalyticalResultCancelRequest message. FinancialInstrumentPosition-AccountingValuationAnalyticalResultBulkCancelRequest can be a message that a ledger for financial instruments can use to cancel several analytical results for an accounting valuation.

FinancialInstrumentPosition-AccountingValuationAnalyticalResult messages can be implemented by one message interface on the Financial Instruments Analytical Results Management side. A FinancialInstrumentsAnalyticalResultsManagementFinancialInstrumentPosAccountingValuationAnalyticalResultIn interface can include the operations CreateResults and CancelResults. In some implementations, in the create and cancel process, the messages are sent exactly once in order.

Figures 1, 42:
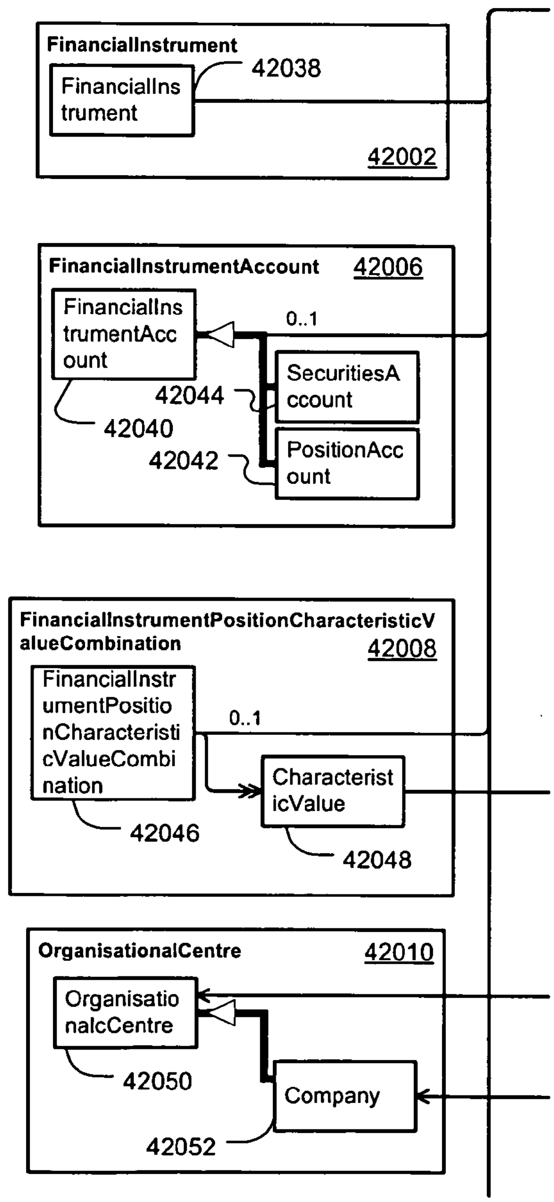
Figures 2, 42:
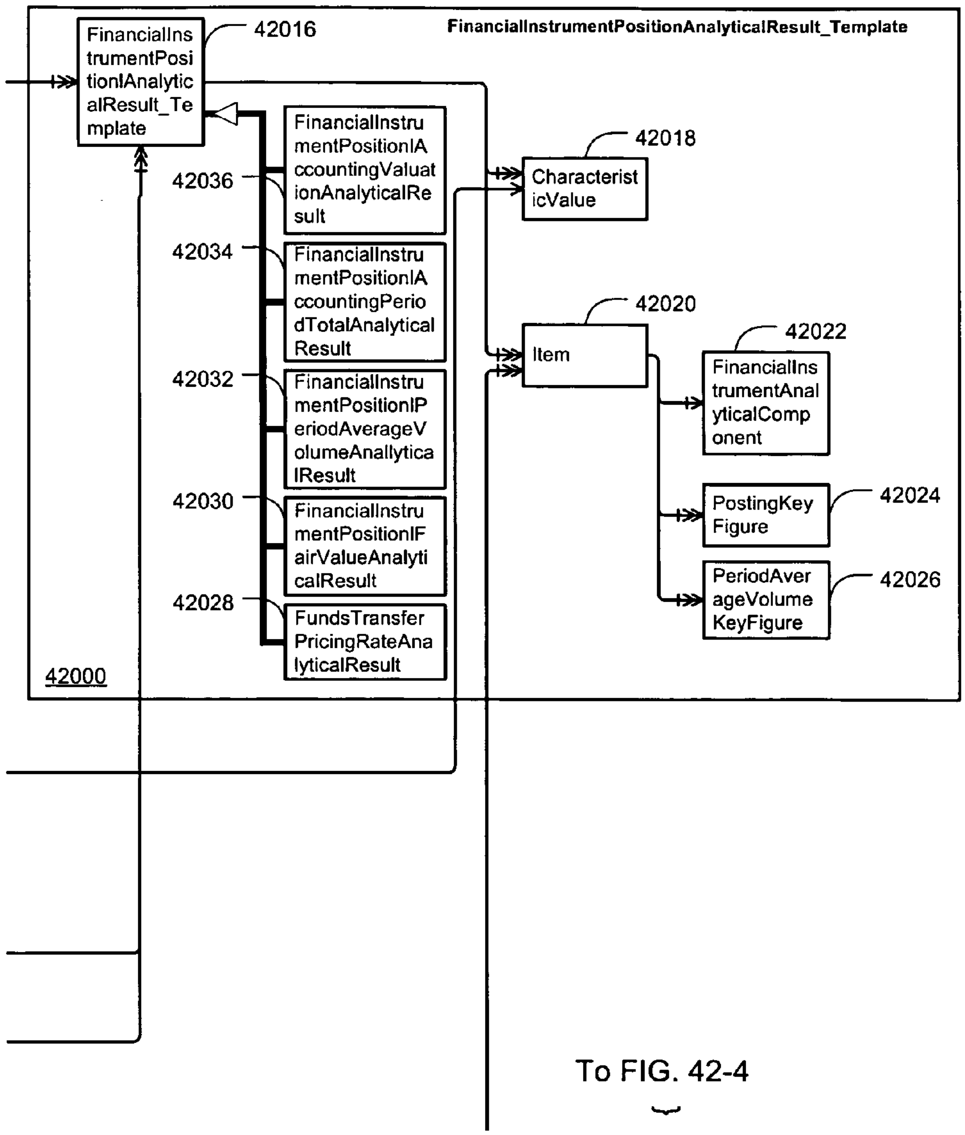
Figures 3, 42:
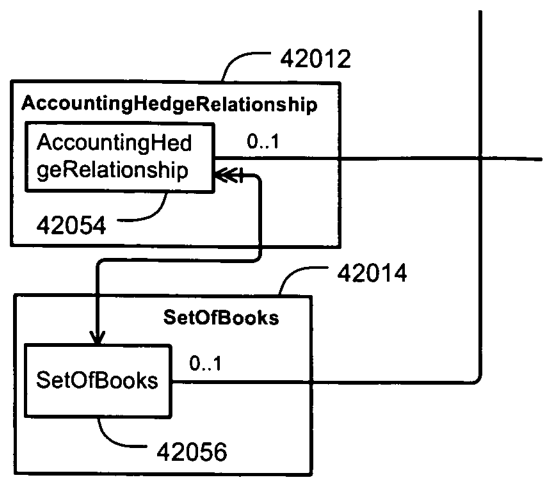
Figures 4, 42:

FIGS. 42-1 through 42-4 illustrate an example FinancialInstrumentPositionAnalyticalResult_Template business object model 42000. Specifically, this model depicts interactions among various components of the FinancialInstrumentPositionAnalyticalResult_Template, as well as external components that interact with the FinancialInstrumentPositionAnalyticalResult_Template (shown here as 42002 through 42014 and 42038 through 42056). FinancialInstrumentPositionAnalyticalResult_Template 42000 includes elements 42016 through 42036. FinancialInstrumentPositionAnalyticalResult_Template 42000 includes for example, a FinancialInstrumentAnalyticalComponent 42022.

Figure 43:
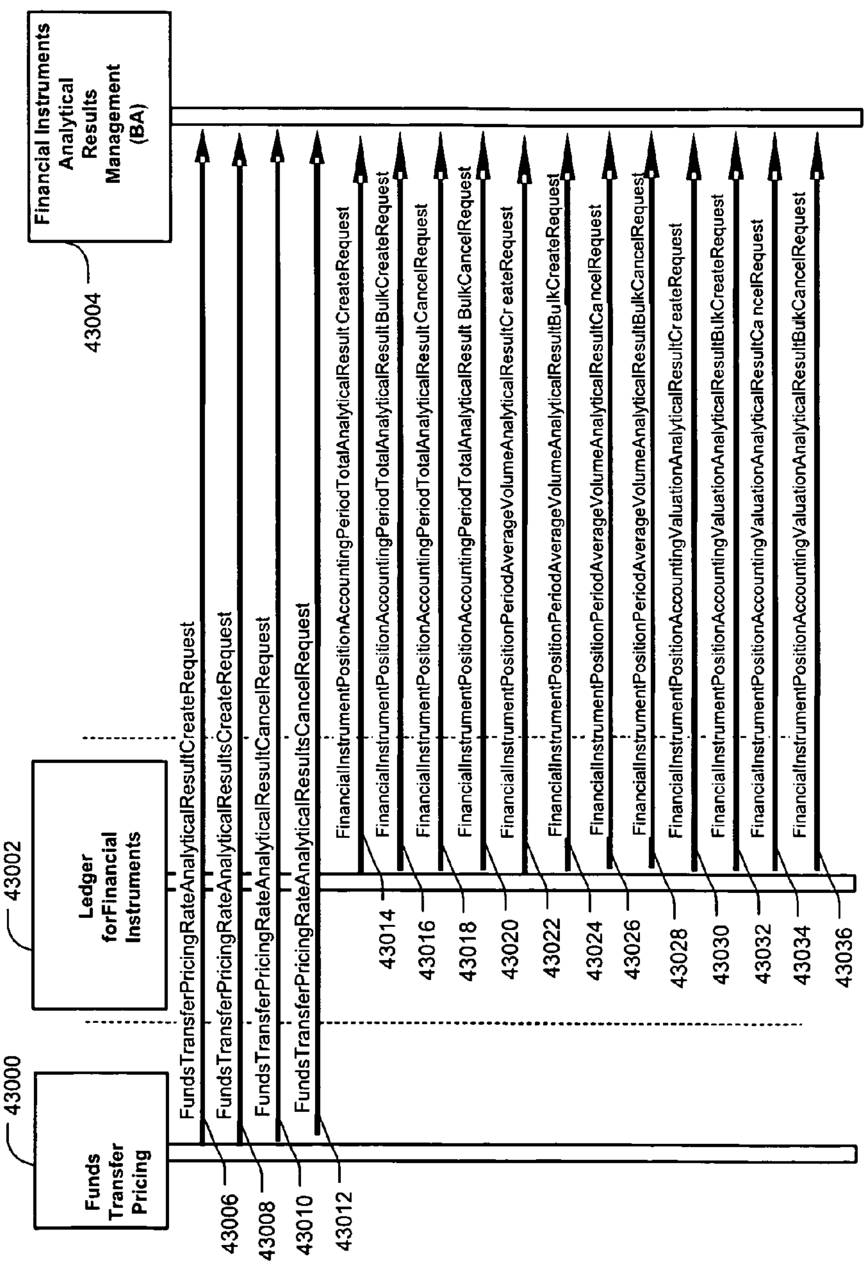
FIG. 43 shows an exemplary Financial Instrument Position Accounting Valuation Analytical Result Message Choreography.

The message choreography of FIG. 43 describes a possible logical sequence of messages that can be used to realize a Profitability Analysis business scenario. A "Funds Transfer Pricing" system 43000 can request the creation of a funds transfer pricing rate analytical result from a "Financial Instruments Analytical Results Management (BA)" system 43004, using a FundsTransferPricingRateAnalyticalResultCreateRequest message 43006 as shown, for example, in FIG. 43. The "Funds Transfer Pricing" system 43000 can request the creation of funds transfer pricing rate analytical results from the "Financial Instruments Analytical Results Management (BA)" system 43004, using a FundsTransferPricingRateAnalyticalResultsCreateRequest message 43008 as shown, for example, in FIG. 43.

The "Funds Transfer Pricing" system 43000 can request the cancellation of the funds transfer pricing rate analytical result from the "Financial Instruments Analytical Results Management (BA)" system 43004, using a FundsTransferPricingRateAnalyticalResultCancelRequest message 43010 as shown, for example, in FIG. 43. The "Funds Transfer Pricing" system 43000 can request the cancellation of funds transfer pricing rate analytical results from the "Financial Instruments Analytical Results Management (BA)" system 43004, using a FundsTransferPricingRateAnalyticalResultsCancelRequest message 43012 as shown, for example, in FIG. 43.

A "Ledger for Financial Instruments" system 43002 can request the creation of a financial instrument position accounting period total analytical result from the "Financial Instruments Analytical Results Management (BA)" system 43004, using a FinancialInstrumentPositionAccountingPeriodTotalAnalyticalResultCreateRequest message 43014 as shown, for example, in FIG. 43. The "Ledger for Financial Instruments" system 43002 can request the creation of financial instrument position accounting period total analytical results from the "Financial Instruments Analytical Results Management (BA)" system 43004, using a FinancialInstrumentPositionAccountingPeriodTotalAnalyticalResultBulkCreateRequest message 43016 as shown, for example, in FIG. 43. The "Ledger for Financial Instruments" system 43002 can request the cancellation of the financial instrument position accounting period total analytical result from the "Financial Instruments Analytical Results Management (BA)" system 43004, using a FinancialInstrumentPositionAccountingPeriodTotalAnalyticalResultCancelRequest message 43018 as shown, for example, in FIG. 43.

The "Ledger for Financial Instruments" system 43002 can request the cancellation of financial instrument position accounting period total analytical results from the "Financial Instruments Analytical Results Management (BA)" system 43004, using a FinancialInstrumentPositionAccountingPeriodTotalAnalyticalResultBulkCancelRequest message 43020 as shown, for example, in FIG. 43. The "Ledger for Financial Instruments" system 43002 can request the creation of a financial instrument position period average volume analytical result from the "Financial Instruments Analytical Results Management (BA)" system 43004, using a FinancialInstrumentPositionPeriodAverageVolumeAnalyticalResultCreateRequest message 43022 as shown, for example, in FIG. 43. The "Ledger for Financial Instruments" system 43002 can request the creation of financial instrument position period average volume analytical result from the "Financial Instruments Analytical Results Management (BA)" system 43004, using a FinancialInstrumentPositionPeriodAverageVolumeAnalyticalResultCreateRequest message 43024 as shown, for example, in FIG. 43.

The "Ledger for Financial Instruments" system 43002 can request the cancellation of the financial instrument position period average volume analytical result from the "Financial Instruments Analytical Results Management (BA)" system 43004, using a FinancialInstrumentPositionPeriodAverageVolumeAnalyticalResultCancelRequest message 43026 as shown, for example, in FIG. 43. The "Ledger for Financial Instruments" system 43002 can request the cancellation of financial instrument position period average volume analytical results from the "Financial Instruments Analytical Results Management (BA)" system 43004, using a FinancialInstrumentPositionPeriodAverageVolumeAnalyticalResultBulkCancelRequest message 43028 as shown, for example, in FIG. 43. The "Ledger for Financial Instruments" system 43002 can request the creation of a financial instrument position accounting valuation analytical result from the "Financial Instruments Analytical Results Management (BA)" system 43004, using a FinancialInstrumentPositionAccountingValuationAnalyticalResultCreateRequest message 43030 as shown, for example, in FIG. 43.

The "Ledger for Financial Instruments" system 43002 can request the creation of financial instrument position accounting valuation analytical results from the "Financial Instruments Analytical Results Management (BA)" system 43004, using a FinancialInstrumentPositionAccountingValuationAnalyticalResultBulkCreateRequest message 43032 as shown, for example, in FIG. 43. The "Ledger for Financial Instruments" system 43002 can request the cancellation of the financial instrument position accounting valuation analytical result from the "Financial Instruments Analytical Results Management (BA)" system 43004, using a FinancialInstrumentPositionAccountingValuationAnalyticalResultCancelRequest message 43034 as shown, for example, in FIG. 43. The "Ledger for Financial Instruments" system 43002 can request the cancellation of financial instrument position accounting valuation analytical results from the "Financial Instruments Analytical Results Management (BA)" system 43004, using a FinancialInstrumentPositionAccountingValuationAnalyticalResultBulkCancelRequest message 43036 as shown, for example, in FIG. 43.

Figure 44:
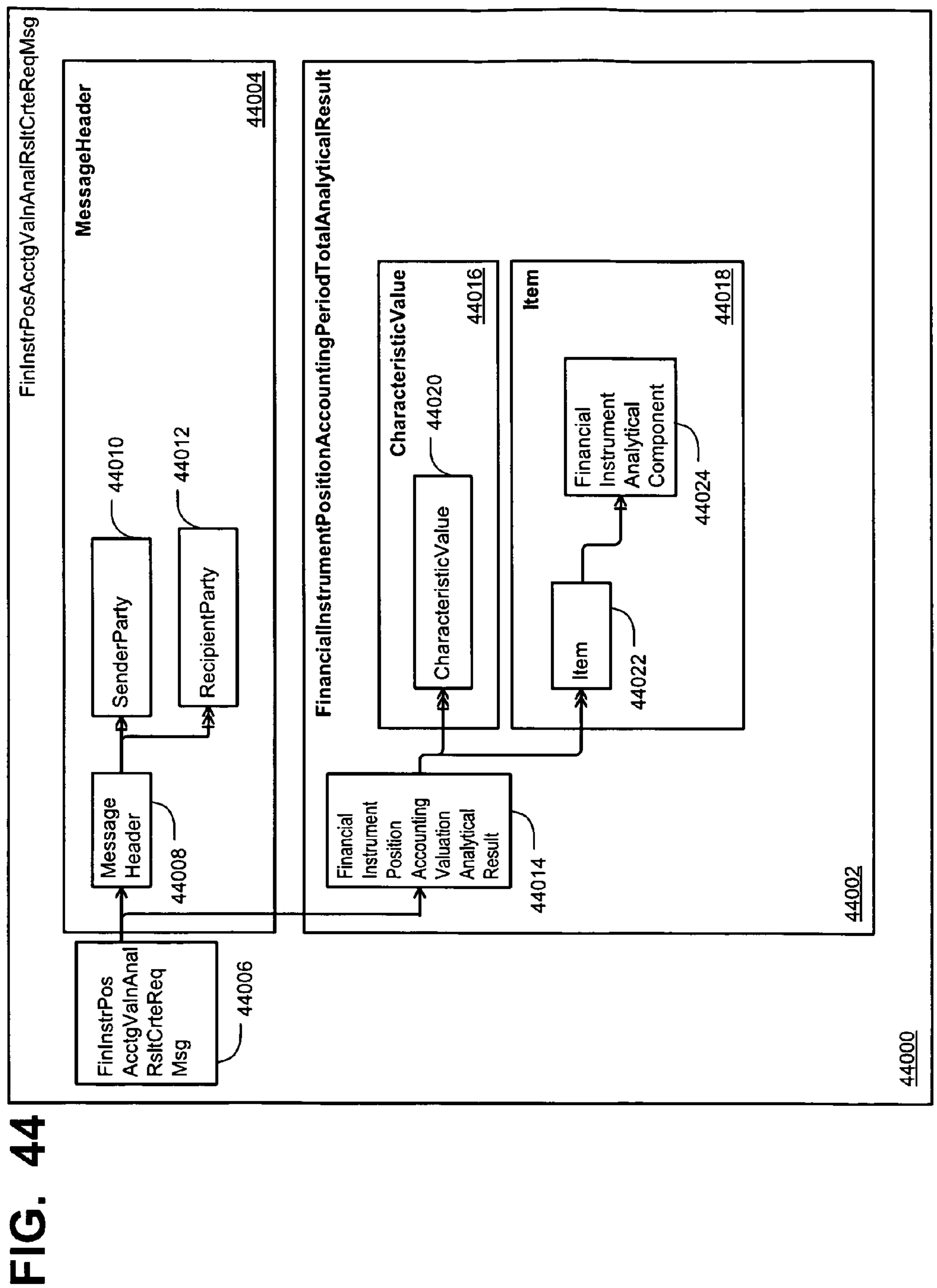
FIG. 44 shows an exemplary FinInstrPosAcctgValnAnalRsltCrteReqMsg Message Data Type.

FIG. 44 illustrates one example logical configuration of FinInstrPosAcctgValnAnalRsltCrteReqMsg message 44000. Specifically, this figure depicts the arrangement and hierarchy of various components such as one or more levels of packages, entities, and datatypes, shown here as 44002 through 44024. As described above, packages may be used to represent hierarchy levels. Entities are discrete business elements that are used during a business transaction. Data types are used to type object entities and interfaces with a structure. For example, FinInstrPosAcctgValnAnalRsltCrteReqMsg message 44000 includes, among other things, MessageHeader 44008. Accordingly, heterogeneous applications may communicate using this consistent message configured as such.

Figure 45:
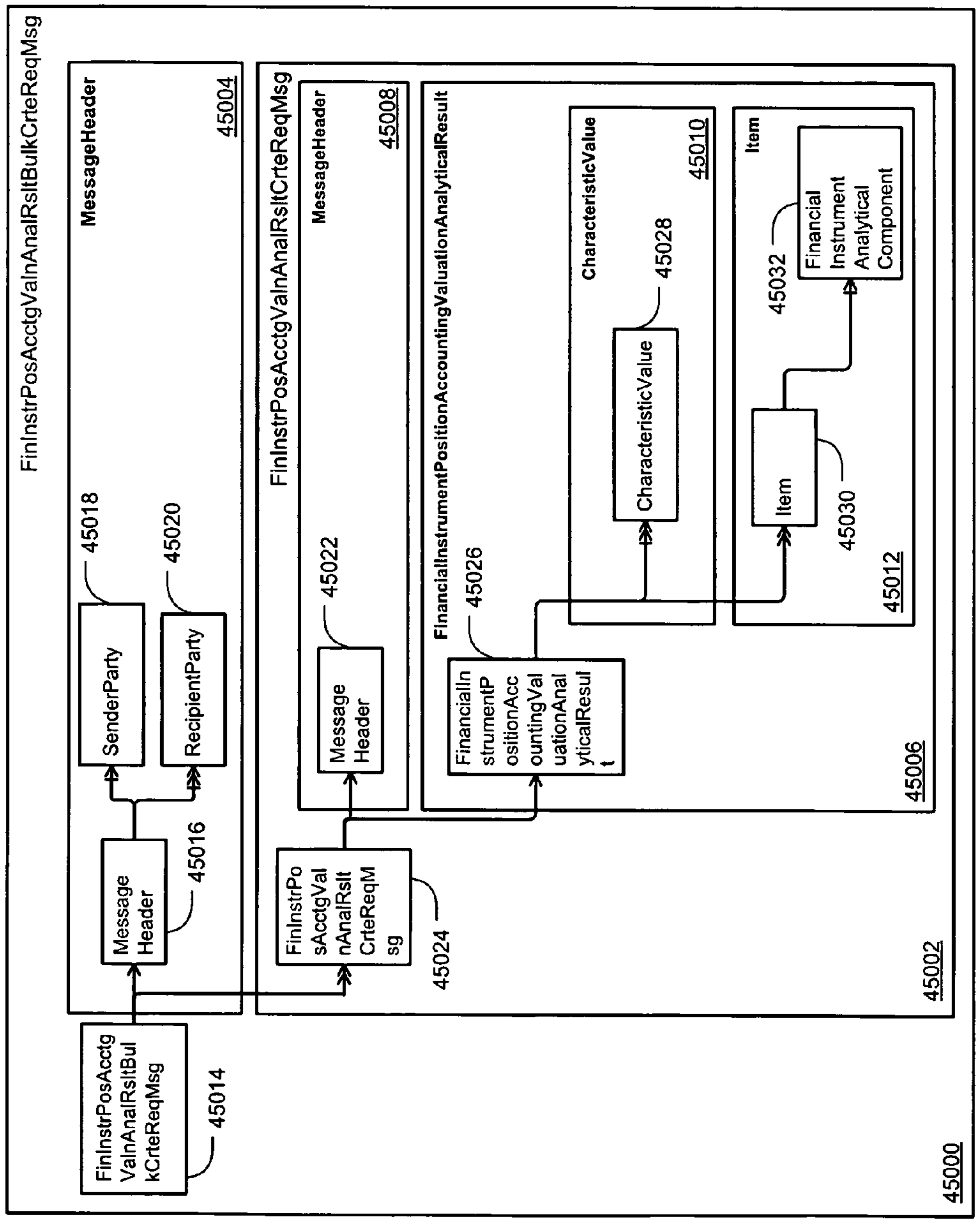
FIG. 45 shows an exemplary FinInstrPosAcctgValnAnalRsltBulkCrteReqMsg Message Data Type.

Additionally, FIG. 45 illustrates one example logical configuration of FinInstrPosAcctgValnAnalRsltBulkCrteReqMsg message 45000. Specifically, this figure depicts the arrangement and hierarchy of various components such as one or more levels of packages, entities, and datatypes, shown here as 45002 through 45032. As described above, packages may be used to represent hierarchy levels. Entities are discrete business elements that are used during a business transaction. Data types are used to type object entities and interfaces with a structure. For example, FinInstrPosAcctgValnAnalRsltBulkCrteReqMsg message 45000 includes, among other things, MessageHeader 45022. Accordingly, heterogeneous applications may communicate using this consistent message configured as such.

Figure 46:
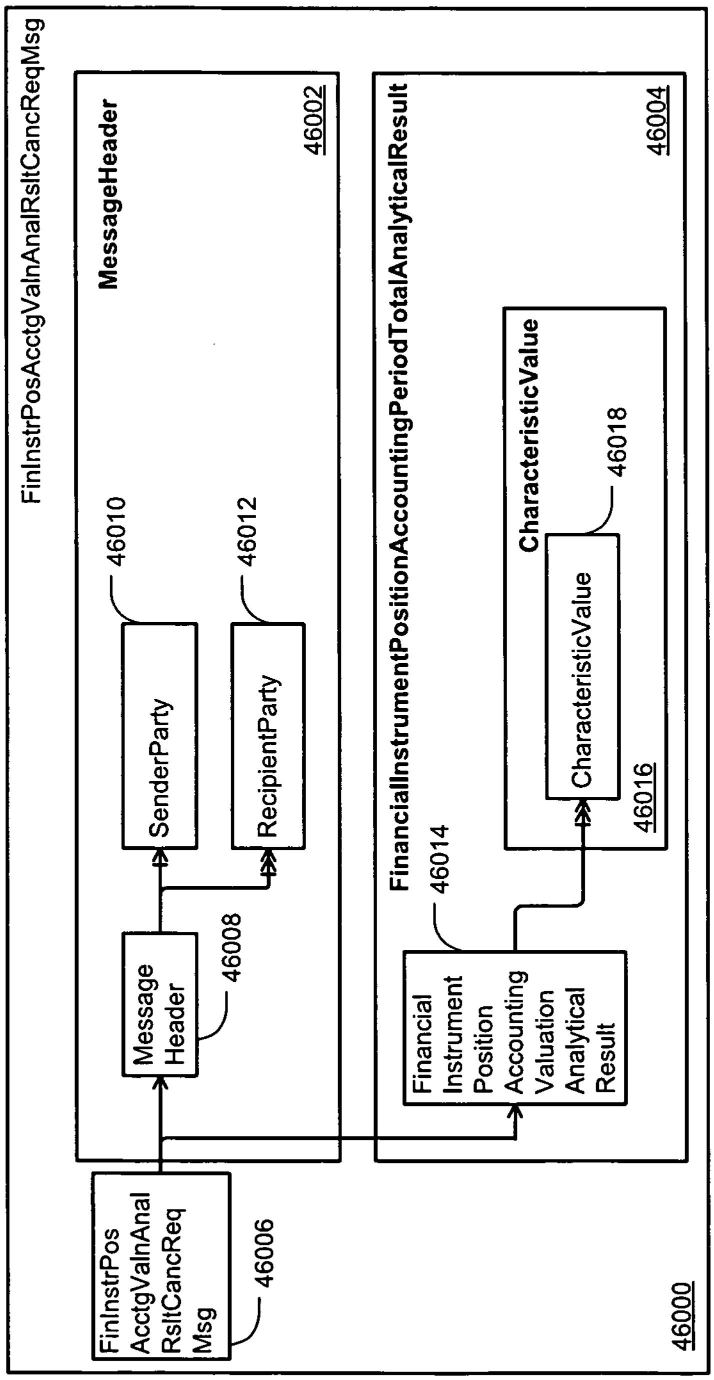
FIG. 46 shows an exemplary FinInstrPosAcctgValnAnalRsltCancReqMsg Message Data Type.

Additionally, FIG. 46 illustrates one example logical configuration of FinInstrPosAcctgValnAnalRsltCancReqMsg message 46000. Specifically, this figure depicts the arrangement and hierarchy of various components such as one or more levels of packages, entities, and datatypes, shown here as 46002 through 46018. As described above, packages may be used to represent hierarchy levels. Entities are discrete business elements that are used during a business transaction. Data types are used to type object entities and interfaces with a structure. For example, FinInstrPosAcctgValnAnalRsltCancReqMsg message 46000 includes, among other things, MessageHeader 46008. Accordingly, heterogeneous applications may communicate using this consistent message configured as such.

Figure 47:
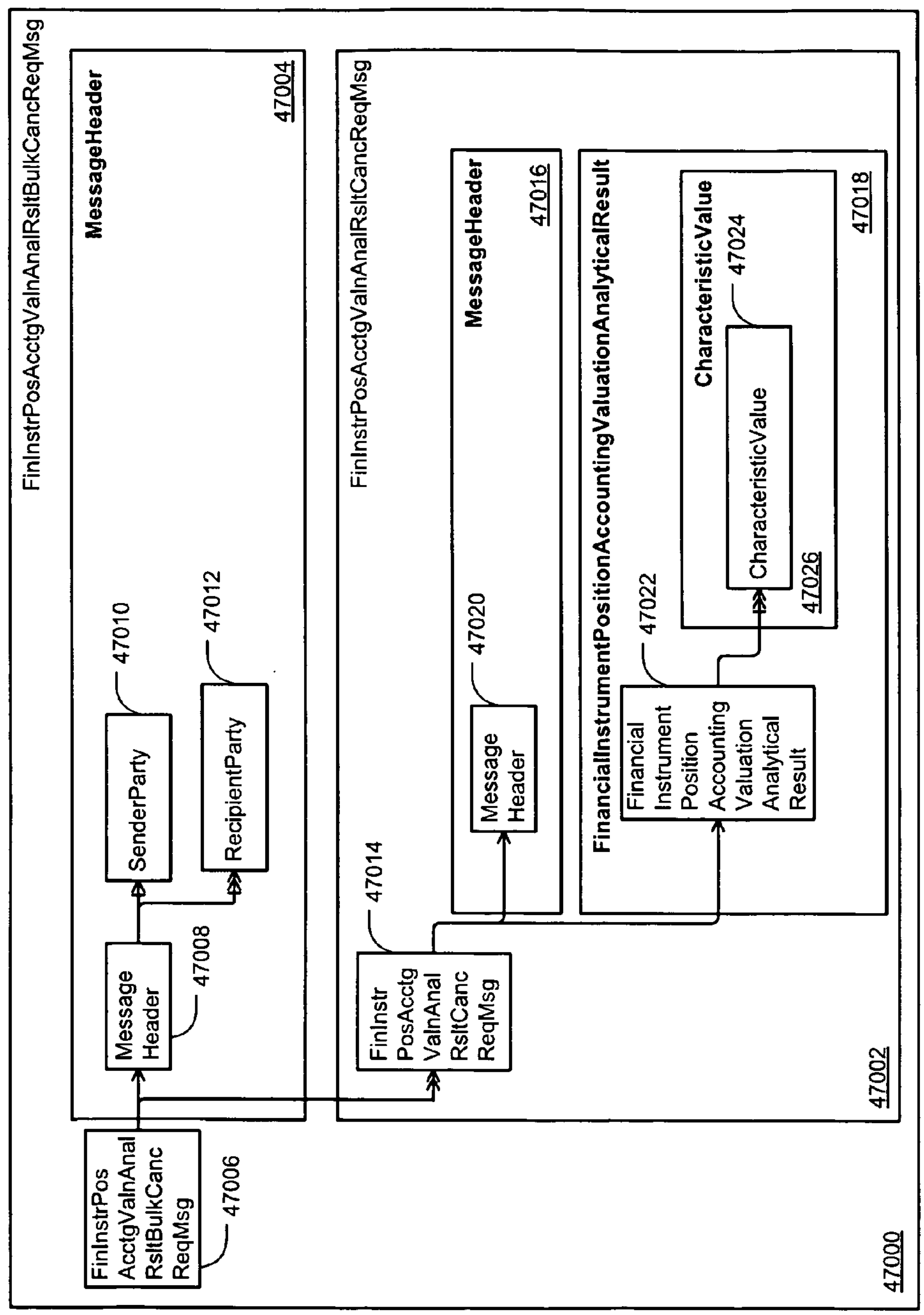
FIG. 47 shows an exemplary FinInstrPosAcctgValnAnalRsltBulkCancReqMsg Message Data Type.

Additionally, FIG. 47 illustrates one example logical configuration of FinInstrPosAcctgValnAnalRsltBulkCancReqMsg message 47000. Specifically, this figure depicts the arrangement and hierarchy of various components such as one or more levels of packages, entities, and datatypes, shown here as 47002 through 47026. As described above, packages may be used to represent hierarchy levels. Entities are discrete business elements that are used during a business transaction. Data types are used to type object entities and interfaces with a structure. For example, FinInstrPosAcctgValnAnalRsltBulkCancReqMsg message 47000 includes, among other things, MessageHeader 47008. Accordingly, heterogeneous applications may communicate using this consistent message configured as such.

FIG. 48 illustrates one example logical configuration of a FinInstrPosAcctgValnAnalRsltBulkCancReqMsg 48000 element structure. Specifically, this figure depicts the arrangement and hierarchy of various components such as one or more levels of packages, entities, and datatypes, shown here as 48000 through 48020. As described above, packages may be used to represent hierarchy levels. Entities are discrete business elements that are used during a business transaction. Data types are used to type object entities and interfaces with a structure. For example, the FinInstrPosAcctgValnAnalRsltBulkCancReqMsg 48000 includes, among other things, a FinInstrPosAcctgValnAnalRsltBulkCancReqMsg 48002. Accordingly, heterogeneous applications may communicate using this consistent message configured as such.

FIG. 49 illustrates one example logical configuration of a FinInstrPosAcctgValnAnalRsltBulkCrteReqMsg 49000 element structure. Specifically, this figure depicts the arrangement and hierarchy of various components such as one or more levels of packages, entities, and datatypes, shown here as 49000 through 49020. As described above, packages may be used to represent hierarchy levels. Entities are discrete business elements that are used during a business transaction. Data types are used to type object entities and interfaces with a structure. For example, the FinInstrPosAcctgValnAnalRsltBulkCrteReqMsg 49000 includes, among other things, a FinInstrPosAcctgValnAnalRsltBulkCrteReqMsg 49002. Accordingly, heterogeneous applications may communicate using this consistent message configured as such.

FIGS. 50-1 through 50-3 illustrate one example logical configuration of a FinInstrPosAcctgValnAnalRsltCancReqMsg 50000 element structure. Specifically, these figures depict the arrangement and hierarchy of various components such as one or more levels of packages, entities, and datatypes, shown here as 50000 through 50088. As described above, packages may be used to represent hierarchy levels. Entities are discrete business elements that are used during a business transaction. Data types are used to type object entities and interfaces with a structure. For example, the FinInstrPosAcctgValnAnalRsltCancReqMsg 50000 includes, among other things, a FinInstrPosAcctgValnAnalRsltCancReqMsg 50002. Accordingly, heterogeneous applications may communicate using this consistent message configured as such.

FIGS. 51-1 through 51-6 illustrate one example logical configuration of a FinInstrPosAcctgValnAnalRsltCrteReqMsg 51000 element structure. Specifically, these figures depict the arrangement and hierarchy of various components such as one or more levels of packages, entities, and datatypes, shown here as 51000 through 51174. As described above, packages may be used to represent hierarchy levels. Entities are discrete business elements that are used during a business transaction. Data types are used to type object entities and interfaces with a structure. For example, the FinInstrPosAcctgValnAnalRsltCrteReqMsg 51000 includes, among other things, a FinInstrPosAcctgValnAnalRsltCrteReqMsg 51002. Accordingly, heterogeneous applications may communicate using this consistent message configured as such.

Message Data Type FinInstrPosAcctgValnAnalRsltCrteReqMsg

The FinInstrPosAcctgValnAnalRsltCrteReqMsg message data type includes the business information that is relevant for sending an analytical result in a message, and the information that is relevant for creating an instance of FinancialInstrumentPositionAccountingValuationAnalyticalResult. It includes the packages MessageHeader and FinancialInstrumentPositionAccountingValuationAnalyticalResult. The FinInstrPosAcctgValnAnalRsltCrteReqMsg message data type can provide the structure for the FinancialInstrumentPositionAccountingValuationAnalyticalResultCreateRequest message type and the service-operations that are based on it.

A MessageHeader package can group the business information that can be relevant for sending an analytical result in a message. It includes the MessageHeader entity. A MessageHeader can group business information from the perspective of the sending application, including information to identify the business document in a message, information about the sender, and information about the recipient. The MessageHeader includes a SenderParty and a RecipientParty. It can be of type GDT BusinessDocumentMessageHeader, whereby the following elements of the GDT are used: ID and CreationDateTime. The ID and the CreationDateTime can be set by the sending application. A SenderParty can be a party responsible for sending an analytical result at a business application level.

The SenderParty can be of type GDT BusinessDocumentMessageHeaderParty. The SenderParty can be filled by the sending application to name a contact person for any problems with the message. SenderParty can be used to transfer the message and can be ignored by the receiving application. RecipientParty can be a party responsible for receiving an analytical result at a business application level. Recipient- Party can be of type GDT BusinessDocumentMessageHeaderParty. RecipientParty can be filled by the sending application to name a contact person for any problems that occur with the message. RecipientParty can be used to transfer the message and can be ignored by the receiving application.

A FinancialInstrumentPositionAccountingValuationAnalyticalResult package can group FinancialInstrumentPositionAccountingValuationAnalyticalResult with its packages. It includes the packages CharacteristicValue and Item. A FinancialInstrumentPositionAccountingValuationAnalyticalResult can be a result of the valuation of an individual financial instrument position in accordance with accounting specific rules and requirements. Examples for accounting valuation results can be the amortized costs or the hedge adjustment. In some implementations, different valuation results can be delivered separately. For example, a bank may want to deliver the amortized costs externally but may have the hedge fair value calculated by Bank Analyzer.

FinancialInstrumentPositionAccountingValuationAnalyticalResult can be subdivided into CharacteristicValue, which can further specify custom characteristics for the financial instrument position and Items, which can further specify the details of the analytical result. FinancialInstrumentPositionAccountingValuationAnalyticalResult includes the following elements: GroupID, FinancialInstrumentID, StandardisedFinancialInstrumentAccountID, FinancialInstrumentPositionCharacteristicValueCombinationID, CompanyID, OrganisationalCentreID, SetOfBooksID, KeyDate, FinancialInstrumentCategoryCode, and CreationDateTime. A BusinessTransactionDocumentGroupID can uniquely identify a group of business documents that can be considered as one group within a business process. It can refer to a group of analytical results for which the analytical result was calculated. This element can be used in messages that cancel by reference and can be based on GDT: BusinessTransactionDocumentGroupID. A BusinessTransactionDocumentID can be a unique identifier for a business transaction document. It can refer to the financial instrument for which the analytical result was calculated. A BusinessTransactionDocumentID can be based on GDT: BusinessTransactionDocumentID. A FinancialInstrumentAccountID can be a unique identifier of an account for financial instruments. It can refer to the account for the position of a standardized financial instrument and can be based on GDT: FinancialInstrumentAccountID, Qualifier: Standardised. A FinancialInstrumentPositionCharacteristicValueCombinationID can be a unique identifier for a FinancialInstrumentPositionCharacteristicValueCombination. It can refer to a financial instrument position. It can be based on GDT:FinancialInstrumentPositionCharacteristicValueCombinationID.

A CompanyID can be an identifier for a company. It can refer to the company that owns the financial instrument for which the analytical result was calculated. A CompanyID can be based on GDT: CompanyID. An OrganisationalCentreID can be a unique identifier of an organizational unit. It can refer to the center which is responsible for the contribution of the financial instrument position to the to the bank's financial result. It can be based on GDT: OrganisationalCentreID. A SetOfBooksID can be a unique identifier for a set of books. It can represent the accounting principle that was used for calculation and can be based on GDT: SetOfBooksID. A Date can be a specification of an exact day in the Gregorian calendar. It can specify the date for which the analytical result was calculated. It can be based on GDT: Date, Qualifier: Key. The FinancialInstrumentCategoryCode can be a coded representation of the category of a financial instrument for which an analytical result was calculated. The FinancialInstrumentCategoryCode can be based on GDT: FinancialInstrumentCategoryCode. The GLOBAL_DateTime can be an accurate-to-the-second time-point of a calendar day in time zone UTC. It can refer to the point in time at which an analytical result was calculated and can be based on GDT: GLOBAL_DateTime, qualifier: Creation.

In some implementations, StandardisedFinancialInstrumentAccountID can be relevant for standardized financial instruments, that is, for financial instruments where the financial instrument category code is equal to '1'. In some implementations, it may not be filled for non-standardized financial instruments, that is, for financial instruments where the financial instrument category code is equal to '2'. The CharacteristicValue package can group a set of characteristics with its values. It includes the CharacteristicValue entity. CharacteristicValue can be a combination of a characteristic and a characteristic value. CharacteristicValue includes the following elements: FinancialInstrumentPositionCharacteristicID and FinancialInstrumentPositionCharacteristicValue. FinancialInstrumentPositionCharacteristicID can be an identifier for a FinancialInstrumentPositionCharacteristic and can be based on GDT: FinancialInstrumentPositionCharacteristicID. FinancialInstrumentPositionCharacteristicValue can be an arbitrary value that a financial instrument position characteristic can have. It can be based on GDT: FinancialInstrumentPositionCharacteristicValue.

The Item package can group a result according to the items for an accounting valuation. It includes the entity Item. Item entity can represent a specific part of the financial instrument position for which FinancialInstrumentPositionAccountingValuationAnalyticalResult can be specified. For structured financial instruments, it can be subdivided by FinancialInstrumentAnalyticalComponent. FinancialInstrumentPositionAccountingValuationAnalyticalResultItem can be subdivided into financial instrument analytical component, which can be based on GDT: FinancialInstrumentAnalyticalComponent, which can further specify the item of the analytical result. FinancialInstrumentPositionAccountingValuationAnalyticalResultItem includes the following elements: ID, AccountingHedgeRelationshipID, AmortisedCostAmount, StartOfDayAmortisedCostAmount, HedgeAdjustmentAmount, StartOfDayHedgeAdjustmentAmount, and StartOfDayFairValueAmount.

A BusinessTransactionDocumentItemID can be a unique identifier of an item or sub item of a document within a business transaction and can be unique in the context of the business transaction. It can refer to the analytical result item for the accounting valuation of the financial instrument position and can be based on GDT: BusinessTransactionDocumentItemID. A BusinessTransactionDocumentItemID can be a unique identifier of an item or sub item of a document within a business transaction and can be unique in the context of the business transaction. It can refer to the hedge relationship for the financial instrument position for which the analytical result was created. It can be based on GDT: BusinessTransactionDocumentItemID. AmortisedCostAmount can be an amount with the corresponding currency unit. It can refer to the amount at which a financial asset or liability was measured at initial recognition minus principal payments, plus or minus the cumulative amortization of any difference between that initial amount and the maturity amount, and minus any write-down for impairment or uncollectability.

AmortisedCost can be based on GDT: Amount, Qualifier: AmortisedCost. StartOfDayAmortisedCostAmount can be an amount with the corresponding currency unit. It can refer to the amortized costs measured before any event, such as master data change or business transaction, on this day and can be based on GDT: Amount, qualifier: AmortisedCost. HedgeAdjustmentAmount can be an amount with the corresponding currency unit. It can be a contribution made by a financial position to the profit and loss statement item or the balance sheet item "Hedge Adjustments." It can describe the change to the position's fair value due to a hedged risk. In contrast to a financial position that is not part of a hedging relationship, in this implementation, this fair value change is recognized as profit or loss or as revaluation reserve. HedgeAdjustmentAmount can be based on GDT: Amount, Qualifier: HedgeAdjustment. StartOfDayHedgeAdjustmentAmount can be an amount with the corresponding currency unit. It can refer to a hedge adjustment before any event, such as master data change or business transaction, on this day and be based on GDT: Amount, Qualifier: HedgeAdjustment. StartOfDayFairValueAmount can be an amount with the corresponding currency unit. It can refer to an amount of a fair value calculated before any event, such as master data change or business transaction, on this day. The amount can be delivered with a clean price. It can be based on GDT: Amount, Qualifier: FairValue.

A FinancialInstrumentAnalyticalComponent can be an analytical component on the financial instrument. In some implementations, the component can be made at issuance of the financial instrument and not revised for subsequent changes in market interest rates, share prices, or other events that change the likelihood that an option included in the financial instrument may be exercised. FinancialInstrumentAnalyticalComponent, which can be based on GDT: FinancialInstrumentAnalyticalComponent, includes the following elements: ID, TypeCode, and CurrencyCode. FinancialInstrumentAnalyticalComponentID can be an identifier for a FinancialInstrumentAnalyticalComponent and can be based on GDT: FinancialInstrumentAnalyticalComponentID. FinancialInstrumentAnalyticalComponentTypeCode can be the coded representation of an analytical component of a financial instrument. It can be based on GDT: FinancialInstrumentAnalyticalComponentTypeCode. The CurrencyCode can be a coded representation of the currency. It can refer to the object currency of a FinancialInstrumentAnalyticalComponent and can be based on GDT: CurrencyCode. In some implementations, the FinancialInstrumentAnalyticalComponentID can be unique in the context of the FinancialInstrumentAnalyticalComponentTypeCode and the FinancialInstrumentAnalyticalComponentCurrencyCode.

Message Data Type FinInstrPosAcctgValnAnalRsltBulkCrteReqMsg

The FinInstrPosAcctgValnAnalRsltBulkCrteReqMsg message data type includes the business information that can be relevant for sending analytical results in a message, and the information that can be relevant for to creating an instance of FinancialInstrumentPositionAccountingValuationAnalyticalResult. It includes the packages MessageHeader and FinInstrPosAcctgValnAnalRsltCrteReqMsg. The FinInstrPosAcctgValnAnalRsltBulkCrteReqMsg message data type can provide the structure for the FinancialInstrumentPositionAccountingValuationAnalyticalResultBulkCreateRequest message type and the service-operations that are based on it. The FinInstrPosAcctgValnAnalRsltCrteReqMsg package can be of type FinInstrPosAcctgValnAnalRsltCrteReqMsg message data type.

Message Data Type FinInstrPosAcctgValnAnalRsltCancReqMsg

The FinInstrPosAcctgValnAnalRsltCancReqMsg message data type includes the business information that can be relevant for sending an analytical result in a message, and the information that can be relevant for canceling an instance of FinancialInstrumentPositionAccountingValuationAnalyticalResult. It includes the packages MessageHeader and FinancialInstrumentPositionAccountingValuationAnalyticalResult. The FinInstrPosAcctgValnAnalRsltCancReqMsg message data type can provide the structure for the FinancialInstrumentPositionAccountingValuationAnalyticalResultCancelRequest message type and the service-operations that are based on it. The FinancialInstrumentPositionAccountingValuationAnalyticalResult package can group FinancialInstrumentPositionAccountingValuationAnalyticalResult with its packages. It includes the CharacteristicValue package.

The FinancialInstrumentPositionAccountingValuationAnalyticalResult can be a result of the valuation of an individual financial instrument position in accordance with accounting specific rules and requirements. Examples for accounting valuation results can be the amortized costs or the hedge adjustment. In some implementations, different valuation results can be delivered separately. For example, a bank might want to deliver the amortized costs externally but have the hedge fair value calculated by Bank Analyzer. FinancialInstrumentPositionAccountingValuationAnalyticalResult can be subdivided into CharacteristicValue, which can further specify custom characteristics for the financial instrument position.

FinancialInstrumentPositionAccountingValuationAnalyticalResult includes the following elements: GroupID, FinancialInstrumentID, StandardisedFinancialInstrumentAccountID, FinancialInstrumentPositionCharacteristicValueCombinationID, SetOfBooksID, KeyDate, FinancialInstrumentCategoryCode, and CreationDateTime. A BusinessTransactionDocumentGroupID can uniquely identify a group of business documents that can be considered as one group within a business process. It can refer to the group of analytical results for which a analytical result was calculated. This element can be used in messages that cancel by reference and it can be based on GDT: BusinessTransactionDocumentGroupID. A BusinessTransactionDocumentID can be a unique identifier for a business transaction document. It can refer to the financial instrument for which the analytical result was calculated and can be based on GDT: BusinessTransactionDocumentID. A FinancialInstrumentAccountID can be a unique identifier of an account for financial instruments. It can refer to the account for the position of a standardized financial instrument. It can be based on GDT: FinancialInstrumentAccountID, Qualifier: Standardised.

A FinancialInstrumentPositionCharacteristicValueCombinationID can be a unique identifier for a FinancialInstrumentPositionCharacteristicValueCombination. It can refer to a financial instrument position. FinancialInstrumentPositionCharacteristicValueCombinationID can be based on GDT: FinancialInstrumentPositionCharacteristicValueCombinationID. A SetOfBooksID can be a unique identifier for a set of books. It can represent the accounting principle that was used for calculation and can be based on GDT: SetOfBooksID. KeyDate can be a specification of an exact day in the Gregorian calendar. It can be a date for which an analytical result was calculated and can be based on GDT: Date, qualifier: Key. FinancialInstrumentCategoryCode can be a coded representation of the category of a financial instrument for which an analytical result was calculated. It can be based on GDT: FinancialInstrumentCategoryCode. GLOBAL_DateTime can be an accurate-to-the-second time-point of a calendar day in time zone UTC. It can refer to the point in time at which the analytical result was calculated. GLOBAL_DateTime can be based on GDT: GLOBAL_DateTime, Qualifier: Creation.

In some implementations, StandardisedFinancialInstrumentAccountID may be relevant for standardized financial instruments, that is, for financial instruments where the financial instrument category code is equal to '1'. In some implementations, it may not be filled for non-standardized financial instruments, that is, for financial instruments where the financial instrument category code is equal to '2'.

Message Data Type FinInstrPosAcctgValnAnalRsltBulkCancReqMsg

The FinInstrPosAcctgValnAnalRsltBulkCancReqMsg message data type includes the business information that can be relevant for sending analytical results in a message, and the information that can be relevant for canceling an instance of FinancialInstrumentPosition-AccountingValuationAnalyticalResult. It includes the packages MessageHeader and FinInstrPosAcctgValnAnalRsltCancReqMsg. The FinInstrPosAcctgValnAnalRsltBulkCancReqMsg message data type can provide the structure for the FinancialInstrumentPositionAccountingValuationAnalyticalResultsCancelRequest message type and the service-operations that are based on it. The FinInstrPosAcctgValnAnalRsltCancReqMsg package can be of type FinInstrPosAcctgValnAnalRsltCancReqMsg.

Financial Instrument Position Accrual Analytical Result InterfacesFinancial Instrument Position Accrual Analytical Result can be part of the Financial Instruments Analytical Results Management process. Complex accrual calculations for specific financial instrument positions can be done in the operational Bank Account Contract Processing process component and the accrual results can be transferred directly to the Financial Instruments Analytical Results Management process component. The Financial Instruments Analytical Results Management process component can store the results of the Calculation and Valuation processes (either from inside the deployment unit Financial Services Analytics or outside) and can act as the single source of truth for multipurpose results, which means that it can serve as a starting point for the creation of all scenario-specific information such as specific reports. In the Financial Accounting for Banks scenario, relevant results are sub ledger documents, valuation results such as fair values, and calculation amounts like accruals. Financial Instrument Analytical Component can be an analytical view on the financial instrument. In some implementations, the component is made at issuance of the financial instrument and not revised for subsequent changes in market interest rates, share prices, or other event that changes the likelihood that an option included in the financial instrument may be exercised.

A CreateAccrualResult operation is associated with a FinancialInstrumentPosition-AccrualAnalyticalResultCreateRequest message type and a FinInstrPosAccrAnalRsltCrteReqMsg message data type. The CreateAccrualResult operation is a single creation of an accrual result, and it may provide accrual/deferral postings based on a financial instrument position. The accrual result is the amount recognized as expense or revenue as a result of an accrual or a deferral.

A CreateAccrualResults operation is associated with a FinancialInstrumentPosition-AccrualAnalyticalResultBulkCreateRequest message type and a FinInstrPosAccrAnalRsltBulkCrteReqMsg message data type. The CreateAccrualResults operation is a mass creation of an accrual result, and may provide accrual/deferral postings based on a financial instrument position. The accrual result is the amount recognized as expense or revenue as a result of an accrual or a deferral.

A CancelAccrualResult operation is associated with a FinancialInstrumentPosition-AccrualAnalyticalResultCancelRequest message type and a FinInstrPosAccrAnalRsltCancReqMsg message data type. The CancelAccrualResult operation is a single cancellation of an accrual result, and may reverse accrual/deferral postings based on a financial instrument position. The accrual result is the amount recognized as expense or revenue as a result of an accrual or a deferral.

A CancelAccrualResults operation is associated with a FinancialInstrumentPosition-AccrualAnalyticalResultBulkCancelRequest message type and a FinInstrPosAccrAnalRsltBulkCancReqMsg message data type. The CancelAccrualResults operation is a mass cancellation of an accrual result, and may reverse accrual/deferral postings based on a financial instrument position. The accrual result is the amount recognized as expense or revenue as a result of an accrual or a deferral.

Figures 1, 52:
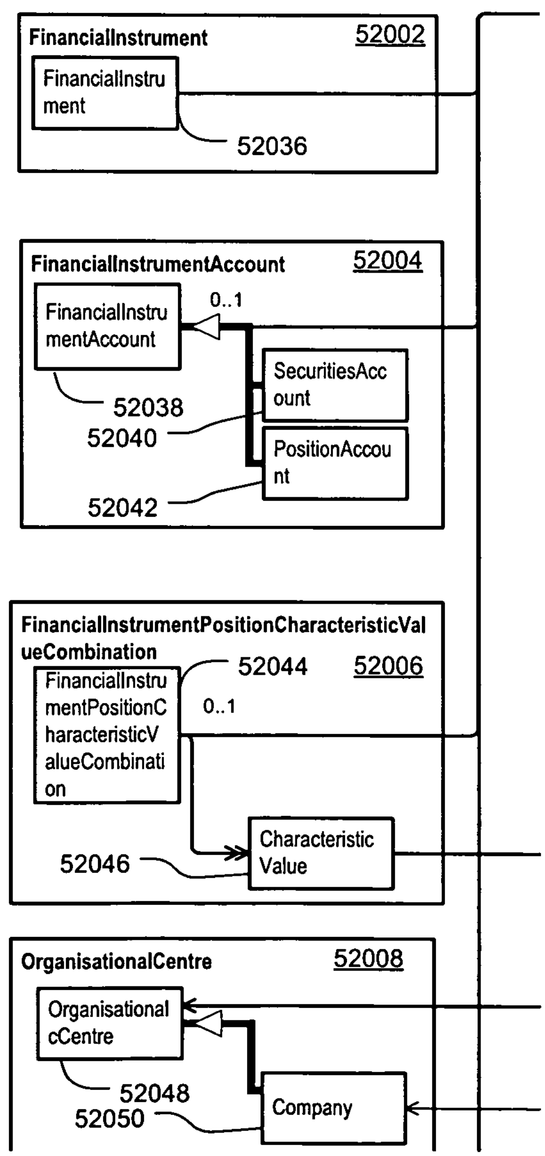
Figures 2, 52:
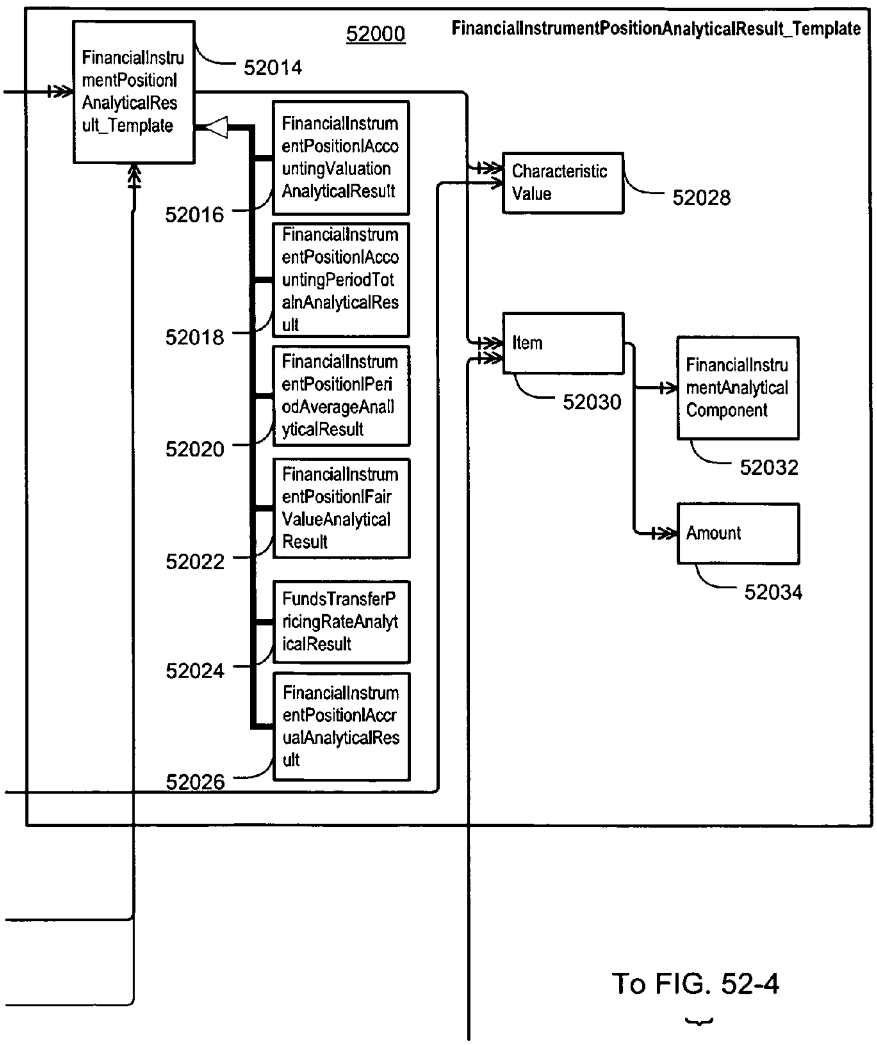
Figures 3, 52:
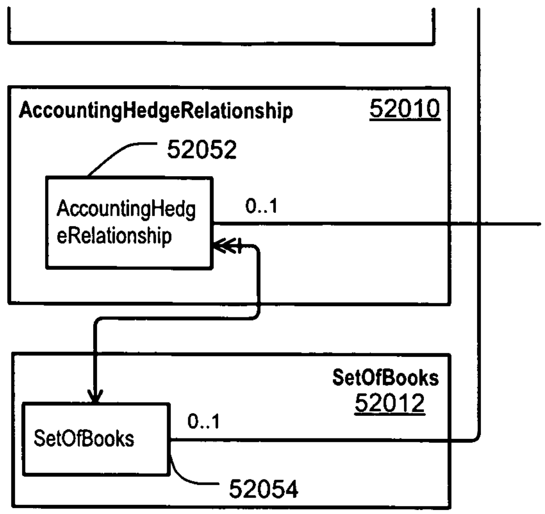

FIGS. 52-1 through 52-4 illustrate an example FinancialInstrumentPositionAccrualAnalyticalResult_Template business object model 52000. Specifically, this model depicts interactions among various components of the FinancialInstrumentPositionAccrualAnalyticalResult_Template, as well as external components that interact with the FinancialInstrumentPositionAccrualAnalyticalResult_Template (shown here as 52002 through 52012 and 52036 through 52054). FinancialInstrumentPosition-AccrualAnalyticalResult_Template 52000 includes elements 52014 through 52034. FinancialInstrumentPosition-AccrualAnalyticalResult_Template 52000 includes for example, a FinancialInstrumentPosition-AccrualAnalyticalResult 52026.

Figure 53:
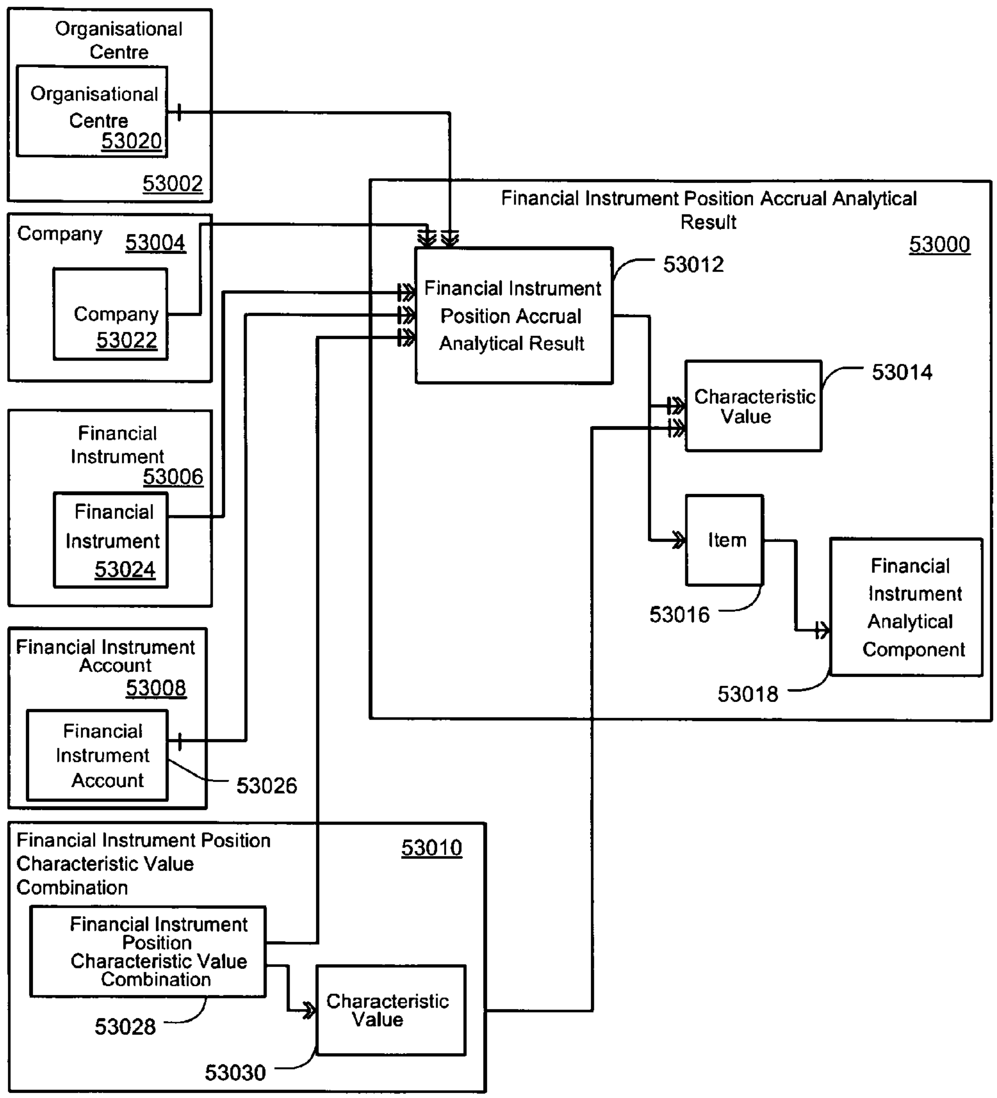
FIG. 53 shows an exemplary FinancialInstrumentPositionAnalyticalResult Object Model.

FIG. 53 illustrates an example Financial Instrument Position Accrual Analytical Result business object model 53000. Specifically, this model depicts interactions among various components of the Financial Instrument Position Accrual Analytical Result, as well as external components that interact with the Financial Instrument Position Accrual Analytical Result (shown here as 53002 through 53010 and 53020 through 53030). Financial Instrument Position Accrual Analytical Result 53000 includes elements 53012 through 53018. Financial Instrument Position Accrual Analytical Result 53000 includes for example, a Financial Instrument Analytical Component 53018.

The Financial Instrument Position Accrual Analytical Result can be a result of the determination of an individual financial instrument position's accrual amounts. Accrual amounts can be results of the calculation of an accrual or a deferral and recognized as either an expense or income. The business object Financial Instrument Position Accrual Analytical Result can belong to the process component Financial Instruments Calculation and Valuation Analytical Results Management. An accrual can be an anticipatory partial recognition of expense, related to a payable, or income, related to a receivable, that may occur in the future. A deferral can be the partial recognition of expense, related to a payable, or income, related to a receivable, that occurred in the past but has not yet been fully recognized. In the context of financial instruments, the most prevalent expenses or incomes are interest payments, different types of fees and commissions. In some implementations, for a specific expense or income, different accrual calculation methods may be applied, depending on the consumer of the accrual result.

The following composition relationships to subordinate nodes exist: from the Financial Instrument Position Accrual Analytical Result 53012 Root node to Characteristic Value 53014 node there is a 1:CN cardinality relationship; and from the Financial Instrument Position Accrual Analytical Result Root node to the Item 53016 node there is a 1:N cardinality relationship. From the Financial Instrument 53024 node within the business object Financial Instrument 53006, the following relationship exists: from the Financial Instrument node to the Financial Instrument Position Accrual Analytical Result node there is a 1:CN cardinality relationship. From the Financial Instrument Account 53026 node within the business object Financial Instrument Account 53008, the following relationship exists: from the Financial Instrument Account node to the Financial Instrument Position Accrual Analytical Result node there is a C:CN cardinality relationship. From the Financial Instrument Position Characteristic Value Combination 53028 node within the business object Financial Instrument Position Characteristic Value Combination 53010 the following relationship exists: from the Financial Instrument Position Characteristic Value Combination node to the Financial Instrument Position Accrual Analytical Result node there is a 1:CN cardinality relationship. From the Company 53022 node within the business object Company 53004 the following relationship exists: from the Company node to the Financial Instrument Position Accrual Analytical Result node there is a 1:CN cardinality relationship. From the Organisational 53020 Centre node within the business object Organisational Centre 53002 the following relationship exists: from the Organisational Centre node to the Financial Instrument Position Accrual Analytical Result node there is a C:CN cardinality relationship.

A Characteristic Value 53030 can be a combination of a characteristic and a characteristic value defining the Characteristic Value Combination 53028 of Financial Instrument Position Accrual Analytical Result. From the Characteristic Value 53030 node within the business object Financial Instrument Position Characteristic Value Combination 53010 the following relationship exists: from the Characteristic Value 53030 node to the Characteristic Value 53014 node within the business object Financial Instrument Position Accrual Analytical Result there is a 1:CN cardinality relationship.

The Item can represent a specific part of the financial instrument position for which the financial instrument position accrual analytical result is specified; for structured financial instruments, it can be subdivided by the financial instrument analytical component. The following composition relationships to subordinate nodes exist: from the Item node within the business object Financial Instrument Position Accrual Analytical Result to the Financial Instrument Analytical Component node within the business object Financial Instrument Position Accrual Analytical Result there is a 1:C cardinality relationship.

Figure 54:
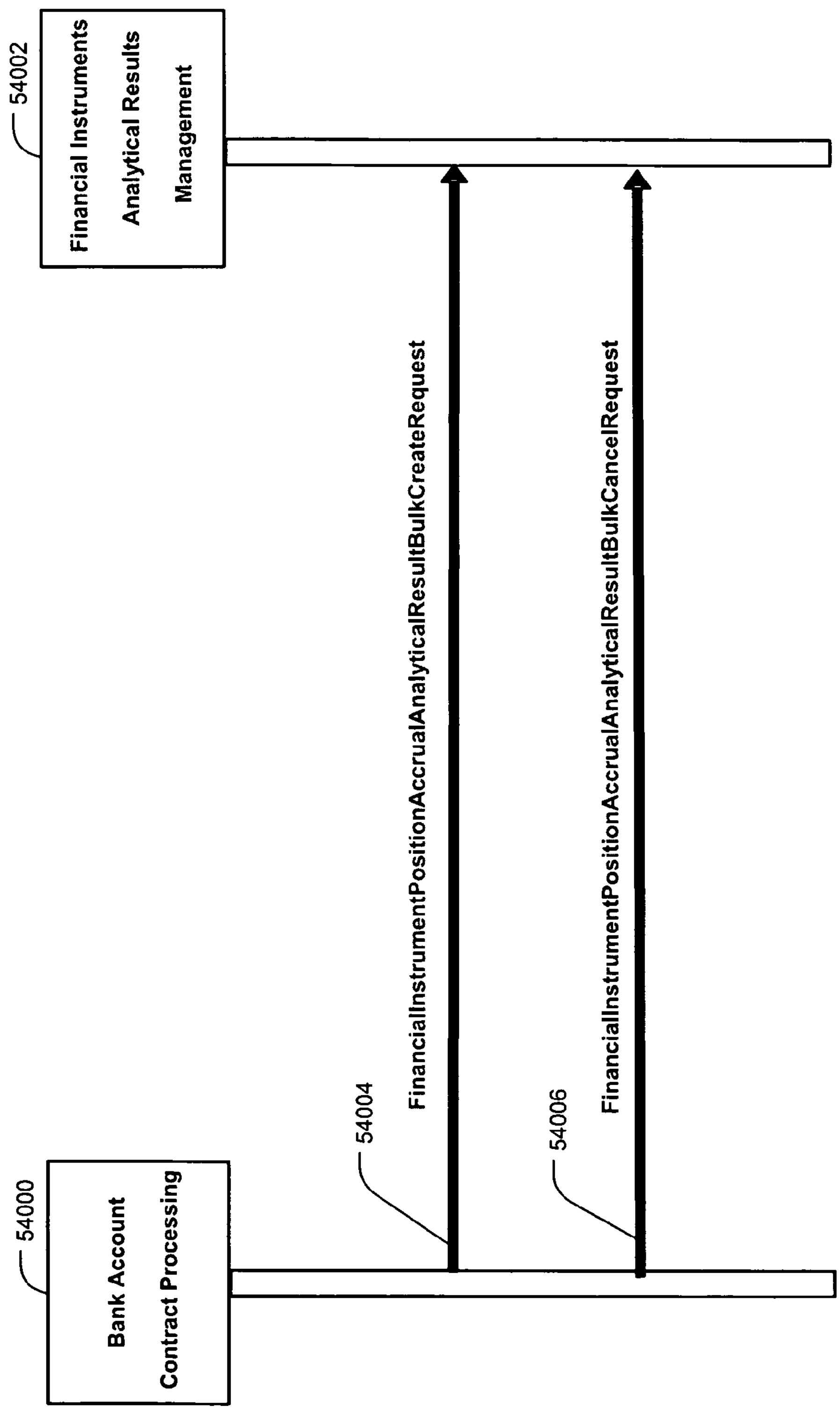
FIG. 54 shows an exemplary FIPAccrualAnalyticalResult Message Choreography.

The message choreography of FIG. 54 describes a possible logical sequence of messages that can be used to realize a process component Financial Instruments Calculation and Valuation Analytical Results Management.

A "Bank Account Contract Processing" system 54000 can request the creation of financial instrument position accrual analytical results from a "Financial Instruments Analytical Results Management" system 54002, using a FinancialInstrumentPositionAccrualAnalyticalResultBulkCreateRequest message 54004 as shown, for example in FIG. 54.

The "Bank Account Contract Processing" system 54000 can request the cancellation of financial instrument position accrual analytical results from the "Financial Instruments Analytical Results Management" system 54002, using a FinancialInstrumentPositionAccrualAnalyticalResultBulkCancelRequest message 54006 as shown, for example in FIG. 54.

Figure 55:
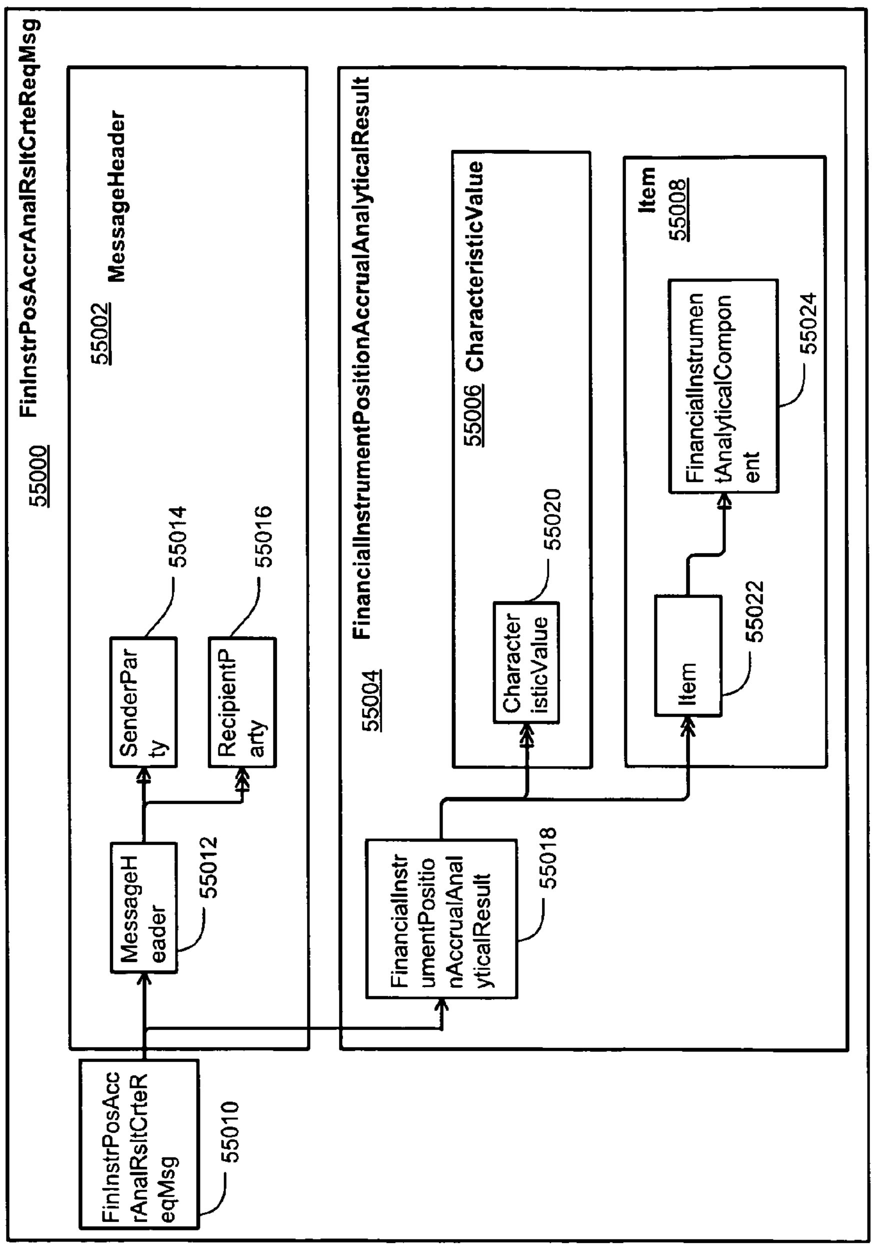
FIG. 55 shows an exemplary FinInstrPosAccrAnalRsltCrteReqMsg Message Data Type.

FIG. 55 illustrates one example logical configuration of FinInstrPosAccrAnalRsltCrteReqMsg message 55000. Specifically, this figure depicts the arrangement and hierarchy of various components such as one or more levels of packages, entities, and datatypes, shown here as 55002 through 55024. As described above, packages may be used to represent hierarchy levels. Entities are discrete business elements that are used during a business transaction. Data types are used to type object entities and interfaces with a structure. For example, FinInstrPosAccrAnalRsltCrteReqMsg message 55000 includes, among other things, MessageHeader 55012. Accordingly, heterogeneous applications may communicate using this consistent message configured as such.

Figure 56:
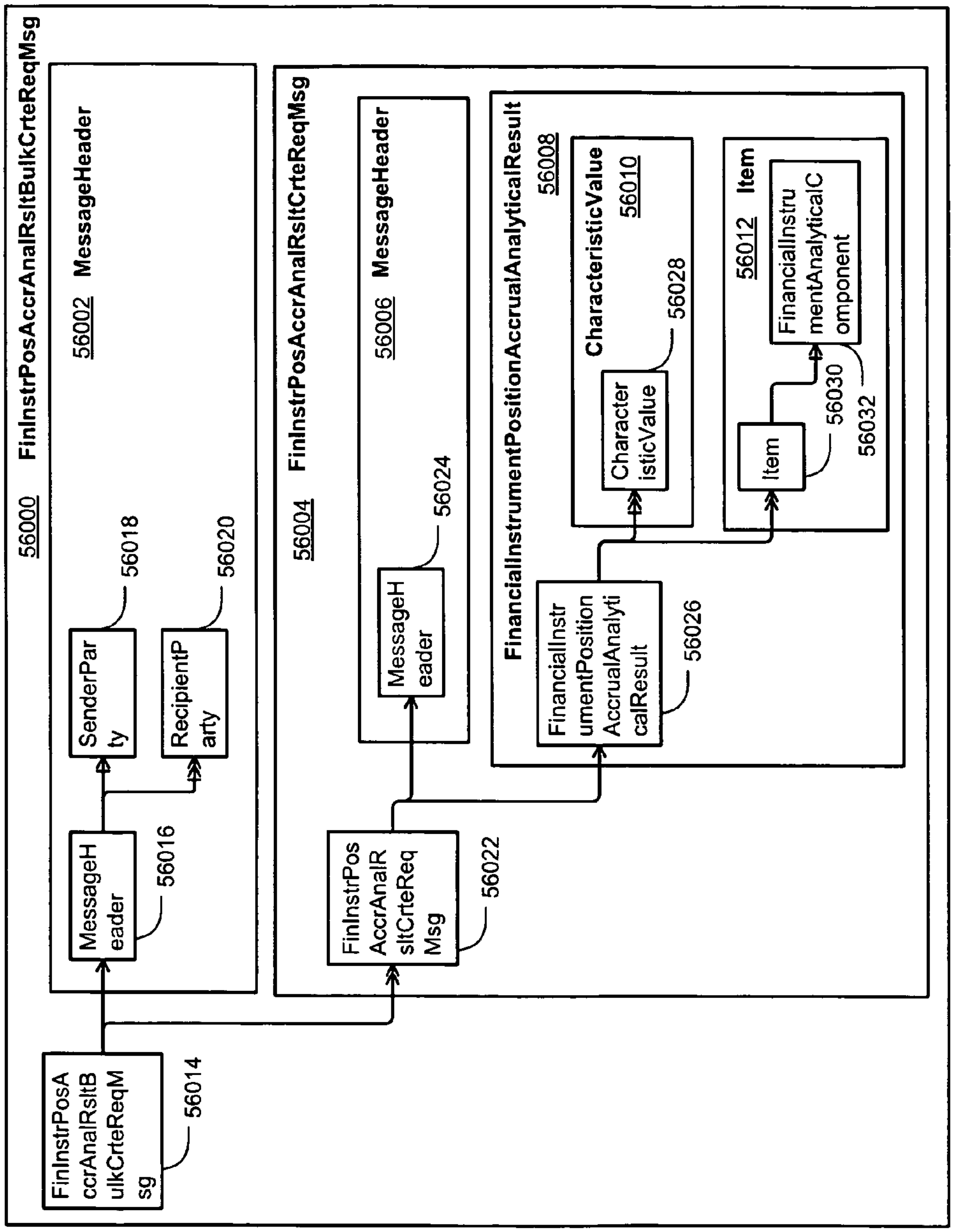
FIG. 56 shows an exemplary FinInstrPosAccrAnalRsltBulkCrteReqMsg Message Choreography.

Additionally, FIG. 56 illustrates one example logical configuration of FinInstrPosAccrAnalRsltBulkCrteReqMsg message 56000. Specifically, this figure depicts the arrangement and hierarchy of various components such as one or more levels of packages, entities, and datatypes, shown here as 56002 through 56032. As described above, packages may be used to represent hierarchy levels. Entities are discrete business elements that are used during a business transaction. Data types are used to type object entities and interfaces with a structure. For example, FinInstrPosAccrAnalRsltBulkCrteReqMsg message 56000 includes, among other things, MessageHeader 56024. Accordingly, heterogeneous applications may communicate using this consistent message configured as such.

Figure 57:
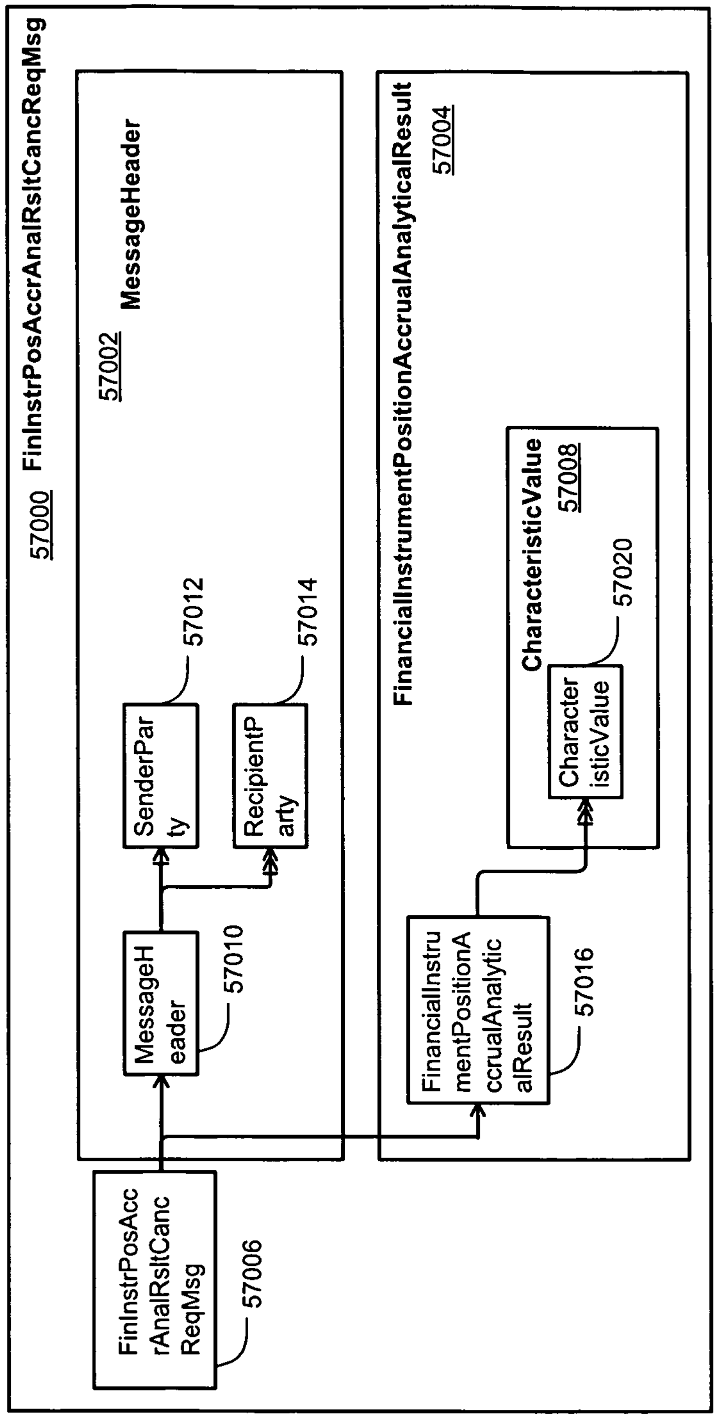
FIG. 57 shows an exemplary FinInstrPosAccrAnalRsltCancReqMsg Message Data Type.

Additionally, FIG. 57 illustrates one example logical configuration of FinInstrPosAccrAnalRsltCancReqMsg message 57000. Specifically, this figure depicts the arrangement and hierarchy of various components such as one or more levels of packages, entities, and datatypes, shown here as 57002 through 57016. As described above, packages may be used to represent hierarchy levels. Entities are discrete business elements that are used during a business transaction. Data types are used to type object entities and interfaces with a structure. For example, FinInstrPosAccrAnalRsltCancReqMsg message 57000 includes, among other things, MessageHeader 57010. Accordingly, heterogeneous applications may communicate using this consistent message configured as such.

Figure 58:
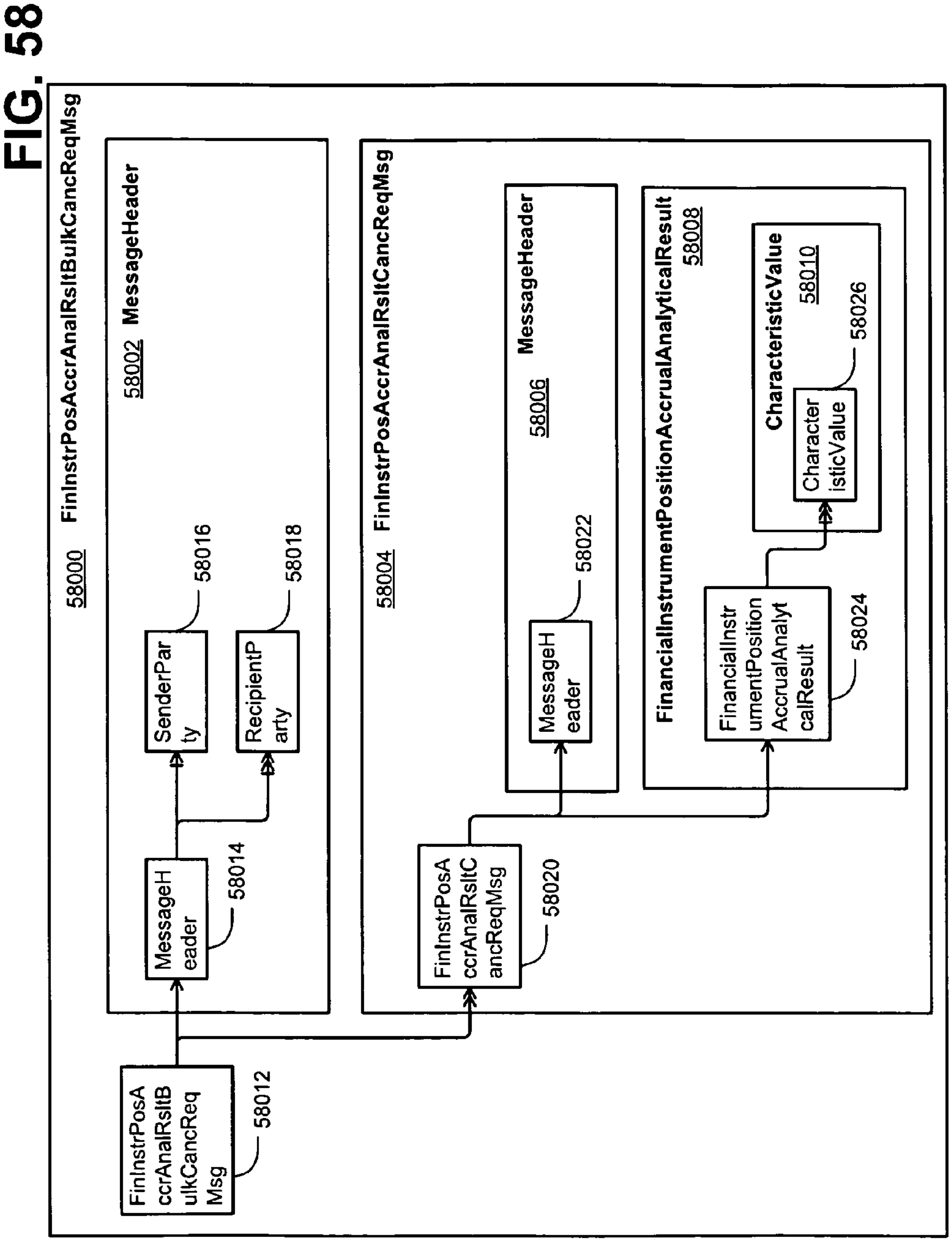
FIG. 58 shows an exemplary FinInstrPosAccrAnalRsltBulkCancReqMsg Message Data Type.

Additionally, FIG. 58 illustrates one example logical configuration of FinInstrPosAccrAnalRsltBulkCancReqMsg message 58000. Specifically, this figure depicts the arrangement and hierarchy of various components such as one or more levels of packages, entities, and datatypes, shown here as 58002 through 58026. As described above, packages may be used to represent hierarchy levels. Entities are discrete business elements that are used during a business transaction. Data types are used to type object entities and interfaces with a structure. For example, FinInstrPosAccrAnalRsltBulkCancReqMsg message 58000 includes, among other things, MessageHeader 58022. Accordingly, heterogeneous applications may communicate using this consistent message configured as such.

FIG. 59 illustrates one example logical configuration of FinInstrPosAccrAnalRsltBulkCancReqMsg 59000 element structure. Specifically, this figure depicts the arrangement and hierarchy of various components such as one or more levels of packages, entities, and datatypes, shown here as 59000 through 59014. As described above, packages may be used to represent hierarchy levels. Entities are discrete business elements that are used during a business transaction. Data types are used to type object entities and interfaces with a structure. For example, FinInstrPosAccrAnalRsltBulkCancReqMsg 59000 includes, among other things, a FinInstrPosAccrAnalRsltCancReqMsg 59010. Accordingly, heterogeneous applications may communicate using this consistent message configured as such.

FIG. 60 illustrates one example logical configuration of FinInstrPosAccrAnalRsltBulkCrteReqMsg 60000 element structure. Specifically, this figure depicts the arrangement and hierarchy of various components such as one or more levels of packages, entities, and datatypes, shown here as 60000 through 60014. As described above, packages may be used to represent hierarchy levels. Entities are discrete business elements that are used during a business transaction. Data types are used to type object entities and interfaces with a structure. For example, FinInstrPosAccrAnalRsltBulkCrteReqMsg 60000 includes, among other things, a FinInstrPosAccrAnalRsltCrteReqMsg 60010. Accordingly, heterogeneous applications may communicate using this consistent message configured as such.

FIGS. 61-1 through 61-3 illustrate one example logical configuration of FinInstrPosAccrAnalRsltCancReqMsg 61000 element structure. Specifically, this figure depicts the arrangement and hierarchy of various components such as one or more levels of packages, entities, and datatypes, shown here as 61000 through 61064. As described above, packages may be used to represent hierarchy levels. Entities are discrete business elements that are used during a business transaction. Data types are used to type object entities and interfaces with a structure. For example, FinInstrPosAccrAnalRsltCancReqMsg 61000 includes, among other things, a FinancialInstrumentPositionAccrualAnalyticalResult 61010. Accordingly, heterogeneous applications may communicate using this consistent message configured as such.

FIGS. 62-1 through 62-5 illustrate one example logical configuration of FinInstrPosAccrAnalRsltCrteReqMsg 62000 element structure. Specifically, this figure depicts the arrangement and hierarchy of various components such as one or more levels of packages, entities, and datatypes, shown here as 62000 through 62114. As described above, packages may be used to represent hierarchy levels. Entities are discrete business elements that are used during a business transaction. Data types are used to type object entities and interfaces with a structure. For example, FinInstrPosAccrAnalRsltCrteReqMsg 62000 includes, among other things, a FinancialInstrumentPositionAccrualAnalyticalResult 62010. Accordingly, heterogeneous applications may communicate using this consistent message configured as such.

FIGS. 63-1 through 63-5 illustrate one example logical configuration of FinInstrPosAccrAnalRsltMsg 63000 element structure. Specifically, this figure depicts the arrangement and hierarchy of various components such as one or more levels of packages, entities, and datatypes, shown here as 63000 through 63110. As described above, packages may be used to represent hierarchy levels. Entities are discrete business elements that are used during a business transaction. Data types are used to type object entities and interfaces with a structure. For example, FinInstrPosAccrAnalRsltMsg 63000 includes, among other things, a FinancialInstrumentPositionAccrualAnalyticalResult 63010. Accordingly, heterogeneous applications may communicate using this consistent message configured as such.

The FinInstrPosAccrAnalRsltMsg package includes a FinInstrPosAccrAnalRsltMsg entity. The FinInstrPosAccrAnalRsltMsg package includes various packages, namely a MessageHeader and a FinancialInstrumentPositionAccrualAnalyticalResult. The MessageHeader package is a BusinessDocumentMessageHeader data type. The MessageHeader package includes a MessageHeader entity.

The FinancialInstrumentPositionAccrualAnalyticalResult package includes a FinancialInstrumentPositionAccrualAnalyticalResult entity. The FinancialInstrumentPositionAccrualAnalyticalResult package includes various packages, namely a CharacteristicValue and an Item. The accrual result can be an amount recognized as an expense or income as a result of an accrual or a deferral. An accrual can be an anticipatory partial recognition of an expense, related to a payable, or income related to a receivable that may occur in the future. A deferral can be a partial recognition of an expense or income that occurred in the past but has not yet been fully recognized. In the context of financial instruments, the most prevalent expenses or incomes are interest payments, different types of fees, and commissions. For a specific expense or income, different accrual calculation methods can be applied, depending on the consumer of the accrual result. The FinancialInstrumentPositionAccrualAnalyticalResult entity includes various attributes, namely a GroupID, a BankAccountDocumentReconciliationKeyID, a FinancialInstrumentID, a StandardisedFinancialInstrumentAccountID, a FinancialInstrumentPositionCharacteristicValueCombinationID, a CompanyID, an OrganisationalCentreID, a KeyDate, a FinancialInstrumentCategoryCode, a CreationDateTime, a NominalAmount, a Quantity and an AccrualCalculationMethodCode.

The GroupID attribute is a BusinessTransactionDocumentGroupID data type. A BusinessTransactionDocumentGroupID can uniquely identify a group of business documents that can be considered as one group within a business process. BusinessTransactionDocumentGroupID can be a unique identifier of a group of analytical results to which an analytical result belongs. This element can be foreseen for future use in messages which cancel by reference. The BankAccountDocumentReconciliationKeyID attribute is a BankAccountDocumentReconciliationKeyID data type. BankAccountDocumentReconciliationKeyID can be an identifier for a reconciliation key of a bank account document. The FinancialInstrumentID attribute can be a BusinessTransactionDocumentID data type. A BusinessTransactionDocumentID is a unique identifier for a business transaction document. It can be a unique identifier of a financial instrument for which an analytical result was calculated. The StandardisedFinancialInstrumentAccountID attribute is a FinancialInstrumentAccountID; Qualifier 'Standardised' data type. A FinancialInstrumentAccountID can be a unique identifier of an account for financial instruments. It can be a unique identifier of an account for a position of a standardized financial instrument. The FinancialInstrumentPositionCharacteristicValueCombinationID attribute is a FinancialInstrumentPositionCharacteristicValueCombinationID data type. FinancialInstrumentPositionCharacteristicValueCombinationID can be an identifier for a CharacteristicValueCombination of a financial instrument position.

The CompanyID attribute is a CompanyID data type. A CompanyID can be an identifier for a company. It can be a unique identifier of a company which owns a financial instrument for which an analytical result was calculated. The OrganisationalCentreID attribute is an OrganisationalCentreID data type. An OrganisationalCentreID can be a unique identifier of an organizational unit. It can be an identifier of the organizational center which is responsible for a contribution of a financial instrument position to a bank's financial result. The KeyDate attribute is a Date, Qualifier: Key data type. A Date can be a specification of an exact day in the Gregorian calendar. KeyDate can be a date for which an analytical result was calculated. The FinancialInstrumentCategoryCode attribute is a FinancialInstrumentCategoryCode data type. The FinancialInstrumentCategoryCode can be a coded representation of a category of a financial instrument. It can be a coded representation of a category of a financial instrument for which an analytical result was calculated. The CreationDateTime attribute is a GLOBAL_DateTime, Qualifier: Creation data type. CreationDateTime can be an accurate-to-the-second time-point of a calendar day in time zone UTC. It can refer to a point in time at which an analytical result was calculated. The NominalAmount attribute is an Amount, Qualifier: Nominal data type. An Amount can be an amount with a corresponding currency unit. NominalAmount can be a nominal amount of a position of standardized financial instruments.

The Quantity attribute is a Quantity data type. A Quantity can be a non-monetary numerical specification of an amount in a unit of measurement. It can be a number of units in a position of standardized financial instruments. The AccrualCalculationMethodCode attribute is an AccrualCalculationMethodCode data type. An AccrualCalculationMethodCode can be a coded representation of a method for calculating accrual or deferral values for a period in time.

The CharacteristicValue package includes a CharacteristicValue entity. A CharacteristicValue can be a combination of a characteristic and a characteristic value defining a CharacteristicValueCombination of FinancialInstrument PositionAccrualAnalyticalResult. The CharacteristicValue entity includes various attributes, namely a FinancialInstrumentPositionCharacteristicID and a FinancialInstrumentPositionCharacteristicValue. The FinancialInstrumentPositionCharacteristicID attribute is a FinancialInstrumentPositionCharacteristicID data type. FinancialInstrumentPositionCharacteristicID can be an identifier for a financial instrument position characteristic. The FinancialInstrumentPositionCharacteristicValue attribute is a FinancialInstrumentPositionCharacteristicValue data type. FinancialInstrumentPositionCharacteristicValue can specify a value assigned to a FinancialInstrumentPositionCharacteristicID. The Item package is a FinInstrPosAccrualAnalyticalResultCreateRequestMessageFinInstrPosAccrualAnalyticalResultItem data type. The Item package includes an Item entity. The Item can represent a specific part of a financial instrument position for which a financial instrument position fair value analytical result is specified. For structured financial instruments, it can be subdivided by the financial instrument analytical component. The Item can represent a result of an accrual or deferral of a specific expense or income with a specific accrual or deferral calculation method. The Item entity includes various attributes, namely an ID, an AccrualItemTypeCode and an AccrualAmount. The Item entity includes a FinancialInstrumentAnalyticalComponentReference subordinate entity.

The ID attribute is a BusinessTransactionDocumentItemID data type. BusinessTransactionDocumentItemID can be a unique identifier of an item or sub item of a document within a business transaction and can be unique in the context of a business transaction. The AccrualItemTypeCode attribute is an AccrualItemTypeCode data type. AccrualAmountTypeCode can be a coded representation of the type of the amount of an accrual or deferral. The AccrualAmount attribute is an Amount, Qualifier: Accrual data type. The accrual result can be an amount recognized as expense or income as a result of an accrual or a deferral. FinancialInstrumentAnalyticalComponentReference can be a reference to an analytical view on a financial instrument. The component can be made at issuance of the financial instrument and might not be revised for subsequent changes in market interest rates, share prices, or other events that changes the likelihood that an option included in the financial instrument may be exercised.

The FinancialInstrumentAnalyticalComponentReference entity includes various attributes, namely an ID, a TypeCode and a CurrencyCode. The ID attribute is a FinancialInstrumentAnalyticalComponentID data type. A FinancialInstrumentAnalyticalComponentID can be an identifier for a financial instrument analytical component. The TypeCode attribute is a FinancialInstrumentAnalyticalComponentTypeCode data type. FinancialInstrumentAnalyticalComponentTypeCode can be a coded representation of the financial instrument analytical component. The CurrencyCode attribute is a CurrencyCode data type. CurrencyCode can be a coded representation of a currency.

FinancialInstrumentPositionFairValueAnalyticalResult Interfaces

The purpose of the Integrated Financial and Management Accounting scenario is twofold. First, it can provide subledger information relating to financial instruments for both external stakeholders and internal ones. This includes the calculation and storage of indirect costs and revenues on a single-transaction level. Second, it can provide net present value information as a basis for performance management of sales forces. In an Integrated Financial and Management Accounting scenario, the creation of profitability information can be integrated with Financial Accounting. In some implementations, this is why business transactions are processed in the Integrated Financial and Management Accounting scenario. The process component Financial Instruments Results Data Management can store the results of the information production processes, act as single source of truth for multipurpose results, and serve as a starting point for the creation of scenario-specific information, such as specific reports.

A FinancialInstrumentPositionFairValueAnalyticalResultCreateRequest can be a request to Financial Instruments Analytical Results Management to create a fair value analytical result. The structure of FinancialInstrumentPositionFairValueAnalyticalResultCreateRequest message type can be specified by a FinInstrPosFairValueAnalRsltCrteReqMsg message data type that includes the object FinancialInstrumentPositionFairValueAnalyticalResult. The FinancialInstrumentPositionFairValueAnalyticalResultCreateRequest can be a message that Financial Instrument Pricing can use to create a fair value analytical result.

A FinancialInstrumentPositionFairValueAnalyticalResultBulkCreateRequest is a request to Financial Instruments Analytical Results Management to create fair value analytical results. The structure of the FinancialInstrumentPositionFairValueAnalyticalResultBulkCreateRequest message type can be specified by the FinInstrPosFairValueAnalRsltBulkCrteReqMsg message data type that includes multiple messages FinancialInstrumentPositionFairValueAnalyticalResultCreateRequest. The FinancialInstrumentPositionFairValueAnalyticalResultBulkCreateRequest is a message that Financial Instrument Pricing can use to create fair value analytical results.

A FinancialInstrumentPositionFairValueAnalyticalResultCancelRequest is a request to Financial Instruments Analytical Results Management to cancel a fair value analytical result. The structure of FinancialInstrumentPositionFairValueAnalyticalResultCancelRequest message type can be specified by a FinInstrPosFairValueAnalRsltCancReqMsg message data type that includes the object FinancialInstrumentPositionFairValueAnalyticalResult. The FinancialInstrumentPositionFairValueAnalyticalResultCancelRequest is a message that Financial Instrument Pricing can use to cancel a fair value analytical result.

A FinancialInstrumentPositionFairValueAnalyticalResultBulkCancelRequest is a request to Financial Instruments Analytical Results Management to cancel fair value results. The structure of FinancialInstrumentPositionFairValueAnalyticalResultBulkCancelRequest message type can be specified by a FinInstrPosFairValueAnalRsltBulkCancReqMsg message data type that includes multiple messages FinancialInstrumentPositionFairValueAnalyticalResultCancelRequest. The FinancialInstrumentPositionFairValueAnalyticalResultBulkCancelRequest is a message that Financial Instrument Pricing can use to cancel fair value analytical results.

In a create and cancel process, the messages can be sent exactly once in order. The FinancialInstrumentPositionFairValueAnalyticalResult messages can be implemented by a message interface on the Financial Instruments Analytical Results Management side, FinancialInstrumentsAnalyticalResultsManagementFinancialInstrumentPositionFairValueAnalyticalResultIn. It includes the operations CreateResults and CancelResults.

Figures 1, 64:
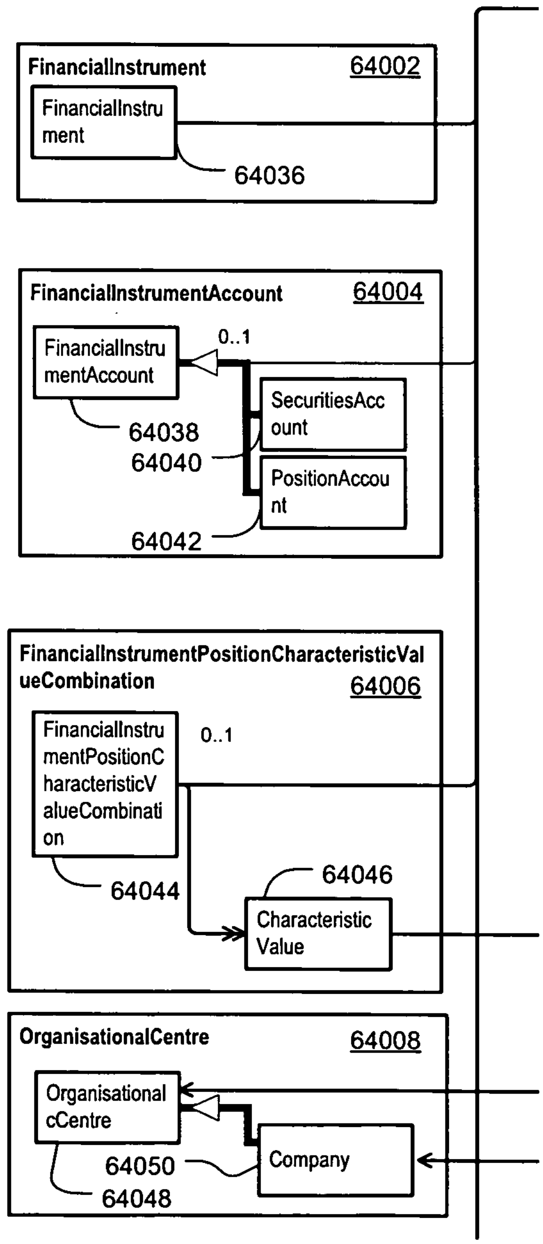
Figures 2, 64:
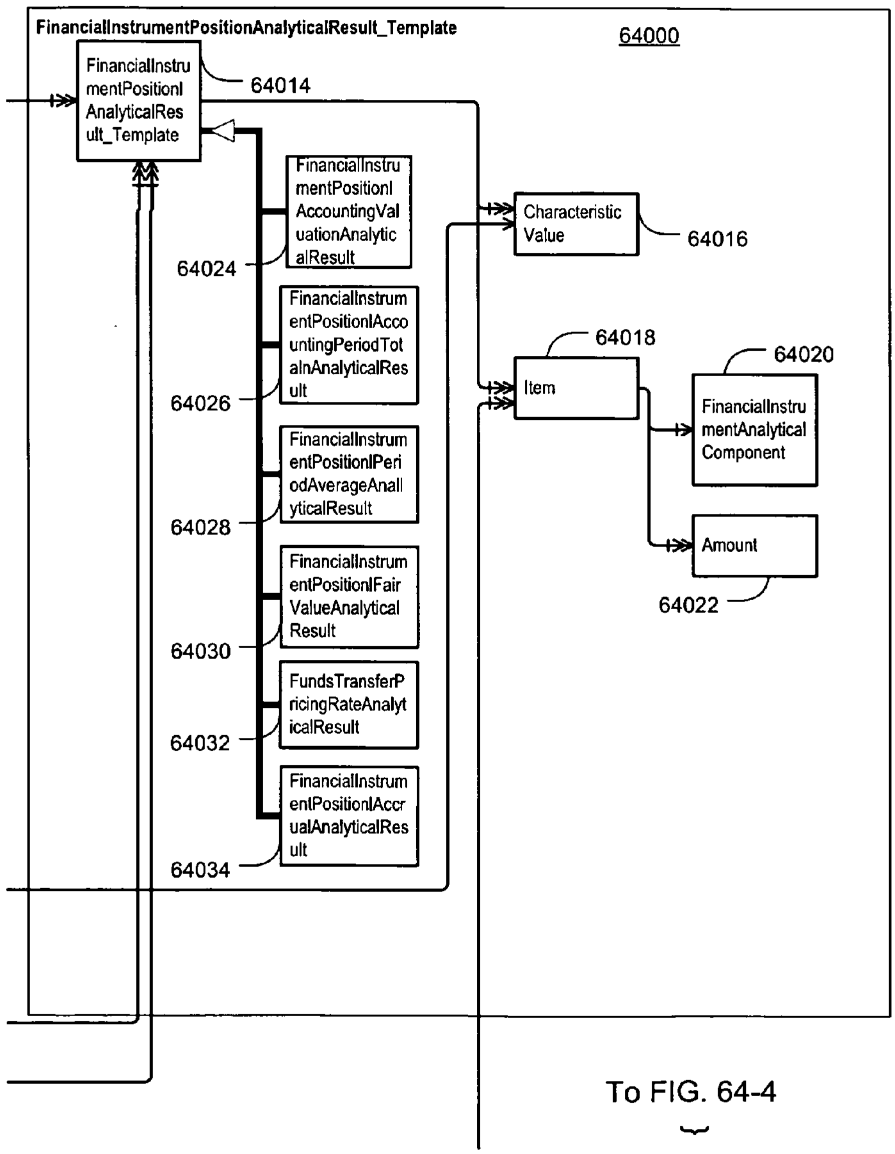
Figures 3, 64:
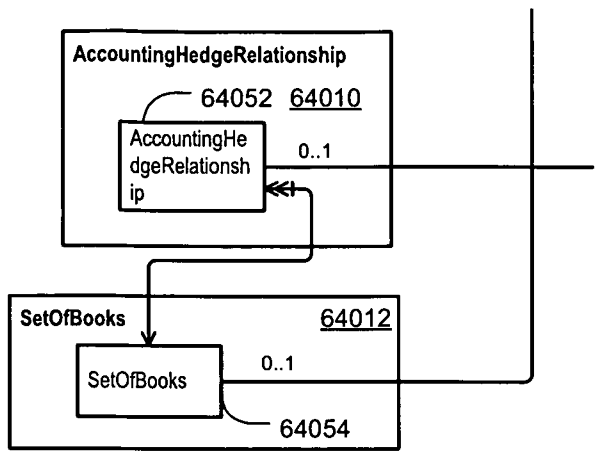

FIGS. 64-1 through 64-4 illustrate an example FinancialInstrumentPositionAnalyticalResult_Template business object model 64000. Specifically, this model depicts interactions among various components of the FinancialInstrumentPositionAnalyticalResult_Template, as well as external components that interact with the FinancialInstrumentPositionAnalyticalResult_Template (shown here as 64002 through 64012 and 64036 through 64054). FinancialInstrumentPositionAnalyticalResult_Template 64000 includes elements 64014 through 64034. FinancialInstrumentPositionAnalyticalResult_Template 64000 includes for example, a FinancialInstrumentPositionAccountingValuationAnalyticalResult 64024.

The FinancialInstrumentPositionFairValueAnalyticalResult 64030 can be a result of a determination of an individual financial instrument position's fair value. The fair value can be an amount for which an asset could be exchanged, or a liability settled, between independent, knowledgeable, willing parties. It can be expressed as dirty or as clean price. The difference of both is the amount of accrued interests. A CharacteristicValue 64046 can be a combination of a characteristic and a characteristic value defining the CharacteristicValueCombination 64044 of FinancialInstrumentPositionFairValueAnalyticalResult. The Item 64018 can represent a specific part of a financial instrument position for which a financial instrument position fair value analytical result can be specified. For structured financial instruments, it can be subdivided by the FinancialInstrumentAnalyticalComponent 64020. ItemFinancialInstrumentAnalyticalComponent can be an analytical view on a financial instrument. In some implementations, the component is made at issuance of a financial instrument and may not be revised for subsequent changes in market interest rates, share prices, or other events that change the likelihood that an option included in the financial instrument may be exercised.

Figure 65:
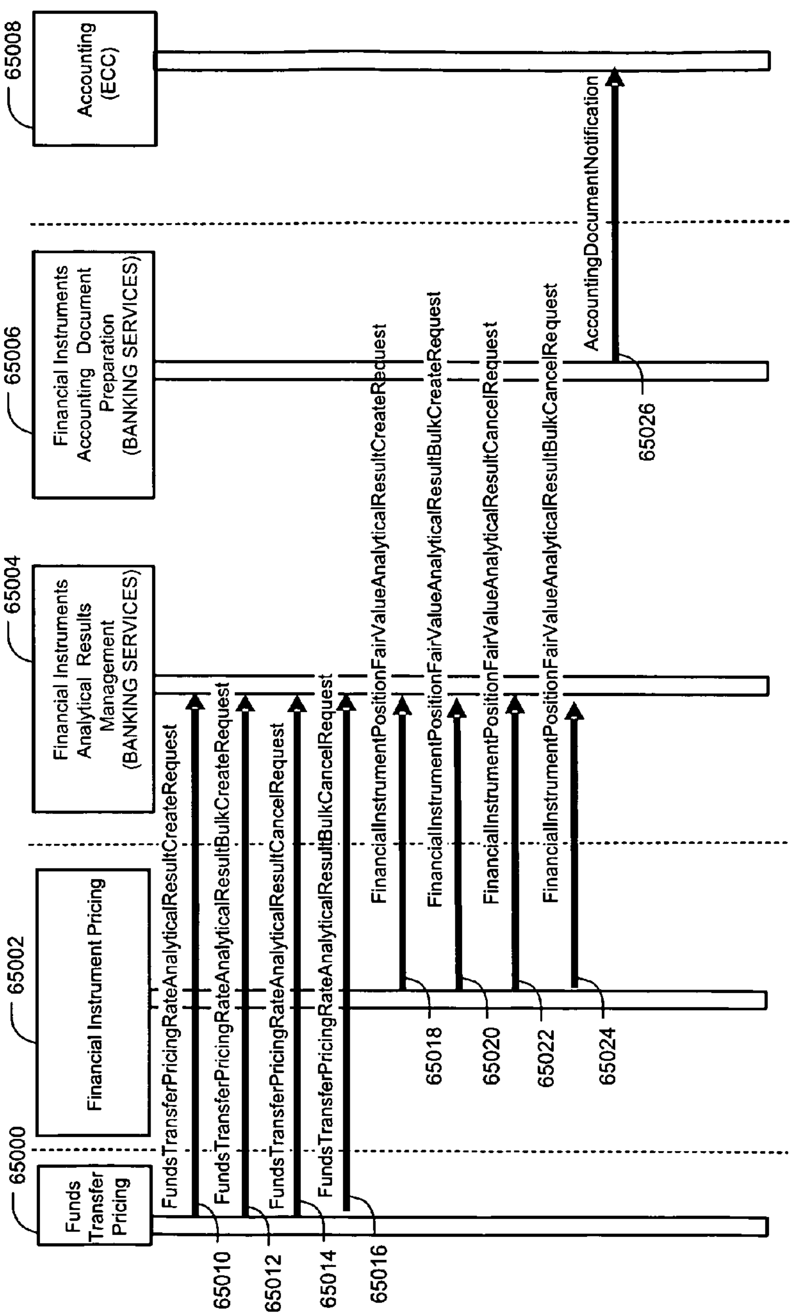
FIG. 65 shows an exemplary Financial Instrument Position Fair Value Analytical Result Message Choreography.

The message choreography of FIG. 65 describes a possible logical sequence of messages that can be used to realize an Integrated Financial and Management Accounting scenario. A "Funds Transfer Pricing" system 65000 can request the creation of a funds transfer pricing rate analytical result from a "Financial Instruments Analytical Results Management (Banking Services)" system 65004, using a FundsTransferPricingRateAnalyticalResultCreateRequest message 65010 as shown, for example, in FIG. 65. The "Funds Transfer Pricing" system 65000 can request the creation of funds transfer pricing rate analytical results from the "Financial Instruments Analytical Results Management (Banking Services)" system 65004, using a FundsTransferPricingRateAnalyticalResultBulkCreateRequest message 65012 as shown, for example, in FIG. 65.

The "Funds Transfer Pricing" system 65000 can request the cancellation of a funds transfer pricing rate analytical result from the "Financial Instruments Analytical Results Management (Banking Services)" system 65004, using a FundsTransferPricingRateAnalyticalResultCancelRequest message 65014 as shown, for example, in FIG. 65. The "Funds Transfer Pricing" system 65000 can request the cancellation of funds transfer pricing rate analytical results from the "Financial Instruments Analytical Results Management (Banking Services)" system 65004, using a FundsTransferPricingRateAnalyticalResultBulkCancelRequest message 65016 as shown, for example, in FIG. 65. A "Financial Instrument Pricing" system 65000 can request the creation of a financial instrument position fair value analytical result from the "Financial Instruments Analytical Results Management (Banking Services)" system 65004, using a FinancialInstrumentPositionFairValueAnalyticalResultCreateRequest message 65018 as shown, for example, in FIG. 65.

The "Financial Instrument Pricing" system 65000 can request the creation of financial instrument position fair value analytical results from the "Financial Instruments Analytical Results Management (Banking Services)" system 65004, using a FinancialInstrumentPositionFairValueAnalyticalResultBulkCreateRequest message 65020 as shown, for example, in FIG. 65. The "Financial Instrument Pricing" system 65000 can request the cancellation of a financial instrument position fair value analytical result from the "Financial Instruments Analytical Results Management (Banking Services)" system 65004, using a FinancialInstrumentPositionFairValueAnalyticalResultCancelRequest message 65022 as shown, for example, in FIG. 65. The "Financial Instrument Pricing" system 65000 can request the cancellation of financial instrument position fair value analytical results from the "Financial Instruments Analytical Results Management (Banking Services)" system 65004, using a FinancialInstrumentPositionFairValueAnalyticalResultBulkCancelRequest message 65024 as shown, for example, in FIG. 65.

A "Financial Instruments Accounting Document Preparation (Banking Services)" system 65006 can request the notification of accounting documentation from an "Accounting (ECC)" system 65008, using an AccountingDocumentNotification message 65026 as shown, for example, in FIG. 65.

Figure 66:
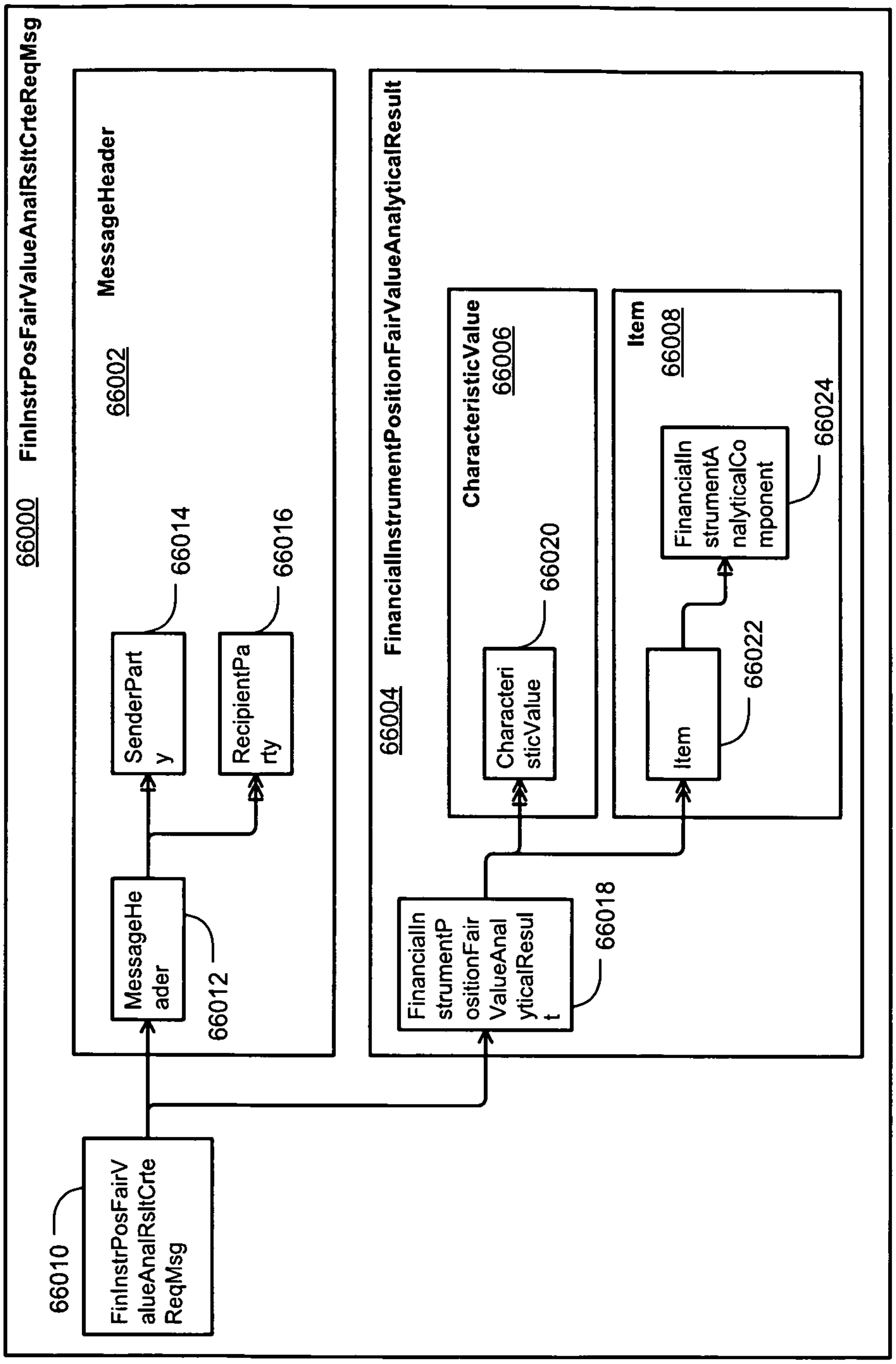
FIG. 66 shows an exemplary FinInstrPosFairValueAnalRsltCrteReqMsg Message Data Type.

FIG. 66 illustrates one example logical configuration of FinInstrPosFairValueAnalRsltCrteReqMsg message 66000. Specifically, this figure depicts the arrangement and hierarchy of various components such as one or more levels of packages, entities, and datatypes, shown here as 66002 through 66024. As described above, packages may be used to represent hierarchy levels. Entities are discrete business elements that are used during a business transaction. Data types are used to type object entities and interfaces with a structure. For example, FinInstrPosFairValueAnalRsltCrteReqMsg message 66000 includes, among other things, MessageHeader 66012. Accordingly, heterogeneous applications may communicate using this consistent message configured as such.

Figure 67:
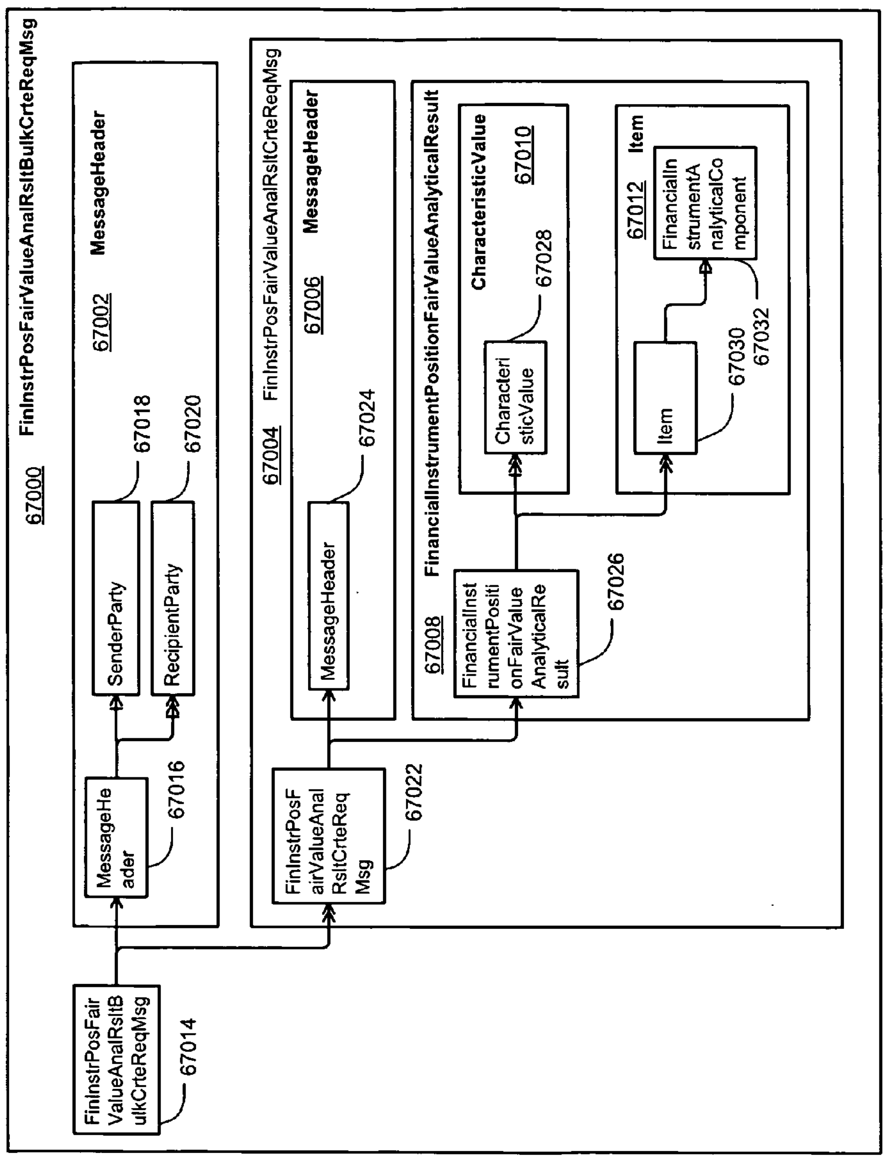
FIG. 67 shows an exemplary FinInstrPosFairValueAnalRsltBulkCrteReqMsg Message Data Type.

Additionally, FIG. 67 illustrates one example logical configuration of FinInstrPosFairValueAnalRsltBulkCrteReqMsg message 67000. Specifically, this figure depicts the arrangement and hierarchy of various components such as one or more levels of packages, entities, and datatypes, shown here as 67002 through 67032. As described above, packages may be used to represent hierarchy levels. Entities are discrete business elements that are used during a business transaction. Data types are used to type object entities and interfaces with a structure. For example, FinInstrPosFairValueAnalRsltBulkCrteReqMsg message 67000 includes, among other things, MessageHeader 67024. Accordingly, heterogeneous applications may communicate using this consistent message configured as such.

Figure 68:
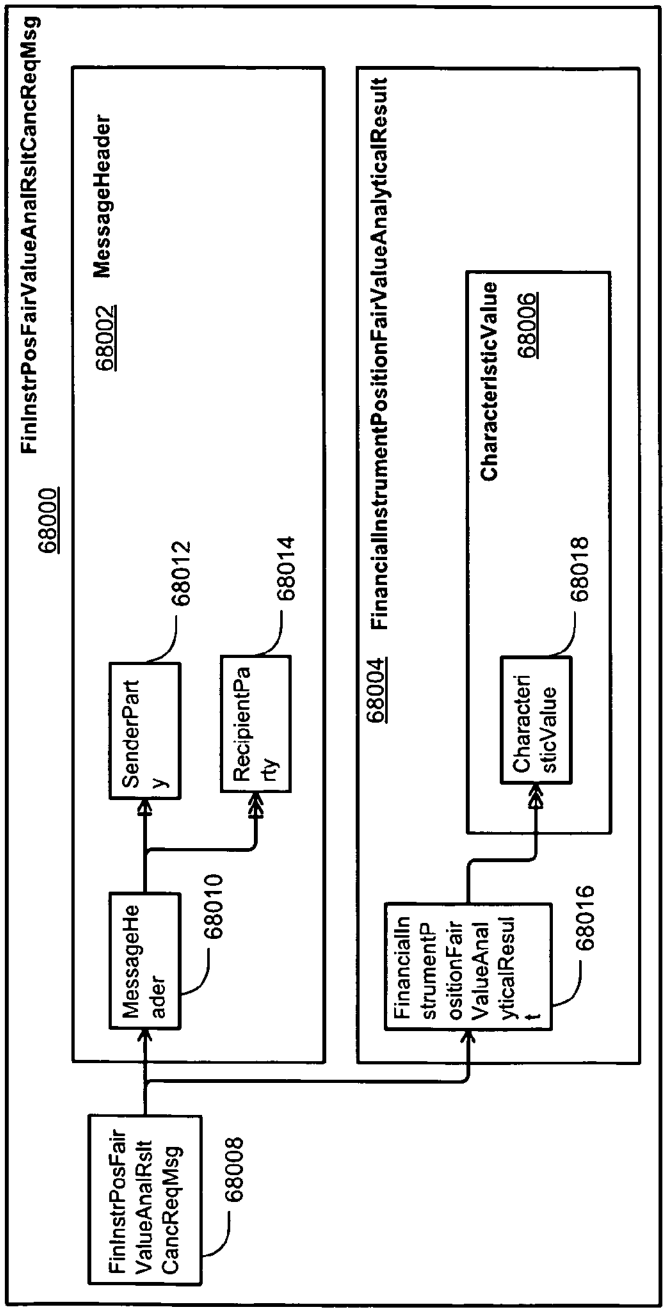
FIG. 68 shows an exemplary FinInstrPosFairValueAnalRsltCancReqMsg Message Data Type.

Additionally, FIG. 68 illustrates one example logical configuration of FinInstrPosFairValueAnalRsltCancReqMsg message 68000. Specifically, this figure depicts the arrangement and hierarchy of various components such as one or more levels of packages, entities, and datatypes, shown here as 68002 through 68018. As described above, packages may be used to represent hierarchy levels. Entities are discrete business elements that are used during a business transaction. Data types are used to type object entities and interfaces with a structure. For example, FinInstrPosFairValueAnalRsltCancReqMsg message 68000 includes, among other things, MessageHeader 68010. Accordingly, heterogeneous applications may communicate using this consistent message configured as such.

Figure 69:
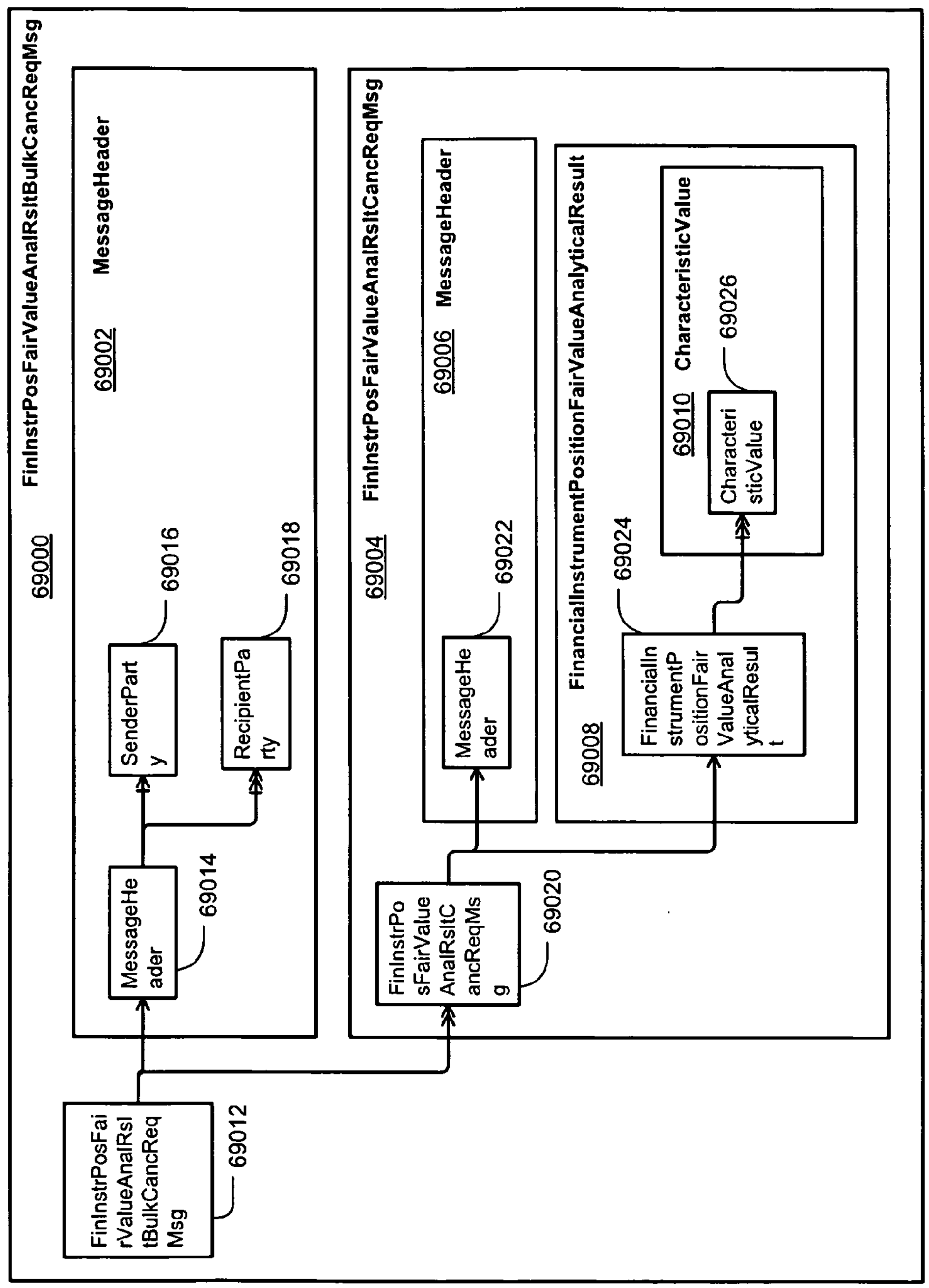
FIG. 69 shows an exemplary FinInstrPosFairValueAnalRsltBulkCancReqMsg Message Data Type.

Additionally, FIG. 69 illustrates one example logical configuration of FinInstrPosFairValueAnalRsltBulkCancReqMsg message 69000. Specifically, this figure depicts the arrangement and hierarchy of various components such as one or more levels of packages, entities, and datatypes, shown here as 69002 through 69026. As described above, packages may be used to represent hierarchy levels. Entities are discrete business elements that are used during a business transaction. Data types are used to type object entities and interfaces with a structure. For example, FinInstrPosFairValueAnalRsltBulkCancReqMsg message 69000 includes, among other things, MessageHeader 69014. Accordingly, heterogeneous applications may communicate using this consistent message configured as such.

FIG. 70 illustrates one example logical configuration of a FinInstrPosFairValueAnalRsltBulkCancReqMsg 70000 element structure. Specifically, this figure depicts the arrangement and hierarchy of various components such as one or more levels of packages, entities, and datatypes, shown here as 70000 through 70020. As described above, packages may be used to represent hierarchy levels. Entities are discrete business elements that are used during a business transaction. Data types are used to type object entities and interfaces with a structure. For example, the FinInstrPosFairValueAnalRsltBulkCancReqMsg 70000 includes, among other things, a FinInstrPosFairValueAnalRsltBulkCancReqMsg 70002. Accordingly, heterogeneous applications may communicate using this consistent message configured as such.

FIG. 71 illustrates one example logical configuration of a FinInstrPosFairValueAnalRsltBulkCrteReqMsg 71000 element structure. Specifically, this figure depicts the arrangement and hierarchy of various components such as one or more levels of packages, entities, and datatypes, shown here as 71000 through 71020. As described above, packages may be used to represent hierarchy levels. Entities are discrete business elements that are used during a business transaction. Data types are used to type object entities and interfaces with a structure. For example, the FinInstrPosFairValueAnalRsltBulkCrteReqMsg 71000 includes, among other things, a FinInstrPosFairValueAnalRsltBulkCrteReqMsg 71002. Accordingly, heterogeneous applications may communicate using this consistent message configured as such.

FIGS. 72-1 through 72-3 illustrate one example logical configuration of a FinInstrPosFairValueAnalRsltCancReqMsg 72000 element structure. Specifically, these figures depict the arrangement and hierarchy of various components such as one or more levels of packages, entities, and datatypes, shown here as 72000 through 72082. As described above, packages may be used to represent hierarchy levels. Entities are discrete business elements that are used during a business transaction. Data types are used to type object entities and interfaces with a structure. For example, the FinInstrPosFairValueAnalRsltCancReqMsg 72000 includes, among other things, a FinInstrPosFairValueAnalRsltCancReqMsg 72002. Accordingly, heterogeneous applications may communicate using this consistent message configured as such.

FIGS. 73-1 through 73-5 illustrate one example logical configuration of a FinInstrPosFairValueAnalRsltCrteReqMsg 73000 element structure. Specifically, these figures depict the arrangement and hierarchy of various components such as one or more levels of packages, entities, and datatypes, shown here as 73000 through 73158. As described above, packages may be used to represent hierarchy levels. Entities are discrete business elements that are used during a business transaction. Data types are used to type object entities and interfaces with a structure. For example, the FinInstrPosFairValueAnalRsltCrteReqMsg 73000 includes, among other things, a FinInstrPosFairValueAnalRsltCrteReqMsg 73002. Accordingly, heterogeneous applications may communicate using this consistent message configured as such.

Message Data Type FinInstrPosFairValueAnalRsltCrteReqMsg

In some implementations, the message data type FinInstrPosFairValueAnalRsltCrteReqMsg includes business information that is relevant for sending an analytical result in a message, and information which is used to create a financial instrument position fair value analytical result. It includes the MessageHeader package and FinancialInstrumentPositionFairValueAnalyticalResult package. The message data type FinInstrPosFairValueAnalRsltCrteReqMsg can provide a structure for the message type FinancialInstrumentPositionFairValueAnalyticalResultCreateRequest and for service-operations that are based on it.

A MessageHeader package groups business information that is relevant for sending an analytical result in a message. It includes the MessageHeader entity. A MessageHeader groups business information from the perspective of a sending application as follows: information to identify a business document in a message, information about the sender, and information about the recipient. The MessageHeader includes SenderParty and RecipientParty. It is of type GDT BusinessDocumentMessageHeader, whereby the following elements of the GDT can be used: ID and CreationDateTime. The ID and the CreationDateTime can be set by the sending application.

A SenderParty is a party responsible for sending an analytical result at a business application level. The SenderParty is of type GDT BusinessDocumentMessageHeaderParty. The SenderParty can be filled by the sending application to name a contact person for problems with the message. The SenderParty can be used to transfer a message and can be ignored by the receiving application. A RecipientParty is a party responsible for receiving an analytical result at a business application level. The RecipientParty is of type GDT BusinessDocumentMessageHeaderParty. The RecipientParty can be filled by a sending application to name a contact person for problems which occur with a message. The RecipientParty can be used to transfer a message and can be ignored by the receiving application.

A FinancialInstrumentPositionFairValueAnalyticalResult package groups the FinancialInstrumentPositionFairValueAnalyticalResult with its packages. It includes the packages CharacteristicValue and Item. The FinancialInstrumentPositionFairValueAnalyticalResult is a result of a determination of an individual financial instrument position's fair value. The fair value is an amount for which an asset could be exchanged, or a liability settled, between independent, knowledgeable, willing parties. It can be expressed as dirty or as clean price. The difference of both is the amount of accrued interests. FinancialInstrumentPositionFairValueAnalyticalResult can be subdivided into CharacteristicValue, which further specifies custom characteristics for the FinancialInstrumentPosition, and the Item, which further specifies the details of the analytical result. FinancialInstrumentPositionFairValueAnalyticalResult includes the following elements: GroupID, FinancialInstrumentID, StandardisedFinancialInstrumentAccountID, FinancialInstrumentPositionCharacteristicValueCombinationID, CompanyID, OrganisationalCentreID, KeyDate, FinancialInstrumentCategoryCode, CreationDateTime, Nominal Amount, and Quantity. A BusinessTransactionDocumentGroupID uniquely identifies a group of business documents that can be considered as one group within a business process. It can be a unique identifier of a group of analytical results to which an analytical result belongs. BusinessTransactionDocumentGroupID can be foreseen for future use in messages which cancel by reference. A BusinessTransactionDocumentGroupID can be based on GDT: BusinessTransactionDocumentGroupID. A BusinessTransactionDocumentID is a unique identifier for a business transaction document. It can be a unique identifier of a financial instrument for which an analytical result was calculated and can be based on GDT: BusinessTransactionDocumentID.

A FinancialInstrumentAccountID is a unique identifier of an account for financial instruments. It can be a unique identifier of an account for a position of a standardized financial instrument. It can be based on GDT: FinancialInstrumentAccountID, Qualifier: Standardised. FinancialInstrumentPositionCharacteristicValueCombinationID can be an identifier for a CharacteristicValueCombination of a financial instrument position and can be based on GDT:FinancialInstrumentPositionCharacteristicValueCombinationID. In some implementations, CompanyID is an identifier for a company and can be a unique identifier of a company which owns the financial instrument for which an analytical result was calculated. CompanyID can be based on GDT: CompanyID. An OrganisationalCentreID is a unique identifier of an organizational unit. It can be an identifier of an organizational center which is responsible for the contribution of the financial instrument position to a bank's financial result. OrganisationalCentreID can be based on GDT: OrganisationalCentreID. A Date can be a specification of an exact day in the Gregorian calendar. It can be a date for which an analytical result was calculated and can be based on GDT: Date; Qualifier: Key.

The FinancialInstrumentCategoryCode can be a coded representation of a category of a financial instrument. It can be a coded representation of a category of a financial instrument for which an analytical result was calculated. FinancialInstrumentCategoryCode can be based on GDT: FinancialInstrumentCategoryCode. GLOBAL_DateTime can be an accurate-to-the-second time-point of a calendar day in time zone UTC. It can refer to a point in time at which an analytical result was calculated. It can be based on GDT: GLOBAL_DateTime. An Amount can be an amount with a corresponding currency unit. It can be the nominal amount of a position of standardized financial instruments and it can be based on GDT: Amount, Qualifier: Nominal. A Quantity can be a non-monetary numerical specification of an amount in a unit of measurement. It can be a number of units in a position of standardized financial instruments. A Quantity can be based on GDT: Quantity.

In some implementations, the elements StandardisedFinancialInstrumentAccountID, NominalAmount, and Quantity can be relevant for standardized financial instruments (e.g., for financial instruments with FinancialInstrumentCategoryCode equal to '1'). In some implementations, NominalAmount and Quantity may not be filled for non-standardized financial instruments (i.e., for financial instruments with FinancialInstrumentCategoryCode equal to '2'). The CharacteristicValue package groups a set of characteristics with its values. It includes the CharacteristicValue entity. A CharacteristicValue can be a combination of a characteristic and a characteristic value defining the CharacteristicValueCombination of FundsTransferPricingRateAnalyticalResult. The CharacteristicValue can include the following elements: FinancialInstrumentPositionCharacteristicID, and FinancialInstrumentPositionCharacteristicValue. FinancialInstrumentPositionCharacteristicID can be an identifier for a financial instrument position characteristic. It can be based on GDT: FinancialInstrumentPositionCharacteristicID. FinancialInstrumentPositionCharacteristicValue can specify a value assigned to a FinancialInstrumentPositionCharacteristicID. FinancialInstrumentPositionCharacteristicValue can be based on GDT: FinancialInstrumentPositionCharacteristicValue.

The Item package groups fair value results differentiated on item level. It includes the Item entity. The Item can represent a specific part of a FinancialInstrumentPosition for which the FinancialInstrumentPositionFairValueAnalyticalResult is specified. For structured financial instruments, Item can be subdivided by the FinancialInstrumentAnalyticalComponent. FinancialInstrumentPositionFairValueAnalyticalResultItem can be subdivided into a FinancialInstrumentAnalyticalComponent, which can be based on GDT: FinancialInstrumentAnalyticalComponent, which can further specify details of an Item of an analytical result. FinancialInstrumentPositionFairValueAnalyticalResultItem can include the following elements: ID, CleanPriceAmount, and DirtyPriceAmount. A BusinessTransactionDocumentItemID can be a unique identifier of an item or sub item of a document within a business transaction and can be unique in the context of the business transaction. BusinessTransactionDocumentItemID can be a unique identifier of the FinancialInstrumentPositionFairValueAnalyticalResultItem and can be based on GDT:

BusinessTransactionDocumentItemID. CleanPriceAmount can be an amount with a corresponding currency unit. It can be a fair price of a financial instrument position without accrued interests. CleanPriceAmount can be based on GDT: Amount, qualifier: CleanPrice. DirtyPriceAmount can be an amount with a corresponding currency unit. It can be a fair price of a financial instrument position including accrued interests. DirtyPrice Amount can be based on GDT: Amount, qualifier: DirtyPrice.

FinancialInstrumentAnalyticalComponent can be an analytical view on a financial instrument. In some implementations, the component can be made at issuance of a financial instrument and may not be revised for subsequent changes in market interest rates, share prices, or other events that change the likelihood that an option included in the financial instrument may be exercised. FinancialInstrumentComponent, which can be based on GDT: FinancialInstrumentAnalyticalComponent, can include the following elements: ID, TypeCode, CurrencyCode, and CurrencyCode. ID can be an identifier of a financial instrument analytical component and can be based on GDT: FinancialInstrumentAnalyticalComponentID. TypeCode can be a coded representation of a financial instrument analytical component. TypeCode can be based on GDT: FinancialInstrumentAnalyticalComponentTypeCode. The CurrencyCode can be a coded representation of currency. It can be a coded representation of an object currency of a financial instrument analytical component, and can be based on GDT: CurrencyCode. In some implementations, the FinancialInstrumentAnalyticalComponentID is unique in the context of the FinancialInstrumentAnalyticalComponentTypeCode and the FinancialInstrumentAnalyticalComponentCurrencyCode.

Message Data Type FinInstrPosFairValueAnalRsltBulkCrteReqMsg

In some implementations, the message data type FinInstrPosFairValueAnalRsltBulkCrteReqMsg includes business information that is relevant for sending analytical results in a message and information which is used to create funds-transfer-pricing-rate analytical results. FinInstrPosFairValueAnalRsltBulkCrteReqMsg includes the MessageHeader package and FinInstrPosFairValueAnalRsltCrteReqMsg package. In some implementations, the message data type FinInstrPosFairValueAnalRsltBulkCrteReqMsg can provide a structure for the message type FinancialInstrumentPositionFairValueAnalyticalResultsCreateRequest and for service-operations that are based on it. The FinInstrPosFairValueAnalRsltCrteReqMsg package can be typed with the message data type FinInstrPosFairValueAnalRsltCrteReqMsg.

Message Data Type FinInstrPosFairValueAnalRsltCancReqMsg

In some implementations, the message data type FinInstrPosFairValueAnalRsltCancReqMsg includes business information that is relevant for sending an analytical result in a message and information that is relevant to cancel a created FinancialInstrumentPositionFairValueAnalyticalResult. FinInstrPosFairValueAnalRsltCancReqMsg includes the MessageHeader package and FinancialInstrumentPositionFairValueAnalyticalResult package. The message data type FinInstrPosFairValueAnalRsltCancReqMsg can provide a structure for the message type FinancialInstrumentPositionFairValueAnalyticalResultCancelRequest and for service-operations that are based on it. A FinancialInstrumentPositionFairValueAnalyticalResult package groups the FinancialInstrumentPositionFairValueAnalyticalResult with its packages. It includes the CharacteristicValue package.

The FinancialInstrumentPositionFairValueAnalyticalResult is a result of a determination of an individual financial instrument position's fair value. The fair value can be an amount for which an asset could be exchanged, or a liability settled, between independent, knowledgeable, willing parties. It can be expressed as dirty or as clean price. The difference of both is the amount of accrued interests. FinancialInstrumentPositionFairValueAnalyticalResult can be subdivided into CharacteristicValue, which can further specify custom characteristics for a FinancialInstrumentPosition. FinancialInstrumentPositionFairValueAnalyticalResult includes the following elements: GroupID, FinancialInstrumentID, StandardisedFinancialInstrumentAccountID, FinancialInstrumentPositionCharacteristicValueCombinationID, KeyDate, FinancialInstrumentCategoryCode, and CreationDateTime. In some implementations, BusinessTransactionDocumentGroupID uniquely identifies a group of business documents that can be considered as one group within a business process. It can be a unique identifier of a group of analytical results to which an analytical result belongs. BusinessTransactionDocumentGroupID can be foreseen for future use in messages which cancel by reference. BusinessTransactionDocumentGroupID can be based on GDT: BusinessTransactionDocumentGroupID. In some implementations, a BusinessTransactionDocumentID can be a unique identifier for a business transaction document. BusinessTransactionDocumentID can be a unique identifier of a financial instrument for which an analytical result was calculated, and can be based on GDT: BusinessTransactionDocumentID.

In some implementations, a FinancialInstrumentAccountID can be a unique identifier of an account for financial instruments and a unique identifier of an account for a position of a standardized financial instrument. FinancialInstrumentAccountID can be based on GDT: FinancialInstrumentAccountID, Qualifier: Standardised. FinancialInstrumentPositionCharacteristicValueCombinationID can be an identifier for a CharacteristicValueCombination of a financial instrument position. FinancialInstrumentPositionCharacteristicValueCombinationID can be based on GDT: FinancialInstrumentPositionCharacteristicValueCombinationID. In some implementations, KeyDate can be a Date for a specification of an exact day in the Gregorian calendar. It can be a date for which an analytical result was calculated and can be based on GDT: Date; Qualifier: Key. The FinancialInstrumentCategoryCode can be a coded representation of a category of a financial instrument. It can be a coded representation of a category of a financial instrument for which an analytical result was calculated and can be based on GDT: FinancialInstrumentCategoryCode. GLOBAL_DateTime can be an accurate-to-the-second time-point of a calendar day in time zone UTC. GLOBAL_DateTime can refer to a point in time at which an analytical result was calculated. GLOBAL_DateTime can be based on GDT: GLOBAL_DateTime.

In some implementations, the element StandardisedFinancialInstrumentAccountID is relevant for standardized financial instruments (e.g., for financial instruments with FinancialInstrumentCategoryCode equal to '1'). In some implementations, the element StandardisedFinancialInstrumentAccountID may not be filled for non-standardized financial instruments (e.g., for financial instruments with FinancialInstrumentCategoryCode equal to '2'). The CharacteristicValue package groups a set of characteristics with its values. It includes the CharacteristicValue entity. A CharacteristicValue can be a combination of a characteristic and a characteristic value defining the CharacteristicValue-Combination of FundsTransferPricingRateAnalyticalResult. The CharacteristicValue can include the following elements: FinancialInstrumentPositionCharacteristicID and Financial-InstrumentPositionCharacteristicValue. FinancialInstrumentPositionCharacteristicID can be an identifier for a financial instrument position characteristic. It can be based on GDT: FinancialInstrumentPositionCharacteristicID. FinancialInstrumentPositionCharacteristicValue can specify a value assigned to a FinancialInstrumentPosition-CharacteristicID. FinancialInstrumentPosition-CharacteristicValue can be based on GDT: FinancialInstrumentPositionCharacteristicValue.

Message Data Type FinInstrPosFairValueAnalRslt-BulkCancReqMsg

The message data type FinInstrPosFairValueAnalRslt-BulkCancReqMsg can include business information that is relevant for sending analytical results in a message and information that is relevant to cancel FinancialInstrumentPositionFairValueAnalyticalResults. It can include the MessageHeader package and FinInstrPosFairValueAnalRsltCancReqMsg package. The message data type FinInstrPosFairValueAnalRslt-BulkCancReqMsg can provide a structure for the message type FinancialInstrumentPosition-FairValueAnalyticalResultCancelRequest and for service-operations that are based on it. The FinancialInstrumentPositionFairValueAnalyticalResultCancelRequest package can be typed with the message data type FinInstrPosFairValueAnalRsltCancReqMsg.

Profitability Analysis Interfaces

One of the purposes of the Profitability Analysis scenario may be to provide a key figure based view of the performance of a bank. This may include two main aspects. The first main aspect may be calculation and storage of two values, usually indirect costs and revenues, on the granularity of a single financial instrument. The second main aspect may be analysis of the cost and revenue information used in reporting. In some implementations the Profitability Analysis scenario may not be integrated with the Financial Accounting scenario. Direct costs and revenues from external transactions, often between the bank and its customers, may be delivered from, in some implementations, an external financial accounting system process component Ledger for Financial Instruments.

The Financial Instruments Analytical Results Management process component corresponds to the analytical Results Data Layer (RDL). It may store analytical results of the valuation and calculation processes, may act as a single source of truth for multipurpose analytical results, and may serve as a starting point for the creation of some or all scenario-specific information such as specific reports. FinancialInstrumentPositionPeriodAverageVolumeAnalyticalResultCreateRequest may be a request to Financial Instruments Analytical Results Management to create an instance of FinancialInstrumentPosition-PeriodAverageVolumeAnalyticalResult. The structure of the FinancialInstrumentPosition-PeriodAverageVolumeAnalyticalResultCreateRequest message type may be specified by the FinInstrPosPerAvgVol-AnalRsltCrteReqMsg message data type that may include the object FinancialInstrumentPosition-PeriodAverageVolumeAnalyticalResult. FinancialInstrumentPositionPeriodAverageVolumeAnalyticalResultCreateRequest may be a message that a ledger for financial instruments may use to create an analytical result for a period average volume.

FinancialInstrumentPosition-PeriodAverageVolumeAnalyticalResultBulkCreateRequest may be a request to Financial Instruments Analytical Results Management to create several instances of FinancialInstrumentPositionPeriodAverageVolumeAnalyticalResult. The structure of the FinancialInstrumentPosition-PeriodAverageVolumeAnalyticalResultBulkCreateRequest message type may be specified by the FinInstrPosPerAvgVol-AnalRsltBulkCrteReqMsg message data type that may include multiple FinInstrPosPerAvgVolAnalRslt-CrteReqMsgs. FinancialInstrumentPosition-PeriodAverageVolumeAnalyticalResultBulkCreateRequest may be a message that a ledger for financial instruments may use to create several analytical results for a period average volume.

FinancialInstrumentPosition-PeriodAverageVolumeAnalyticalResultCancelRequest may be a request to Financial Instruments Analytical Results Management to cancel an instance of FinancialInstrumentPositionPeriodAverageVolumeAnalyticalResult. The structure of the FinancialInstrumentPosition-PeriodAverageVolumeAnalyticalResultCancelRequest message type may be specified by the FinInstrPosPerAvgVol-AnalRsltCancReqMsg message data type that may include the object FinancialInstrumentPosition-PeriodAverageVolumeAnalyticalResult. FinancialInstrumentPositionPeriodAverageVolumeAnalyticalResultCancelRequest may be a message that a ledger for financial instruments may use to cancel an analytical result for a period average volume.

FinancialInstrumentPosition-PeriodAverageVolumeAnalyticalResultBulkCancelRequest may be a request to Financial Instruments Analytical Results Management to cancel one or more instances of FinancialInstrumentPositionPeriodAverageVolumeAnalyticalResult. The structure of the FinancialInstrumentPosition-PeriodAverageVolumeAnalyticalResultBulkCancelRequest message type may be specified by the FinInstrPosPerAvgVol-AnalRsltBulkCancReqMsg message data type that includes the FinancialInstrumentPosition-PeriodAverageVolumeAnalyticalResultCancelRequest message. The FinancialInstrumentPosition-PeriodAverageVolumeAnalyticalResultBulkCancelRequest may be a message that a ledger for financial instruments may use to cancel several analytical results for a period average volume.

In the create and cancel process, the messages may be sent exactly once in order. FinancialInstrumentPosition-PeriodAverageVolumeAnalyticalResult messages may be implemented by one or more message interfaces on the Financial Instruments Analytical Results Management side. FinancialInstrumentPosPeriodAverageVolumeAnalyticalResultIn may include the operations CreateResults and/or CancelResults.

Figures 1, 74:
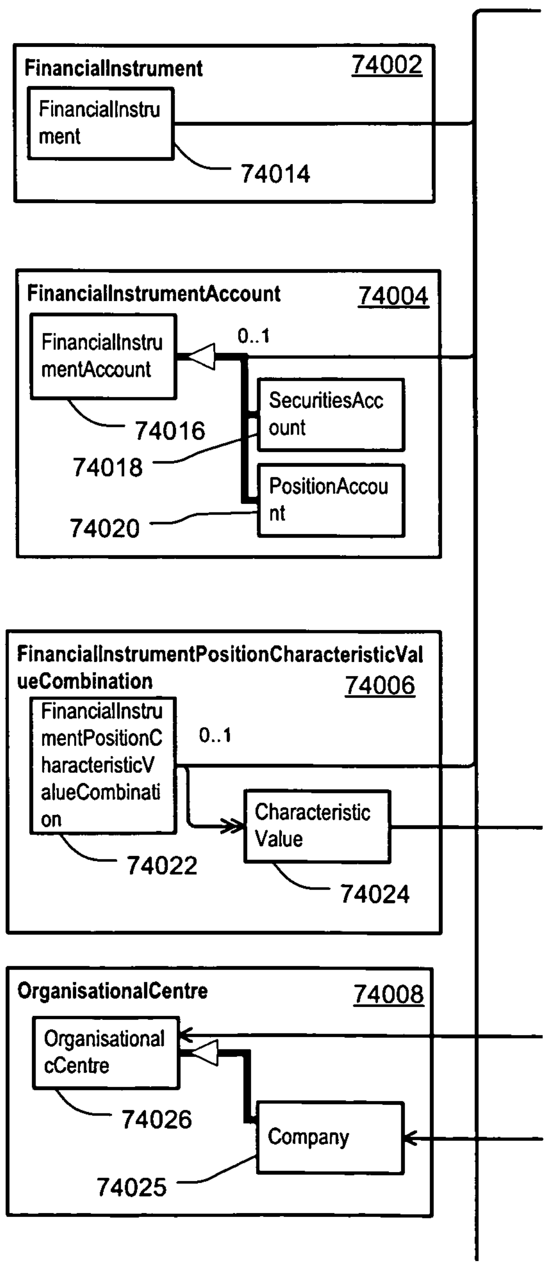
Figures 2, 74:
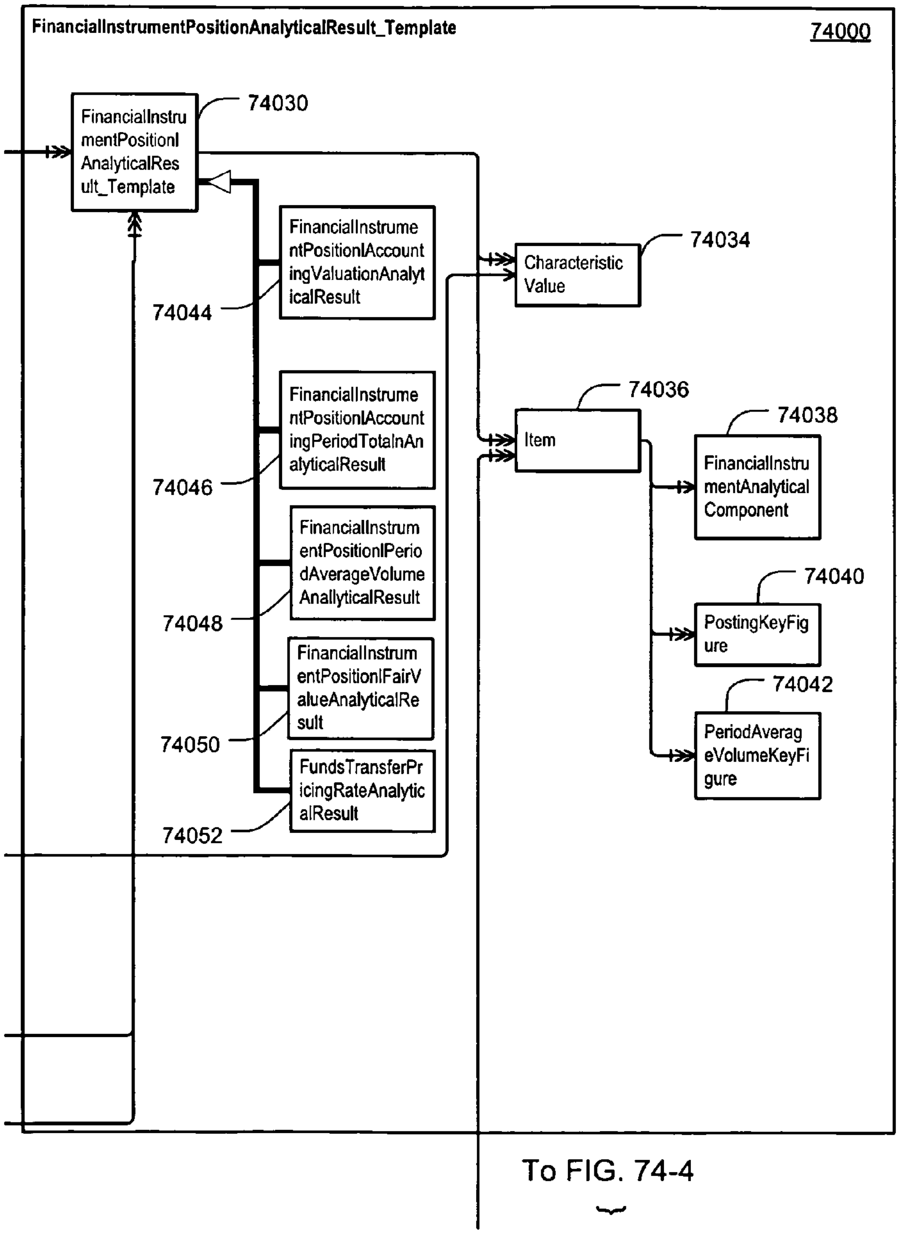
Figures 3, 74:
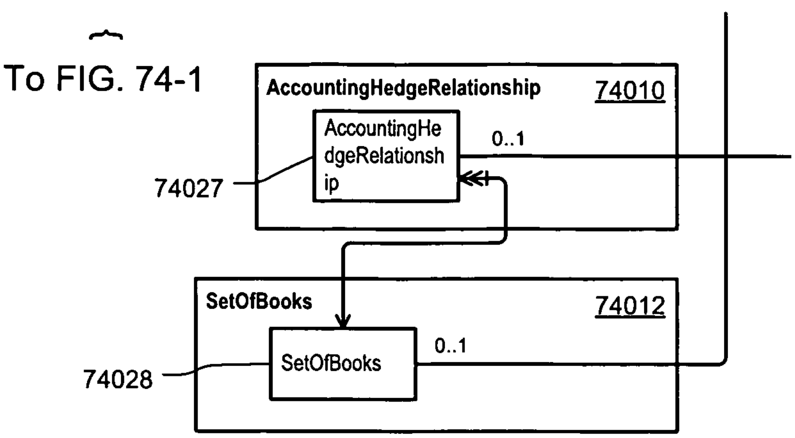

FIGS. 74-1 through 74-4 illustrate an example Financial-InstrumentPositionAnalyticalResult_Template business object model 74000. Specifically, this model depicts interactions among various components of the FinancialInstrument-PositionAnalyticalResult_Template, as well as external components that interact with the FinancialInstrumentPositionAnalyticalResult_Template (shown here as 74002 through 74012 and 74014 through 74028). FinancialInstrumentPositionAnalyticalResult_Template 74000 includes elements 74030 through 74052. FinancialInstrumentPositionAnalyticalResult_Template 74000 includes for example, a FinancialInstrumentPositionFairValueAnalyticalResult 74050.

Figure 75:
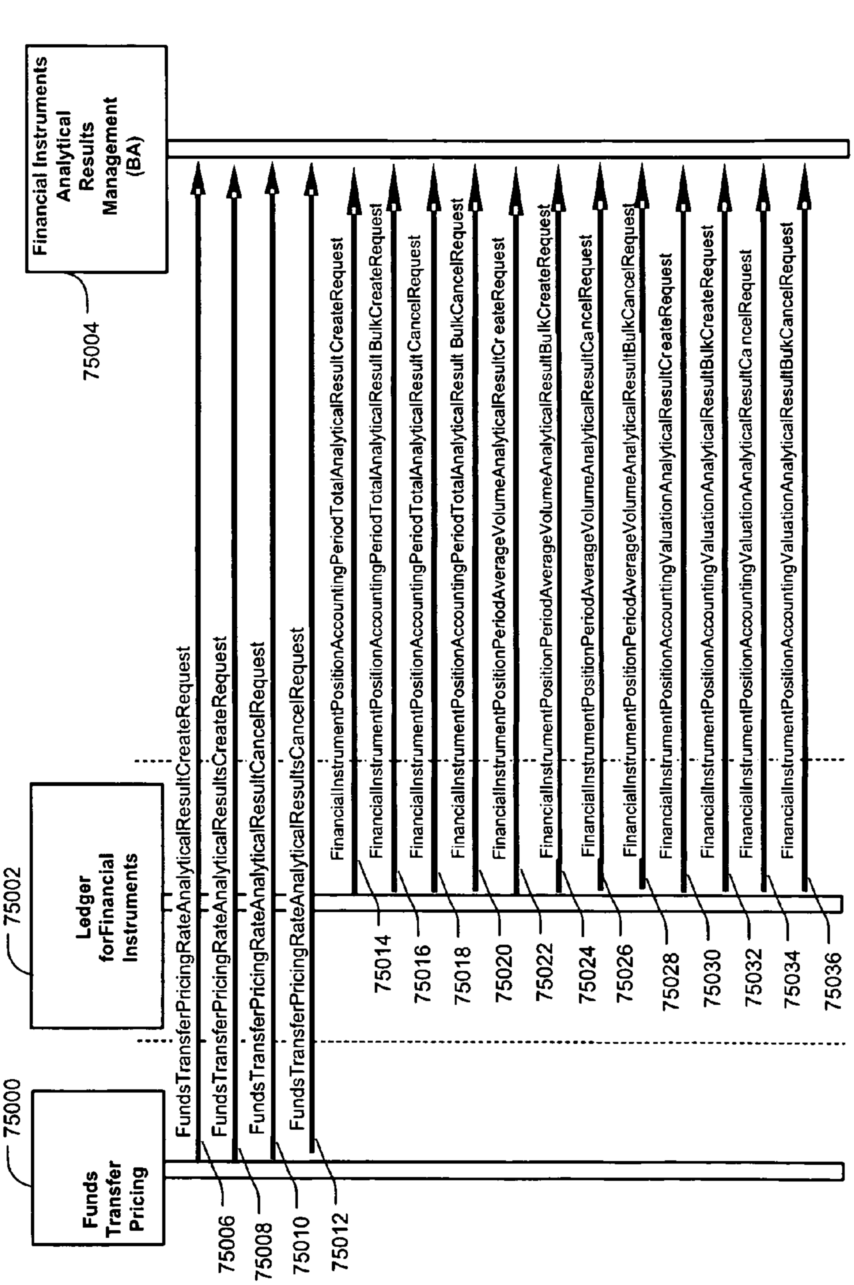
FIG. 75 shows an exemplary Financial Instrument Position Period Average Volume Analytical Result Message Choreography.

The message choreography of FIG. 75 describes a possible logical sequence of messages that can be used to realize a Profitability Analysis business scenario. A "Funds Transfer Pricing" system 75000 can request the creation of a funds transfer pricing rate analytical result from a "Financial Instruments Analytical Results Management (BA)" system 75004, using a FundsTransferPricingRateAnalyticalResultCreateRequest message 75006 as shown, for example, in FIG. 75. The "Funds Transfer Pricing" system 75000 can request the creation of funds transfer pricing rate analytical results from the "Financial Instruments Analytical Results Management (BA)" system 75004, using a FundsTransferPricingRateAnalyticalResultsCreateRequest message 75008 as shown, for example, in FIG. 75.

The "Funds Transfer Pricing" system 75000 can request the cancellation of the funds transfer pricing rate analytical result from the "Financial Instruments Analytical Results Management (BA)" system 75004, using a FundsTransferPricingRateAnalyticalResultCancelRequest message 75010 as shown, for example, in FIG. 75. The "Funds Transfer Pricing" system 75000 can request the cancellation of funds transfer pricing rate analytical results from the "Financial Instruments Analytical Results Management (BA)" system 75004, using a FundsTransferPricingRateAnalyticalResultsCancelRequest message 75012 as shown, for example, in FIG. 75.

A "Ledger for Financial Instruments" system 75002 can request the creation of a financial instrument position accounting period total analytical result from the "Financial Instruments Analytical Results Management (BA)" system 75004, using a FinancialInstrumentPositionAccountingPeriodTotalAnalyticalResultCreateRequest message 75014 as shown, for example, in FIG. 75. The "Ledger for Financial Instruments" system 75002 can request the creation of financial instrument position accounting period total analytical results from the "Financial Instruments Analytical Results Management (BA)" system 75004, using a FinancialInstrumentPositionAccountingPeriodTotalAnalyticalResultBulkCreateRequest message 75016 as shown, for example, in FIG. 75. The "Ledger for Financial Instruments" system 75002 can request the cancellation of the financial instrument position accounting period total analytical result from the "Financial Instruments Analytical Results Management (BA)" system 75004, using a FinancialInstrumentPositionAccountingPeriodTotalAnalyticalResultCancelRequest message 75018 as shown, for example, in FIG. 75.

The "Ledger for Financial Instruments" system 75002 can request the cancellation of financial instrument position accounting period total analytical results from the "Financial Instruments Analytical Results Management (BA)" system 75004, using a FinancialInstrumentPositionAccountingPeriodTotalAnalyticalResultBulkCancelRequest message 75020 as shown, for example, in FIG. 75. The "Ledger for Financial Instruments" system 75002 can request the creation of a financial instrument position period average volume analytical result from the "Financial Instruments Analytical Results Management (BA)" system 75004, using a FinancialInstrumentPositionPeriodAverageVolumeAnalyticalResultCreateRequest message 75022 as shown, for example, in FIG. 75. The "Ledger for Financial Instruments" system 75002 can request the creation of financial instrument position period average volume analytical result from the "Financial Instruments Analytical Results Management (BA)" system 75004, using a FinancialInstrumentPositionPeriodAverageVolumeAnalyticalResultCreateRequest message 75024 as shown, for example, in FIG. 75.

The "Ledger for Financial Instruments" system 75002 can request the cancellation of the financial instrument position period average volume analytical result from the "Financial Instruments Analytical Results Management (BA)" system 75004, using a FinancialInstrumentPositionPeriodAverageVolumeAnalyticalResultCancelRequest message 75026 as shown, for example, in FIG. 75. The "Ledger for Financial Instruments" system 75002 can request the cancellation of financial instrument position period average volume analytical results from the "Financial Instruments Analytical Results Management (BA)" system 75004, using a FinancialInstrumentPositionPeriodAverageVolumeAnalyticalResultBulkCancelRequest message 75028 as shown, for example, in FIG. 75. The "Ledger for Financial Instruments" system 75002 can request the creation of a financial instrument position accounting valuation analytical result from the "Financial Instruments Analytical Results Management (BA)" system 75004, using a FinancialInstrumentPositionAccountingValuationAnalyticalResultCreateRequest message 75030 as shown, for example, in FIG. 75.

The "Ledger for Financial Instruments" system 75002 can request the creation of financial instrument position accounting valuation analytical results from the "Financial Instruments Analytical Results Management (BA)" system 75004, using a FinancialInstrumentPositionAccountingValuationAnalyticalResultBulkCreateRequest message 75032 as shown, for example, in FIG. 75. The "Ledger for Financial Instruments" system 75002 can request the cancellation of the financial instrument position accounting valuation analytical result from the "Financial Instruments Analytical Results Management (BA)" system 75004, using a FinancialInstrumentPositionAccountingValuationAnalyticalResultCancelRequest message 75034 as shown, for example, in FIG. 75. The "Ledger for Financial Instruments" system 75002 can request the cancellation of financial instrument position accounting valuation analytical results from the "Financial Instruments Analytical Results Management (BA)" system 75004, using a FinancialInstrumentPositionAccountingValuationAnalyticalResultBulkCancelRequest message 75036 as shown, for example, in FIG. 75.

Figure 76:
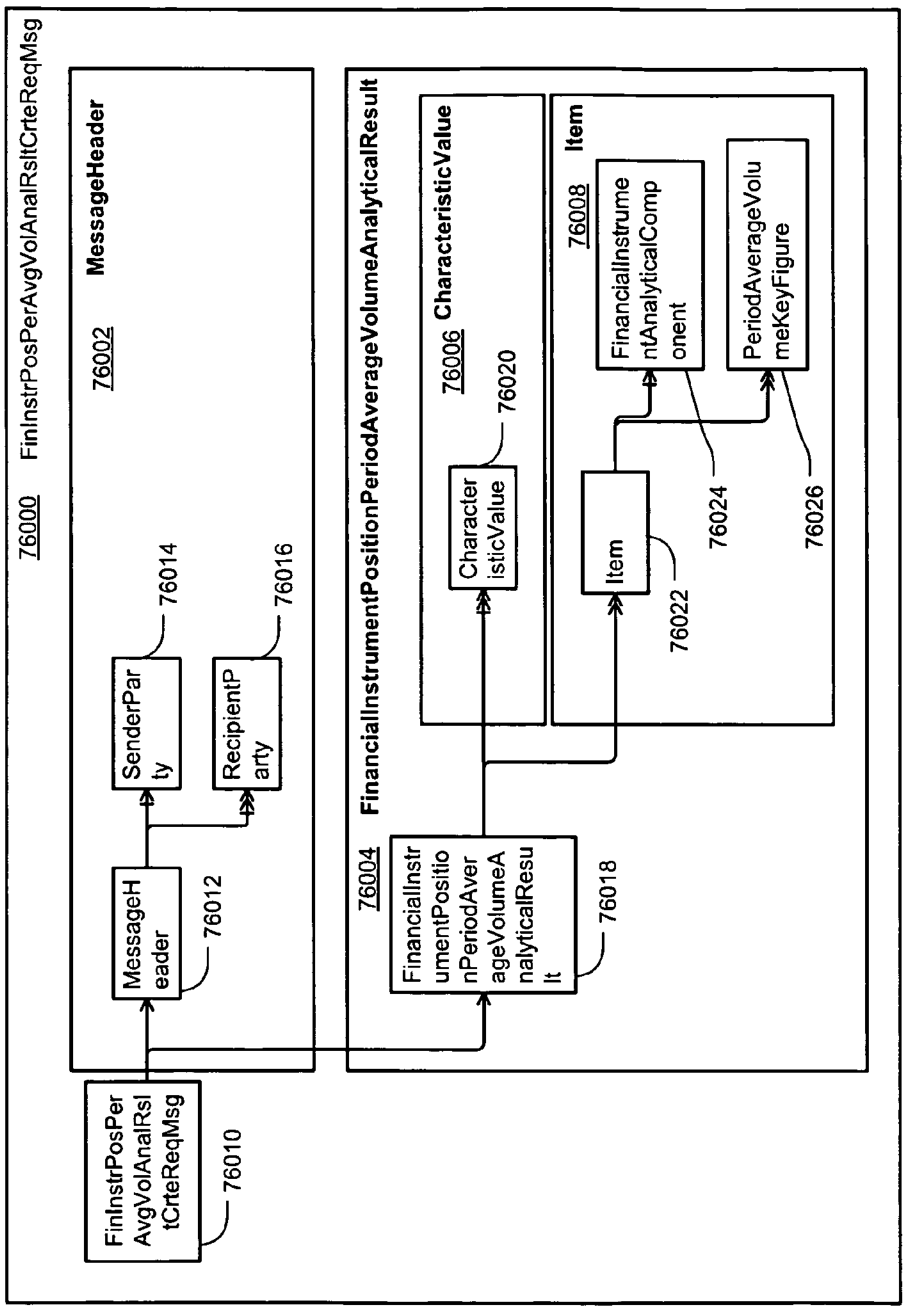
FIG. 76 shows an exemplary FinInstrPosPerAvgVolAnalRsltCrteReqMsg Message Data Type.

FIG. 76 illustrates one example logical configuration of FinInstrPosPerAvgVolAnalRsltCrteReqMsg message 76000. Specifically, this figure depicts the arrangement and hierarchy of various components such as one or more levels of packages, entities, and datatypes, shown here as 76002 through 76026. As described above, packages may be used to represent hierarchy levels. Entities are discrete business elements that are used during a business transaction. Data types are used to type object entities and interfaces with a structure. For example, FinInstrPosPerAvgVolAnalRsltCrteReqMsg message 76000 includes, among other things, SenderParty 76014. Accordingly, heterogeneous applications may communicate using this consistent message configured as such.

Figure 77:
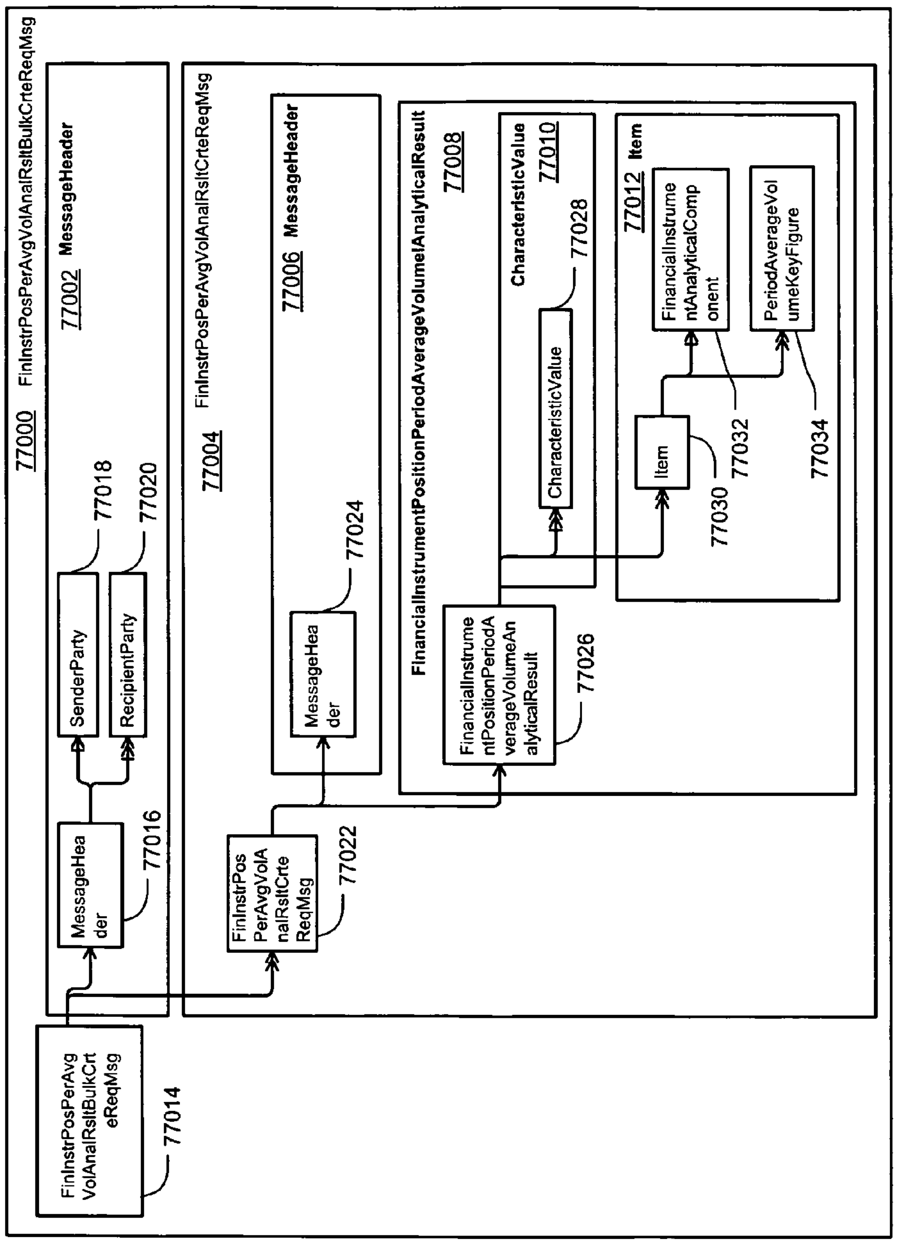
FIG. 77 shows an exemplary FinInstrPosPerAvgVolAnalRsltBulkCrteReqMsg Message Data Type.

Additionally, FIG. 77 illustrates one example logical configuration of FinInstrPosPerAvgVolAnalRsltBulkCrteReqMsg message 77000. Specifically, this figure depicts the arrangement and hierarchy of various components such as one or more levels of packages, entities, and datatypes, shown here as 77002 through 77034. As described above, packages may be used to represent hierarchy levels. Entities are discrete business elements that are used during a business transaction. Data types are used to type object entities and interfaces with a structure. For example, FinInstrPosPerAvgVolAnalRsltBulkCrteReqMsg message 77000 includes, among other things, SenderParty 77018. Accordingly, heterogeneous applications may communicate using this consistent message configured as such.

Figure 78:
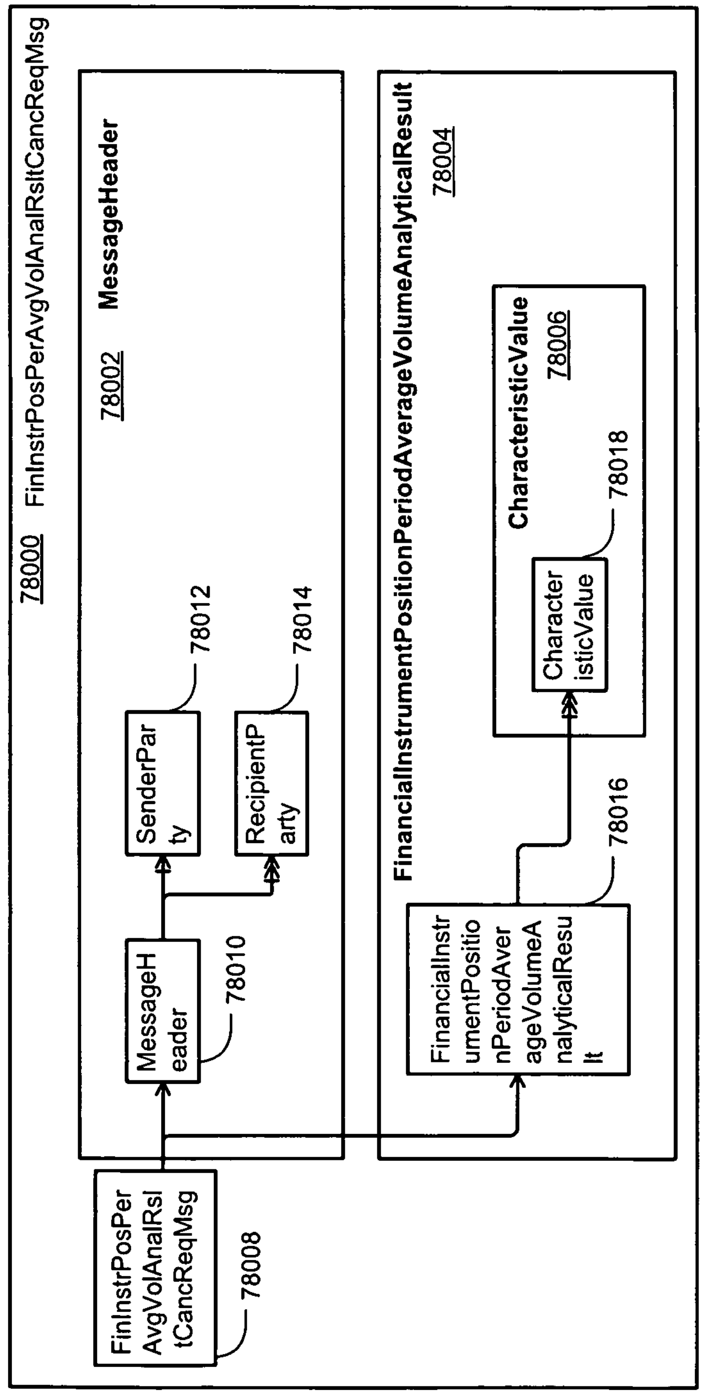
FIG. 78 shows an exemplary FinInstrPosPerAvgVolAnalRsltCancReqMsg Message Data Type.

Additionally, FIG. 78 illustrates one example logical configuration of FinInstrPosPerAvgVolAnalRsltCancReqMsg message 78000. Specifically, this figure depicts the arrangement and hierarchy of various components such as one or more levels of packages, entities, and datatypes, shown here as 78002 through 78018. As described above, packages may be used to represent hierarchy levels. Entities are discrete business elements that are used during a business transaction. Data types are used to type object entities and interfaces with a structure. For example, FinInstrPosPerAvgVolAnalRsltCancReqMsg message 78000 includes, among other things, SenderParty 78012. Accordingly, heterogeneous applications may communicate using this consistent message configured as such.

Figure 79:
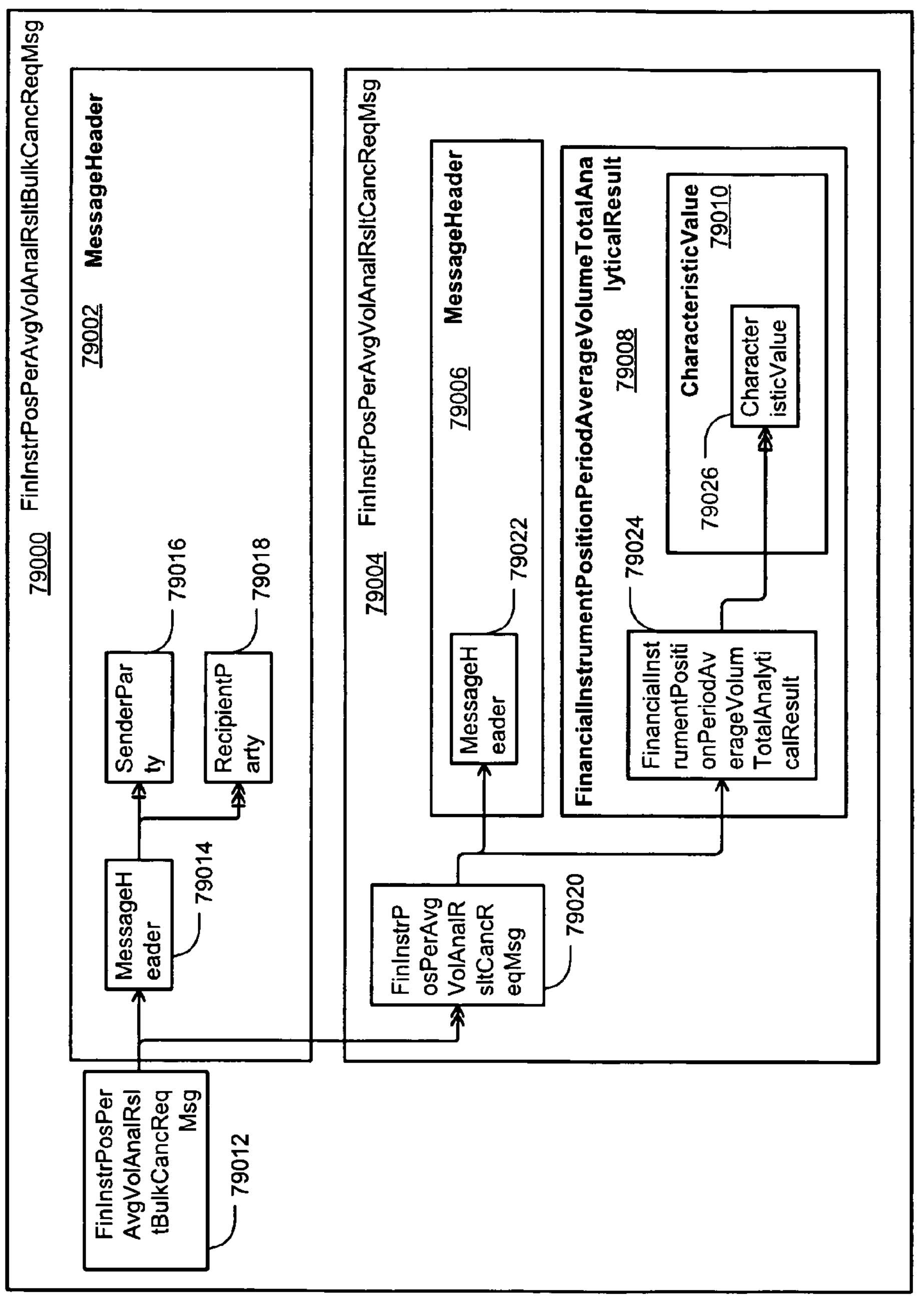
FIG. 79 shows an exemplary FinInstrPosPerAvgVolAnalRsltBulkCancReqMsg Message Data Type.

Additionally, FIG. 79 illustrates one example logical configuration of FinInstrPosPerAvgVolAnalRsltBulkCancReqMsg message 79000. Specifically, this figure depicts the arrangement and hierarchy of various components such as one or more levels of packages, entities, and datatypes, shown here as 79002 through 79026. As described above, packages may be used to represent hierarchy levels. Entities are discrete business elements that are used during a business transaction. Data types are used to type object entities and interfaces with a structure. For example, FinInstrPosPerAvgVolAnalRsltBulkCancReqMsg message 79000 includes, among other things, SenderParty 79016. Accordingly, heterogeneous applications may communicate using this consistent message configured as such.

FIG. 80 illustrates one example logical configuration of a FinInstrPosPerAvgVolAnalRsltBulkCancReqMsg 80000 element structure. Specifically, this figure depicts the arrangement and hierarchy of various components such as one or more levels of packages, entities, and datatypes, shown here as 80000 through 80020. As described above, packages may be used to represent hierarchy levels. Entities are discrete business elements that are used during a business transaction. Data types are used to type object entities and interfaces with a structure. For example, the FinInstrPosPerAvgVolAnalRsltBulkCancReqMsg 80000 includes, among other things, a FinInstrPosPerAvgVolAnalRsltBulkCancReqMsg 80002. Accordingly, heterogeneous applications may communicate using this consistent message configured as such.

FIG. 81 illustrates one example logical configuration of a FinInstrPosPerAvgVolAnalRsltBulkCrteReqMsg 81000 element structure. Specifically, this figure depicts the arrangement and hierarchy of various components such as one or more levels of packages, entities, and datatypes, shown here as 81000 through 81020. As described above, packages may be used to represent hierarchy levels. Entities are discrete business elements that are used during a business transaction. Data types are used to type object entities and interfaces with a structure. For example, the FinInstrPosPerAvgVolAnalRsltBulkCrteReqMsg 81000 includes, among other things, a FinInstrPosPerAvgVolAnalRsltBulkCrteReqMsg 81002. Accordingly, heterogeneous applications may communicate using this consistent message configured as such.

FIGS. 82-1 through 82-3 illustrate one example logical configuration of a FinInstrPosPerAvgVolAnalRsltCancReqMsg 82000 element structure. Specifically, these figures depict the arrangement and hierarchy of various components such as one or more levels of packages, entities, and datatypes, shown here as 82000 through 82082. As described above, packages may be used to represent hierarchy levels. Entities are discrete business elements that are used during a business transaction. Data types are used to type object entities and interfaces with a structure. For example, the FinInstrPosPerAvgVolAnalRsltCancReqMsg 82000 includes, among other things, a FinInstrPosPerAvgVolAnalRsltCancReqMsg 82002. Accordingly, heterogeneous applications may communicate using this consistent message configured as such.

FIGS. 83-1 through 83-6 illustrate one example logical configuration of a FinInstrPosPerAvgVolAnalRsltCrteReqMsg 83000 element structure. Specifically, these figures depict the arrangement and hierarchy of various components such as one or more levels of packages, entities, and datatypes, shown here as 83000 through 83180. As described above, packages may be used to represent hierarchy levels. Entities are discrete business elements that are used during a business transaction. Data types are used to type object entities and interfaces with a structure. For example, the FinInstrPosPerAvgVolAnalRsltCrteReqMsg 83000 includes, among other things, a FinInstrPosPerAvgVolAnalRsltCrteReqMsg 83002. Accordingly, heterogeneous applications may communicate using this consistent message configured as such.

The FinInstrPosPerAvgVolAnalRsltCrteReqMsg message data type may include the business information that may be relevant for sending an analytical result in a message and/or the information that may be relevant for creating an instance of FinancialInstrumentPositionPeriodAverageVolumeAnalyticalResult. The FinInstrPosPerAvgVolAnalRsltCrteReqMsg message data type may include the packages MessageHeader and/or FinancialInstrumentPositionPeriodAverageVolumeAnalyticalResult.

A MessageHeader package may group the business information that may be relevant for sending an analytical result in a message. It may include the entity MessageHeader. In some implementations, a MessageHeader may group business information from the perspective of the sending application as information to identify the business document in a message, information about the sender, and/or information about the recipient. The MessageHeader may include SenderParty and/or RecipientParty. A MessageHeader may be of type GDT BusinessDocumentMessageHeader, whereby the ID and/or CreationDateTime elements of the GDT may be used. The ID and the CreationDateTime may be set by the sending application. A SenderParty may be a party responsible for sending an analytical result at a business application level. The SenderParty may be of type GDT BusinessDocumentMessageHeaderParty. The SenderParty can be filled by the sending application to name a contact person for problems with the message. SenderParty may be simply used to transfer the message and may be ignored by the receiving application.

RecipientParty may be a party responsible for receiving an analytical result at a business application level. The RecipientParty may be of type GDT BusinessDocumentMessageHeaderParty. RecipientParty can be filled by the sending application to name a contact person for problems that occur with the message. RecipientParty may be simply used to transfer the message and may be ignored by the receiving application. A FinancialInstrumentPositionPeriodAverageVolumeAnalyticalResult package may group FinancialInstrumentPositionPeriodAverageVolumeAnalyticalResult with its packages. It may include the packages CharacteristicValue and/or Item. A FinancialInstrumentPositionPeriodAverageVolumeAnalyticalResult package may be a result of a calculation of a financial instrument position's average volume in a given period. In some implementations, the volume may be a measure of a financial instrument positions 'size'. Different measures of a volume may be applied, such as nominal, cost price, market value or average effective capital. The average volume may be used for a calculation of indirect costs, such as funding costs, costs of risk and costs of capital. For intraperiod analysis, average volumes may be used as period-to-date averages. In some implementations, FinancialInstrumentPosition-PeriodAverageVolumeAnalyticalResult may be subdivided into CharacteristicValue, which may further specify custom characteristics for a financial instrument position and/or Item, which may further specify details of the analytical result. FinancialInstrumentPosition-PeriodAverageVolumeAnalyticalResult may include the following elements: GroupID, FinancialInstrumentID, StandardisedFinancialInstrumentAccountID, FinancialInstrumentPosition-CharacteristicValueCombinationID, CompanyID, OrganisationalCentreID, FiscalYearID, AccountingPeriodID, FinancialInstrumentCategoryCode, DatePeriod and/or CreationDateTime.

BusinessTransactionDocumentGroupID may uniquely identify a group of business documents that may be considered as one group within a business process. It may refer to a group of analytical results for which an analytical result was calculated. BusinessTransactionDocumentGroupID may be used in messages that cancel by reference. BusinessTransactionDocumentGroupID may be based on GDT: BusinessTransactionDocumentGroupID. BusinessTransactionDocumentID may be a unique identifier for a business transaction document. It may refer to a financial instrument for which an analytical result was calculated, and may be based on GDT: BusinessTransactionDocumentID. FinancialInstrumentAccountID may be a unique identifier of an account for financial instruments. It may refer to an account for a position of a standardized financial instrument. FinancialInstrumentID may be based on GDT: BusinessTransactionDocumentID. FinancialInstrumentPosition-CharacteristicValueCombinationID may be a unique identifier for a FinancialInstrumentPosition-CharacteristicValueCombination. It may refer to a financial instrument position. FinancialInstrumentPosition-CharacteristicValueCombinationID may be based on GDT: FinancialInstrumentPosition-CharacteristicValueCombinationID. CompanyID may be an identifier for a company. It may refer to the company that owns a financial instrument for which an analytical result was calculated. CompanyID may be based on GDT: CompanyID. OrganisationalCentreID may be a unique identifier of an organizational unit. It may refer to a center which may be responsible for a contribution of a financial instrument position to a bank's financial result. OrganisationalCentreID may be based on GDT: OrganisationalCentreID. FiscalYearID may be a unique identifier for a fiscal year. It may refer to a year for which the profit and loss of a company may be accounted (i.e. inventory and balance sheet). FiscalYearID may be based on GDT: FiscalYearID.

AccountingPeriodID may be a unique identifier for an accounting period in a fiscal year. AccountingPeriodID may be based on GDT: AccountingPeriodID. FinancialInstrumentCategoryCode may be a coded representation of the category of a financial instrument for which an analytical result was calculated. FinancialInstrumentCategoryCode may be based on GDT: FinancialInstrumentCategoryCode. A DatePeriod may be a period that may be identified by two points in time. These points in time may be expressed in calendar days. It may refer to a period for the key figure values delivered. DatePeriod may be based on GDT: CLOSED_DatePeriod. GLOBAL_DateTime may be an accurate-to-the-second time-point of a calendar day in time zone UTC. It may refer to a point in time at which an analytical result was calculated. GLOBAL_DateTime may be based on GDT: GLOBAL_DateTime, possibly with the qualifier Creation.

In some implementations, StandardisedFinancialInstrumentAccountID may be relevant for standardized financial instruments, such as for financial instruments where the financial instrument category code may be equal to '1'. In some examples, StandardisedFinancialInstrumentAccountID may not be filled for non-standardized financial instruments, such as for financial instruments where the financial instrument category code may be equal to '2'. DatePeriod may coincide with an accounting period. The CharacteristicValue package may group a set of characteristics with its values. It may include the entity CharacteristicValue. CharacteristicValue may be a combination of a characteristic and a characteristic value. CharacteristicValue may include the following elements: FinancialInstrumentPosition-CharacteristicID. FinancialInstrumentPosition-CharacteristicID may be an identifier for a FinancialInstrumentPositionCharacteristic. FinancialInstrumentPositionCharacteristicID may be based on GDT: FinancialInstrumentPositionCharacteristicID. FinancialInstrumentPositionCharacteristicValue may be an arbitrary value that a financial instrument position characteristic can have. FinancialInstrumentPosition-CharacteristicValue may be based on GDT: FinancialInstrumentPositionCharacteristicValue.

The Item package may group a result according to items for a period average volume. It may include the entity Item. Item may represent a specific part of a financial instrument position for which FinancialInstrumentPosition-PeriodAverageVolumeResult may be specified; for structured financial instruments, it may be subdivided by FinancialInstrumentAnalyticalComponent and PeriodAverageVolumeKeyFigure. FinancialInstrumentPosition-PeriodAverageVolumeResultItem may be subdivided into a FinancialInstrumentAnalyticalComponentReference that may further specify the item, and PeriodAverageVolumeKeyFigure that further may specify the details of the item of an analytical result. FinancialInstrumentPosition-PeriodAverageVolumeAnalyticalResultItem may include the elements ID, AssetLiabilityCode, FinancialInstrumentCashFlowOwnAllotmentPortionIndicator, and FinancialInstrumentCashFlowCoveragePortionCode.

BusinessTransactionDocumentItemID may be a unique identifier of an item or subitem of a document within a business transaction and/or may be unique in the context of a business transaction. It may refer to an analytical result item for an accounting period average volume of a financial instrument position. BusinessTransactionDocumentID may be based on GDT: BusinessTransactionDocumentItemID. The AssetLiabilityCode may be a coded representation of an asset or liability side of a balance sheet. AssetLiabilityCode may be based on GDT: AssetLiabilityCode. FinancialInstrumentCashFlowOwnAllotmentPortionIndicator may indicate that a portion of a cash flow of a financial instrument falls into a portion that may be allotted to the business ('own allotment'). FinancialInstrumentCashFlowOwnAllotmentPortionIndicator may be based on GDT: OwnAllotmentIndicator. FinancialInstrumentCashFlowCoveragePortionCode may be a coded representation of a portion of coverage for a cash flow of a financial instrument.

FinancialInstrumentAnalyticalComponentReference may be a reference to an analytical component on a financial instrument. The component may be made at issuance of a financial instrument and may or may not be revised for subsequent changes in market interest rates, share prices, and/or other events that change the likelihood that an option included in a financial instrument may be exercised. FinancialInstrumentAnalyticalComponentReference may include the elements ID, TypeCode and/or CurrencyCode. FinancialInstrumentCashFlowCoveragePortionCode may be based on GDT: FinancialInstrumentCashFlowCoveragePortionCode. FinancialInstrumentAnalyticalComponentID may be an identifier for a FinancialInstrumentAnalyticalComponent. FinancialInstrumentAnalyticalComponentTypeCode may be a code representation of an analytical component of a financial instrument. FinancialInstrumentAnalyticalComponentID may be based on GDT: FinancialInstrumentAnalyticalComponentID. CurrencyCode may be a coded representation of a currency. It may refer to the object currency of a financial instrument analytical component. CurrencyCode may be based on GDT:CurrencyCode. In some implementations, the FinancialInstrumentAnalyticalComponentID may be unique in the context of the FinancialInstrumentAnalyticalComponentTypeCode and/or the FinancialInstrumentAnalyticalComponentCurrencyCode.

PeriodAverageVolumeKeyFigure may be an accounting period total value for a financial instrument position. FinancialInstrumentPositionAccountingPeriodTotalAnalyticalResultAmount may include the elements Code and/or Value. FinancialInstrumentPeriodAverageVolumeKeyFigureCode may be a coded representation of a period average volume key figure for financial instruments. FinancialInstrumentPeriodAverageVolumeKeyFigureCode may be based on GDT: FinancialInstrumentPeriodAverageVolumeKeyFigureCode. Value may express the concept of numeric worth in general. It may refer to one or more values (amount, quantity, etc.) for a key figure that may be defined by the FinancialInstrumentPostingKeyFigureCode. Value may be based on GDT: Value. PeriodAverageVolumeKeyFigure may be based on some or all of the GDT and/or CDT: AccountingPeriodID, AssetLiabilityCode, BusinessDocumentMessageHeader, BusinessTransactionDocumentGroupID, BusinessTransactionDocumentID, BusinessTransactionDocumentItemID, CurrencyCode, CompanyID, CLOSED_DatePeriod, FinancialInstrumentAccountID, FinancialInstrumentAnalyticalComponentReference, FinancialInstrumentAnalyticalComponentID, FinancialInstrumentAnalyticalComponentTypeCode, FinancialInstrumentCashFlowCoverageSplitCode, FinancialInstrumentCashFlowSyndicationSplitCode, FinancialInstrumentCategoryCode, FinancialInstrumentPeriodAverageVolumeKeyFigureCode, FinancialInstrumentPositionCharacteristicID, FinancialInstrumentPositionCharacteristicValue, FinancialInstrumentPositionCharacteristicValueCombinationID, FiscalYearID, GLOBAL_DateTime, OrganisationalCentreID, and Value.

The FinInstrPosPerAvgVolAnalRsltBulkCrteReqMsg message data type may include business information that may be relevant for sending analytical results in a message and/or information that may be relevant for creating an instance of FinancialInstrumentPositionPeriodAverageVolumeAnalyticalResult. It may include the packages MessageHeader and/or FinInstrPosPerAvgVolAnalRsltCrteReqMsg. The FinInstrPosPerAvgVolAnalRsltBulkCrteReqMsg message data type may provide a structure for the FinancialInstrumentPosPeriodAverageVolumeAnalyticalResultsCreateRequest message type and service-operations that are based on it. The FinInstrPosPerAvgVolAnalRsltBulkCrteReqMsg package may be based on the FinInstrPosPerAvgVolAnalRsltCrteReqMsg message data type. The FinInstrPosPerAvgVolAnalRsltCancReqMsg message data type may include business information that may be relevant for sending an analytical result in a message and/or information that may be relevant for canceling an instance of FinancialInstrumentPositionPeriodAverageVolumeAnalyticalResult. It may include the packages MessageHeader and/or FinancialInstrumentPositionPeriodAverageVolumeAnalyticalResult. The FinInstrPosPerAvgVolAnalRsltCancReqMsg message data type may provide a structure for the FinancialInstrumentPositionPeriodAverageVolumeAnalyticalResultCancelRequest message type and service-operations that may be based on it.

FinancialInstrumentPositionPeriodAverageVolumeAnalyticalResult may group FinancialInstrumentPositionPeriodAverageVolumeAnalyticalResult with its packages. It may include the package CharacteristicValue. FinancialInstrumentPositionPeriodAverageVolumeAnalyticalResult may be a result of a calculation of a financial instrument position's average volume in a given period. The volume may be a measure of a financial instrument position's 'size'. Different measures of a volume may be applied, such as nominal, cost price, market value or average effective capital. The average volume may be used for a calculation of indirect costs, such as funding costs, costs of risk and costs of capital. For intra-period analysis average, volumes may be used as period-to-date averages. FinancialInstrumentPositionPeriodAverageVolumeAnalyticalResult may be subdivided into CharacteristicValue, which further may specify custom characteristics for a financial instrument position.

FinancialInstrumentPositionPeriodAverageVolumeAnalyticalResult may include the elements GroupID, FinancialInstrumentID, StandardisedFinancialInstrumentAccountID, FinancialInstrumentPositionCharacteristicValueCombinationID, FinancialInstrumentCategoryCode, DatePeriod, and/or CreationDateTime. A BusinessTransactionDocumentGroupID may uniquely identify a group of business documents that can be considered as one group within a business process. It may refer to a group of analytical results for which an analytical result was calculated. BusinessTransactionDocumentGroupID may be used in messages that cancel by reference. BusinessTransactionDocumentGroupID may be based on GDT: BusinessTransactionDocumentGroupID. A BusinessTransactionDocumentID may be a unique identifier for a business transaction document. It may refer to a financial instrument for which an analytical result may be calculated. BusinessTransactionDocumentID may be based on GDT: BusinessTransactionDocumentID. A FinancialInstrumentAccountID may be a unique identifier of an account for financial instruments. It may refer to an account for a position of a standardized financial instrument. FinancialInstrumentAccountID may be based on GDT: FinancialInstrumentAccountID. A FinancialInstrumentPositionCharacteristicValueCombinationID may be a unique identifier for a FinancialInstrumentPositionCharacteristicValueCombination. It may refer to a financial instrument position. FinancialInstrumentPositionCharacteristicValueCombinationID may be based on GDT: FinancialInstrumentPositionCharacteristicValueCombinationID.

FinancialInstrumentCategoryCode may be a coded representation of a category of a financial instrument for which an analytical result was calculated. FinancialInstrumentCategoryCode may be based on GDT: FinancialInstrumentCategoryCode. A DatePeriod may be a period that may be identified by two points in time. These points in time may be expressed in calendar days. It may refer to a period for the key figure values delivered. DatePeriod may be based on GDT: CLOSED_DatePeriod. GLOBAL_DateTime may be an accurate-to-the-second time-point of a calendar day in time zone UTC. It may refer to a point in time at which an analytical result was calculated. GLOBAL_DateTime may be based on GDT: GLOBAL_DateTime, possibly with the qualifier Creation.

In some implementations, StandardisedFinancialInstrumentAccountID may be relevant for standardized financial instruments (that is, for some financial instruments where the financial instrument category code may be equal to '1'). In some implementations, it may not be filled for non-standardized financial instruments (that is, for some financial instruments where the financial instrument category code may be equal to '2'). The FinInstrPosPerAvgVolAnalRsltBulkCancReqMsg message data type may include business information that may be relevant for sending analytical results in a message and/or the information that may be relevant for canceling an instance of FinancialInstrumentPositionPeriodAverageVolumeAnalyticalResult. It may include the packages MessageHeader and/or FinInstrPosPerAvgVolAnalRsltCancReqMsg. The FinInstrPosPerAvgVolAnalRsltBulkCancReqMsg message data type may provide a structure for the FinancialInstrumentPosPeriodAverageVolumeAnalyticalResultsCancelRequest message type and service-operations that may be based on it. The FinInstrPosPerAvgVolAnalRsltCancReqMsg package may be based on FinInstrPosPerAvgVolAnalRsltCancReqMsg message data.

A number of implementations have been described. Nevertheless, it will be understood that various modifications may be made without departing from the spirit and scope of the disclosure. Accordingly, other implementations are within the scope of the following claims.

What is claimed is:

1. A non-transitory computer readable medium including program code for providing a message-based interface for performing a financial instrument position accounting period total analytical result service, the medium comprising:

program code for receiving via a message-based interface derived from a common business object model, where the common business object model includes business objects having relationships that enable derivation of message packages, the message-based interface exposing at least one service as defined in a service registry and from a heterogeneous application executing in an environment of computer systems providing message-based services, a first message for requesting creation of a profitability analysis scenario for providing a key figure-based view of the performance of a bank, including information that a ledger for financial instruments can use to create or cancel one or more analytical results for an accounting period total, the first message including a first message package derived from the common business object model and hierarchically organized in memory, the hierarchical organization of the first message package including:

at a first hierarchical level within the first message package, a financial instrument position accounting period total analytical result create request message entity; and at the first hierarchical level within the first message package, a financial instrument position accounting period total analytical result package, where the financial instrument position accounting period total analytical result package includes, at a second hierarchical level within the first message package, a financial instrument position accounting period total analytical result entity and an item package, where the financial instrument position accounting period total analytical result entity includes, at a third hierarchical level within the first message package, a group ID, a financial instrument ID, a company ID, a set of books ID, a fiscal year ID, an accounting period ID, a financial instrument category code, and a creation date time, where the item package includes, at the third hierarchical level within the first message package, at least one item entity, where each item entity includes, at a fourth hierarchical level within the first message package, an ID and at least one posting key figure, and where each posting key figure includes, at a fifth hierarchical level within the first message package, a financial instrument posting key figure code and a financial instrument posting key figure value;

program code for processing the first message based on the hierarchical organization of the first message package, where processing the first message includes unpacking the first message package based on the first message package's structure and the first message package's derivation from the common business object model, wherein the particular structure of the first message package is used at least in part to identify the purpose of the first message; and program code for sending a second message to the heterogeneous application responsive to the first message, where the second message includes a second message package derived from the common business object model to provide consistent semantics with the first message package.

2. The medium of claim 1, wherein the financial instrument position accounting period total analytical result package further includes a characteristic value package, where the characteristic value package includes at least one characteristic value entity, where each characteristic value entity includes a financial instrument position characteristic ID and a financial instrument position characteristic value.

3. The medium of claim 1, wherein the financial instrument position accounting period total analytical result entity further includes at least one of the following: a standardized financial instrument account ID, a financial instrument position characteristic value combination ID, an organizational center ID, and a validity end date.

4. A distributed system operating in a landscape of computer systems providing message-based services defined in a service registry, the system comprising:

at least one processor operable to execute computer readable instructions embodied on tangible media;

a graphical user interface comprising computer readable instructions executable by the at least one processor, embedded on tangible media, for requesting creation of a profitability analysis scenario for providing a key figure-based view of the performance of a bank, including information that a ledger for financial instruments can use to create or cancel one or more analytical results for an accounting period total, using a request;

a first memory storing a user interface controller for processing the request when executed by the at least one processor and involving a message including a message package derived from a common business object model, where the common business object model includes business objects having relationships that enable derivation of message-based service interfaces and message packages, the message package hierarchically organized, the hierarchical organization of the message package including:

at a first hierarchical level within the message package, a financial instrument position accounting period total analytical result create request message entity; and at the first hierarchical level within the message package, a financial instrument position accounting period total analytical result package, where the financial instrument position accounting period total analytical result package includes, at a second hierarchical level within the message package, a financial instrument position accounting period total analytical result entity and an item package, where the financial instrument position accounting period total analytical result entity includes, at a third hierarchical level within the message package, a group ID, a financial instrument ID, a company ID, a set of books ID, a fiscal year ID, an accounting period ID, a financial instrument category code, and a creation date time, where the item package includes, at the third hierarchical level within the message package, at least one item entity, where each item entity includes, at a fourth hierarchical level within the message package, an ID and at least one posting key figure, and where each posting key figure includes, at a fifth hierarchical level within the message package, a financial instrument posting key figure code and a financial instrument posting key figure value; and a second memory, remote from the graphical user interface, storing a plurality of message-based service interfaces derived from the common business object model to provide consistent semantics with messages derived from the common business object model, where one of the message-based service interfaces is operable to process the message via the service interface when executed by the at least one processor, where processing the message includes unpacking the message package based on the message package's structure and the message package's derivation from the common business object model, where the specific hierarchical organization of the message package is used at least in part to identify the purpose of the message.

5. The distributed system of claim 4, wherein the first memory is physically remote from the graphical user interface.

6. The distributed system of claim 4, wherein the first memory is physically remote from the second memory.

* * * * *